(12) United States Patent
Lutnick et al.

(10) Patent No.: US 12,436,604 B2
(45) Date of Patent: Oct. 7, 2025

(54) GAME WITH HAND MOTION CONTROL

(71) Applicant: CFPH, LLC, New York, NY (US)

(72) Inventors: Howard W. Lutnick, New York, NY (US); Dean P. Alderucci, Westport, CT (US); Geoffrey M. Gelman, Brooklyn, NY (US)

(73) Assignee: CFPH, LLC, New York, NY (US)

( * ) Notice: Subject to any disclaimer, the term of this patent is extended or adjusted under 35 U.S.C. 154(b) by 0 days.

(21) Appl. No.: 18/669,609

(22) Filed: May 21, 2024

(65) Prior Publication Data
US 2024/0302893 A1 Sep. 12, 2024

Related U.S. Application Data

(63) Continuation of application No. 17/520,793, filed on Nov. 8, 2021, now Pat. No. 12,032,729, which is a continuation of application No. 16/592,120, filed on Oct. 3, 2019, now Pat. No. 11,169,595, which is a continuation of application No. 15/131,991, filed on Apr. 18, 2016, now Pat. No. 10,459,518, which is a continuation of application No. 11/754,944, filed on May 29, 2007, now Pat. No. 9,317,110.

(51) Int. Cl.
*G06F 3/01* (2006.01)
*G06V 40/10* (2022.01)
*G07F 17/32* (2006.01)

(52) U.S. Cl.
CPC ............ *G06F 3/011* (2013.01); *G06V 40/107* (2022.01); *G07F 17/32* (2013.01); *G07F 17/3209* (2013.01); *A63F 2300/1093* (2013.01); *A63F 2300/201* (2013.01); *A63F 2300/204* (2013.01); *A63F 2300/6045* (2013.01)

(58) Field of Classification Search
None
See application file for complete search history.

(56) References Cited

U.S. PATENT DOCUMENTS

| | | | | |
|---|---|---|---|---|
| 10,459,518 B2* | 10/2019 | Lutnick | ............... | G07F 17/3209 |
| 2005/0014542 A1* | 1/2005 | Ueshima | ............... | A63F 13/833 |
| | | | | 463/8 |
| 2006/0205505 A1* | 9/2006 | Hussaini | ................. | A63F 13/20 |
| | | | | 463/36 |
| 2008/0119279 A1* | 5/2008 | Nogami | ................. | A63F 13/12 |
| | | | | 463/42 |
| 2008/0207325 A1* | 8/2008 | Hsu | ........................ | A63F 13/212 |
| | | | | 463/39 |
| 2013/0190135 A1* | 7/2013 | Pryor | ................. | B60R 11/0235 |
| | | | | 482/8 |

* cited by examiner

*Primary Examiner* — Peter J Iannuzzi

(57) ABSTRACT

In various embodiments, the motion of a wristband is used to control games.

12 Claims, 66 Drawing Sheets

MAPPING ONE RGB COMPONENT OF A COLOR
HERE, THE RED COMPONENT IS USED. THE SAME
PROCESS CAN BE USED FOR THE GREEN AND BLUE
COMPONENTS AS WELL.

Ar - IS THE RED COMPONENT OF THE AQUA COLOR

Or - IS THE RED COMPONENT OF THE ORANGE COLOR

Pr - IS THE RED COMPONENT OF THE PIXEL COLOR

Cr - IS THE RED COMPONENT OF THE COLOR ADJUSTED
     TO BE BETWEEN A AND O

Raw Image

Filtered Image

Low-Value Threshold

High-Value Threshold

Binary Difference

Binary Difference Map

Reduced Difference Map

Another Binary Difference Map

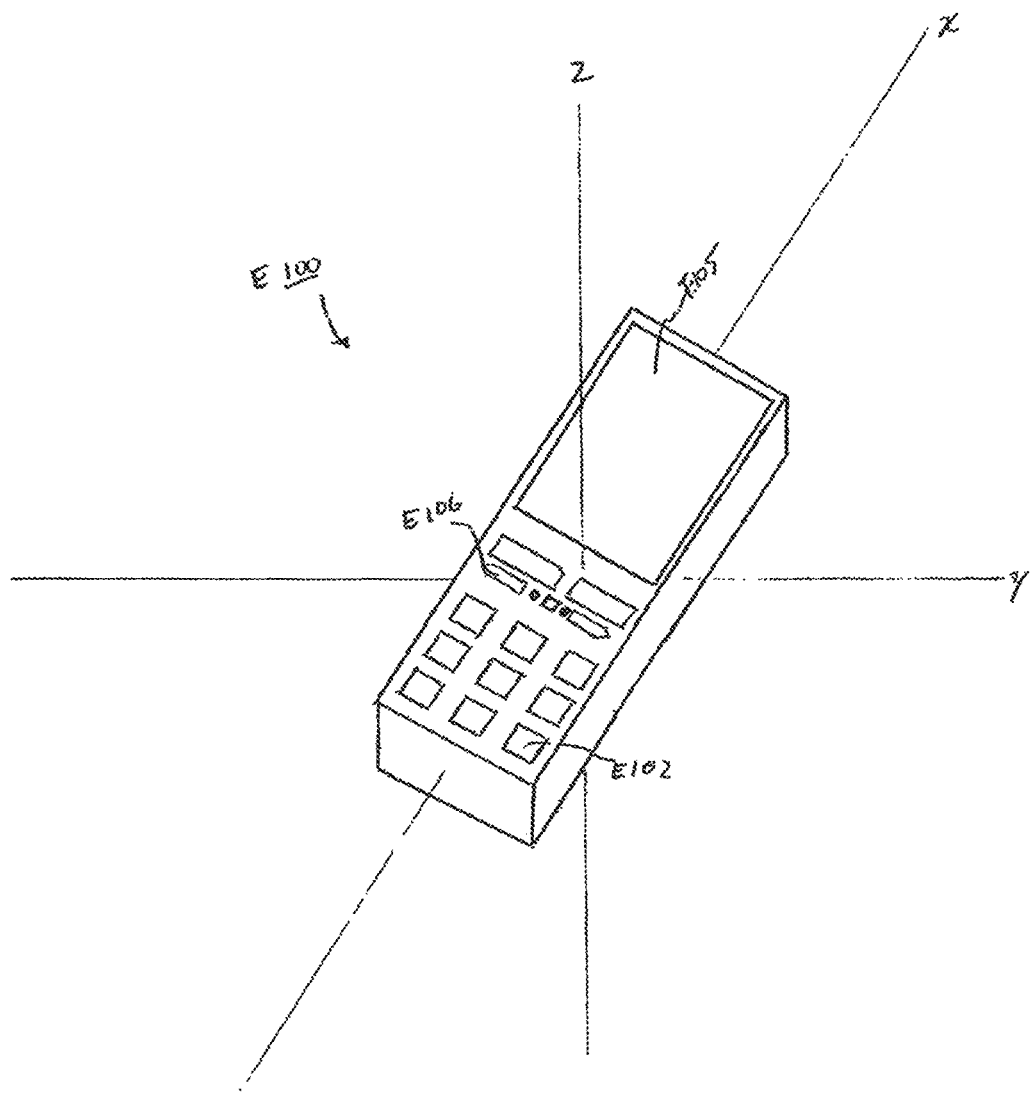

|  | Left | Center | Right |
|---|---|---|---|
| Up | A | B | C |
| Center | a | b | c |
| Down | 2 | 2 | 2 |

FIG. 37

| | Left | Center | Right |
|---|---|---|---|
| Up | ! | @ | # |
| Center | $ | % | ^ |
| Down | & | * | ( |

GAME WITH HAND MOTION CONTROL

CROSS REFERENCE TO RELATED APPLICATION

This application is a continuation of U.S. patent application Ser. No. 17/520,793 filed Nov. 8, 2021, which is a continuation of U.S. patent application Ser. No. 16/592,120 filed Oct. 3, 2019 (now U.S. Pat. No. 11,169,595 issued Nov. 9, 2021), which is a continuation of U.S. patent application Ser. No. 15/131,991 filed Apr. 18, 2016 (now U.S. Pat. No. 10,459,518 issued Oct. 29, 2019), which is a continuation of U.S. patent application Ser. No. 11/754,944 filed May 29, 2007 (now U.S. Pat. No. 9,317,110 issued Apr. 19, 2016), each of which is incorporated by reference herein in its entirety.

BRIEF DESCRIPTION OF THE FIGURES

FIG. 28 depicts the exterior appearance of a device according to some embodiments, in a state where the device is in the neutral position.

FIG. 37 is a table showing one possible mapping of device orientations used to output signals corresponding to characters and cases that are output when a control is selected, according to some embodiments.

DETAILED DESCRIPTION

Figure 1:
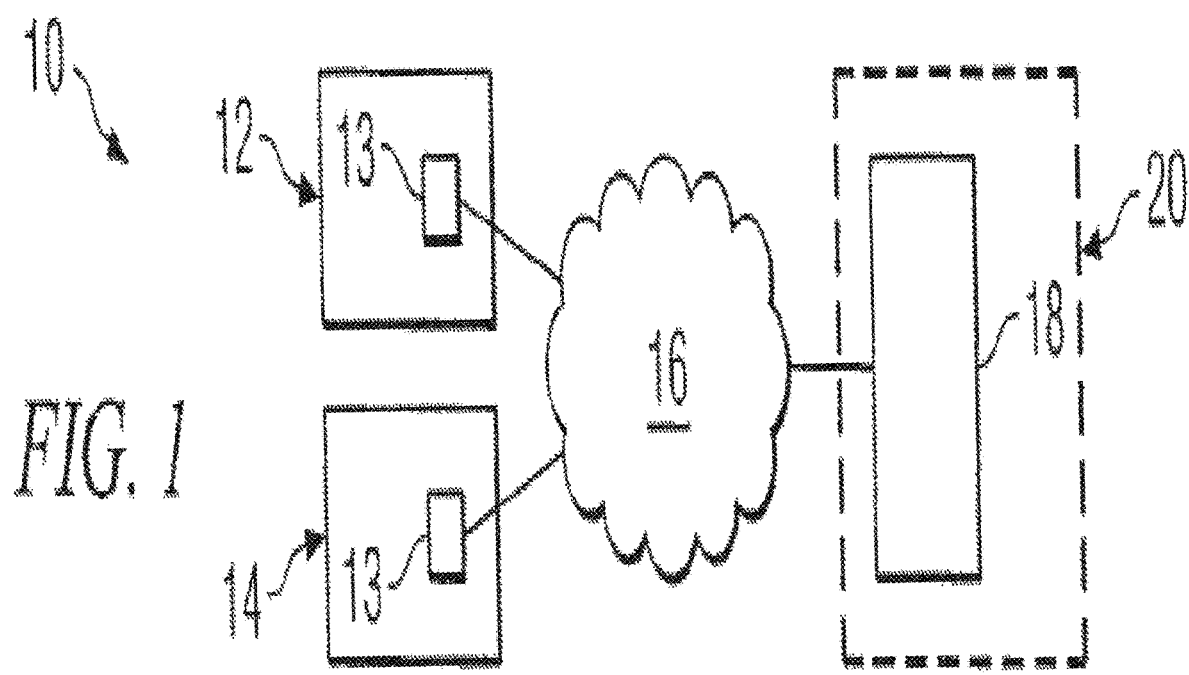
FIG. 1 shows a gaming system according to some embodiments.

In various embodiments, a player may use motion as an input to a game played on a mobile gaming device. The game may be a gambling game, such as a game of video poker, a slot machine game, a game of roulette, a game of craps, or any other gambling game. The player may make a bet on the game and may stand to win money depending on the outcome of the game. The player may have money at risk on the game.

The motion used as input may include motion of the mobile gaming device itself. Thus, the player may tilt, shake, move, rotate, or otherwise move the mobile gaming device. Such movements of the mobile gaming device may be interpreted by hardware sensors and/or by software as commands or instructions for the play of a game. A motion may thus be seen as an initiation signal for a game, or as a signal to cash out.

In various embodiments, a player may be provided with audio feedback. The audio feedback may be supplied following a motion made by the player, or following a motion that has been recognized by the mobile gaming device. The audio feedback may be supplied during a motion that is being made by the player. The audio feedback may enhance the gaming experience for the player by providing sounds a player might hear while playing a game at an actual gaming table or at a standalone gaming device, such as a slot machine. The audio feedback may provide information to the player. The audio feedback may tell the player that a motion he has made has been recognized as a command, or the motion he has made has not been recognized as a command.

In various embodiments, a player may be provided with force feedback or haptic feedback. The mobile gaming device may create haptic sensations using springs, motors, resistors, or other devices that may create motion, pressure, heat, or other tactile sensations or other sensations. Haptic feedback may allow the player to shake a mobile gaming device in his hand and have the feeling that he is shaking dice, for example.

In various embodiments, a player may have a wristband. The wristband may include motion sensors, such as accelerometers, for detecting motions. The player may move the hand wearing the wristband in particular ways in order to issue commands in a game. In various embodiments, a wristband may provide haptic feedback.

Wristband/Bracelet

In various embodiments, a player may wear a bracelet, wristwatch, wristband, or other device around his wrist. The wristband may include one or more of: (a) a processor (e.g., a semiconductor processor); (b) a power source (e.g., a battery); (c) a motion sensor (e.g., an accelerometer; e.g., a gyroscope; e.g., a camera for determining motion based on a changing visual image); (d) a transmitter (e.g., an antenna); (e) a receiver (e.g., an antenna); (f) a memory (e.g., a semiconductor memory); (g) a display device (e.g., a liquid crystal display screen); (h) a speaker (e.g., for transmitting audio outputs); (i) a haptic output device.

Wristband Logs Motions

In various embodiments, a wristband may track motions made by the player wearing the wristband. For example, the motion sensors within the wristband may detect accelerations, changes in position, changes in orientation, angular displacements, paths, trajectories, or any other components of motion. The wristband may track motions of the hand or wrist on which the wristband is worn. The wristband may store data representative of the motions. Such data may be stored, for example, in a memory of the wristband. The wristband may also transmit an indication of motions made to another device, such as to a mobile gaming device, to a stationary gaming device, or to a casino server.

In various embodiments, the wristband may store or forward raw data, such as data indicating every reading received from motion sensors. In various embodiments, the wristband may translate the raw data into more condensed or more higher level data. For example, a series of readings from motion sensors in the bracelet may be translated into command. That is, the player wearing the wristband may have made a motion to give a command. The wristband may then store the command rather than the exact position of the wristband as a function of time. The wristband may also transmit the command to another device, e.g., via a transmitter on the wristband.

Motions Constitute Commands in a Game

In various embodiments, a motion of the wristband may be interpreted as a command in a game. A player may move his hand up and down, for example, in order to initiate the spin of reels in a slot machine game. A player may also move his hand in such a way as to signify commands to: (a) cash out; (b) hold a card in video poker; (c) discard a card in video poker; (d) double down in blackjack; (e) choose one of several options in a bonus round; (f) make a bet of a certain size; (g) show a list of game instructions; (h) initiate a bonus round; (i) select a pay-line to play; or to make any other command in a game, or to make any other command. The wristband may store a table which associates particular motions with particular game commands. Upon receiving sensor readings that are indicative of a particular motion, the wristband may look up in the table the motion corresponding to the command. The wristband may then transmit the command to a mobile gaming device, a stationary gaming device, or to another device, such as to the casino server. The casino server may relay the command to another device, such as to a stationary gaming device or to a mobile gaming device. In various embodiments, the command may then be executed or followed in the game.

Wristband Communicates with Mobile Gaming Device

In various embodiments, a wristband may communicate with a mobile gaming device. The wristband may have an antenna and receiver for this purpose. The mobile gaming device may similarly have an antenna and receiver for communicating with other devices. The mobile gaming device and the wristband may communicate via various protocols, such as via Bluetooth, Wi-Fi, or via any other protocol.

The Wristband Controls Other Devices

The wristband may be in communication with a mobile gaming device, stationary gaming device, or with any other device. The wristband may detect motions of a player, such as motions of the player's hand. The wristband may interpret the motions as commands for a device with which the wristband is in communication. The wristband may transmit the commands to the device and the other device may thereupon follow the commands. In some embodiments, the wristband captures raw data, such as a series of positions of the player's wrist as a function of time. The raw data is transmitted to another device. The other device then interprets the raw data as a command.

Communication with Multiple Devices at Once

In various embodiments, a wristband may be in communication with two or more devices. The wristband may be in communication with two or more devices at once. The wristband may transmit a single signal which may be received at both a first device and a second device. For example, a command transmitted by the wristband may be received at a first slot machine and at a second slot machine.

In some embodiments, a first device and a second device may emit signals nearly simultaneously. The wristband may receive both signals.

In some embodiments, a player may identify himself to two or more devices, such as to two or more stationary gaming devices. The player may provide some proof of identity, such as a player tracking card, biometric, or a device (such as a wristband) with an identifier (e.g., a unique identifier) that can be tied to the player. The player may authorize or enable communication between his wristband and the two or more devices. As part of the authorization, the player may agree to play games on each of the two or more devices. Thus, in some embodiments, the player may authorize the two or more devices to interpret signals coming from the player's wrist band as command signals to be used in a game. In some embodiments, the player may present his wristband to the two or more devices. For example, the player may bring his wristband to within a few inches of an RFID reader on a slot machine. The slot machine may pick up a signal from an RFID tag on the wristband. The devices may thereafter recognize commands received from the wristband presented, but not from other wristbands. Thus, the devices may accept commands from the wristband for some period of time. In various embodiments, commands may be accepted until some termination command is received, until no more commands are detected (e.g., the wristband has been switched off or has moved out of communication range of the devices), until a certain period of time has passed, or until some other termination circumstance has occurred. In order to resume providing motion-based commands to a device, the player may once again authorize the receipt and use of commands from his wristband. The player may present his wristband again, for example.

In various embodiments, a player may engage in play at two or more gaming devices at once. The player may make motions and an indication of such motions (e.g., a command that has been derived from such motions) may be transmitted to the two or more gaming devices. Each of the two or more gaming devices may execute the command. Thus, in some embodiments, a player may conveniently play two or more games simultaneously while avoiding repetition of commands for each individual game. For example, a player may use a single shake of the wrist to start games at each of two slot machines.

In some embodiments, a first device may receive data (e.g., motion data) from a wristband. The first device may interpret the data as commands and may conduct a game based on the commands. A second device may receive the same data from the wristband. The second device may transmit the data (or an interpretation of the data) to friends of the player or to other parties, such that the other parties can follow what the player is doing. The second device may also transmit to friends of the player or to other parties an indication of game outcomes, payouts and other occurrences related to games played by the player. In some embodiments, a player may use the motions from his wristband to play several games at once. Data, such as outcomes, from the games may be transmitted to a casino server or to another device. Data may be made available for viewing by other parties, such as by the player's friends or by others who will play their own games using the random occurrences that happened in the player's game (e.g., others may bet on outcomes generated in the player's game).

In various embodiments, a player may play at two gaming devices at once. However, each command made by the player (e.g., through a motion) may apply to only one gaming device at a time. For example, a player may make a first command which applies only to a first game at a first gaming device. The player may then make a second command which applies only to a second game at a second gaming device. The player may then make a third command which applies only to the first game at the first gaming device. In various embodiments, two gaming devices may each be controllable by their own set of motion commands, where there is little or no overlap between the motions used for commands. Thus, for example, a motion made by a player may correspond to a valid command at one of the gaming devices but not at the other one. A different motion may not correspond to a valid command at the first gaming device, but it may at the second.

Times when a Data Stream from a Wristband is not Picked Up

In various embodiments, a device may be within communication range of a wristband that is transmitting data, yet the device may fail to receive the data, or the device may fail to interpret the data, or the device may fail to use the data. A device may be a mobile gaming device or stationary gaming device, such as a slot machine, for example. A device may fail to use data from a wristband if one or more of the following is true: (a) the player with the wristband has not identified himself to the device; (b) the player with the wristband has not provided proof of identification to the device; (c) the wristband is transmitting commands that do not make sense to the device; (d) the player with the wristband has not made at least some physical contact with the device (e.g., pressing a button on the device); (e) the player has not informed the device that it should be expecting motion commands from the wristband; (f) the device is currently accepting motion commands from a different wristband; (g) the player does not have a high enough credit balance to play games at the device (e.g., the player has a credit balance of zero); (h) the player has not made physical contact with the device in a predetermined period of time (e.g., the player has not physically pressed a button on the gaming device in the last 10 minutes); or if any other circumstance is true.

Biometric as Game Input

In various embodiments, the wristband may sense a pulse, a temperature, a skin conductivity level, a moisture level, an electric field (e.g., from nerve impulses), a degree of muscle tension, or any other biometric signal from the player. The signal may be translated into a number. For example, a numerical temperature reading in degrees Fahrenheit may be used as a seed for a random number generator, which is in turn used to generate an outcome in a game.

In various embodiments, a biometric reading received at a wristband may indicate that the wristband is still being worn. If the wristband detects a pulse, for example, the wristband or another device may infer that the wristband is being worn by a player and hasn't been taken off. In various embodiments, a mobile gaming device, a stationary gaming device, or another device may take actions based on signals received from a wristband only if the wristband is currently being worn (or appears to be worn based on biometric signals received from the wristband). In some embodiments, if there is a break in biometric signals received at the wristband (e.g., the wristband no longer detects a pulse), then the wristband may transmit a signal to the casino server or to some other device. The signal may indicate that there has been a break in the biometric signal detected at the wristband. The casino server may, accordingly, instruct other devices not to follow commands or signals received from the wristband until the wristband has been reestablished on a player. In some embodiments, the wristband must be reestablished on the player in the presence of, or with the help of a casino representative before signals from the wristband will be honored by another device. In some embodiments, if there is a break in a biometric signal detected at a wristband, the wristband may send a signal summoning medical personnel. For example, the wristband may send a signal to the casino server indicating that a pulse is no longer detected.

Wristband Broadcasts Data that Identifies the User

In various embodiments, the wristband may transmit or broadcast data that identifies the player wearing the wristband. The wristband may broadcast a player tracking card number, a player name, a player alias, a player room number, a player credit card number, or any other information about a player that may be used to identify the player. In some embodiments, the wristband may transmit a signal derived from a biometric reading. For example, the wristband may broadcast a signal derived from a pulse or electro-cardiogram reading taken from the player. The biometric reading may serve to uniquely identify the player.

In various embodiments, a signal which is broadcast from a wristband, and which identifies a player may allow the player wearing the wristband certain privileges. A player's hotel room door may be unlocked remotely (e.g., the door may unlock without requiring physical contact from a key or other device). The hotel room door may unlock once it receives the signal from the player's wristband identifying the player. The player may also be allowed to gamble at a particular gaming device. The player may be allowed to enter certain areas of the casino based on the identity provided from his wristband. In various embodiments, the wristband may provide a player identifier to allow a player to receive access to a balance of funds or to another financial account. The player may use the funds, for example, to gamble or to make purchases. For example, a player may approach a gaming device. The player may have an account with a positive balance of funds stored with the casino server. When the player's wristband transmits a player identifier to the slot machine, the slot machine may receive the identifier and transmit an indication of the identifier to the casino server. The casino server may then authorize the player to gain access to his funds. Some or all of the player's funds may then be made available for use on the gaming device (e.g., in the form of a credit balance). The player may then use the funds for gaming.

In various embodiments, a wristband may be power constrained due to the small available volume within the wristband within which to include a battery or other power source. The wristband may take various steps to conserve power. In some embodiments, the wristband may periodically transmit signals to another device, such as to a mobile gaming device or such as to a stationary gaming device. For example, the wristband may transmit a signal to a mobile gaming device every 50 milliseconds, where the signal consists of a string of bits. The signal may include data or information descriptive of motions made by the wristband since the last signal transmission. In various embodiments, the time between signal transmissions may vary based on what data or information needs to be transmitted by the wristband. For example, if the wristband has been motionless, the time between signal transmissions may be extended to 200 milliseconds. If the wristband starts moving again, the time between signal transmissions may be reduced back to 50 milliseconds. Thus, in various embodiments, the time between when signals are transmitted by the wristband may vary based on the motion of the wristband and/or based on motion detected by the wristband. In various embodiments, the time between when signals are transmitted by the wristband may vary based on the amount of information the wristband has to communicate to another device. For example, if the player is actively involved in a game, the wristband may transmit signals frequently. If the player is not actively involved in a game (e.g., if the player has not initiated game play at a stationary gaming device or mobile gaming device; e.g., if the player is not in an area where gaming is permitted), then the wristband may transmit signals relatively less frequently. In various embodiments, when the wristband is not moving, the wristband may periodically send a short or concise signal indicating that the wristband is still operational or still available for use. However, the signal may indicate that the wristband is currently not in use or not being used for a game.

In various embodiments, the wristband may derive power or energy from motions of the wearer's arm, or from other motions of the wearer. The wristband may derive energy from its own motion, which may be caused by the motion of the arm to which it is attached. Devices for harnessing electrical energy from motion may include piezoelectric devices or mechanical rotary magnetic generators. Power sources such as those used in the Fossil kinetic watch or in the Ventura kinetic watch may also be used.

In various embodiments, the wristband may detect relative motion between it and another device. For example, a player may wear two wristbands. One wristband may transmit signals of a fixed strength to the other wristband. Based on the distance between the wristbands, the signal will appear relatively strong (e.g., if the wristbands are close) or relatively weak (e.g., if the wristbands are far) at the receiving wristband. In this way, it may be determined how close the wristbands are to one another. The relative motion of a wristband may be determined relative to any suitable device. A player may wear a device elsewhere on his body, such as a belt buckle which can transmit or receive signals. A wristband may transmit or receive signals to any fixed device external to the person, such as to a receiver attached to a wall, ceiling, floor, or gaming device.

In various embodiments, a wristband may detect a drinking motion. The wristband may detect a rotation in a wrist via orientation sensors in the wristband. If there is significant rotation of the wrist, it may be inferred that the player has almost finished a drink, thus requiring the player to tilt the drink significantly. Accordingly, a casino representative may be instructed to provide the player with a new drink, and/or the player may be asked if he would like another drink.

Technologies for Harvesting Energy for a Wristband

Various technologies for harvesting energy from the environment or from ambient conditions are described in the paper, "Energy Scavenging for Mobile and Wireless Electronics" by Joseph A. Paradiso and Thad Starner. As of May 11, 2007, the paper was available at http://www.media.mit-.edu/resenv/pubs/papers/2005-02-E-HarvestingPervasiveP-prnt.pdf.

Radio frequency identification systems allow a tag to derive energy from a remote or non-contiguous source (e.g., the tag reader). The tag receives radio frequency energy from the tag reader inductively, capacitively, or radiatively.

Solar cells may allow a mobile device, such as a wristband, to derive energy from ambient light. An example technology includes crystalline silicon solar cells.

Thermoelectric generators may allow the derivation of energy from heat transfer. These generators may take advantage of temperature gradients, such as differences between human body temperature and the surrounding air temperature. The Seiko Thermic wristwatch uses thermoelectric generators to power its mechanical clock components. One thermoelectric technology is Applied Digital Solutions' Thermo Life.

Various technologies allow energy harvesting from vibration or motion. Motion may be used to move a mass in a preferred or biased direction. The movement of the mass may wind a spring. The energy in the spring may then be used to create direct mechanical energy (e.g., to move the hands of a watch), or may move a magnet, coil, or other component of a generator to create electricity. Exemplary technologies for harvesting energy from mechanical motion include the ETA Autoquartz, the Seiko AGS (automatic generating system), and Ferro Solutions' Harvester. Piezoelectric materials may deform in the presence of motion or vibration to produce electricity. Ocean Power Technologies, for example, has developed harvesters that are immersed in turbulent water and deform from the water currents to generate electricity. Some generators comprise capacitors with moving plates. On a charged capacitor, the induced motion of one of the plates can generate an electric current. Piezoelectric generators and capacitive generators may be used to harvest energy from shoes during walking, for example.

Some generators comprise turbines that may be driven by ambient airflows.

Gaming Devices as Antenna Array

In various embodiments, each of two or more stationary gaming devices may include a component of an antenna array. Acting in conjunction, the gaming devices may detect and interpret signals from mobile gaming devices or from wristbands. For example, each of two or more stationary gaming devices may have an antenna. The gaming devices may each pick up the signal emitted by a mobile gaming device or by a wristband. The signal picked up at each of the antennas at the two or more gaming devices may then be added up, perhaps with some time delay or phase shift added at one or more of the gaming devices. Adding up signals received at two or more antennas may reduce the signal to noise ratio, thus potentially allowing a signal from the mobile gaming device or wristband to be read with greater accuracy or at a greater distance, or thus allowing the mobile gaming device or wristband to transmit with less power and thus benefit from extended battery life.

New Batteries at the End of Every Shift

In various embodiments, the batteries or power sources in a wristband may be routinely replaced on a periodic basis. Batteries may be replaced: (a) once a day (e.g., at the end of the day); (b) once per shift (e.g., at the end of a casino attendant's shift; e.g., at the beginning of a casino attendant's shift); (c) once per hour; or on any other basis. In various embodiments, a wristband may include an indicator light or some other output device to indicate a low power level in its battery or power source. The battery may be changed or recharged when the indicator light comes on.

Wristband Gives Player Location Information

In various embodiments, a wristband may broadcast a signal. The signal may include a player identifier, such as a name or player tracking card number. The signal may include information about the player's location. For example, the wristband may gather positioning information from beacons or satellites, calculate its own position, and then transmit the position information to gaming devices or to any receivers.

In some embodiments, a wristband determines a change in its own position, but not an absolute position. A receiver that picks up the signal from the wristband may be able to determine the direction of the wristband from the receiver, but not the distance of the wristband. The player wearing the wristband may then walk some distance, and the position of the wristband may thereby change. The wristband may include accelerometers or other motion detectors which can be used to determine a change in a position, but not necessarily an absolute position. The wristband may also include sensors for determining an orientation, such as a compass. The wristband may thus determine a change in position in (e.g., measured in feet or meters) and broadcast this change to the receiver. The wristband may further determine the direction in which that change in position occurred and broadcast this direction to the receiver. Once again, the receiver may be able to determine the direction of the wristband from the receiver at the new location of the wristband, but not its distance from the receiver. Based on the two measurements of the wristband's direction from the receiver, and based on the distance moved by the wristband and based on the direction in which the wristband moved, the absolute position of the wristband may be determined. This is because in a triangle formed by the receiver, the wristband's initial position, and the wristband's final position, one side and the two adjacent angles will be known. The side is the path traveled by the wristband (assuming it took the shortest path), and the angles can be found based on the directions from which the receiver detected the wristband at its first and final positions, and based on the direction in which the wristband itself traveled.

Wristband Used to Control a Mobile Gaming Device

In various embodiments, a wristband may be used to control a mobile gaming device. A wristband may transmit signals to a mobile gaming device where such signals provide instructions or commands as to how to proceed in a game. Such instructions may include instructions to initiate game play, instructions to hold a particular card, instructions to hit or stand (e.g., in blackjack), instructions to bet a particular pay-line, or any other instructions. A wristband may also transmit signals to a stationary gaming device, where such signals provide instructions to the stationary gaming device as to how to proceed in a game.

A wristband may determine its own motions through motion sensors, such as through accelerometers. The wristband may interpret such motion as commands to be used in a game. The wristband may transmit such commands to a mobile gaming device or to a stationary gaming device in order to control such devices. In some embodiments, the wristband records motion data, such as distances moved, accelerations, trajectories, velocities, or any other motion data. The motion data may be transmitted to a mobile gaming device or to a stationary gaming device. At the mobile gaming device or at the stationary gaming device, the motions may be translated into game commands. In various embodiments, the wristband may transmit either motion data or game commands to a casino server. The casino server may then transmit motion data or game commands to a mobile gaming device or to a stationary gaming device in order to control such devices.

In various embodiments, a wristband may be used to control or to issue commands to any device. Such devices may include point of sale terminals, vending machines, kiosks, automated teller machines (ATM), or any other devices. For example, a player may make a series of motions with his hand. The motions may be picked up by his wristband. The wristband may interpret the motions as instructions for an ATM. The wristband may transmit the instructions to the ATM. The ATM may then act in accordance with the instructions, e.g., by dispensing cash for the player.

Wristband for 2D Control

In various embodiments, a player may move his hand or arm in a plane. Such motions may direct a cursor on a screen to move in an analogous fashion. For example, if the player moves his hand first in one direction and then in the opposite direction, the cursor would also first move in one direction and then in the opposite direction. A player may rest his arm on a flat surface, such as on a table surface. The player may move his hand around on the table surface, thereby moving his hand in two dimensions. The wristband may thus be used to control the position of a cursor on a screen, such as the screen of a stationary gaming device, mobile gaming device, or other device.

String Provides Force Feedback

In various embodiments, a stationary gaming device may include a string, cable, wire, or other similar component. The string may be wound around a wheel, axle, spindle, shaft, or other device. The gaming device may include motors for rotating the wheel. The rotation of the wheel in one direction may release more string, while the rotation of the wheel in the other direction may pull string in.

In various embodiments, the player may attach one end of the string to the wristband. Depending on events in the game, the gaming device may either pull in on the string or let loose more string. This may have the effect of pulling and releasing the player's wrist. This may provide tactile feedback to the player. In some embodiments, the player may also purposefully pull on the string in order to make commands in the game. For example, the player may pull outwards on the string in order to cause reels of a slot machine game to spin. The faster or harder the player pulls the string, the faster the reels may spin.

Distinguishing Signals from Multiple Wristbands

In various embodiments, a gaming device may detect a signal from a wristband. The wristband may transmit a player identifier, so that the gaming device would be able to recognize the identity of the player. In various embodiments, when one gaming device detects a signal from a wristband, other gaming devices might also detect the same signal. Therefore, in various embodiments, a gaming device may determine whether it was the player's intention to communicate with it, or whether it was the player's intention to communicate with a different gaming device.

In various embodiments, a gaming device may recognize that someone is playing the gaming device. For example, the gaming device may detect actual button presses, a player tracking card may be inserted, currency may be inserted, and so on. At the same time, the gaming device may detect signals from a wristband. The gaming device may then display a message or otherwise ask the player currently playing the machine whether that player is the one whose wristband signal has been received. The gaming device may recognize a player identity from the wristband signal and may thus display the name of the player to the player physically present at the gaming device. If the player who is physically present recognizes his own name, then the player may confirm that in fact the gaming device is receiving wristband signals from him. The gaming device may then allow the player to use motion controls to proceed with play of the game.

In various embodiments, a gaming device may recognize that there is a wristband in the vicinity and also that the gaming device is being played by a player who is physically present. Thus, a game may be conventionally started, e.g., through the physical press of a button. The gaming device may then ask the player physically present if he is the same player indicated in a received signal from a wristband. If the player who is physically present answers in the affirmative, then the gaming device may ask the player whether he would like to proceed with play using motion control.

In various embodiments, a gaming device may differentiate between multiple signals coming from different wristbands as follows. Each wristband may be associated with a unique identifier. Each wristband may broadcast its own unique identifier. A gaming device may ask a player who is physically present which identifier corresponds to his wristband. In some embodiments, the gaming device may ask the player to enter the identifier of his wristband. If the identifier matches an identifier of a signal received from one of the wristbands, then the gaming device may thereupon react only to signals received from that wristband.

In various embodiments, a gaming device may ask a player to bring a wristband near a reader. The reader may be an optical reader, an RFID reader, a magnetic stripe reader, or any other reader. In this way the signal belonging to the player physically at the gaming device may become clearly the strongest signal received at the gaming device. The gaming device may then allow the player physically at the gaming device to proceed with play using his wristband. The player may then use some motion control, or he may use motion control for every command at the gaming device.

Reference Lights at a Stationary Gaming Device

In various embodiments, a stationary gaming device may include one or more lights, beacons, transmitters, audio speakers, or other emitters. For example, a stationary gaming device may include two bright lights situated on top of the gaming device. The emitters may serve as reference points for a mobile gaming device and/or for a wristband. A wristband may, for example, detect the light or other signal from two emitters on a gaming device. The bracelet May use the two emitters as a fixed reference frame based on which to determine its own orientation. For example, if the two emitters appear side by side from the vantage point of the wristband, the wristband may determine that its orientation is normal. If, however, the two emitters appear one on top of the other, then the wristband may assume it has been rotated 90 degrees. In various embodiments, the emitters may output the same type signal, e.g., light of the same wavelength and amplitude. In some embodiments, different emitters may output different signals. This may allow a wristband or mobile gaming device to distinguish one emitter from the other in all orientations and to thereby make an even more accurate determination of its own orientation. In various embodiments, a stationary gaming device may have more than two emitters. For example, a stationary gaming device may have three, four, or five emitters. In various embodiments, emitters may be located in other places than just on a stationary gaming device. For example, emitters may be located on the ceiling, or on a wall.

In various embodiments, an emitter may emit light of a particular frequency. An emitter may emit red light, green light, infrared light, or light of some other frequency. An emitter may emit light at multiple frequencies. For example, an emitter may emit white light. An emitter may emit sound.

A wristband and/or a mobile gaming device may include sensors, cameras, microphones, or other detectors for detecting the output of the emitters. For example, a wristband may include a camera. The camera may detect light from emitters on a gaming device. Based on the position of the emitters in an image captured by the camera of the wristband, the wristband may determine its own orientation.

In various embodiments, a gaming device may not necessarily have dedicated emitters for detection by wristbands or mobile gaming devices. However, a wristband or mobile gaming device may detect particular features of the gaming device. For example, the gaming device may have a candle on top which is meant to light up when a casino attendant is summoned to the gaming device (e.g., when a player at the gaming device has won a jackpot). A sensor in a wristband or mobile gaming device may recognize the image of the candle. For example, the wristband may include a camera. The camera may capture images and attempt to match portions of the image to a pre-stored image of a candle on a gaming device. Based on the orientation of the candle from the captured image relative to the orientation of the candle in a stored, reference image, the wristband may determine its own orientation. E.g., if the captured image appears to be a version of the reference image that has been rotated 90 degrees, then the wristband may assume that it has been rotated 90 degrees.

In various embodiments, sensors in a mobile gaming device or wristband may detect other features of a stationary gaming device. Sensors may detect a pay table, a screen, a handle, betting buttons, a coin tray, graphics on the housing of the gaming device, a jackpot meter, or any other features of the gaming device. For any feature, the wristband or mobile gaming device may have stored reference images or reference signals. In order to detect or interpret a feature, the wristband or mobile gaming device may capture an image and attempt to match portions of the image to one or more reference images. In the matching process, the wristband or mobile gaming device may manipulate the captured image, adjusting the size or orientation of the captured image in an attempt to better match a reference image. When there is a match (e.g., a portion of the captured image matches a reference image of a coin tray), the wristband or mobile gaming device may determine the degree of rotation of the captured image that was required to make the match. The degree of rotation may then indicate the amount by which the wristband or mobile gaming device has been rotated.

In various embodiments, a gaming device may track the motion of a wristband or of a mobile gaming device. The wristband may include beacons or emitters, such as infrared emitters, light emitting diodes, or audio speakers. The wristband may include two or more emitters. The gaming device may include detectors, such as cameras, microphones, or antennas. The gaming device may determine the positions or relative positions of emitters on a wristband. For example, in a normal upright position, two emitters on a wristband may appear side by side. When the wristband is rotated 90 degrees, one emitter may appear above the other. Thus, based on the relative positions of two emitters on a wristband, the gaming device may be able to ascertain the orientation of the wristband. Also, the apparent distance between two emitters on a wristband may provide an indication of distance of the wristband itself from the gaming device. For example, if two emitters on a wristband appear close to one another, then it may be assumed that the wristband is far away. On the other hand, if two emitters on a wristband appear far from one another (at least relatively speaking), then the wristband may be assumed to be near. Through tracking the motion of the wristband or the mobile gaming device, a gaming device (e.g., a slot machine; e.g., a video poker machine) may ascertain commands that are intended by the player. The gaming device may execute those commands in a game that it conducts. The gaming device may also transmit those commands to another device, such as to another stationary gaming device or such as to a mobile gaming device.

Screen Directions for Motion Control

In various embodiments, a gaming device, such as a stationary gaming device, may provide instructions to a player as to how to use motion control. Instructions may indicate one or more available commands that the player can give. For example, the gaming device may list commands to: (a) start a game; (b) make a selection in a bonus round; (c) select a card to discard in a game of video poker; (d) select whether to hit or stand in a game of blackjack; (e) select a pay line to bet on; or to take any other action in a game or otherwise. The gaming device may also provide instructions as to how to issue commands. The gaming device may indicate which motions are necessary to issue commands. The gaming device may show small videos or animations of people motioning with their hand. Thus, a player may see next to a potential command a small video clip of a person moving his arm in a particular way. The video clip may repeat constantly, or it may play on demand (e.g., upon touch by the player). The motions to be made in order to issue the command may also be spelled out in text form, such as "move your hand to the right twice and then up once". Instructions as to how to use motion control may be shown in many different forms.

In some embodiments, a person may be walked through tutorial or may have the opportunity to practice making motions. For example, instructions for making the motion corresponding to the "start game" command may be played in the form of a video clip. In other words, an animation of a person making a particular motion may be shown on the display screen of a gaming device. The player may be instructed to repeat the motion with his own wristband. The player may be instructed to follow along with the video of the motion being performed. If the gaming device recognizes the motion, the gaming device may ask the player to follow along in making the motion for the next instruction. If the gaming device does not recognize the motion made by the player (e.g., if the player has made wrong motion), then the gaming device may ask the player to repeat making the motion until he gets it right.

In various embodiments, when a player is playing a game at a gaming device (e.g., at a slot machine), and when the player makes a motion to issue a command, the gaming device May provide feedback as to how the gaming device interpreted the player's motion. For example, the gaming device may display a text message, "you have motioned to start a new game".

Window of Time to Make a Motion

In various embodiments, there may be finite windows of time when a gaming device (e.g., a stationary gaming device) will accept motion commands. For example, there may be a 10 second window during which a gaming device will accept motion commands. During other times, the player may make motions, but they will not necessarily register as commands. This may allow the player some freedom to make motions unrelated to a game (e.g., hand gestures in a conversation) during times other than the window in which commands may register. A window of time for making motion commands may open and close periodically. For example, a window may open up for ten seconds, then close for twenty seconds, then open for another ten seconds, and so on. If a person makes a first motion command during the window of time, then the window of time may be extended. For example, the extension of the window of time may allow the person to complete a full game before the window for making motion commands closes. In some embodiments, a window of time for making motion commands may persist so long as a game is in progress. In some embodiments, a window of time for making motion commands may persist for a predetermined period of time after the last motion command made by a player. This may allow the player to continue making motion commands for as long as he wants to. In some embodiments, there may be an alert or other indicator that a gaming device (e.g., a stationary gaming device; e.g., a mobile gaming device) is receptive to motion commands. For example, an indicator light on the gaming device may come on, or the indicator light may change from one color to another. Thus, for example, a light may be blue when a gaming device is receptive to motion commands, and may be red when a gaming device is not receptive to motion commands. In some embodiments, a player may turn motion control on or off. For example, the player may instruct a gaming device to be receptive to motion commands, or may instruct the gaming device to ignore motion commands. A player may have to physically touch a gaming device in order to switch motion commands either on or off. In some embodiments, when a gaming device is not receptive to motion commands, the gaming device may still respond to a motion command which commands the gaming device to become receptive to other motion commands again. For example, the gaming device may then become receptive to motion commands again.

In various embodiments, a first set of motions may correspond to moving a cursor, mouse pointer, or other indicator. A second set of motions may correspond to making a selection. For example, once a cursor is resting over a card or an image of a button, making a motion of the second set of motions may correspond to selecting the card (e.g., selecting the card to be discarded), or to pressing the button. Motions from the second set of motions may be used, for example, to select an amount to bet, to select a pay line, to select a decision from a menu of decisions, or to make any other selection. Motions from the first set of motions may position a cursor for later selection, but may not yet commit a player to a course of action. In some embodiments, motions in the forward and back directions (e.g., from the player's perspective) may correspond to the second set of motions, e.g., to making a selection. Motions in other direction (e.g., up, down, left, right) may correspond to motions from the first set of motions, e.g., to positioning a cursor.

In various embodiments, a player may receive visual feedback as he makes a motion. A cursor may trace out on the screen of a gaming device (e.g., a stationary gaming device; e.g., a mobile gaming device) a trajectory made by the player's wristband as he moves his hand. To make a particular command, the player may have to keep the cursor within certain boundaries. For example, boundaries consisting of two concentric circles may be displayed on the display screen of the gaming device. The player may have to make a circle with the cursor while keeping the cursor outside of the inner circle but inside of the outer circle (i.e., between the two circles). In some embodiments, there are points or dots on the screen. The player may need to make a motion so that a cursor on the screen is moved between the two dots. In some embodiments, there may be several pairs of dots. The player must move the cursor between various pairs of dots in some particular order in order to issue a command. Different commands may require the cursor be moved between different pairs of dots, or between pairs of dots in different orders.

In various embodiments, a player may make motion commands to position a cursor over a button. The player may make further motion commands to select the button. Various buttons may correspond to different commands or actions in a game. Thus, by making motions to position a cursor over an appropriate button, the player may make a desired command in a game.

Wristband Senses Muscle Strain on Wrist Muscles in the Form of A Grabbing Motion In various embodiments, a player wristband may include a strain gauge. The wristband may be made of a pliant material, such as rubber. The wristband may fit snugly to the player's wrist. When the player closes his fist, the player may tense certain wrist muscles. This may put additional strain on the wristband as the girth of the player's wrist may expand. The strain gauge may sense this extra strain on the wristband. The strain gauge may send a signal to the processor of the wristband indicating the strain that has been detected. The strain gauge may also send a signal via an antenna or other transmitter to another device, such as to a mobile gaming device, to a stationary gaming device, or to the casino server.

In various embodiments, a wristband may have one or more pressure sensors on the inside surface, e.g., the surface in contact with the wrist of the player. The pressure sensors may sense pressure from the player's wrist, indicating the possible tensing of the wrist or flexing of the wrist muscles.

In various embodiments, a wristband may have temperature sensors. The sensors may detect an increase in temperature at the wrist stemming from increased blood flow and/or from the more rapid burning of energy in wrist muscles. These sensor readings may correspond to a player's tensing of his wrist, such as when the player performs a grabbing motion.

In various embodiments, electrical activity of the nerves or muscles in the wrist may vary depending on whether the muscles are in a tensed or relaxed state. Sensors in the wristband, such as antennae, may pick up the electrical activity in the wrist and may interpret the electrical activity as an indication that the wrist muscles are tensed or not.

In various embodiments, a tensing of the wrist muscles may be interpreted as a command in a game. In various embodiments, a tensing of the wrist muscles may be interpreted as a selection of a button or a choice from among multiple options. In various embodiments, a tensing of the wrist muscles may correspond to virtually grabbing something in a game. For example, in a bonus round, a game character may grab the knob on one of three doors in order to open the knob. Since the tensing of wrist muscles may be caused by a player actually making a grabbing motion (e.g., in the real world), the player may use the grabbing motion as an intuitive way to select something or to grab something in a game. Thus, for example, the player May move a cursor through linear displacements of the hand, and may select something a cursor is on by making a grabbing motion.

In various embodiments, sensors or detectors could detect a grabbing motion or other hand or wrist motions even when such sensors do not lie within a wristband. For example, a camera may film the motions of a player's hand. Image processing algorithms may be used to recognize which motions have been made by the player's hand. These motions may be translated into commands in a game.

Thad Starner, Joshua Weaver, and Alex Pentland of the Massachusetts Institute of Technology have developed a camera-based system for recognizing American Sign Language. The system is described in a paper entitled, "Real-Time American Sign Language Recognition Using Desk and Wearable Computer Based Video".

Receiver on Slot Machine

In various embodiments, a gaming device such as a slot machine may include a Bluetooth transceiver. The transceiver may be built into the device. The transceiver may also take the form of a Bluetooth dongle, which may be plugged into a universal serial bus (USB) port of the gaming device. In various embodiments, a gaming device may include a Wi-Fi transceiver. A gaming device may send and receive messages to and from a wristband or mobile gaming device using Bluetooth, Wi-Fi, or using any other communication protocols.

Components of a Message from a Wristband

The data content of a signal from a wristband may include one or more components. The signal may be understood to always include these components in a particular order, for example. For example, the first 3 bits of the signal may indicate the start of a new message. The next 4 bits may indicate the type of device providing the transmission (e.g., a wristband; e.g., a mobile gaming device). The next 30 bits may provide an identifier for the wristband. The next 100 bits of the signal may provide a player name. The next 20 bits may provide a command. The next 10 bits may indicate that the signal has ended. In some embodiments, a signal may include one or more of the following portions or regions: (a) a region indicating the start of the signal; (b) a region indicating a type of device transmitting a signal; (c) a region indicating the intended recipient of the signal (e.g., a unique identifier for a gaming device; e.g., an identifier for the casino server); (d) a region indicating a player identifier; (e) a region indicating a device identifier (e.g., a unique identifier for the particular device transmitting the signal); (f) a region indicating the end of the signal; (g) a region indicating a player name; (h) a region indicating a command to be used in a game; (i) a region indicating a game identifier (e.g., an identifier for a game to which a command will apply); (j) a region containing one or more error-checks; and any other region.

Confirmation of Player Presence and Identity at a Stationary Gaming Device

In various embodiments, a wristband may transmit a signal. The signal may be received by a stationary gaming device. The signal may include an identifier for the wristband. The gaming device may transmit the identifier of the wristband to the casino server. The casino server may look up the name of the player who has signed out the wristband (e.g., the player who is currently using the wristband). The casino server may transmit the name of that player to the gaming device. In some embodiments, the signal from the wristband may include a player identifier. The gaming device may transmit the player identifier to the casino server. The casino server may in turn transmit the name of the player back to the gaming device. In any event, the gaming device may determine the name of the player. The gaming device may display a message which indicates the name of the player. The message may be a greeting. For example, the message may say, "Hello, Sarah Jones!" The message may also ask a player to confirm his or her identity. A player may confirm his or her identity by answering a secret question, by providing a biometric (e.g., a fingerprint), by inserting a player tracking card, by inserting a credit card, by inserting a bank card, by inserting a driver's license, by flashing any of the aforementioned cards in front of a camera, or in any other fashion. In various embodiments, the player may confirm his identity through physical contact with the gaming device. For example, the player may answer a secret question by physically touching letters on a touch screen of the gaming device and spelling out the answer that way. When a player confirms his identity through physical contact with a gaming device, the gaming device can be more assured that a gaming device is not being controlled by motion-based or other wireless commands from a person other than the person sitting at the gaming device.

Prominent Screen for Playing with Motion Control Only

In various embodiments, a casino or other venue may include a large display screen. The screen may display a game. The screen may show the progress and the action in a game, such as a game of slot machine or a game of video poker. Electronics or other devices associated with the screen may allow the screen to receive motion inputs for play of a game. For example, there may be antennae for receiving signals from a player's wristband, or a camera for reading a player's motion commands. A processor or other device may compute or determine game events or game outcomes. A player may provide value or currency for gambling by inserting a cashless gaming ticket. Thus, associated with the screen may be a ticket-in-ticket-out device for accepting and dispensing cashless gaming slips.

A player may play games at the large display screen. The player may make commands in the game using motion control. For example, a wristband on the player may detect motions made by the player's hand. An indication of the motions made may be transmitted to the large display screen. The large display screen may then steer the course of the game as dictated by the player's commands.

In various embodiments, a game with a large display screen and controlled by motions may be located at the end of each of two or more rows of slot machines. For example, at the end of each row of slot machines or other gaming devices may be a large display screen which features games with motion control. Such games may be visible to everyone in the row of slot machines. In this way, people playing slot machines may watch the games played at the large screen and may be tempted to try motion control themselves.

Toggle Button on Wrist Watch to Turn Functions on or Off

In various embodiments, a wristband may include a switch, button, toggle, or other device for selecting among two or more states. A switch may be used to enable or disable motion control. Thus, when the switch is in one location, the player wearing the wristband may be able to use motion control to control the action in a game. When the switch is in another location, the player may be unable to use motion control to control the action in a game. When the player does not desire to play a game at the moment, the player may flip the switch so that motion is disabled. The player will then be able to make wrist gestures without worry that such gestures would affect a game outcome. When a player wishes to play a game again and to use motion control in the game, the player may flip the switch to enable motion control once more.

In various embodiments, a player may use a switch or other device to switch on or off other features of a wristband. A player may switch haptic feedback on or off. For example, with a switch in one position, the wristband may provide force feedback or haptic feedback to a player. When the switch is in another position, the wristband may not provide such feedback. A player may wish to turn off haptic feedback in order to conserve battery power in the wristband, for example. In some embodiments, a player may switch sound on or off. For example, at least in one state, a wristband may emit audio signals. The audio signals may relate to a game (e.g., triumphant music may be emitted from a wristband when the player wins). The audio signals may relate to a player location. For example, the wristband may emit audio signals when a player enters a restricted area where gaming is not permitted. The audio signals may relate to an account balance. For example, the wristband may emit an audio signal when a player account balance reaches zero. There may be other reasons for audio signals to be emitted by wristbands.

In various embodiments, a wristband may include one or more buttons, one or more sensors, one or more piezoelectric sensors, a batter, a transmitter, a receiver, and an onboard processor. The buttons may allow a player to change a setting or state of the wristband (e.g., to turn sound on or off). The buttons may allow a player to provide commands for a game, where such commands are not motion based. Sensors may include motion sensors, such as accelerometers or gyroscopes. Sensors may include position sensors, such as GPS sensors. Sensors may include temperature sensors, pressure sensors, strain gauges, microphones, light sensors, or any other sensors. Sensors may perform various functions. Sensors may detect motions so that such motions can be translated into commands. Sensors may sense a player's position so that the player can be told if he is in a permitted gaming area or not. Sensors may be used to sense a tension or electrical activity in a player's muscles, e.g., to derive motion commands. The transmitter may be used to communicate with another device, such as a stationary gaming device, mobile gaming device, or casino server. The receiver may receive communications from another device, such as a mobile gaming device, a stationary gaming device, or a casino server. Communications received at the wristband may reprogram the wristband. Such communications may provide the wristband with commands, for example. For example, a communication received by the wristband may instruct the wristband to shut off, due to a player's account balance reaching zero.

Shaking Hands

In various embodiments, the wristbands of two players may interact. The interaction may occur when the wristbands are brought close to one another. For example, when two players shake hands with the hands wearing the wristbands, the two wristbands may interact.

In various embodiments, during an interaction, a wristband of a first player may receive information from the wristband of a second player. The wristband of the second player may receive information from the wristband of the first player.

In various embodiments, a mobile gaming device of a second player may receive information from the wristband of a first player. In various embodiments, a mobile gaming device of the first player may receive information from the wristband of the second player.

In various embodiments, shaking hands may cause a bet to be made or sealed between the two players shaking hands. Technically, in some embodiments, the bet may be made when the wristbands of the two players are within a predetermined distance (e.g., 5 inches) of one another for a predetermined amount of time (e.g., 5 seconds). In some embodiments, the bet may be made when the wristbands are within a predetermined distance of one another for a predetermined time and when there is a shaking motion of one or both wristbands. The shaking motion may correspond to the shaking of hands. The wristbands may even transmit to one another information about the timing of the shaking motion to ensure that the wristbands are shaking in sync, as would happen with a hand shake. In various embodiments, a first player may prearrange the terms of a bet using a stationary gaming device or other device. For example, the first player may arrange a bet such that the first player will win $1 from the second player if the a spin of a roulette wheel ends up black, while the second player will win $1 from the first player if the spin of the roulette wheel ends up red. Once the bet has been specified, the first player need only find a second player to shake hands with in order to seal the bet. In various embodiments, it is possible that the first player would mischaracterize the terms of the bet to the second player. Thus, in various embodiments, a first player may be allowed to prearrange only fair bets (e.g., bets where both sides have equal probabilities of winning and/or where both sides have equal expected winnings and/or where both sides have zero expected winnings and losses). In various embodiments, when players shake hands to make a bet, the terms of the bet may be displayed on one or both of the players' mobile gaming devices. Each player may have a window of time (e.g., thirty seconds) to cancel the bet. To cancel a bet, a player may press a "cancel" button on his mobile gaming device, for example. If neither player cancels the bet, an outcome may be generated, and the bet may be resolved one way or the other.

In various embodiments, a first wristband may detect the proximity of another wristband. A wristband may be Bluetooth enabled so that the wristband can detect the proximity of another wristband transmitting with the Bluetooth protocol. In various embodiments, a wristband may be programmed or configured to send and receive signals of other protocols, such as Wi-Fi.

In various embodiments, two or more players may shake hands in order to make a bet with one another. The player who wins may depend on the outcome of some game, such as a game conducted or simulated by a gaming device. In some embodiments, in order for the bet to be resolved, the two players must be in proximity of a gaming device, such as a stationary gaming device. For example, in order for a bet to proceed, the two players may have to be standing in front of a slot machine. The players may be required to be within a predetermined distance of a particular gaming device, such as within two feet. The wristbands of one or both players may communicate with the gaming device indicating that the players have agreed to a bet. One or both wristbands may communicate to the gaming device the terms of the bet, such as which game the bet depends on. The gaming device may then conduct the appropriate game to satisfy the bet. For example, if the bet is on a game of video poker, then the gaming device may conduct a game of video poker. If the bet is on a game of blackjack, the gaming device may conduct a game of blackjack. In various embodiments, the wristbands may communicate to the gaming device which player will win under which circumstances. For example, the wristbands may communicate to the gaming device that "Joe Smith" will win if the house wins in a game of blackjack, while "Jane Smith" will win if the player wins in the game of blackjack. The player, in this case, may refer to a hypothetical player that is being simulated by a gaming device. The gaming device may play basic strategy or optimal strategy on behalf of the hypothetical player. In some embodiments, two players who make a bet on a game may play the game against one another using one or more gaming devices. The players may indicate strategic decisions at the gaming device(s). For example, if two players make a bet on a game of blackjack, the players may be effectively agreeing to play a game of blackjack against one another. The two players may play at a particular gaming device. During the course of the game, the players may provide decisions for the game. The players may provide decisions by physically pressing buttons on the gaming device or otherwise physically interacting with the gaming device. The players may also provide decisions by using motion controls, e.g., using their wristbands.

Incentives for Shaking Hands

In various embodiments, there may be incentives to shaking hands with people. A person's wristband may track the number of times a person has shaken hands with someone else, and/or the number of people with which the person has shaken hands. In some embodiments, after each handshake, a player's wristband may transmit a record or other indication of the handshake to the casino server. A wristband may transmit an identifier for the other player or the other wristband with which the player made contact. The casino server and/or a player's wristband may track the number of other players with which a player shook hands. The casino server and/or the player's wristband may also track the names or identities of other players with whom a player shook hands. In various embodiments, the player who shook hands with the most other players in some period of time (e.g., in one day) may win a prize, such as $1000.

In some embodiments, a mixer may be held in a casino or related property or in any other venue. The mixer may be an opportunity for singles to meet, an opportunity for business people to make contacts, an opportunity for scientists to exchange ideas with colleagues, or any other type of mixer. During the mixer, people may shake hands with one another. The wristbands of the people may automatically exchange information, include names, contact information, email addresses, phone numbers, biographical information, pictures, credentials, place of residence, age, gender, marital status, or any other information which may be appropriate to the circumstances, or any other information.

The wristbands of people who have participated in a mixer may transmit to a casino server or other device information about people with whom they have shaken hands or otherwise made contact. A person who has been at a mixer may later log onto a web site to see a summary list of people he has met. The web site may include contact information for the people. In some embodiments, no contact information is provided. Rather, a person must select who he/she would like to make contact with. If the person selects another person, and that other person selects him/her, then the website may later provide both of them with each other's contact information.

In some embodiments, during a handshake, the wristband of one person may transmit information about that person (e.g., contact information) to a mobile device (e.g., a mobile gaming device; e.g., a personal digital assistant; e.g., a cellular phone) to the other person. In this way, at the end of a mixer, a person may have stored on a mobile device information about other people he has met during the mixer.

In various embodiments, at the end of a mixer, a person may view images of people he/she had met at the mixer. Viewing the images may jog the person's memory about people he/she has met. The person may select people he/she is interested in having further contact with. The person may then be given their contact information. In some embodiments, the person may be given their contact information only if they have also expressed interest in having further contact with the person.

In various embodiments, a mixer may be held at a bar, restaurant, lounge, gym, swimming pool, gambling floor, shop, or at any other lounge.

Make Payments by Shaking Hands

In various embodiments a player may make a payment through shaking hands. A player may pay for a drink, a foot item, a product at a retail establishment, or any other item through a handshake. In some embodiments, a casino employee or employee of a retail establishment may possess a wristband. When the employee shakes hands with a person (e.g., a customer; e.g., a player), the employee wristband may receive a communication from the player's wristband. The communication may include information about the player, such as a name, identifier, credit card identifier, financial account identifier, or any other information about the player. The employee's wristband may communicate the player's financial account identifier as well as other identifying information about the player to a point of sale terminal, to a retail server, to a casino server, or to any other device. The player may then be charged for a purchase through a credit card network or other financial network.

Having shaken hands with a casino employee, retail employee, salesperson, or other person, a player may have a limited period of time in order to review a transaction and cancel it. For example, a player's wristband may also store the details of a transaction following a handshake with a salesperson. The details of the transaction may include a purchase price, a product, a mode of delivery, and so on. The player may bring his wristband close to a mobile gaming device or to a stationary gaming device. The wristband may transfer transaction details to the mobile gaming device or to the stationary gaming device. The mobile or stationary gaming device may then display the transaction details for the player. The player may review them and decide whether or not to cancel. If the player wishes to cancel, the player may, in some embodiments, press a button or screen region on a mobile gaming device or on a stationary gaming device. The player may also be required to return to the place he bought the product and to return the product.

In various embodiments, a player may bring his wristband near to a reader as a way to pay for a transaction. The player may touch a pad with the wristband. For example, the player may put his hand on a pad to pay for a drink. The pad may contain an antenna or other type receiver to detect signals from the wristband. The signal detected may include a financial account identifier.

In various embodiments, a player may pay for a purchase or other transaction using a balance of gaming credits. The player may have an account with gaming credits that is stored and tracked with a casino server. When a player holds his wristband near a pad or reader in order to make a purchase, the reader may verify with the casino server whether the player has a sufficient account balance to complete the purchase. In various embodiments, a pad or reader may provide a first indicator if the player does have a sufficient account balance, and may provide a second indicator if the player does not have a sufficient account balance. The first indicator may be a green light, for example. The second indicator may be a red light, for example.

Wristband Becomes Unclasped

In various embodiments, if the wristband comes off the player (e.g., if the wristband becomes unclasped) then an alert may be sent to the casino server. The alert may indicate to the casino server that the wristband is no longer around the player's wrist. In various embodiments, once the wristband has been taken off, the wristband may cease to function for gaming purposes. For example, the wristband may no longer allow motion control. The wristband may also stop communicating a player identifier to a mobile gaming device. Thus, a mobile gaming device of the player may no longer allow the player to engage in gambling activities. Various other functions of the wristband may also cease once the wristband has been taken off.

In various embodiments, if a player wants to restore various functions of the wristband, the player may visit a special servicing area of a casino, such as a casino desk. There, a casino employee may put the wristband back on the player. The casino employee may transmit a special code to the wristband to activate it again. The casino employee may also check the identity of the player, such as by asking for a fingerprint or a driver's license, before reapplying the wristband.

In various embodiments, a wristband include one or more sensors for determining whether the wristband has come off the player, is unclasped, or has otherwise been tampered with or removed. For example, a sensor may comprise an electrical circuit encircling the wristband. If the wristband comes off the circuit may be broken.

In various embodiments, a wristband or mobile gaming device may rely upon continuous or periodic contact with a casino server in order to function. If the wristband or mobile gaming device loses contact with the casino server then they may cease to function. In various embodiments, the wristband may communicate with the server on a periodic basis. Inputs that the wristband receives from the player may not be carried out until the next communication is received from the server. For example, if the player moves his hand to make a command, the wristband may store a record of the motion and/or may store a command which corresponds to the motion. However, the wristband may not transmit the command to another device, such as to a mobile gaming device or a gaming device that the player may be playing. Rather, the wristband may store the command until it again receives a communication signal from the server. In this way, the wristband may ensure that no commands or no gaming commands are performed while the wristband may not be in contact with the casino server. In some embodiments, a wristband may store up inputs received from a player. However, if the wristband does not receive a communication from the casino server within a predetermined period of time of receiving the inputs, then the wristband may discard the inputs. In this way, the player may not later be surprised when a large number of stored or saved commands are executed at once. In various embodiments, player who enters an elevator may not be able to play for some time as communication between his bracelet and the casino server may be cut off.

In various embodiments, instead of a wristband ceasing to function when it is opened or unclasped, the wristband could continue broadcasting "I've been opened up" to the server until the server confirms it. There may be a period of time after the wristband has been opened that it is trying to tell the server it has been opened. Then there may be a period of time when it stops broadcasting after receiving confirmation from the server. After the wristband has been opened, it may no longer allow some functions (e.g., payments to be made using the wristband), but may still allow other functions (e.g., motion control). So, in various embodiments, some functions are disabled upon the opening of the clasp or otherwise taking off of the wrist band.

Wristband and Mobile Gaming Device can Replicate Each Other's Functions

In various embodiments, any motion commands that can be made with a wristband may also be made with a mobile gaming device. For example, just as a wristband may include sensors to detect accelerations, changes in orientation, displacements, and any other motions, so may a mobile gaming device. Just as with a wristband, a mobile gaming device may include a processor for reading signals from motion sensors in a mobile gaming device and interpreting such motions as commands to be used in a game or as any other commands. In various embodiments, any commands that can be made through a mobile gaming device may also be made using a wristband. In various embodiments, a wristband may detect motions made by a player and transmit an indication of such motions to a mobile gaming device. The mobile gaming device may interpret the motions as a command in a game or as any other command. In various embodiments, the mobile gaming device may detect motions and transmit such motions to the wristband. The wristband may interpret the motions as commands in a game, for example. The wristband may then transmit an indication of the commands to a stationary gaming device. In various embodiments, any signals or alerts broadcast by a mobile gaming device based on the location of the mobile gaming device may just as well be broadcast by a wristband based on the location of the wristband. For example, if a player wanders out of a legal gaming zone, a mobile gaming device or a wristband could detect the position of the player and emit an audio alert for the player. In various embodiments, any haptic feedback that may be provided by a wristband may also be provided by a mobile gaming device. In various embodiments, any haptic feedback that may be provided by a mobile gaming device may also be provided by a wristband. In various embodiments, any information received, determined, or detected by a wristband may be communicated to a mobile gaming device, e.g., via wireless communication.

The following are embodiments, not claims. Various embodiments include:

A. A method comprising:
   receiving a first wireless signal from a first device;
   receiving a second wireless signal from a second device;
   determining from the first wireless signal a first player identifier;
   determining from the second wireless signal a second player identifier;
   displaying a message that asks a player to identify himself;
   receiving via tactile input an indication of a third player identifier;
   determining that the third player identifier matches the first player identifier;
   receiving a third wireless signal from the first device;
   interpreting the third wireless signal as a command in a gambling game; and
   carrying out the command in the gambling game.

Carrying out the command may include executing the command, following the command, acting in response to the command, and/or acting in accordance with the command.

B. The method of embodiment A in which the first device is one of: (a) a wristband; (b) a watch; (c) a bracelet; (d) an armband; and (e) a mobile gaming device.

C. The method of embodiment A in which determining from the first wireless signal a first player identifier includes determining from the first wireless signal a name of a first player. For example, the first wireless signal may encode a player name. In some embodiments, a player name may be found from a database which associates player other player identifiers (e.g., player tracking card numbers) with player names.

D. The method of embodiment A in which the first player identifier and the second player identifier correspond to different players.

E. The method of embodiment A in which receiving via tactile input an indication of a third player identifier includes receiving an indication of a third player identifier, in which the third player identifier has been inputted using buttons. For example, the someone may enter the third player identifier by physically pressing buttons (e.g., letter keys) on a gaming device.

F. The method of embodiment A in which receiving via tactile input an indication of a third player identifier includes receiving an indication of a third player identifier, in which the third player identifier has been inputted using a joystick.

G. The method of embodiment A in which receiving via tactile input an indication of a third player identifier includes receiving an indication of a third player identifier, in which the third player identifier has been inputted using a touch screen.

H. The method of embodiment A in which receiving via tactile input an indication of a third player identifier includes receiving an indication of a third player identifier, in which the third player identifier has been inputted using a track ball.

I. The method of embodiment A in which the third wireless signal encodes a set of motions made by the first device. For example, the third wireless signal may include a set of numbers representing positions, velocities, accelerations, displacements, angular displacements, or other components of motion. The numbers may be understood to represent degrees, centimeters, or other units of measurement. In some embodiments, the third wireless signal may include an identifier for one of a set of recognized motions (e.g., "Motion F"; e.g., "Zigzag motion").

J. The method of embodiment A in which interpreting the third wireless signal includes interpreting the third wireless signal as a command to discard a card in a game of video poker.

K. The method of embodiment A in which interpreting the third wireless signal includes interpreting the third wireless signal as a command to initiate a slot machine game.

L. An apparatus comprising:
   a band formed into a loop;
   a power source attached to the band;
   a motion sensor attached to the band;
   an electromagnetic transmitter attached to the band;
   an audio speaker attached to the band;
   a haptics transducer attached to the band;
   a processor attached to the band; and
   an electromagnetic receiver attached to the band.

The band may be a metal band, elastic band, chain link band, cloth band, leather band, or any other type of band. In some embodiments, the band can be made into a loop by clasping its two ends together. In some embodiments, the band is always in loop form, save for unintended tearing or ripping.

M. The apparatus of embodiment L in which the haptics transducer is operable to generate vibrations in response to an electric signal from the processor. For example, the processor may direct the haptics transducer to vibrate when a jackpot has been won in a game being played by the wearer of the apparatus.

N. The apparatus of embodiment L in which the motion sensor is an accelerometer.

O. The apparatus of embodiment L in which the processor is operable to:
   receive a first electronic signal from the motion sensor;
   determine a first command for a first gambling game based on the first electronic signal;
   transmit the first command to the electromagnetic transmitter; and
   direct the electromagnetic transmitter to transmit the first command to a first gaming device.

Thus, in various embodiments, the apparatus may detect a player's motions and interpret the motions as commands in gambling game, such as a slot machine game, video poker game, blackjack game, or any other game. The apparatus may then transmit the command via to a gaming device, such as to a slot machine or to a mobile gaming device, so that the command may be executed in a game.

P. The apparatus of embodiment L in which the processor is operable to:
   receive from the electromagnetic receiver instructions that have been received wirelessly by the electromagnetic receiver;
   receive a second electronic signal from the motion sensor;
   follow the instructions in order to determine a second command for a second gambling game based on the second electronic signal;
   transmit the second command to the electromagnetic transmitter; and
   direct the electromagnetic transmitter to transmit the second command to the gaming device.

Q. The apparatus of embodiment L further including a switch attached to the band, in which the switch has two stable positions, and in which the processor is operable to detect the position of the switch and to direct the electromagnetic transmitter to transmit signals only if the switch is in a first of the two stable positions.

In various embodiments, a player may turn some or all aspects of a wristband on or off. The player may do this by means of a switch, button, or other toggling device, or other device. With one state of the switch, the wristband may transmit motions or commands to be used in a game. With another state of the switch, no such motions or commands may be transmitted. For example, the player may wish to make motions without worry that such motions would be counted in a game.

R. The apparatus of embodiment L further including a piezoelectric sensor attached to the band. The piezoelectric sensor may detect flexing of a player's wrist muscles through the pressure they place on the wristband, for example.

S. An apparatus comprising:
   a housing, the housing including a top surface that is parallel to the ground;
   a coin hopper disposed within the housing;
   a bill validator attached to the housing;
   a display screen attached to the housing;
   a processor disposed within the housing;
   a wireless receiver attached to the housing;
   a wireless transmitter attached to the housing;
   a first light source attached to the top surface of the housing, in which the first light source is operable to emit light of a first frequency; and
   a second light source attached to the top surface of the housing at least one foot from the first light source, in which the second light source is configured to emit light of a second frequency which is different from the first frequency.

The apparatus may represent a gaming device. The two light sources may provide fixed reference points relative to which a wristband or mobile gaming device may determine its own position or orientation. For example, the first light source may be a green light and the second light source may be a red light. A wristband may detect the two lights sources by e.g., capturing an image which includes the light sources, determining the apparent distance of the light sources in the image, and determining its own distance from the light sources based on the known distance between the two light sources.

T. The apparatus of embodiment 5 in which the processor is operable to:
conduct gambling games; and
alter the course of a gambling game based on wireless signals received at the wireless receiver.

In various embodiments, altering the course of a gambling game may include taking one of two or more possible actions in a gambling game, such as choosing one or two possible cards to keep, or such as choosing one of two or more possible bets.

Some Haptics Technology

The Impulse stick from Immersion is a joystick which provides force feedback and is marketed to be used in challenging environments, such as video arcades.

The VibeTonz® system by Immersion is a system that can endow mobile phones with haptic sensations. Such sensations may provide the feel from a repetition of a machine gun, from the shock and decay of an explosion, or from the thump of a foot kicking a ball.

A "haptic interface device" provides a haptic sensation (haptic display) to a user of the haptic interface device in response to the user's interaction with an environment with which the haptic interface device is associated. "Haptic" refers to the sense of touch: haptic interface display devices thus produce sensations associated with the sense of touch, such as texture, force (e.g., frictional force, magnetic repulsion, or attraction), vibration, mass, density, viscosity, temperature, moisture, or some combination of such sensations. Haptic interface devices can be embodied in a variety of different apparatus, such as, for example, apparatus for conveying force and/or vibrotactile sensation (e.g., a stylus, a movable arm, a wheel, a dial, a roller, a slider or a vibratory surface), apparatus for conveying thermal sensation (e.g., a thermally-controlled surface or air volume), and apparatus for conveying the sensation of moisture (e.g., a moisture-controlled surface or air volume). Haptic interface devices can be used in a wide variety of applications. For example, some joysticks and mice used with computers incorporate force feedback to provide a haptic display to a user of the joystick or mouse. Some paging devices are adapted to vibrate when a paging signal is received. Some toys produce vibrations as part of the interaction with the toy. These examples give an indication of the range of applications for which a haptic interface device can be used.

In a conventional haptic interface device, the character of the haptic display experienced by a user is determined by a haptic model that links the state of one or more aspects of the environment to the haptic sensation provided to the user. A user uses an environment interaction control apparatus to interact with an environment via an environment interaction model (either directly or via a haptic model). The haptic model "interprets" the user interaction with the environment (based on information concerning the user interaction obtained either from the environment interaction model or the environment to cause a haptic display apparatus to produce a corresponding haptic display. The environment interaction model can also cause a non-haptic display apparatus to produce a non-haptic display (e.g., a visual display and/or an audio display). However, there need not necessarily be a non-haptic display.

The magnitude of the change in haptic sensation per unit change in the state of one or more aspects of the environment is referred to herein as the "resolution" of the haptic display. For example, in a haptic interface device used for video browsing and/or editing, a knob can be rotated to advance through the frames of a video recording, a force being applied in opposition to rotation of the knob, to simulate a detent, at predetermined transitions from one video frame to the next in the video recording. The resolution of the haptic display in that haptic interface device can be the frequency of occurrence of detents in the video recording (e.g., the number of video frames between each detent). (It can also be possible, as illustrated by an example discussed further below, to define the resolution of the haptic display of such a haptic interface device in terms of the frequency of detents per unit duration of time over which the video was obtained.)

Output produced by the haptic display apparatus can include, for example, sensations of texture, force (e.g., frictional force, magnetic repulsion, or attraction), vibration, mass, density, viscosity, temperature, moisture, or some combination of such sensations. When the environment is a visual and/or an audio recording, for example, force can be applied in opposition to movement of an apparatus embodying the environment interaction control apparatus and the haptic display apparatus to simulate a detent as transition is made from one video frame (or other related set of visual recording data) to the next. Additionally the haptic model can replicate a variety of characteristics of a haptic sensation, such as inertia, damping and/or compliance. The haptic display apparatus can make use of a variety of devices to produce the haptic display. For example, if appropriate for the desired haptic display, devices for producing force and/or vibrotactile sensation can be used, such as, for example, DC servo motor(s), voice coil motor(s), linear actuator(s), hydraulic actuator(s), pneumatic actuator(s), shape memory alloy(s) (SMAs) and piezoelectric transducer(s). If appropriate for the desired haptic display, thermal devices can additionally or alternatively be used, such as, for example, thermoelectric module(s), or heater and fan combination(s). If appropriate for the desired haptic display, moisture devices and/or materials can additionally or alternatively be used, such as, for example, condenser(s), mister(s), moisture-permeable barrier(s), and anhydrous material(s).

The haptic display apparatus can be embodied by, for example, a force-actuated wheel, knob, handle or arm, a heat sourcing and/or sinking device, or a moisture generating and/or absorbing device.

Various devices actively respond to user input by providing tactile cues or responses to the user. The vibrator in a cell phone or pager is a good example. Other examples include an input key that provides a clicking sound when moved; a key or touch screen that moves suddenly or vibrates in an opposed direction to the input; and a key that moves suddenly or vibrates perpendicular to the direction of input in response to a transducer attached to the device housing.

An input mechanism such as a display and/or a key may be configured for providing active tactile force feedback. An electromechanical transducer, such as a voice-coil based linear vibration motor, a piezoelectric actuator or vibrator, or the like, is mechanically connected directly to the display, and an electromechanical transducer, such as a vibrator, or the like, is mechanically connected directly to the key.

In various embodiments, a haptic interface module is configured to output pulses of predetermined or user defined amplitude and duration in response to receiving a trigger signal from a phone processor. Alternatively, other interface logic (e.g., address decoding logic) is included between a digital signal bus, and a haptic interface module. The phone processor is programmed to trigger the haptic interface module in response to a predetermined state as determined by intelligent operations within the phone processor. Optionally, the triggering of the haptic interface module can selectively enabled or disabled in accordance with configuration settings that a user can edit. The haptic interface module is coupled to electromechanical transducers. The electromechanical transducers are driven by the output of the haptic interface module.

More generally, the electromechanical transducers are preferably driven by a signal that includes at least one approximation of a step function. (Note that a step function is a mathematical ideal that no real world circuit can achieve). A step function includes a broad range of frequencies. By using a driving signal that includes an approximation of a step function, the electromechanical transducer is caused to emit an impulse of mechanical energy that propagates to the haptic point and is felt by a user operating the cellular phone. In various embodiments, the electromechanical transducer is driven by a signal that includes one or more pulses. A pulse, e.g., a single pulse or a complex waveform, is generated in response to each detected state, where a state refers to a particular situation identified by the phone processor. Using a known pulse is advantageous in that a known pulse generates an impulse of mechanical energy that creates a tactile sensation that simulates the feel of previous states with which the user may be familiar.

A transceiver module, phone processor, A/D, input decoder, D/A 510, haptic interface module, display driver, memory, and display driver are preferably part of an electric circuit that is embodied in the circuit components, and interconnecting traces of the circuit board.

Alternatively in lieu of using the phone processor, a different electric circuit may be used to drive the electromechanical transducer in order to generate tactile feedback to the haptic points.

The haptic interface module could alternatively be a pulse generator, generating digital pulses of various widths, heights, and/or frequencies based on instructions from the phone processor. Depending on the impedance match to the electromechanical transducer and current sourcing/sinking capability, an amplifier may be needed. Alternatively, the haptic interface module could simply be a current amplifier and pulses would be generated by the phone processor itself. Another possibility is that the haptic interface module comprises multiple DACs which apply analog signals as would be the case if additional audio channels were included.

Various situations could prompt different haptic responses. For example, in a pager or cell phone, a message or call from a spouse might cause all the haptic points to vibrate, or a message or call from a boss might cause the haptic points to vibrate in a circular motion around the electronic device, or a message or call from another might cause the haptic points to vibrate repeatedly up one side of the electronic device. The use of adjacent multiple vibrators in succession as described creates a perceptual illusion of movement (known as the cutaneous rabbit).

This illusion of movement could be used to give directional information for navigation. The movement along a side, around the electronic device, back and forth, can also be used to convey information, such as to gather attention, create emphasis, and general non-verbal information. The electronic device can also relay information of its status, such as out of range, low battery, and busy signal. Such information may be valuable while the user is holding the electronic device to his/her ear and cannot readily see information on the screen.

The multiple localized force feedback could also be used for sensorial communication. Instead of sending a voice or text message or a picture or a data file, one could send a particular haptic pattern to other users. The pattern could represent a reminder, a certain mood (e.g., thinking of you, love you, missing you, etc.), a particular sensation, or any other user defined contents.

Computer devices are widely used for entertainment activities such as playing games. Currently, popular gaming computer devices include game consoles connected to a home television set, such as the Nintendo® 64 from Nintendo Corp., the Playstation® from Sony Corp. and the Dreamcast™ from Sega Corp. Gaming computer devices also include personal computers, such as Windows PCs, Macintosh computers, and others. Also, portable computer devices are often used for entertainment purposes, such as Game Boy® from Nintendo, personal digital assistants such as PalmPilot® from Palm Computing, and laptop computers.

Users of these computer devices typically interact with a game or other application program using an interface device connected to the host computer (e.g., game console). Such interface devices may include joysticks, gamepads, mice, trackballs, styluses, steering wheels, or other devices. A user moves a user manipulatable object (manipulandum), such as a joystick, wheel, mouse, button, dial, or other object, which is sensed by the host computer and used to manipulate a graphical environment displayed by the host computer. Recently, haptic feedback in interface devices has become available as well, where the host computer and/or a microprocessor on the interface device controls one or more motors to output forces to the user. These forces are correlated with events or objects in the graphical environment to further immerse the user in the gaming experience or interface task. Herein, the term "haptic feedback" is intended to include both tactile (or vibrotactile) feedback (forces transmitted to user skin surfaces) and kinesthetic feedback (forces provided in degree(s) of freedom of motion of the manipulandum).

Existing force feedback "gamepad" controllers (or add-on hardware for gamepad controllers) that are used to interface with games running on game consoles include the Dual Shock™ from Sony Corp., the Rumble Pak™ from Nintendo Corp., and the Jump Pack from Sega Corp, as well as other types of handheld controllers such as the MadCatz Dual Force Racing Wheel. These devices are inertial tactile feedback controllers which employ one or more motors to shake the housing of the controller and thus provide output forces such as vibrations to the user which are correlated to game events and interactions. Typically, an eccentric rotating mass (ERM) motor, i.e., pager motor, is used to generate vibration on the controller and thus to the user. The motor is rigidly coupled to the controller housing and provides a mass on a rotating shaft offset from the axis of rotation, so that when the shaft is rotated, the inertial forces from the moving mass rock the motor and the gamepad housing back and forth.

To replicate texture, a force-feedback device is preferably used to allow users to touch and feel computer generated objects. The sense of touch is preferably simulated using a haptic (sensory/touch) interface. A haptic interface is a force reflecting device that allows a user to touch, feel, manipulate, create, and/or alter simulated three-dimensional objects in a virtual environment. There are various known haptic interface objects, including a flat surface area interface, joystick, glove, thimble, stick or pen, exo-skeletal structures, tread-mills, fans, magnetic. Hardware employed includes DC brushless motors, potentiometers, Silicon Graphics, Inc. IRIS Indigo computers, V25 board computers, 8086 compatible microprocessors, CRT displays, stereo-imaging systems, magnetic and electromagnetic components, pulleys, steel belt drive trains, VME bus, encoders, potentiometers, motor controllers, encoders, cable reducers. The required software can be any of a variety of programming languages (e.g., C, C++) that are able to work with visual modeling programs.

Currently, there is no consensus on the "best" type of interface among experts. However, an example of a known haptic interface is the "Phantom Haptic Interface" developed at MIT's Artificial Intelligence Laboratory. The "Phantom Haptic Interface," delivers precise haptic stimulation to humans at a level of fidelity and convenience previously unattainable. The device built to deliver the forces that arise in "point contacts" gives the sensation of fingertip interactions with a wide variety of objects. Requiring only three motors and three sensors to accomplish this, the device provides a computationally and mechanically tractable way to enable haptic interaction with complex virtual objects.

Haptic interfaces permit user to touch and manipulate imaginary computer-generated objects in a way that evokes a compelling sense of tactile "realness." With this technology a user at a computer terminal can touch objects that exist only in the "mind" of the computer. By transmitting the correct digital signals to a master haptic interface device at a remote user location, the master device can be used to make users feel as though they were performing a real task. In reality, users would simply be interacting through motors with a computer program.

Various embodiments are optically based, and generally uses unobtrusive specialized datum's on, or incorporated within, an object whose 3D position and/or orientation is desired to be inputted to a computer. Typically such datums are viewed with a single TV camera, or two TV cameras forming a stereo pair. A location for the camera(s) may be proximate the computer display, looking outward therefrom, or to the top or side of the human work or play space.

Retroreflective glass bead tape, or beading, such as composed of Scotchlite 7615 by 3M co., provides a point, line, or other desirably shaped datum which can be easily attached to any object desired, and which has high brightness and contrast to surroundings such as parts of a human, clothes, a room etc., when illuminated with incident light along the optical axis of the viewing optics such as that of a TV camera. This in turn allows cameras to be used in normal environments, and having fast integration times capable of capturing common motions desired, and allows datums to be distinguished easily which greatly reduces computer processing time and cost.

FIG. 14a

Figure 14A:
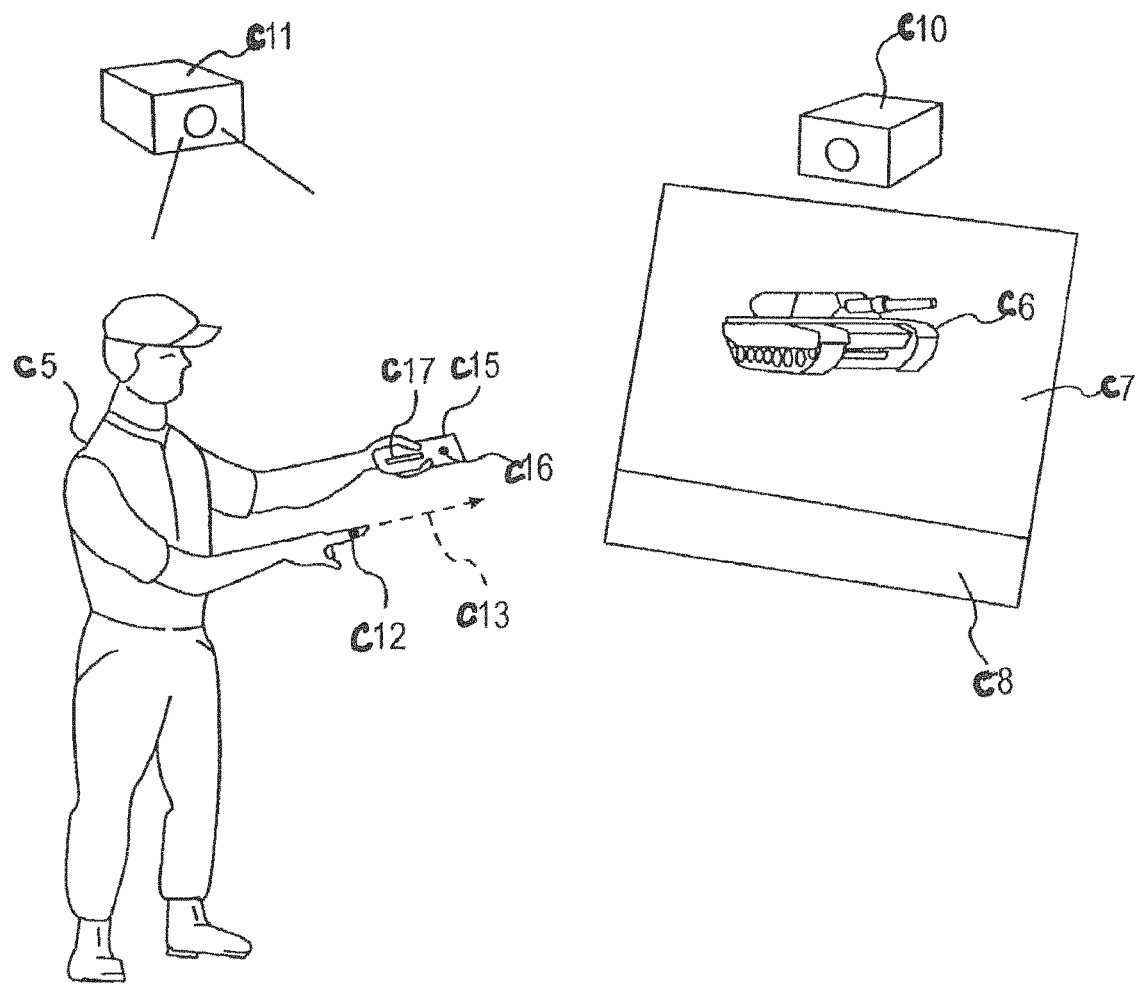
FIG. 14a shows some single camera based embodiments.

FIG. 14a illustrates exemplary single camera based embodiments. In this case, a user C5, desires to point at an object C6 represented electronically on the screen C7 and cause the pointing action to register in the software contained in computer C8 with respect to that object (a virtual object), in order to cause a signal to be generated to the display C7 to cause the object to activate or allow it to be moved, (e.g. with a subsequent finger motion or otherwise). He accomplishes this using a single TV camera C10 located typically on top of the screen as shown or alternatively to the side (such as C11) to determine the position of his fingertip C12 in space, and/or the pointing direction of his finger C13.

It may be desirable to use retroreflective material on the finger, e.g., as either temporarily attached to the finger as in jewelry or painted on the finger using retro-reflective coating "nail polish" or adhered to the finger such as with adhesive tape having a retro-reflective coating. Such coatings may include those of Scotch-lite 7615 and its equivalent that have high specific reflectivity, contrasting well to their surroundings to allow easy identification. The brightness of the reflection allows dynamic target acquisition and tracking at lowest cost.

The use of retroreflective and/or highly distinctive targets (e.g., bright orange triangles) allows reliable acquisition of the target in a general scene, and does not restrict the device to pointing on a desktop application under controlled lighting. Active (self-luminous) targets such as LEDS may also allow such acquisition.

If we consider camera system C10 sitting on top of the screen C7 and looking at the user or more particularly, the user's hand, in a normal case of Internet telephony there is a relatively large field of view so that the user's face can also be seen. This same field of view can be used for various embodiments, but it describes a relatively large volume. For higher precision, add-on lenses or zoom lenses on the camera may be used to increase the resolution.

Or it is possible according to various embodiments to have a plurality of cameras, one used for the Internet and the other used for the input application here described. Indeed with the ever dropping prices, the price of the actual camera including the plastic lens on the CMOS chip is so low, it is possible perhaps even to have multiple cameras with fixed magnifications, each having a separate chip!

These can easily be daisy chained with either fire wire or USB such that they can either be selected at will electronically in fact by the different magnifications or pointing directions desired.

Let us now return now to the question of determining location or orientation of a human portion such as typically a hand, or finger—in this case, a finger. In various embodiments, low cost lighting may be used. The power for the lighting, such as LEDs can generally be conveyed over the USB or 1394 bus, however.

The user can also point or signal with an object such as C15 having datum C16 on it, such as a retroreflective dot C16 or line target C17.

It is possible to expand the sensing of 2D positions described above into 3, 4, 5 and 6 dimensions (x, y plus z, pitch, yaw, roll). Two sensing possibilities of the many possible, are described in various embodiments herein.

1. The first, illustrated in FIGS. 14a and b is to utilize a single camera, but multiple discrete features or other targets on the object which can provide a multidegree of freedom solution. In one example, the target spacing on the object is known a priori and entered into the computer manually or automatically from software containing data about the object, or can be determined through a taught determining step.

2. The second is a dual camera solution shown in FIGS. 14c and d that does not require a priori knowledge of targets and in fact can find the 3D location of one target by itself, useful for determining finger positions for example. For 6-degree Freedom of information, at least three point, targets are required, although line targets, and combinations of lines and points can also be used.

Figure 14B:
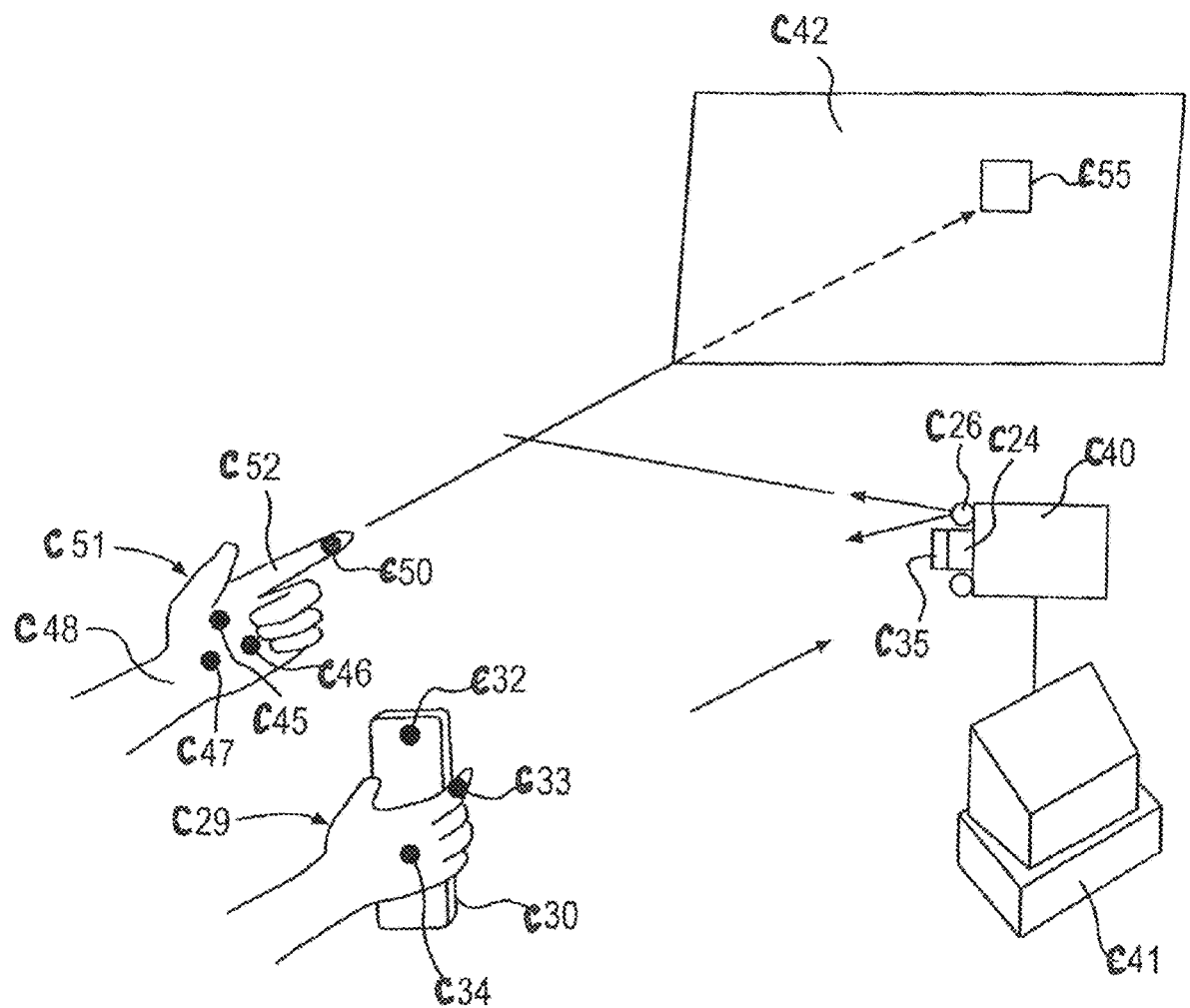
FIG. 14b illustrates some 3-D (3 Dimensional) sensing embodiments.

FIG. 14b illustrates a 3-D (3 Dimensional) sensing embodiment using single camera stereo with 3 or more datums on a sensed object, or in another example, the wrist of the user.

As shown the user holds in his right hand C29, object C30 which has at least 3 visible datums C32, C33, and C34 which are viewed by TV camera C40 whose signal is processed by computer C41 which also controls projection display C42. TV camera C40 also views 3 other datums C45, C46 and C47, on the wrist C48 of the users left hand, in order to determine its orientation or rough direction of pointing of the left hand C51, or its position relative to object C30, or any other data (e.g. relation to the screen position or other location related to the mounting position of the TV camera, or to the users head if viewed, or whatever. The position and orientation of the object and hand can be determined from the 3 point positions in the camera image using known photogrammetric equations (see Pinckney, reference U.S. Pat. No. 4,219,847 and other references in papers referenced).

Alternatively to the 3 discrete point target, a colored triangular target for example can be used in which the intersections of lines fitted to its sides define the target datums, as discussed below.

It is also possible to use the camera C40 to see other things of interest as well. For the direction of pointing of the user at an object C55 represented on display C42 is determine for example datum C50 on finger C52 of users left hand C51 (whose wrist position and attitude can be also determined).

Alternatively, the finger can be detected just from its general gray level image, and can be easily identified in relation to the targeted wrist location (especially if the user, as shown, has clenched his other fingers such that the finger C52 is the only one extended on that hand).

The computer can process the gray level image using known techniques, for example blob and other algorithms packaged with the Matrox brand Genesis image processing board for the PC, and determine the pointing direction of the finger using the knowledge of the wrist gained from the datums. This allows the left hand finger C50 to alternatively point at a point (or touch a point) to be determined on the object C30 held in the right hand as well.

FIG. 14c

Figure 14C:
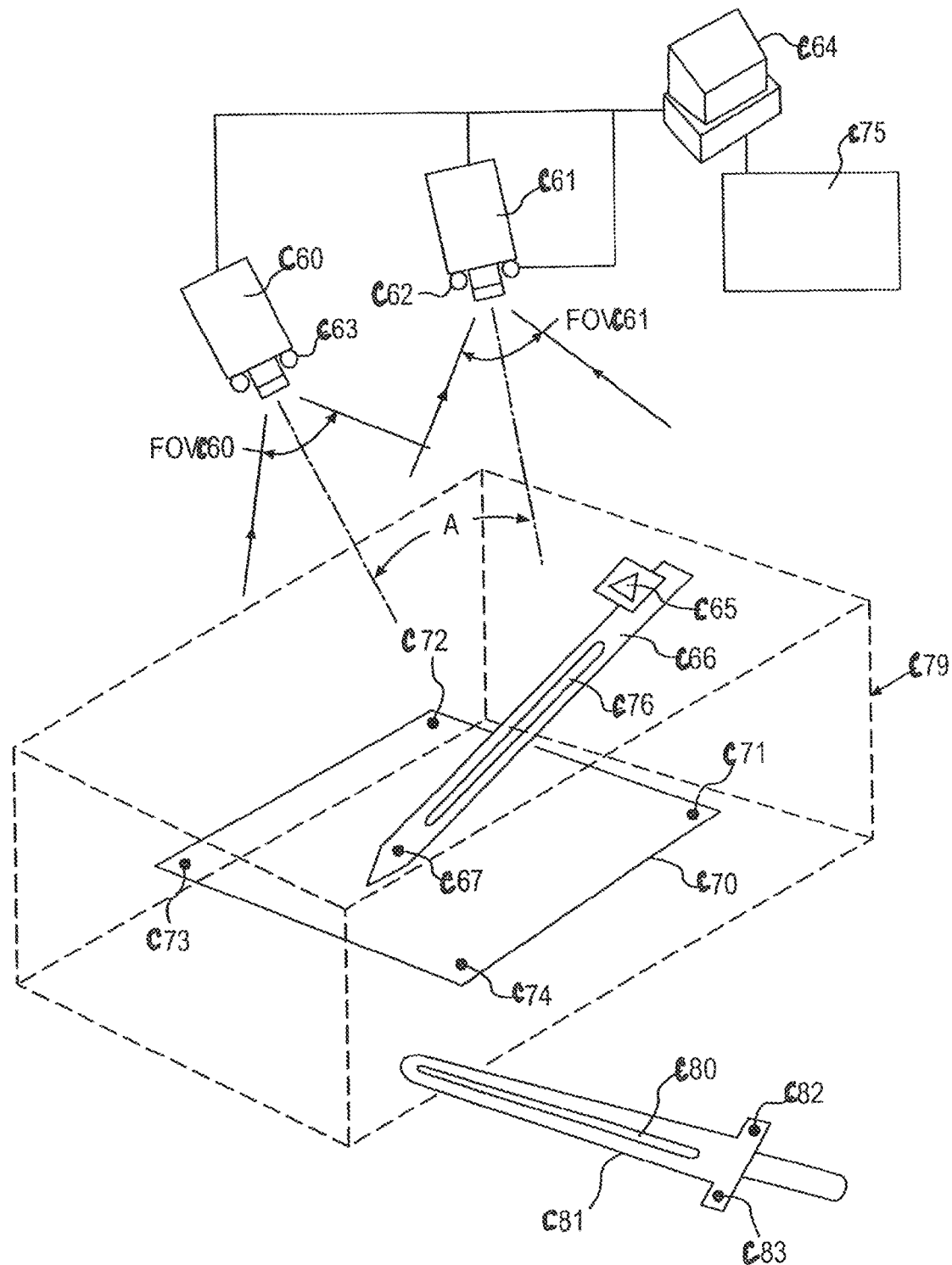
FIG. 14c illustrates some embodiments with two camera "binocular" stereo cameras.

FIG. 14c illustrates another version of the embodiments of FIGS. 14a and 14b, in which two camera "binocular" stereo cameras C60 and C61 processed by computer C64 are used to image artificial target (in this case a triangle, see also FIG. 2), C65, on the end of pencil C66, and optionally to improve pointing resolution, target C67 on the tip end of the pencil, typically a known small distance from the tip (the user and his hand holding the pencil is not shown for clarity. This imaging allows one to track the pencil tip position in order to determine where on the paper (or TV screen, in the case of a touch screen) the pencil is contacting.

It may be desirable to have independently controllable near coaxial light sources C62 and C63 are shown controlled by computer C64 to provide illumination of retroreflective targets for each camera independently. This is because at different approach angles the retroreflector reflects differently, and since the cameras are often angularly spaced (e.g., by non-zero angle A), they do not see a target the same.

Numerous other camera arrangements, processing, computation, and other issues are discussed in general relative to accurate determination of object positions using two or more camera stereo vision systems in the S. F. El Hakim paper referenced above and the additional references referred to therein.

The computer can also acquire the stereo image of the paper and the targets in its four corners, C71-C74. Solution of the photogrammetric equation allows the position of the paper in space relative to the cameras to be determined, and thence the position of the pencil, and particularly its tip, to the paper, which is passed to display means C75 or another computer program. Even without the target on the end, the pointing direction can be determined from target C65 and knowing the length of the pencil the tip position calculated.

A line target C76 can also be useful on the pencil, or a plurality of line targets spaced circumferentially, can also be of use in defining the pencil pointing direction from the stereo image pair.

A working volume of the measurement system is shown in dotted lines C79—that is the region on and above the desk top in this case where the sensor system can operate effectively. Typically this is more than satisfactory for the work at hand. It is noted that due to possible compound inclination of the cameras, and other geometric considerations, the effective working volume for any given accuracy or resolution criteria, does not necessarily have parallel sides.

It is noted that the dual (Stereo pair) camera system of FIG. 14 has been extensively tested and can provide highly accurate position and orientation information in up to 6 degrees of freedom. One particular version using commercial CCD Black and white cameras and a Matrox "Genesis" framegrabber and image processing board, and suitable stereo photogrammetry software running in an Intel Pentium 300 MHZ based computer, has characteristics well suited to input from a large desktop CAD station for example. This provides 30 Hz updates of all 6 axes (x y z roll pitch and yaw) data over a working volume of 0.5 meter×0.5 meter in x and y (the desktop, where cameras are directly overhead pointing down at the desk) and 0.35 meters in z above the desk, all to an accuracy of 0.1 mm or better, when used with clearly visible round retroreflective (scotchlite 7615 based) datums approx. 5-15 mm in diameter on an object for example. This may be accurate enough for precision tasks such as designing objects in 3D cad systems.

The cameras in this example are mounted overhead. If mounted to the side or front, or at an angle such as 45 degrees to the desktop, the z axis becomes the direction outward from the cameras.

FIG. 14c additionally illustrates 2 camera stereo arrangement, used in this case to determine the position and orientation of an object having a line target, and a datum on a portion of the user. Here, cameras C60 and C61 are positioned to view a retro-reflective line target C80 in this case running part of the length of a toy sword blade C81. The line target in this case is made as part of the plastic sword, and is formed of molded in corner cube reflectors similar to those in a tail light reflector on a car. It may also be made to be one unique color relative to the rest of the sword, and the combination of the two gives an unmistakable indication.

There are typically no other bright lines in any typical image when viewed retroreflectively. This also illustrates how target shape (i.e., a line) can be used to discriminate against unwanted other glints and reflections which might comprise a few bright pixels worth in the image. It is noted that a line type of target can be cylindrical in shape if wrapped around a cylindrical object, which can be viewed then from multiple angles.

Matching of the two camera images and solution of the photogrammetric equations gives the line target pointing direction. If an additional point is used, such as C82 the full 6 degree of freedom solution of the sword is available. Also shown here is yet another point, C83, which serves two purposes, in that it allows an improved photogrammetric solution, and it serves as a redundant target in case C82 can't be seen, due to obscuration, obliteration, or what have you.

This data is calculated in computer C64, and used to modify a display on screen C75 as desired.

In one embodiment a matrox genesis frame processor card on an IBM 300 mhz PC was used to read both cameras, and process the information at the camera frame rate of 30 HZ. Such line targets are very useful on sleeves of clothing, seams of gloves for pointing, rims of hats, and other decorative and practical purposes for example for example outlining the edges of objects or portions thereof, such as holes and openings.

Typically the cameras C60 and C61 have magnifications and fields of view which are equal, and overlap in the volume of measurement desired. The axes of the cameras can be parallel, but for operation at ranges of a few meters or less, are often inclined at an acute angle A with respect to each other, so as to increase the overlap of their field of view—particularly if larger baseline distances d are used for increased accuracy (albeit with less z range capability). For example for a cad drawing application, A can be 30-45 degrees, with a base line of 0.5 to 1 meter. Whereas for a video game such as FIG. 5, where z range could be 5 meters or more, the angle A and the base line would be less, to allow a larger range of action.

Data Base

The datums on an object can be known a priori relative to other points on the object, and to other datums, by selling or otherwise providing the object designed with such knowledge to a user and including with it a CD ROM disc or other computer interfaceable storage medium having this data. Alternatively, the user or someone, can teach the computer system this information. This is particularly useful when the datums are applied by the user on arbitrary objects.

FIG. 14*d*

Illustrated here are steps used in various embodiments relating to detection of a single point to make a command, in this case; the position (or change of position, i.e. movement) of a fingertip having retroreflective target attached detected by a stereo pair of TV cameras using detection algorithm which in its simplest case is based on thresholding the image to see only the bright target indication from the finger (and optionally, any object associated therewith such as a screen to be touched for example).

If this is insufficient to unambiguously define the datum on the finger, added algorithms may be employed which are themselves known in the art (many of which are commonly packaged with image analysis frame grabber boards such as the matrox genesis. The processes can include, for example:
- a brightness detection step relative to surroundings, or to immediate surroundings (contrast);
- a shape detection step, in which a search for a shape is made, such as a circle, ring, triangle, etc.;
- a color detection step, where a search for a specific color is made;
- a movement step, wherein only target candidates which have moved from a location in a previous TV image are viewed.

Each step may process only those passing the previous step, or each may be performed independently, and the results compared later. The orders of these steps can be changed but each adds to further identify the valid indication of the finger target.

Next the position of the targeted finger is determined by comparing the difference in location of the finger target in the two camera images of the stereo pair. There is no matching problem in this case, as a single target is used, which appears as only one found point in each image.

After the Image of finger (or other tool) tip is found, its location is computed relative to the screen or paper, and this data is inputted to the computer controlling the display to modify same, for example the position of a drawing line, an icon, or to determine a vector of movement on the screen.

Motion Detection.

The computer 8 can be used to analyze incoming TV image based signals and determine which points are moving in the image This is helpful to eliminate background data, which is stationary, since often times only moving items such as a hand or object are of interest. In addition, the direction of movement is in many cases the answer desired or even the fact that a movement occurred at all.

A simple way to determine this is to subtract an image of retroreflective targets of high contrast from a first image—and just determine which parts are different—essentially representing movement of the points. Small changes in lighting or other effects are not registered. There are clearly more sophisticated algorithms as well.

Motion preprocessing is useful when target contrast is not very high, as it allows one to get rid of extraneous regions and concentrate all target identification and measurement processing on the real target items.

Such processing is also useful when two camera stereo is used, as only moving points are considered in image matching—a problem when there are lots of points in the field.

Can it be assumed that the object is moving? The answer is yes if it's a game or many other activities. However there may be a speed of movement of issue. Probably frame to frame is the criteria, in a game, namely 30 Hz for a typical camera. However, in some cases movement might be defined as something much slower—e.g., 3 Hz. for a CAD system input using deliberate motion of a designer.

Once the moving datum is identified, then the range can be determined and if the object is then tracked even if not moving from that point onward, the range measurement gives a good way to lock onto the object using more than just 2 dimensions.

One might actually use an artificial movement of the target if one doesn't naturally exist. This could be done by causing it to vibrate. If one or more LEDs is used as a target, they can be made to blink, which also shows up in an image subtraction (image with led on, vs. image with led off). The same is true of a target which changed color, showing up in subtraction of color images.

Image subtraction or other computer processing operations can also be useful in another sense. One can also subtract background, energizing the retroreflective illumination light with no retroreflective targets present, and then with them. One idea is simply to take a picture of a room or other work space, and then bring in the targeted object. That would seem pretty simple to subtract or whatever. And the net result is that any bright features in the space which are not of concern, such as bright door knobs, glasses, etc. are eliminated from consideration.

This can also be done with colored targets, doing a color based image subtract—especially useful when one knows the desired colors a priori (as one would, or could, via a teach mode).

Figure 14D:
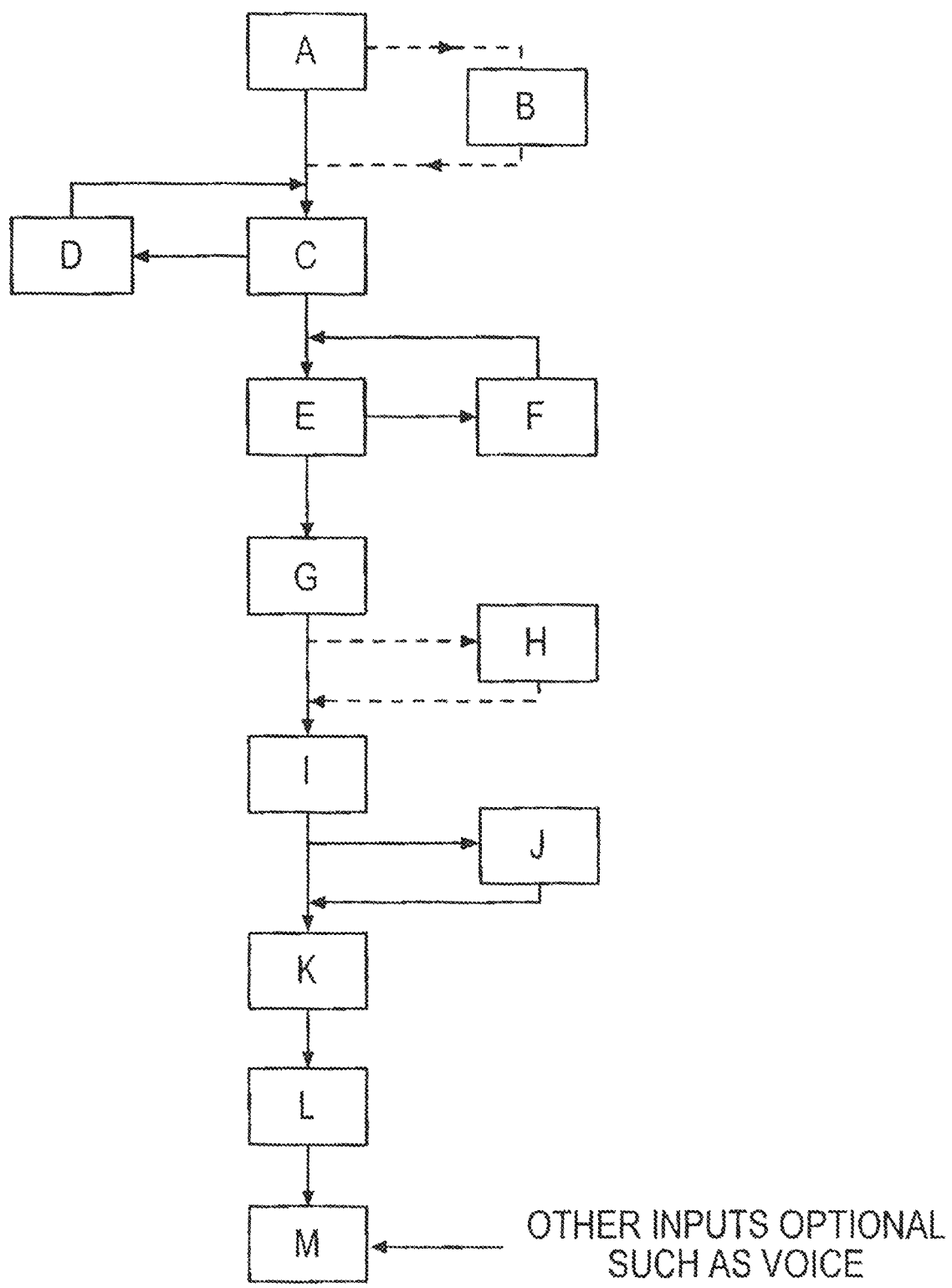
FIG. 14d illustrates some steps according to some embodiments.
Figure 14E:
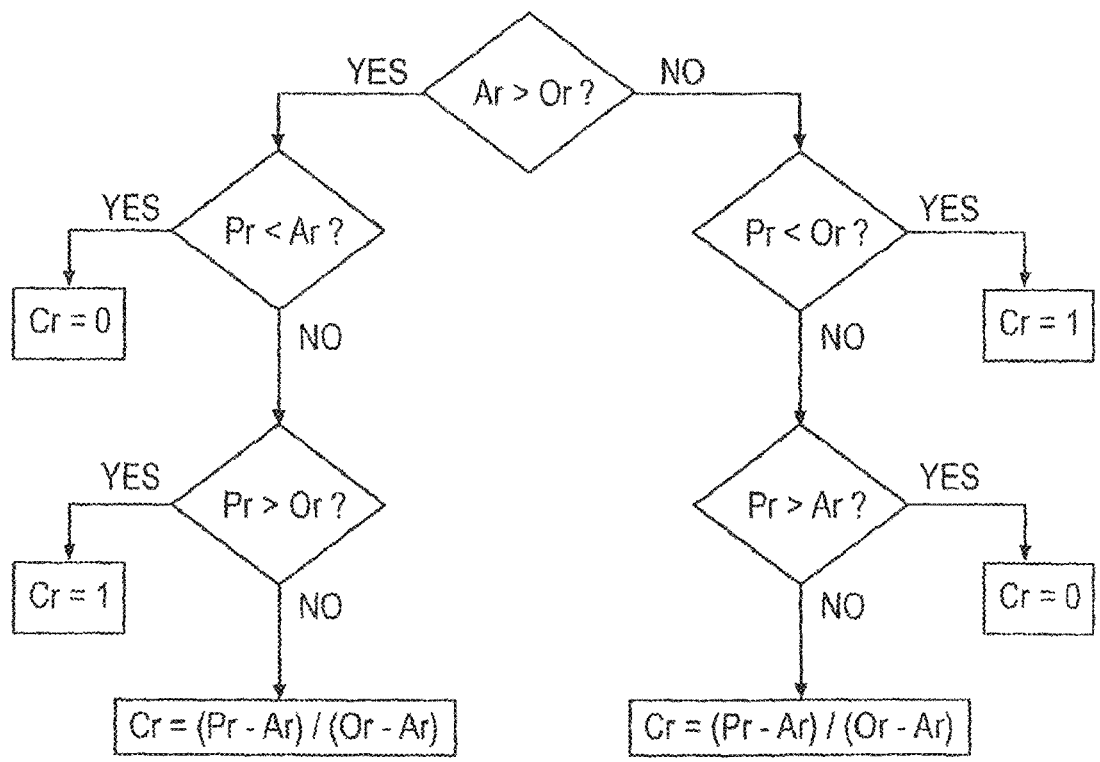
FIG. 14e shows a process for color mapping, according to some embodiments.

A flow chart is shown in FIG. 14*d* illustrating the steps as follows:
- A. Acquire images of stereo pair;
- B. Optionally preprocess images to determine if motion is present. If so, pass to next step otherwise do not or do anyway (as desired);
- C. Threshold images;

D. If light insufficient, change light or other light gathering parameter such as integration time;
E. Identify target(S);
F. If not identifiable, add other processing steps such as a screen for target color, shape, or size;
G. Determine centroid or other characteristic of target point (in this case a retro dot on finger);
H. Perform auxiliary matching step if required;
I. Compare location in stereo pair to determine range z and x y location of target(s);
J. Auxiliary step of determining location of targets on screen if screen position not known to computer program. Determine via targets on screen housing or projected on to screen for example;
K. Determine location of target relative to screen;
L. Determine point in display program indicated;
M. Modify display and program as desired.

FIG. 14e

The following is a multi-degree of freedom image processing description of a triangular shaped color target (disclosed itself in several embodiments herein) which can be found optically using one or more cameras to obtain the 3 dimensional location and orientation of the target using a computer based method described below. It uses color processing to advantage, as well as a large number of pixels for highest resolution, and is best for targets that are defined by a large number of pixels in the image plane, typically because the target is large, or the cameras are close to the target, or the camera field is composed of a very large number of pixels.

The method is simple but unique in that it can be applied 1) in a variety of degrees to increase the accuracy (albeit at the expense of speed), 2) with 1 or more cameras (more cameras increase accuracy), 3) it can utilize the combination of the targets colors and triangles, (1 or more) to identify the tool or object. It utilizes the edges of the triangles to obtain accurate subpixel accuracy. A triangle edge can even have a gentle curve and the method will still function well. Other geometric shapes can also be processed similarly in some cases.

The method is based on accurately finding the 3 vertices (F0,G0,F1,G1,F2,G2) of each triangle in the camera field by accurately defining the edges and then computing the intersection of these edge curves. This is generally more accurate, than finding 3 or 4 points from spot centroids. However, the choice of which to use, often comes down to which is more pleasing to the consumer, or more rugged and reliable in use.

The preferred implementation uses 1 or more color cameras to capture a target composed of a brightly colored right triangle on a rectangle of different brightly colored background material. The background color and the triangle color must be two colors that are easily distinguished from the rest of the image. For purposes of exposition we will describe the background color as a bright orange and the triangle as aqua.

By using the differences between the background color and the triangle color, the vertices of the triangle can be found very accurately. If there are more than one triangle on a target, a weighted average of location and orientation information can be used to increase accuracy.

The method starts searching for a pixel with the color of the background or of the triangle beginning with the pixel location of the center of the triangle from the last frame. Once a pixel with the triangle "aqua" color is found, the program marches in four opposite directions until each march detects a color change indicative of an edge dividing the triangle and the "orange" background. Next, the method extends the edges to define three edge lines of the triangle with a least squares method. The intersection points of the resulting three lines are found, and serve as rough estimates of the triangle vertices. These can serve as input for applications that don't require high accuracy.

If better accuracy is desired, these provisional lines are then used as a starting point for the subpixel refinement process. Each of these 3 lines is checked to see if it is mainly horizontal. If a line is mainly horizontal, then a new line will be determined by fitting a best fit of a curve through the pixel in each column that straddles the provisional line. If a line is mainly vertical, then the same process proceeds on rows of pixels.

The color of each pixel crossed by a line is translated into a corresponding numeric value. A completely aqua pixel is would receive the value 0, while a completely orange pixel would receive the value 1. All other colors produce a number between 0 and 1, based on their relative amounts of aqua and orange. This numeric value, V, assigned to a pixel is a weighted average of the color components (such as the R, G, B values) of the pixel. If the components of the calibrated aqua are AR, AG, AB, and those of orange are OR, OG, OB, and the pixel components are PR, PG, PB, then the numeric value Vis:

$$V = WR*CR + WG*CG + WB*CB$$

With WR, WG, WB being weighting constants between 0 and 1 and CR is defined as:

The same process can be used to define CG and CB.

This value Vis compared with the ideal value U which is equal to the percentage of orangeness calculated assuming the angle of the provisional line is the same as that of the ideal line. For example, a pixel which is crossed by the line in the exact middle would have a U of 0.5, since it is 50% aqua and 50% orange. A fit of U-V in the column (or row) in the vicinity of the crossing of the provisional line gives a new estimate of the location of the true edge crossing. Finally, the set of these crossing points can be fit with a line or gentle curve for each of the three edges and the 3 vertices can be computed from the intersections of these lines or curves.

We can now use these three accurate vertices in the camera plane (F0,G0,F1,G1,F2,G2) together with lens formula (here we will use the simple lens formula for brevity) to relate the x and y of the target to F and G $$F = .lambda.X/Z;\ G = .lambda.Y/Z$$

lambda. is the focal length and z is the perpendicular distance from the lens to a location on the target. A triangle on the target is initially defined as lying in a plane parallel to the lens plane. The preferred configuration has one right triangle whose right angle is defined at x0, y0, z0 with one edge (of length A) extending along the direction of the F axis of the camera and with the other edge (of length B) extending along the direction of the G axis of the camera. The actual target orientation is related to this orientation with the use of Euler Angles .phi., .theta., .psi. Together with the lens equations and the Euler equations, the 6 derived data values of the 3 vertices (F0, G0, F1, G1, F2, G2) can be used to define 6 values of location and orientation of the target. The location and orientation of a point of interest on any tool or object rigidly attached to this target can be easily computed from calibration data and ordinary translation and rotation transformations. Refinements to handle lens distortions can be handled by forming a correction function with calibration data that modifies the locations of the F and G data. The Euler formulation is nonlinear. We linearize the equations by assuming initially that the angles have not changed much since the last video frame. Thus we replace .phi. with .phi.(old)+U1., .theta. with .theta.(old)+U2, .psi. with .psi.(old)+U3, and z0 with z0(old)+U4 or:

$$.phi. = .phi. + U1$$
$$.theta. = .theta. + U2$$
$$.psi. = .psi. + U3$$
$$z0 = z0 + U4$$

Substituting these into the Euler equations and applying the lens formulas leads to a matrix equation $$SU=R$$

that can be solved for the U values with a standard methods such as Gauss Jordan routine. The angles and z0 can be updated iteratively until convergence is achieved. The coefficients of the matrix are defined as:

$$s11 = -A(\cos(.phi.)(F1/.lambda. \cos(.psi.) + \sin(.psi.)) -$$
$$\sin(.phi.)\cos(.theta.)(F1/.lambda. \sin(.psi.) - \cos(.psi.)))$$
$$s12 = A(\sin(.theta.)\cos(.phi.)(F1/.lambda. \sin(.psi.) - \cos(.psi.))$$
$$s13 = A(\sin(.phi.)(F1/.lambda. \sin(.psi.) - \cos(.psi.)) -$$
$$\cos(.phi.)\cos(-.theta.)(F1/.lambda. \cos(.psi.) - \sin(.psi.)))$$
$$s14 = (F0 - F1)/.lambda.$$
$$s21 =$$
$$A(G1/.lambda.(-\cos(.phi.)*\cos(.psi.) + \sin(.phi.)\sin(.psi.)\cos(.theta.))$$
$$+\sin(.theta.)\sin(.phi.))$$
$$s22 = A\cos(.phi.)(G1/.lamda. \sin(.theta.)\sin(.psi.) - \cos(.theta.))$$
$$s23 =$$
$$G1/.lamda.A(\sin(.psi.)\sin(.phi.) - \cos(.psi.)\cos(.theta.)\cos(.p-hi.))$$
$$s24 = (G0 - G1)/.lambda.$$
$$s31 = 0$$
$$s32 = -B\cos(.theta.)(F2/.lambda. \sin(.psi.) - \cos(.psi.))$$
$$s33 = -B\sin(.theta.)(F2/.lambda. \cos(.psi.) + \sin(.psi.))$$
$$s34 = (F0 - F2)/.lambda.$$
$$s41 = 0$$
$$s42 = -B(G2/.lambda.\sin(.psi.)\cos(.theta.) + \sin(.theta.))$$
$$s43 = -BG2/.lambda. \sin(.theta.)\cos(.psi.)$$
$$s44 = (G0 - G2)/.lambda.$$

and the right hand side vector is defined as:

$$r1 = (F1 - F0)z0/.lambda. +$$
$$A(F1/.lambda. (\cos(.psi.)\sin(.phi.) + \cos(.thet-a.)\cos(.phi.)\sin(.psi.)) +$$
$$\sin(.psi.)\sin(.psi.) - \cos(.theta.)\cos(.phi.)\cos(-.psi.))$$
$$r2 = (G1 - G0)z0/.lambda. +$$
$$A(G1/.lambda. (\cos(.psi.)\sin(.phi.) + \cos(.theta.)\cos(.phi.)\sin(.psi.)) +$$
$$\sin(.theta.)\cos(.phi.))$$
$$r3 =$$
$$(F2 - F0)z0/.lambda. + B\sin(.theta.)(F2/.lambda. \sin(.psi.) - \cos(.psi.))$$
$$r4 =$$
$$(G2 - G0)z0/.lambda. + B(G2/.lambda. \sin(.theta.)\sin(.psi.) - \cos(.theta.))$$

After convergence, the remaining parameters x0 and y0 are defined from the equations:

$$x0 = F0z0/.lambda.$$
$$Y0 = G0z0/.lambda.$$

The transition of pronounced colors can yield considerably more information than a black white transition, and is useful for the purpose of accurately calculating position and orientation of an object. As color cameras and high capacity processors become inexpensive, the added information provided can be accessed at virtually no added cost. And very importantly, in many cases color transitions are more pleasing to look at for the user than stark black and white. In addition the color can be varied within the target to create additional opportunities for statistically enhancing the resolution with which the target can be found.

Problems in 3 Dimensional Input to Computers

Today, input to a computer for Three Dimensional (3D) information is often painstakingly done with a 2 Dimensional device such as a mouse or similar device. This artifice, both for the human, and for the program and its interaction with the human is un-natural, and CAD designers working with 3D design systems require many years of experience to master the skills needed for efficient design using same.

A similar situation exists with the very popular computer video games, which are becoming ever more 3 Dimensional in content and graphic imagery, but with similar limitations. These games too heretofore have not been natural for the player(s).

"Virtual reality" too requires 3D inputs for head tracking, movement of body parts and the like. This has led to the development of a further area of sensor capability which has resulted in some solutions which are either cumbersome for the user, expensive, or both.

The limits of computer input in 3D have also restricted the use of natural type situations for teaching, simulation in medicine, and the like. It further limits young children, older citizens, and disabled persons from benefiting from computer aided living and work.

Another aspect is digitization of object shapes. There are times that one would like to take a plastic model or a real world part as a starting point for a 3D design.

We propose one single inexpensive device that can give all of this control and also act as a drawing pad, or input a 3D sculptured forms or even allow the user to use real clay that as she sculptures it the computer records the new shape.

Various embodiments relate physical activities and physical objects directly to computer instructions. A novice user can design a house with a collection of targeted model or "toy" doors, windows, walls etc. By touching the appropriate toy component and then moving and rotating the user's hand she can place the component at the appropriate position. The user can either get his or her visual cue by looking at the position of the toy on the desk or by watching the corresponding scaled view on the computer display. Many other embodiments are also possible.

Object Tracking

In one general aspect, a method of tracking an object of interest is disclosed. The method includes acquiring a first image and a second image representing different viewpoints of the object of interest, and processing the first image into a first image data set and the second image into a second image data set. The method further includes processing the first image data set and the second image data set to generate a background data set associated with a background, and generating a first difference map by determining differences between the first image data set and the background data set, and a second difference map by determining differences between the second image data set and the background data set. The method also includes detecting a first relative position of the object of interest in the first difference map and a second relative position of the object of interest in the second difference map, and producing an absolute position of the object of interest from the first and second relative positions of the object of interest.

The step of processing the first image into the first image data set and the second image into the second image data set may include determining an active image region for each of the first and second images, and extracting an active image data set from the first and second images contained within the active image region. The step of extracting the active image data set may include one or more techniques of cropping the first and second images, rotating the first and second images, or shearing the first and second images.

In one implementation, the step of extracting the active image data set may include arranging the active image data set into an image pixel array having rows and columns. The step of extracting further may include identifying the maximum pixel value within each column of the image pixel array, and generating data sets having one row wherein the identified maximum pixel value for each column represents that column.

Processing the first image into a first image data set and the second image into a second image data set also may include filtering the first and second images. Filtering may include extracting the edges in the first and second images. Filtering further may include processing the first image data set and the second image data set to emphasize differences between the first image data set and the background data set, and to emphasize differences between the second image data set and the background data set.

Processing the first image data set and the second image data set to generate the background data set may include generating a first set of one or more background data sets associated with the first image data set, and generating a second set of one or more background data sets associated with the second image data set.

Generating the first set of one or more background data sets may include generating a first background set representing a maximum value of data within the first image data set representative of the background, and generating the second set of one or more background data sets includes generating a second background set representing a maximum value of data within the second image data set representative of the background. Generating further may include, for the first and second background sets representing the maximum value of data representative of the background, increasing the values contained within the first and second background sets by a predetermined value.

Generating the first set of one or more background data sets may include generating a first background set representing a minimum value of data within the first image data set representative of the background, and generating the second set of one or more background data sets may include generating a second background set representing a minimum value of data within the second image data set representative of the background. Generating further may include, for the first and second background sets representing the minimum value of data representative of the background, decreasing the values contained within the first and second background sets by a predetermined value.

Generating the first set of background data sets may include sampling the first image data set, and generating the second set of background data sets may include sampling the second image data set. Sampling may occur automatically at predefined time intervals, where each sample may include data that is not associated with the background.

Generating the first set of one or more background data sets may include maintaining multiple samples of the first image data set within each background data set, and generating the second set of one or more background data sets may include maintaining multiple samples of the second image data set within each background data set.

Generating each first background data set may include selecting from the multiple samples one value that is representative of the background for each element within the first image data set, and generating each second background data set may include selecting from the multiple samples one value that is representative of the background for each element within the second image data set. Selecting may include selecting the median value from all sample values in each of the background data sets.

In other implementations, generating may include comparing the first image data set to a subset of the background data set, and comparing the second image data set to a subset of the background data set.

In other implementations generating a first difference map further may include representing each element in the first image data set as one of two states, and generating a second difference map further may include representing each element in the second image data set as one of two states, where the two states represent whether the value is consistent with the background.

In still other implementations, detecting may include identifying a cluster in each of the first and second difference maps, where each cluster has elements whose state within its associated difference map indicates that the elements are inconsistent with the background.

Identifying the cluster further may include reducing the difference map to one row by counting the elements within a column that are inconsistent with the background. Identifying the cluster further may include identifying the column as being within the cluster and classifying nearby columns as being within the cluster. Identifying the column as being within the cluster also may include identifying the median column.

Identifying the cluster further may include identifying a position associated with the cluster. Identifying the position associated with the cluster may include calculating the weighted mean of elements within the cluster.

Detecting further may include classifying the cluster as the object of interest. Classifying the cluster further may include counting the elements within the cluster and classifying the cluster as the object of interest only if that count exceeds a predefined threshold. Classifying the cluster further may include counting the elements within the cluster and counting a total number of elements classified as inconsistent within the background within the difference map, and classifying the cluster as the object of interest only if the ratio of the count of elements within the cluster over the total number of elements exceeds a predefined threshold.

The step of detecting further may include identifying a sub-cluster within the cluster that represents a pointing end of the object of interest and identifying a position of the sub-cluster.

In the above implementations, the object of interest may be a user's hand, and the method may include controlling an application program using the absolute position of the object of interest.

The above implementations further may include acquiring a third image and a fourth image representing different viewpoints of the object of interest, processing the third image into a third image data set and the fourth image into a fourth image data set, and processing the third image data set and the fourth image data set to generate the background data set associated with the background. The method also may include generating a third difference map by determining differences between the third image data set and the background data set, and a fourth difference map by determining differences between the fourth image data set and the background data set, and detecting a third relative position of the object of interest in the third difference map and a fourth relative position of the object of interest in the fourth difference map. The absolute position of the object of interest may be produced from the first, second, third and fourth relative positions of the object of interest.

As part of this implementation, the object of interest may be a user's hand, and also may include controlling an application program using the absolute position of the object of interest.

In another aspect, a method of tracking an object of interest controlled by a user to interface with a computer is disclosed. The method includes acquiring images from at least two viewpoints, processing the acquired images to produce an image data set for each acquired image, and comparing each image data set to one or more background data sets to produce a difference map for each acquired image. The method also includes detecting a relative position of an object of interest within each difference map, producing an absolute position of the object of interest from the relative positions of the object of interest, and using the absolute position to allow the user to interact with a computer application.

Additionally, this method may include mapping the absolute position of the object of interest to screen coordinates associated with the computer application, and using the mapped position to interface with the computer application. This method also may include recognizing a gesture associated with the object of interest by analyzing changes in the absolute position of the object of interest, and combining the absolute position and the gesture to interface with the computer application.

In another aspect, a multiple camera tracking system for interfacing with an application program running on a computer is disclosed. The multiple camera tracking system includes two or more video cameras arranged to provide different viewpoints of a region of interest and are operable to produce a series of video images. A processor is operable to receive the series of video images and detect objects appearing in the region of interest. The processor executes a process to generate a background data set from the video images, generate an image data set for each received video image and compare each image data set to the background data set to produce a difference map for each image data set, detect a relative position of an object of interest within each difference map, and produce an absolute position of the object of interest from the relative positions of the object of interest and map the absolute position to a position indicator associated with the application program.

In the above implementation, the object of interest may be a human hand. Additionally, the region of interest may be defined to be in front of a video display associated with the computer. The processor may be operable to map the absolute position of the object of interest to the position indicator such that the location of the position indicator on the video display is aligned with the object of interest.

The region of interest may be defined to be any distance in front of a video display associated with the computer, and the processor may be operable to map the absolute position of the object of interest to the position indicator such that the location of the position indicator on the video display is aligned to a position pointed to by the object of interest. Alternatively, the region of interest may be defined to be any distance in front of a video display associated with the computer, and the processor may be operable to map the absolute position of the object of interest to the position indicator such that movements of the object of interest are scaled to larger movements of the location of the position indicator on the video display.

The processor may be configured to emulate a computer mouse function. This may include configuring the processor to emulate controlling buttons of a computer mouse using gestures derived from the motion of the object of interest. A sustained position of the object of interest for a predetermined time period may trigger a selection action within the application program.

The processor may be configured to emulate controlling buttons of a computer mouse based on a sustained position of the object of interest for a predetermined time period. Sustaining a position of the object of interest within the bounds of an interactive display region for a predetermined time period may trigger a selection action within the application program.

The processor may be configured to emulate controlling buttons of a computer mouse based on a sustained position of the position indicator within the bounds of an interactive display region for a predetermined time period.

In the above aspects, the background data set may include data points representing at least a portion of a stationary structure. In this implementation, at least a portion of the stationary structure may include a patterned surface that is visible to the video cameras. The stationary structure may be a window frame. Alternatively, the stationary structure may include a strip of light.

In another aspect, a multiple camera tracking system for interfacing with an application program running on a computer is disclosed. The system includes two or more video cameras arranged to provide different viewpoints of a region of interest and are operable to produce a series of video images. A processor is operable to receive the series of video images and detect objects appearing in the region of interest. The processor executes a process to generate a background data set from the video images, generate an image data set for each received video image, compare each image data set to the background data set to produce a difference map for each image data set, detect a relative position of an object of interest within each difference map, produce an absolute position of the object of interest from the relative positions of the object of interest, define sub regions within the region of interest, identify a sub region occupied by the object of interest, associate an action with the identified sub region that is activated when the object of interest occupies the identified sub region, and apply the action to interface with the application program.

In the above implementation, the object of interest may be a human hand. Additionally, the action associated with the identified sub region may emulate the activation of keys of a keyboard associated with the application program. In a related implementation, sustaining a position of the object of interest in any sub region for a predetermined time period may trigger the action.

The details of one or more implementations are set forth in the accompanying drawings and the description below.

Figure 15:
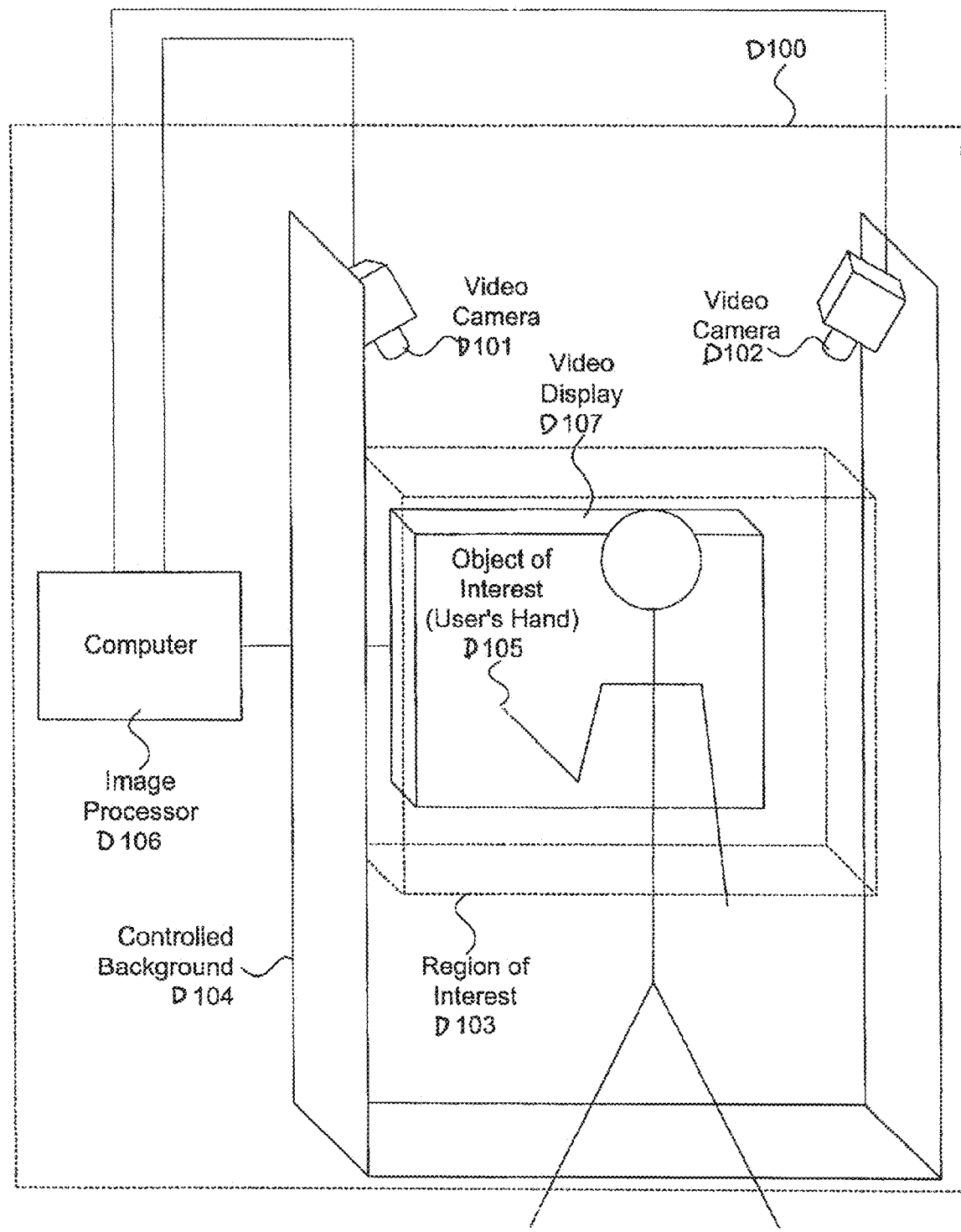
FIG. 15 shows the hardware components of an implementation of the multicamera control system, and their physical layout, according to some embodiments.

FIG. 15 shows a multicamera motion tracking and control system D100 interfaced with an image viewing system. In this implementation two cameras D101 and D102 scan a region of interest D103. A controlled or known background D104 surrounds the region of interest D103. An object of interest D105 is tracked by the system when it enters the region of interest D103. The object of interest D105 may be any generic object inserted into the region of interest D103, and is typically a hand or finger of a system user. The object of interest D105 also may be a selection device such as a pointer.

The series of video images acquired from the cameras D101 and D102 are conveyed to a computing device or image processor D106. In this implementation, the computing device is a general-purpose computer that runs additional software that provides feedback to the user on a video display D107.

Figure 16A:
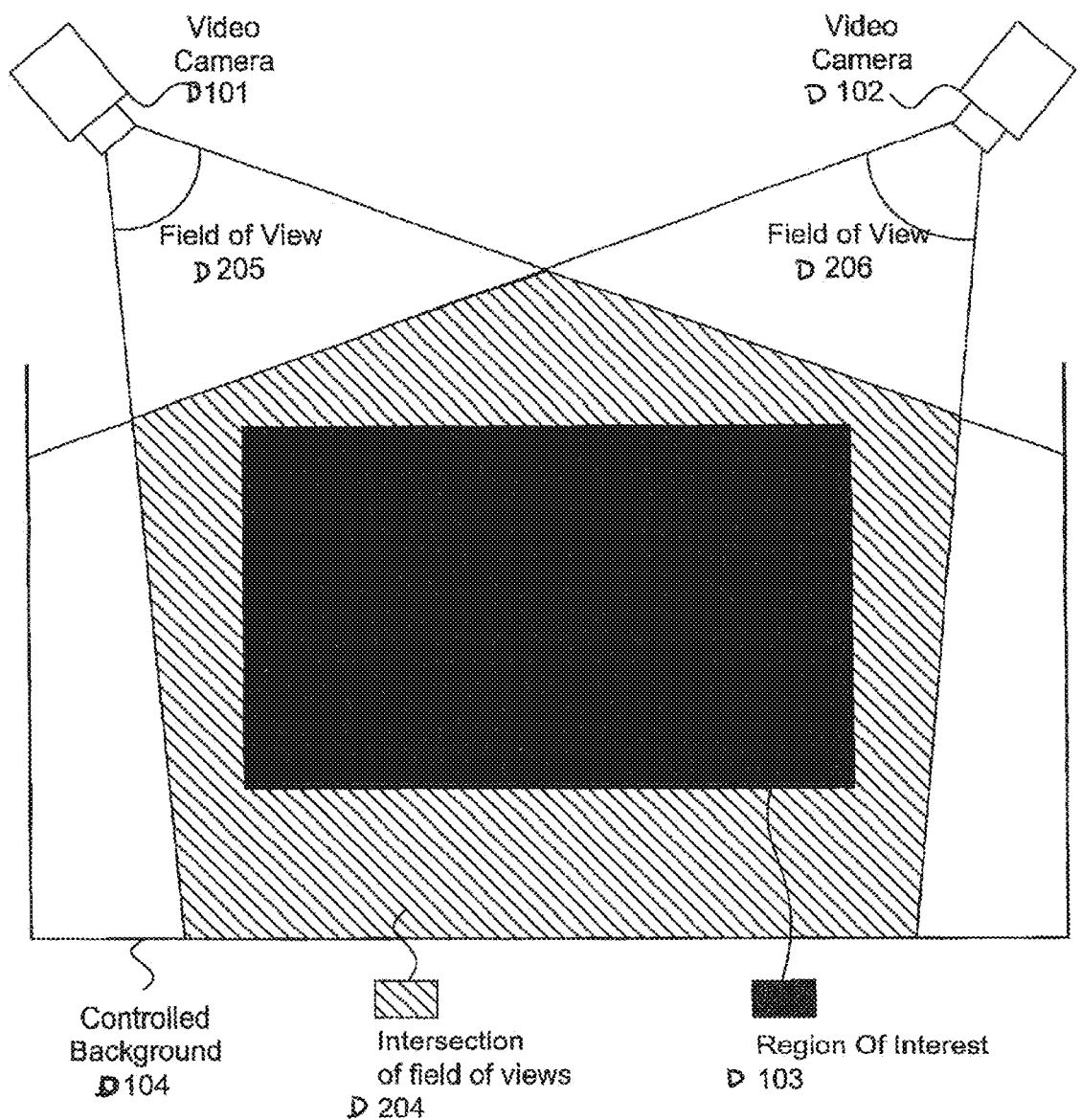
FIG. 16A shows the geometric relationship between the cameras and various image regions of FIG. 15, according to some embodiments.
Figure 16B:
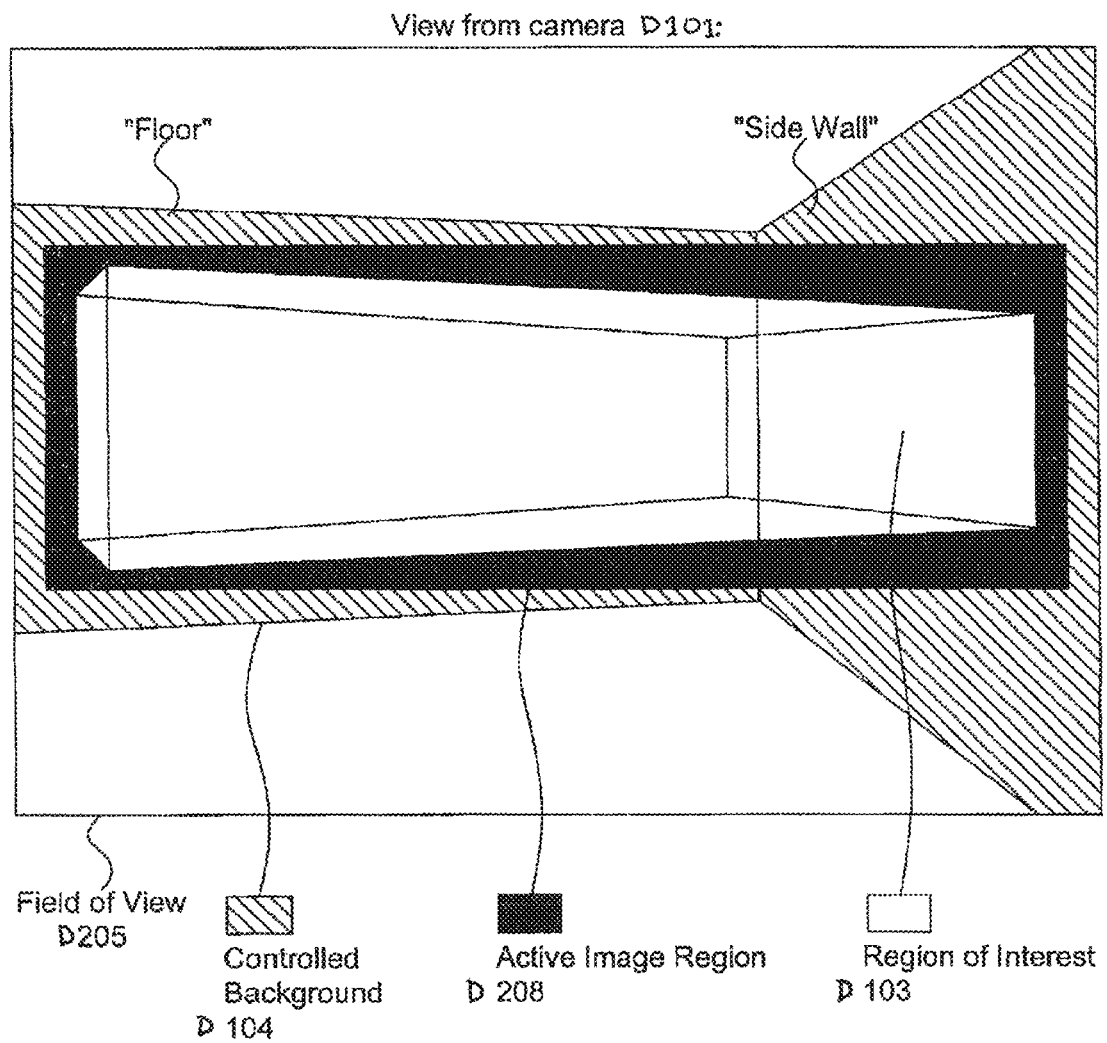
FIG. 16B shows an image captured by one of the cameras of FIG. 15, according to some embodiments.

FIG. 16A illustrates a typical implementation of the multicamera control system D100. The two cameras D101 and D102 are positioned outside of the region of interest D103. The cameras are oriented so that the intersection D204 of their field of views (D205 for camera D101, D206 for camera D102) completely encompasses the region of interest D103. The orientation is such that the cameras D101, D102 are rotated on axes that are approximately parallel. In this example, a floor or window ledge and sidewalls provide a controlled background D104 having distinct edges. The corresponding view captured by camera D101 is shown in FIG. 16B. While not shown, it should be understood that the view captured by camera D102 is a mirror image of the view captured by camera D101. The controlled background D104 may not cover the camera's entire field of view D205. For each camera, an active image region D208 is found that is entirely contained within the controlled background D104, and also contains the entire region of interest D103. The background D104 is controlled so that a characteristic of the background can be modeled, and the object of interest D105, either in part or in whole, differs from the background D104 in that characteristic. When the object of interest D105 appears within the region of interest D103, the object 105 will occlude a portion of the controlled background D104 within the active image region D208 of each camera D101, D102. In the location of the occlusion, either as a whole or in parts, the captured images will, in terms of the selected characteristic, be inconsistent with the model of the controlled background D104.

In summary, the object of interest D105 is identified and, if found, its position within the active image region D208 of both cameras is calculated. Using the position data of each camera D101, D102, as well as the positions of the cameras relative to the region of interest D103, and parameters describing the cameras, the position of the object of interest D105 within the region of interest D103 is calculated.

Figure 17:
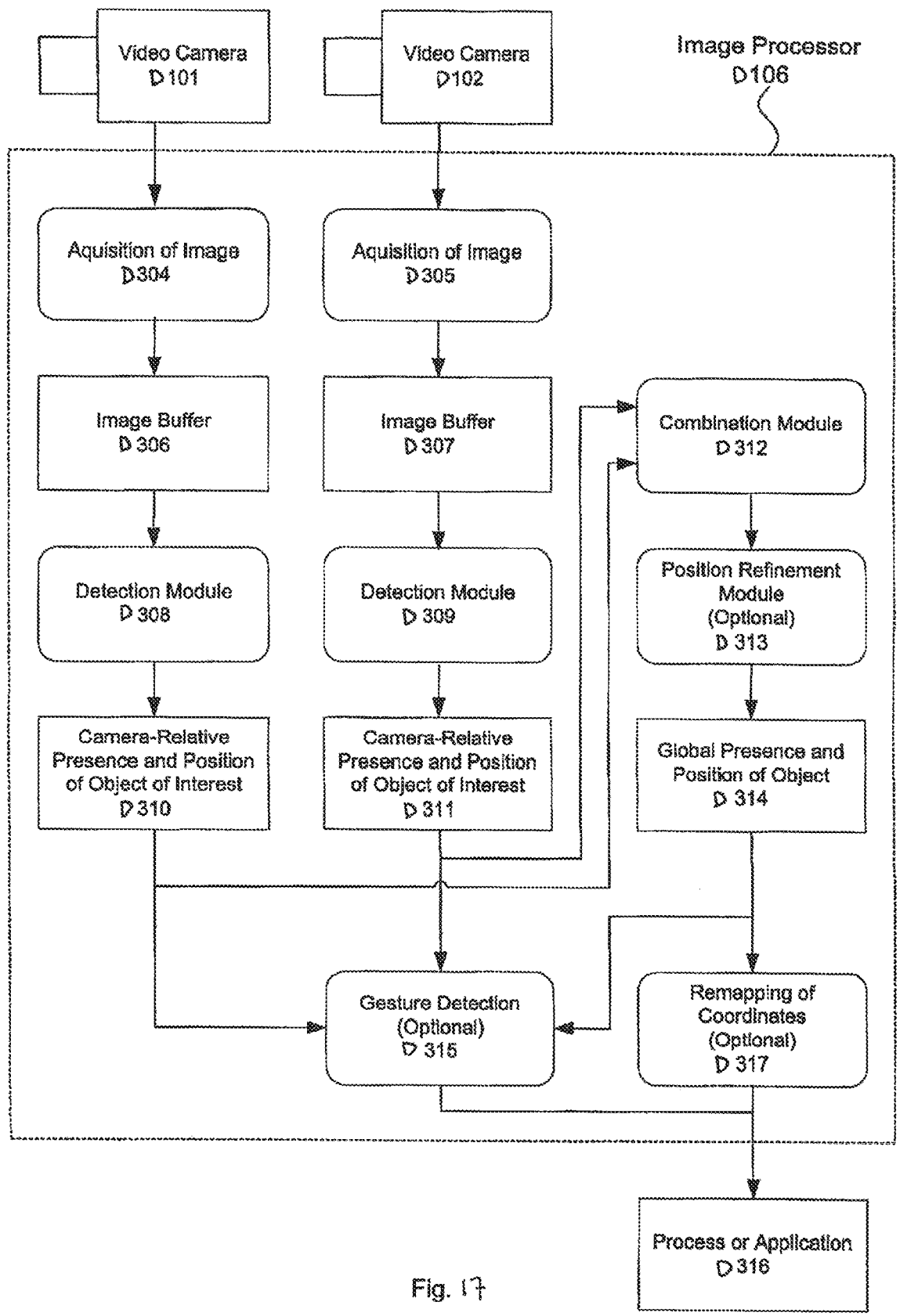
FIG. 17 is a flow diagram showing the processes that are performed within a microcomputer program associated with the multicamera control system, according to some embodiments.

The processes performed by the image processor D106 (FIG. 15), which may be implemented through a software process, or alternatively through hardware, are generally shown in FIG. 17. The camera images are simultaneously conveyed from the cameras D101, D102 and captured by image acquisition modules D304, D305 (respectively) into image buffers D306, D307 (respectively) within the image processor D106. Image detection modules D308, D309 independently detect the object of interest D105 in each image, and determine its position relative to the camera view. The relative position information D310, D311 from both camera views is combined by a combination module D312 and optionally refined by a position refinement module D313, to determine at block D314, the global presence and position of the object of interest D105 within the region of interest D103. Optionally, specific gestures performed by the user may be detected in a gesture detection module D315. The results of the gesture detection process are then conveyed to another process or application D316, either on the same image processor D106 or to another processing device. The process of gesture detection is described in greater detail below.

Figure 18:
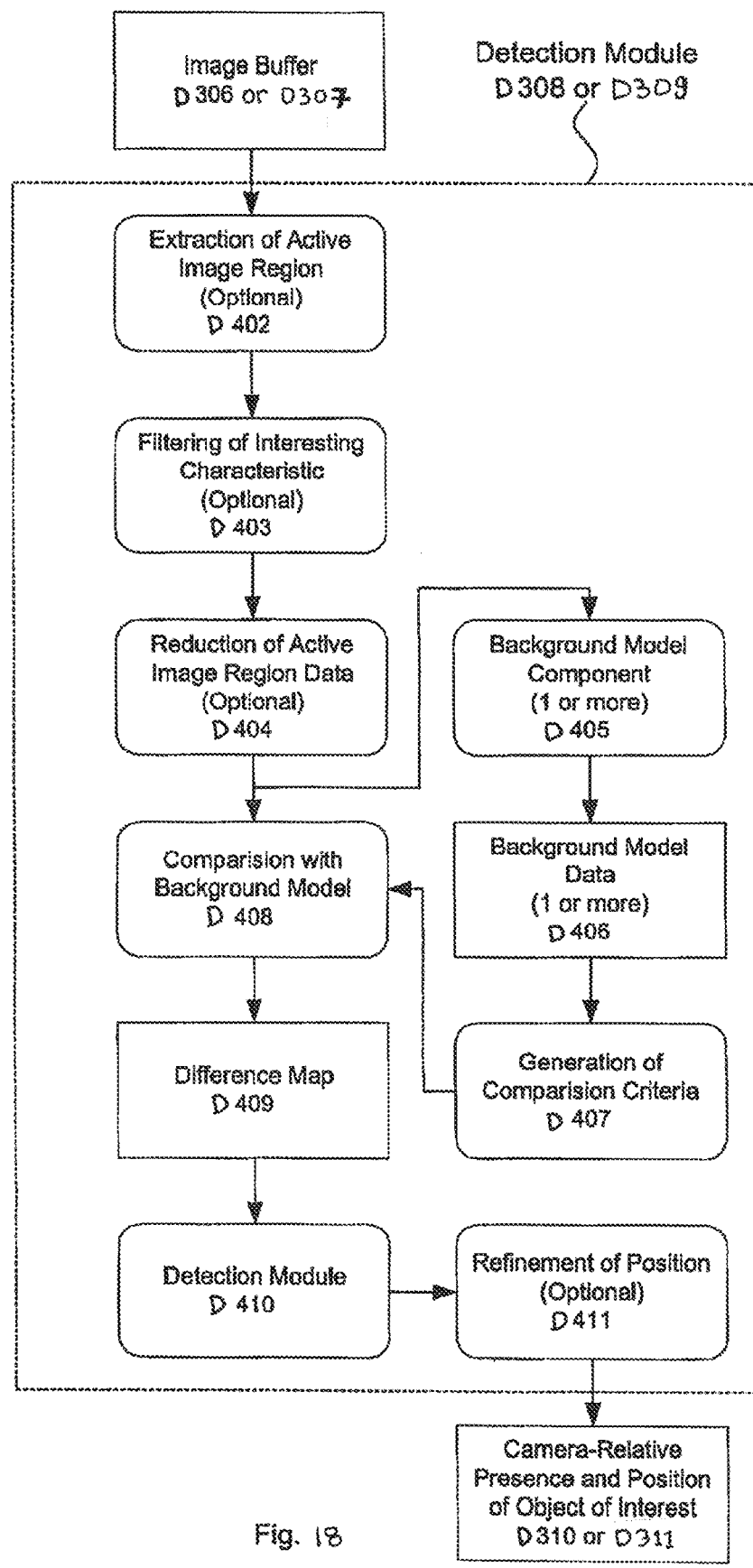
FIG. 18 is a flow diagram showing a portion of the process shown in FIG. 17 in greater detail, and in particular, the processes involved in detecting an object and extracting its position from the image signals captured by the cameras, according to some embodiments.

Image detection modules D308 and D309 are identical in the processes that they execute. An implementation of these image detection modules D308, D309 is shown in FIG. 18. In block D402, the image processor D106 extracts, from the captured image data stored in the image buffers D306 or D307, the image data that corresponds to the active image region D208 (of FIG. 16B). The image may be filtered in a filtering process D403 to emphasize or extract the aspects or characteristics of the image where the background D104 and object of interest D105 differ, but are otherwise invariant within the background D104 over time. In some implementations, the data representing the active image region may also be reduced by a scaling module D404 in order to reduce the amount of computations required in later processing steps. Using the resulting data, the background D104 is modeled by one or more instances of a background model process at block D405 to produce one or more descriptions represented as background model data 406 of the controlled background D104. Therefore the background D104 is modeled in terms of the desired aspects or characteristics of the image. The background model(s) D406 are converted into a set of criteria in process D407. In a comparison process D408, the filtered (from process D403) and/or reduced (from module D404) image data is compared to those criteria (from process D407), and the locations where the current data is inconsistent with the background model data D406, that is where the criteria is not satisfied, are stored in an image or difference map D409. In detection module D410, the difference map D409 is analyzed to determine if any such inconsistencies qualify as a possible indication of an object of interest D105 and, if these criteria are satisfied, its position within the camera view (D205 or D206) is determined. The position of the object 105 may be further refined (optionally) at block D411, which produces a camera-relative presence and position output D310 or D311 associated with the object of interest D105 (as described above with respect to FIG. 17).

In block D402 of FIG. 18, image processor D106 extracts the image data that corresponds to the active image region D208 (of FIG. 16B). The image data may be extracted by cropping, shearing, rotating, or otherwise transforming the captured image data. Cropping extracts only the portion of the overall image that is within the active image region D208. Bounds are defined, and any pixels inside the bounds are copied, unmodified, to a new buffer, while pixels outside of the bounds are ignored. The active image region D208 may be of arbitrary shape. Shearing and rotation reorder the data into an order that is more convenient for further processing, such as a rectangular shape so that it may be addressed in terms of rows and columns of pixels.

Rotation causes the contents of an image to appear as if the image has been rotated. Rotation reorders the position of pixels from (x,y) to (x',y') according to the following equation: ".times..times..theta..times..times..theta..times..times..theta..times..times..theta..function. ##EQU00001 ## where .theta. is the angle that the image is to be rotated.

If the cameras D101 and D102 are correctly mounted with respect to the region of interest D103, the desired angle of rotation will typically be small. If the desired angle of rotation is small, shearing may be used to provide an approximation that is computationally simpler than rotation. Shearing distorts the shape of an image such that the transformed shape appears as if the rows and columns have been caused to slide over and under each other. Shearing reorders the position of pixels according to the following equations:
".function..times..times..times.".function..times.##EQU00002 ## where sh.sub.x represents the amount of horizontal shear within the image, and sh.sub.y represents the amount of vertical shear within the image.

An implementation of the multicamera control system D100 applies in scenarios where the object of interest D105, either in whole or in part, is likely to have either higher or lower luminance than the controlled background D104. For example, the background D104 may be illuminated to create this scenario. A filtering block D403 passes through the luminance information associated with the image data. A single background model D406 represents the expected luminance of the background D104. In practice, the luminance of the controlled background D104 may vary within the active image region D208, therefore the background model D406 may store the value of the expected luminance for every pixel within the active image region D208. The comparison criteria generation process D407 accounts for signal noise (above that which may be accounted for within the background model) and minor variability of the luminance of the controlled background D104 by modifying each luminance value from the background model D406, thus producing the minimal luminance value that may be classified as being consistent with the background model D406. For example, if the luminance of the controlled background D104 is higher than the luminance of the object of interest D105, then processes block D407 decreases the luminance value of each pixel by an amount greater than the expected magnitude of signal noise and variability of luminance.

In some implementations of system D100, the region of interest D103 is sufficiently narrow such that it may be modeled as a region of a plane. The orientation of that plane is parallel to the front and rear faces of the dotted cube that represents the region of interest D103 in FIG. 15. The active image region D208 may be reduced to a single row of pixels in the optional scaling module D404 if two conditions are satisfied: 1) the object of interest D105, when it is to be detected, will occlude the background D104 in all rows of some columns of the active image region D208, and 2) a single set of values in the background model D406 sufficiently characterizes an entire column of pixels in the active image region D208. The first condition is usually satisfied if the active image region D208 is thinner than the object of interest D105. The second condition is satisfied by the implementation of blocks D403, D405, D406 and D407 described above. Application of the scaling module D404 reduces the complexity of processing that is required to be performed in later processes, as well as reducing the storage requirements of the background model(s) D406.

The particular implementation of the scaling module D404 depends on the specifics of processing blocks D403, D405, D406 and D407. If the luminance of the controlled background D104 is expected to be higher than that of the object of interest D105, as described above, one implementation of the scaling module D404 is to represent each column by the luminance of greatest magnitude within that column. That is to say, for each column, the highest value in that column is copied to a new array. This process has the added benefit that the high-luminance part of the controlled background D104 need not fill the entire controlled background D104.

Figure 19A:
FIG. 19A shows sample image data, presented as a gray-scale bitmap image, acquired by a camera, and generated by part of the process shown in FIG. 18, according to some embodiments.
Figure 19B:
FIG. 19B shows sample image data, presented as a gray-scale bitmap image, generated by part of the process shown in FIG. 18, according to some embodiments.
Figure 19C:
FIG. 19C shows sample image data, presented as a gray-scale bitmap image, generated by part of the process shown in FIG. 18, according to some embodiments.
Figure 19D:
FIG. 19D shows sample image data, presented as a gray-scale bitmap image, generated by part of the process shown in FIG. 18, according to some embodiments.
Figure 19E:
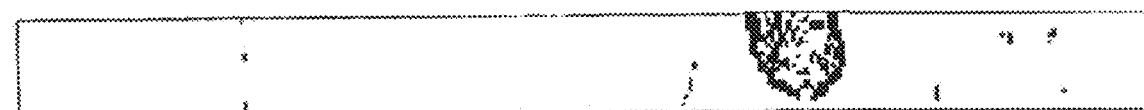
FIG. 19E shows sample data, presented as a binary bitmap image, identifying those pixels that likely belong to the object that is being tracked in the sample, generated by part of the process shown in FIG. 18, according to some embodiments.

An alternative implementation applies in scenarios where the controlled background D104 is static, that is, contains no motion, but is not otherwise limited in luminance. A sample source image is included in FIG. 19A as an example. In this case, the object of interest, as sensed by the camera, may contain, or be close in magnitude to, the luminance values that are also found within the controlled background D104. In practice, the variability of luminance of the controlled background D104 (for example, caused by a user moving in front of the apparatus thereby blocking some ambient light) may be significant in magnitude relative to the difference between the controlled background D104 and the object of interest D105. Therefore, a specific type of filter may be applied in the filtering process D403 that produces results that are invariant to or de-emphasize variability in global luminance, while emphasizing parts of the object of interest D105. A 3.times.3 Prewitt filter is typically used in the filtering process D403. FIG. 19B shows the result of this 3.times.3 Prewitt filter on the image in FIG. 19A. In this implementation, two background models D406 may be maintained, one representing each of the high and low values, and together representing the range of values expected for each filtered pixel. The comparison criteria generation process D407 then decreases the low-value and increases the high-value by an amount greater than the expected magnitude of signal noise and variability of luminance. The result is a set of criterion, an example of which, for the low-value, is shown in FIG. 19C, and an example of which, for the high-value, is shown in FIG. 19D. These modified images are passed to the comparison process D408, which classifies pixels as being inconsistent to the controlled background D104 if their value is either lower than the low-value criterion (FIG. 19C) or higher than the high-value criterion (FIG. 19D). The result is a binary difference map D409, of which example corresponding to FIG. 19B is shown in FIG. 19E.

The preceding implementation allows the use of many existing surfaces, walls, or window frames, for example, as the controlled background D104 where those surfaces may have arbitrary luminance, textures, edges, or even a light strip secured to the surface of the controlled background D104. The above implementation also allows the use of a controlled background D104 that contains a predetermined pattern or texture, a stripe for example, where the above processes detect the lack of the pattern in the area where the object of interest D105 occludes the controlled background D104.

The difference map D409 stores the positions of all pixels that are found to be inconsistent with the background D104 by the above methods. In this implementation, the difference map D409 may be represented as a binary image, where each pixel may be in one of two states. Those pixels that are inconsistent with the background D104 are identified or "tagged" by setting the pixel in the corresponding row and column of the difference map to one of those states. Otherwise, the corresponding pixel is set to the other state.

Figure 20:
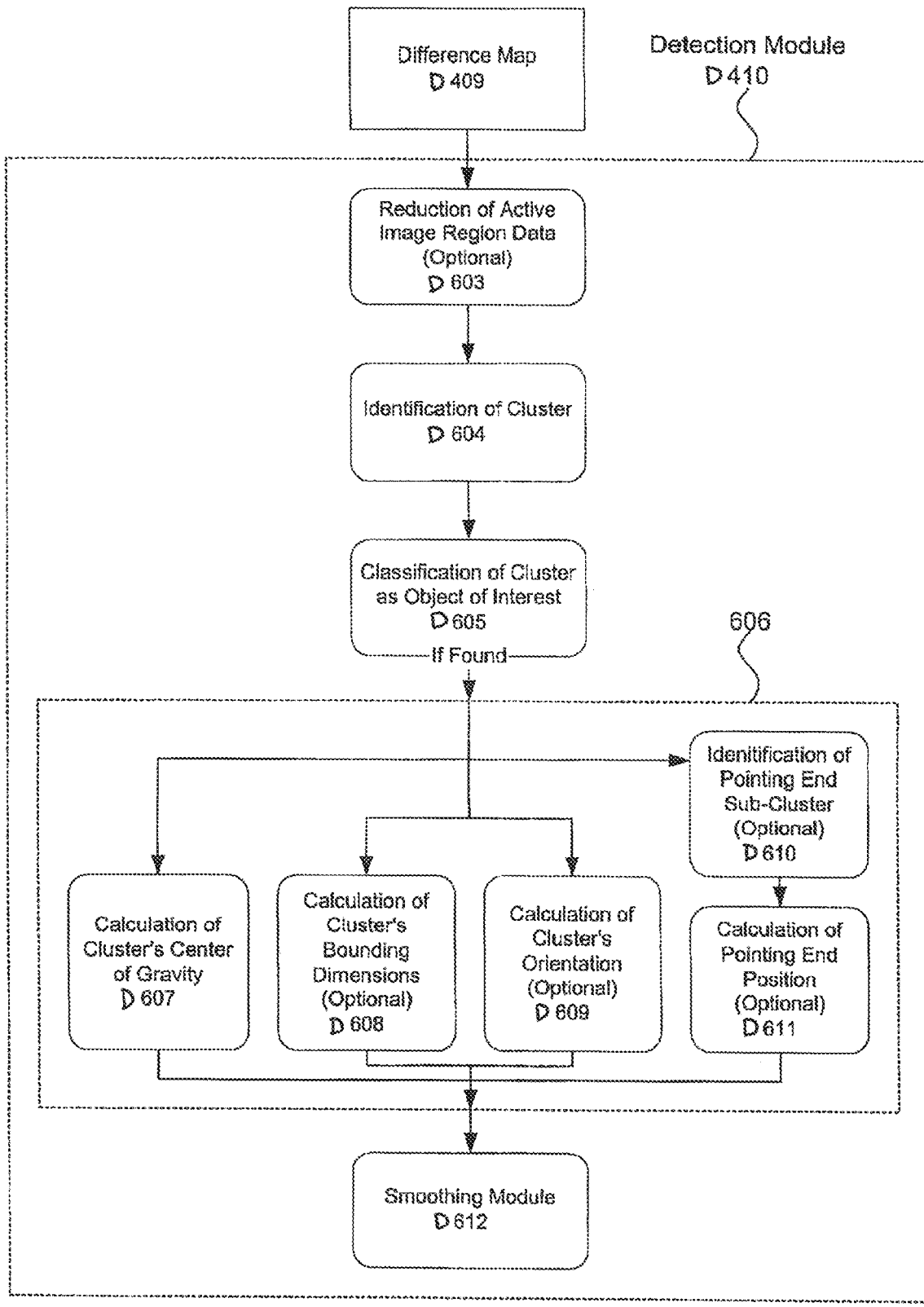
FIG. 20 is a flow diagram showing a portion of the process described in FIG. 18 in greater detail, and in particular, the processes involved in classifying and identifying the object given a map of pixels that have been identified as likely to belong to the object that is being tracked, for example given the data shown in FIG. 19E, according to some embodiments.
Figure 21A:
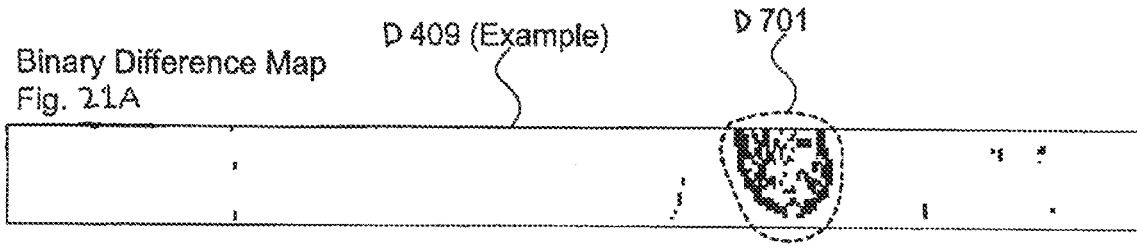
FIG. 21A shows the sample data presented in FIG. 19E, presented as a binary bitmap image, with the identification of those data samples that the processes shown in FIG. 20 have selected as belonging to the object in this sample, according to some embodiments.
Figure 21B:
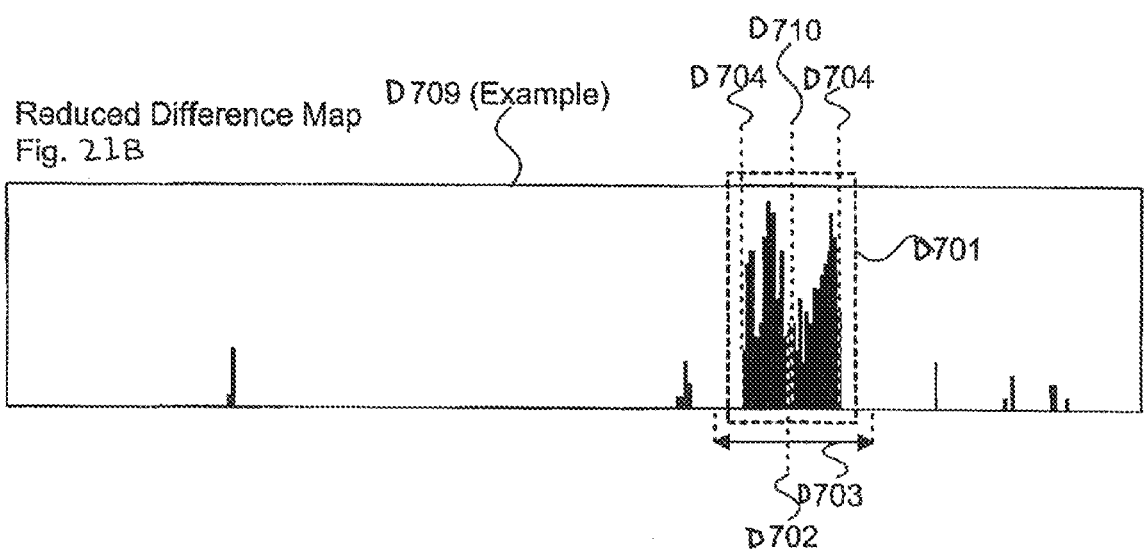
FIG. 21B shows the sample data presented in FIG. 19E, presented as a bar graph, with the identification of those data samples that the processes outlined in FIG. 20 have selected as belonging to the object, with specific points in the graph being identified, according to some embodiments.

An implementation of the detection module D410, which detects an object of interest D105 in the difference map D409, shown in FIG. 20. Another scaling module at block D603 provides an additional opportunity to reduce the data to a single dimensional array of data, and may optionally be applied to scenarios where the orientation of the object of interest D105 does not have a significant effect on the overall bounds of the object of interest D105 within the difference map D409. In practice, this applies to many scenarios where the number of rows is less than or similar to the typical number of columns that the object of interest D105 occupies. When applied, the scaling module at block D603 reduces the difference map D409 into a map of one row, that is, a single dimensional array of values. In this implementation, the scaling module D603 may count the number of tagged pixels in each column of the difference map D409. As an example, the difference map D409 of FIG. 21A is reduced in this manner and depicted as a graph D709 in FIG. 21B. Applying this optional processing step reduces the processing requirements and simplifies some of the calculations that follow.

Continuing with this implementation of the detection module D410, it is observed that the pixels tagged in the difference map (D409 in example FIG. 21A) that are associated with the object of interest D105 will generally form a cluster D701, however the cluster is not necessarily connected. A cluster identification process D604 classifies pixels (or, if the scaling module D603 has been applied, classifies columns) as to whether they are members of the cluster D701. A variety of methods of finding clusters of samples exist and may be applied, and the following methods have been selected on the basis of processing simplicity. It is noted that, when the object of interest D105 is present, it is likely that the count of correctly tagged pixels will exceed the number of false-positives. Therefore the median position is expected to fall somewhere within the object of interest D105. Part of this implementation of the cluster identification process D604, when applied to a map of one row (for example, where the scaling module at block D603 or D404 has been applied), is to calculate the median column D702 and tag columns as part of the cluster D701 (FIG. 21B) if they are within a predetermined distance D703 that corresponds to the maximum number of columns expected to be occupied. Part of this implementation of the cluster identification process D604, when applied to a map of multiple rows, is to add tagged pixels to the cluster D703 if they meet a neighbor-distance criterion.

In this implementation, a set of criteria is received by a cluster classification process D605 and is then imposed onto the cluster D701 to verify that the cluster has qualities consistent with those expected of the object of interest D105. Thus, process D605 determines whether the cluster D701 should be classified as belonging to the object of interest D105. Part of this implementation of the cluster classification process D605 is to calculate a count of the tagged pixels within the cluster D701 and to calculate a count of all tagged pixels. The count within the cluster D701 is compared to a threshold, eliminating false matches in clusters having too few tagged pixels to be considered as an object of interest D105. Also, the ratio of the count of pixels within the cluster D701 relative to the total count is compared to a threshold, further reducing false matches.

If the cluster D701 passes these criteria, a description of the cluster is refined in process block D606 by calculating the center of gravity associated with the cluster D701 in process D607. Although the median position found by the scaling module D603 is likely to be within the bounds defining the object of interest D105, it is not necessarily at the object's center. The weighted mean D710, or center of gravity, provides a better measure of the cluster's position and is optionally calculated within process D606, as sub-process D607. The weighted mean D710 is calculated by the following equation: .times..function..times..function. ##EQU00003## where: {overscore (x)} is the mean c is the number of columns C[x] is the count of tagged pixels in column x.

The cluster's bounds D704 may also be optionally calculated within process D606, shown as process D608. The cluster D703 may include some false-positive outliers, so as part of this implementation, the bounds may be defined as those that encompass a predetermined percentile of the tagged pixels, or, in scenarios where relatively few pixels are expected to be tagged, encompasses those tagged pixels (or columns, if scaling module D603 is applied) that form tight sub-clusters, that is those tagged pixels (or columns) that have neighbors that are also tagged.

In addition to the middle and bound coordinates, the orientation of the object of interest D105 may optionally be inferred by calculation of the moments of the cluster. This calculation is represented by a cluster orientation calculation process at sub-process D609 within process D606.

Figure 21C:
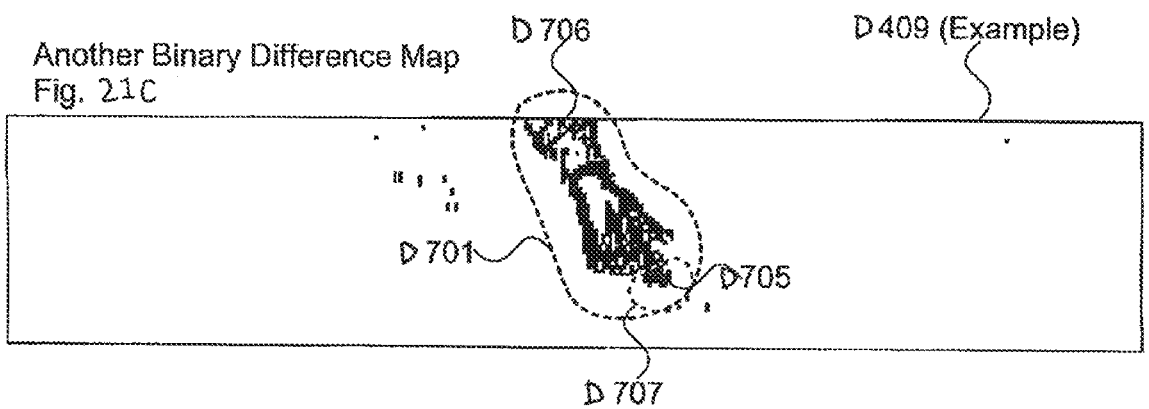
FIG. 21C shows a difference set of sample data, presented as a binary bitmap image, with the identification of those data samples that the processes shown in FIG. 20 have selected as belonging to the object and key parts of the object in this sample, according to some embodiments.

In some applications of the system D100, the object of interest D105 is used as a pointer. In this case, the "pointing end" of the object D105 is desired and may also be determined by a pointing end calculation sub-process within process D606 if the region of interest D103 contains a sufficient number of rows and the number of rows has not been reduced. An example is depicted in FIG. 21C. The object of interest D105 will typically enter, or be constrained to enter, the active image region D208 from a known border of that region. The pointing end D705 (for example the user's fingertip) of the object of interest D105 is likely to be the portion of the cluster D701 that is furthest from the region of entry D706 into the active image region D208. The cluster D701 may include some false-positive outliers. As such, the pointing end D705 may be defined as the region D707 within the cluster D701 that encompasses multiple tagged pixels near the furthest bounding side of the cluster D701, or, in scenarios where relatively few pixels are expected to be tagged, encompasses the furthest tagged pixels that form a tight sub-cluster; that is those tagged pixels that have neighbors that are also tagged. This sub-cluster is identified by a sub-cluster pointing end process D610, and the position of the sub-cluster is found in process D611.

Continuing with this implementation, a process implemented by a smoothing module D612 may optionally be applied to any or all of the positions found in process D606. Smoothing is a process of combining the results with those solved previously so they move in a steady manner from frame to frame. The weighted mean coordinate D710, found by the center of gravity determination process D607, is dependent on many samples and therefore is inherently steady. The bound D704, found by the cluster bounding dimension determination process D608, and pointing end D705, found by D611, coordinates are dependent on relatively fewer members of the cluster, and the state of a single pixel may have a significant effect. Since the size of the region occupied by the object of interest 105 is expected to remain relatively steady, smoothing may be applied to the distance between the bounds D704 measured relative to the cluster's weighted mean coordinate D710. Since the shape and orientation of the object of interest D105 is expected to change less rapidly than the overall position object of interest D105, smoothing may be applied to the distance of the pointing end D705 measured relative to the cluster's weighted mean coordinate D710.

A process used in the center of gravity process D607 is Eq. 1 as follows:

$$s(t) = (a.\text{times.}r(t)) + ((1-a).\text{times.}s(t-1))$$

In Eq. 1, the smoothed value at time t (s(t)) is equal to one minus the scalar value (a) multiplied by the smoothed value at time minus one (t−1). This amount is added to the raw value at time t (r(t)) multiplied by a scalar (a) that is between zero and one.

Figure 22:
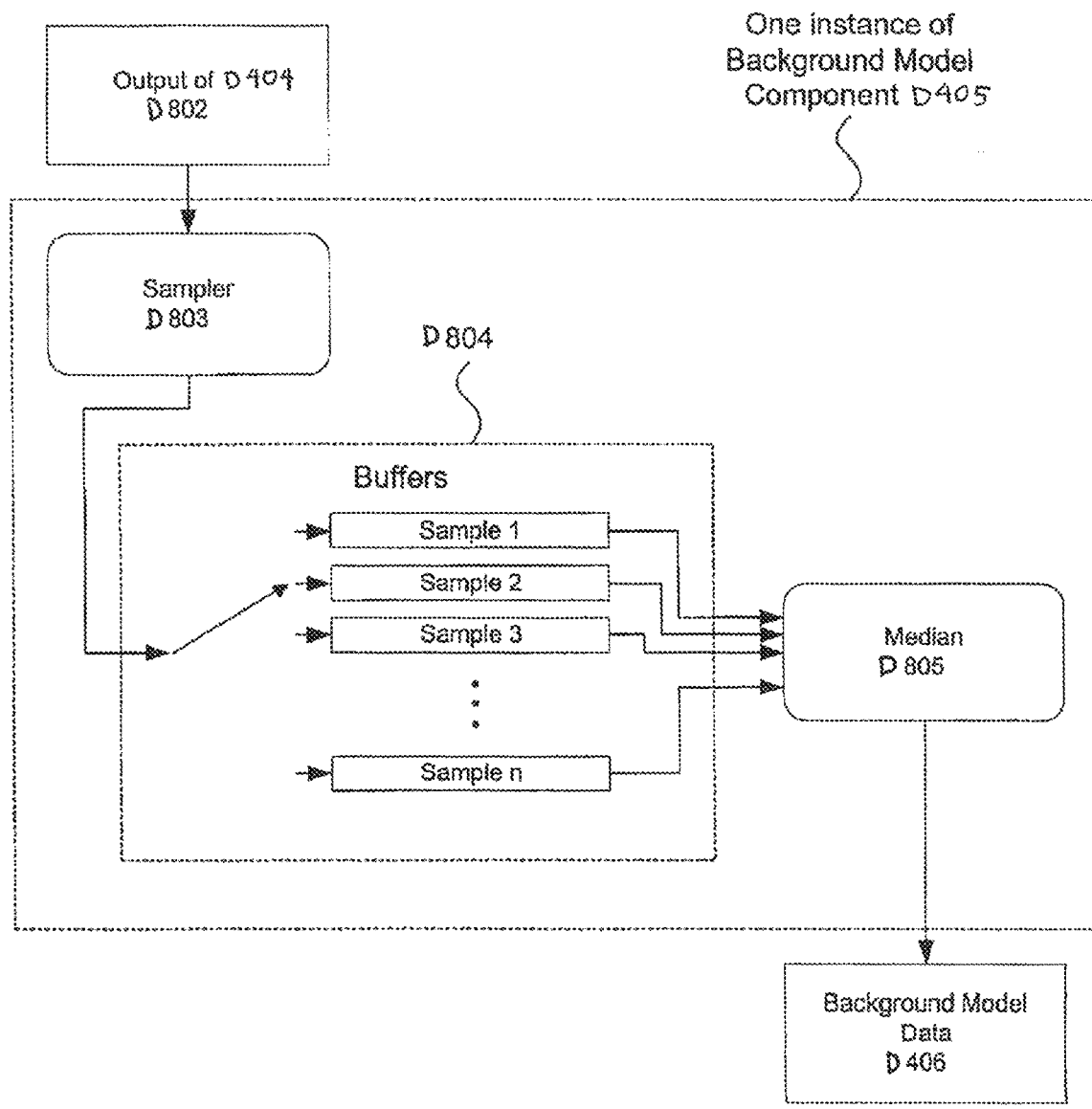
FIG. 22 is a flow diagram that shows a part of the process shown in FIG. 18 in greater detail, and in particular, the processes involved in generating and maintaining a description of the background region over which the object occludes, according to some embodiments.

Referring to FIG. 22, implementations of system D100 make use of, as described above, one or more background models D406 (FIG. 22). An implementation of the background model process or component D405 that generates the background model data D406 is shown in FIG. 22. This implementation of the background model component D405 automatically generates and dynamically updates the background model, allowing unattended operation of the system.

Input data D802 is provided by the output of scaling module 404 for this implementation of the background model component D405. Input is available every frame, and is sampled in a sampling process D803. The sample may contain the object of interest D105 occluding part of the controlled background D104. For each pixel, a range of values may be a better representative of the background D104 than a single value. By including the effects of this range in the background model, the expansion in process D407 may be made tighter. Contributing multiple frames of data to the sample allows this range to be observed, but also increases the portion of the background D104 that is occluded by the object of interest D105 if the object of interest D105 is in motion while the frames are being sampled. The optimal number of frames to use is dependent on the expected motion of the object of interest D105 in the particular application of the system. In practice, for systems that are tracking a hand, 10 frames, representing approximately 0.33 seconds, is sufficient to observe the majority of that range without allowing motion of the object of interest to occlude an undue portion of the background. If the particular background model is to be compared in comparison process D408 as the upper bound on values that are considered to be consistent with the background D104, then the maximum value of each pixel observed in the multiple frames may be recorded as the sample value. If the particular background model D406 is to be compared in process D408 as the lower bound on values that are considered to be consistent with the background D104, then the minimum value of each pixel observed in the multiple frames may be recorded as the sample value.

In this implementation of the background model component D405, samples from the sampling process D803 are added to a buffer D804 having storage locations to store n samples, where the oldest sample in the history is replaced. The history therefore contains n sampled values for each pixel. The span of time, d, represented in the buffer is dependent on the rate that new samples are acquired and added to the history, r, by Eq. 2, described as follows:
EQU00004##

In this implementation, a median process block D805 selects, for each pixel, a value that it determines is representative of the controlled background D104 at the location represented by that pixel. One method of selecting a value representative of the controlled background D104 within process block D805 is to select the median value of the n samples of each pixel. For any pixel, a number of the n sampled values in the buffer D804 may represent the object of interest D105. Duration d is selected so that it is unlikely that the object of interest D105 will occlude any one pixel of the controlled background D104 for an accumulated duration of d/2 or longer within any time-span of d. Therefore, for any pixel, the majority of the sampled values will be representative of the background D104, and therefore the median of the sampled values will be a value representative of the background D104.

The background model component D405 is adaptive, and any changes to the background D104 will be reflected in the output of median process block D805 once they have been observed for time of d/2. This system does not require that the entire controlled background D104 be visible when initialized, the object of interest D105 may be present when initialized, however it does require that samples be observed for time of d before providing output. Optionally, the constraint may be applied that the object of interest D105 must be absent when the system is initialized, in which case the first observed sample values may be copied into all n samples of the buffer D804, allowing the system to produce an output sooner.

The duration that any one pixel of the controlled background D104 will be occluded by the object of interest D105, and therefore the duration d, is dependent on the particular application of the system. The number of samples, n, can be scaled for the memory buffer and processing power available.

The preceding discussion presents one implementation of obtaining the position of the object of interest D105 within and relative to the images acquired by the cameras D101 and D102. If the object of interest D105 was successfully detected and its coordinates found in both cameras views D205 and D206 by detection modules D308 and D309 of FIG. 17, then the combination of these coordinates is sufficient to recover the position of the object of interest D105 within the region of interest D103. In the implementation outlined in FIG. 17, the position of the object of interest D105 is calculated in combination module D312.

Figure 23A:
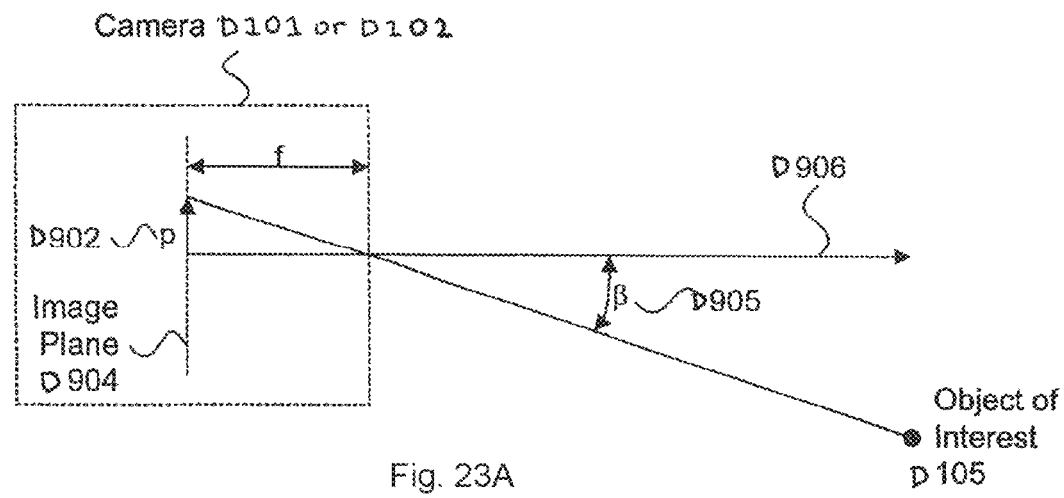
FIG. 23A shows the geometry on which Eq. 3 is based, that is, an angle defining the position of the object within the camera's field of view, given the location on the image plane where the object has been sensed, according to some embodiments.
Figure 23B:
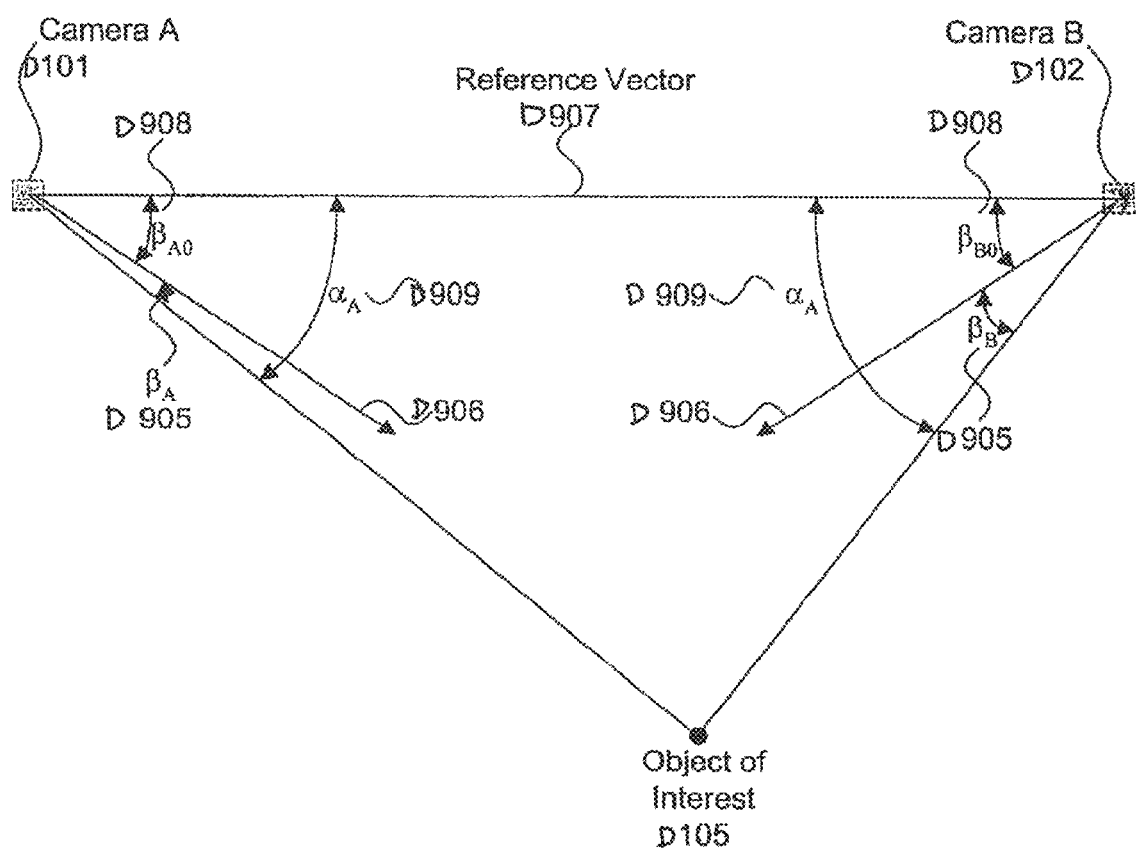
FIG. 23B shows the geometry on which Eq. 4, 5 and 6 are based, that is, the relationship between the positions of the cameras and the object that is being tracked, according to some embodiments.

Turning to FIGS. 23A and 23B, an implementation of the combination module D312 is shown. For each camera D101 and D102, the position p D902 of the object of interest D105 on the camera's image plane D904 is converted to an angle D905, which is referred in this description as beta (.beta.), and is measured on the reference plane whose normal is defined by the axes of the rotations of the cameras D101, D102. (In practice, the axes are not precisely parallel and do not exactly define a single plane, however the process described herein is tolerant of that error). By approximating the camera D101, D102 as an ideal pinhole model of the camera, that angle ($\beta$), relative to the vector D906 defining the orientation of the camera, is approximated.

Eq. 3, as shown in FIG. 23A, illustrates an approximation calculation as follows: $\beta \approx$ ##EQU00005## To approximate the angle beta ($\beta$), the inverse tangent is applied to the quantity of the focal length (f) divided by the position p on the image plane projected onto the intersection of the reference plane and the image plane.

For maximum precision, the intrinsic camera parameters (location of the principal point and scale of image) and radial distortion caused by the lens should be corrected for by converting the distorted position (as represented by the relative position information D310, D311) to the ideal position. More specifically, the ideal position is the position on the image plane D904 that the object D105 would be projected if the camera D101, D102 had the properties of an ideal pinhole camera, whereby Eq. 3 will produce the exact angle. One set of correction equations are presented in Z. Zhang, A Flexible New Technique for Camera Calibration, Microsoft Research, http://research.microsoft.com/.about.zhang, which is incorporated by reference. For many applications of the system, the approximation has been found to provide sufficient precision without this correction noted above.

Continuing with the description of combination module D312, a reference vector D907, as illustrated in FIG. 23B, is defined such that it passes through the positions of both cameras D101 and D102 on the reference plane where the reference plane is defined such that the axis of rotation of the cameras define the normal of the reference plane. The angles D908 that the cameras are rotated are measured relative to the reference vector D907.

A formula for measurement of the angles is shown in Eq. 4: $\alpha = \beta_0 + \beta$. Measurement of the angle alpha ($\alpha$) is equal to the angle beta_not ($\beta_0$) and the angle beta ($\beta$).

Eq. 4 is applied to measure the angles D909 of the object of interest D105 relative to the reference vector D907. That angle is referred to by the alpha ($\alpha$) symbol herein. The angle alpha D909 for each camera D101 and D102, and the length of the reference vector D907, are sufficient to find the position of the object of interest D105 on the reference plane, by Eq. 5 and Eq. 6.

Eq. 5 calculates the offset of the object of interest (y) by the formula: $\times \times \times \times \alpha \times times \times \alpha \times \times \times \alpha \times \times \times \alpha$. ##EQU00006## The offset (y) is equal to the reciprocal of the tangent of the angle ($\alpha_A$) for camera A 101 and the tangent of the angle ($\alpha_B$) for camera B D102 multiplied by the vector length D907 (w), the tangent of the angle ($\alpha_A$) for camera A D101 and the tangent of the angle ($\alpha_B$) for camera B D102.

Eq. 6 calculates the offset of the object of interest ($x_A$) as follows: $\times \times \alpha$. ##EQU00007## In Eq. 6, the offset ($x_A$) is measured by the offset from Eq. 5 (y) divided by the tangent of the angle ($\alpha_A$) for camera A D101.

The position of the object D105 on the axis perpendicular to the reference plane may be found by Eq. 7, which is applied to the position in each image, using the distance of the object of interest D105 from the camera.$\times \times$. ##EQU00008##

In Eq. 7, the position (z) is calculated as the position (p) on the image plane projected onto the vector of the image plane perpendicular to that use in Eq. 3 divided by the focal length (f) multiplied by the distance of the object of interest D105 from the camera (l).

These relations provide a coordinate of the object of interest D105 relative to Camera A D101. Knowing the position and size of the region of interest D103 relative to Camera A D101, the coordinate may be converted so that it is relative to the region of interest D103, D312 of FIG. 17.

Smoothing may optionally be applied to these coordinates in refinement module D313 of the implementation of this system shown in FIG. 17. Smoothing is a process of combining the results with those solved previously so that motion is steady from frame to frame. One method of smoothing for these particular coordinate values ($x_A$, y, z found by combination module D312) is described herein. Each of the components of the coordinate values associated with the object of interest D105, that is x, y, and z, are smoothed independently and dynamically. The degree of dampening S is calculated by Eq. 8, where S is dynamically and automatically adjusted in response to the change in position is calculated as follows: $\times \times ltoreq \alpha - \times \times \alpha \times \times \times \alpha \times \times \times \times$.. $\alpha \times \times \times \ll \times \times gtoreq \times \times function function$.##EQU0 ## In Eq. 8, s(t) is the smoothed value at time t, r(t) is the raw value at time t, $D_A$ and $D_B$ are thresholds, and $S_A$ and $S_B$ define degrees of dampening.

Figure 24:
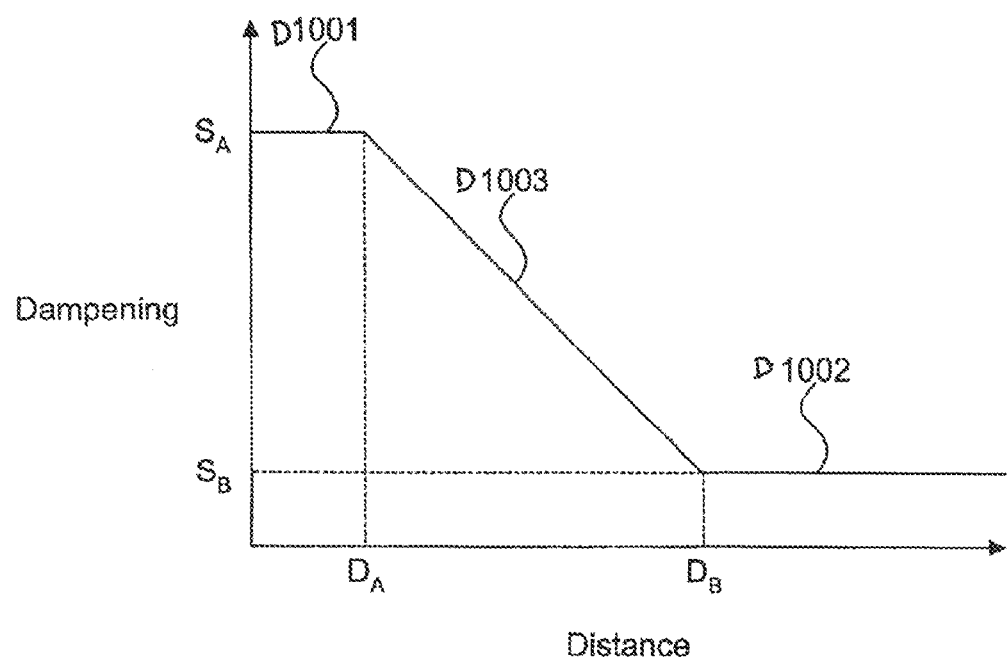
FIG. 24 is a graph illustrating Eq. 8, that is, the amount of dampening that may be applied to coordinates given the change in position of the object to refine the positions, according to some embodiments.

Two distance thresholds, $D_A$ and $D_B$, as shown in FIG. 24, define three ranges of motion. A change in position that is less than $D_A$, motion is heavily dampened D1001 by $S_A$, thereby reducing the tendency of a value to switch back and forth between two nearby values (a side effect of the discrete sampling of the images). A change in position greater than $D_B$ is lightly dampened D1002 by $S_B$, or not dampened. This reduces or eliminates lag and vagueness that is introduced in some other smoothing procedures. The degree of dampening is varied for motion between $D_A$ and $D_B$, the region marked as D1003, so that the transition between light and heavy dampening is less noticeable. The scalar a, which is applied to Eq. 1, is found by Eq. 9 as follows: $\times$. ##EQU00010## In Eq. 9, scalar (a) is bound such that equal to or greater than zero, and less than or equal to one, the dampening value of S is found by Eq. 8, and e is the elapsed time since the previous frame.

These coordinates D314 of the object of interest D105, if found, are typically conveyed to another process such as a user application program D316 for use. They may be conveyed to another process executing on the same image processor D106 as the above calculations where performed, or to another computing device. The method in which the data are conveyed to the application program D316 may include emulation of a traditional user input device (including mouse and keyboard), allowing the system to provide control of existing control functions within the application program D316. The coordinates D314 of the object of interest D105 may be calculated for every video frame captured by the cameras, where one video frame is typically captured 30 times or more every second. This results in little latency between the user's actions and the application's reactions.

In a typical implementation of the system, the application program D316 provides user feedback by displaying to the video display D107 a visual representation of an indicator. The indicator is caused to move such that its position and motion mimics the motion of the object of interest D105 (typically the user's hand).

In one variation of this form of user interface, the indicator, such as a mouse pointer, is shown in front of other graphics, and its movements are mapped to the two dimensional space defined by the surface of the screen. This form of control is analogous to that provided by a computer mouse, such as that used with the Microsoft® Windows® operating system. An example feedback image of an application that uses this style of control is shown as D1102 in FIG. 25A.

Figure 25A:
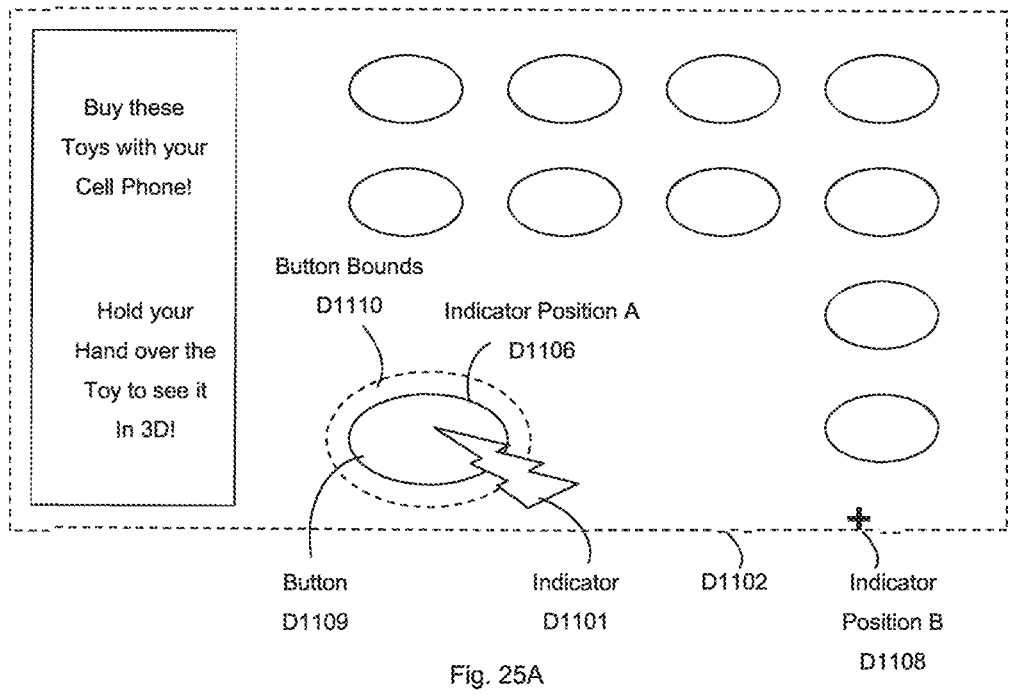
FIG. 25A is an example of an application program that is controlled by the system, where the object of interest controls a screen pointer in two dimensions, according to some embodiments.

Referring to FIG. 25A (and briefly to FIG. 17), the image processor D106 also includes an optional coordinate re-mapping process D317 (FIG. 17). The coordinate re-mapping process D317 is operable to remap the global presence and position coordinates D314 (associated with the object of interest D105) into the position where the indicator D1101 (such as a cursor or mouse pointer) is overlaid onto the image D1102 by way of Eq. 10 for the x coordinate, and the equivalent of this equation for the y coordinate, as follows:
<.ltoreq..ltoreq.> ##EQU00011 ##

Figure 25B:
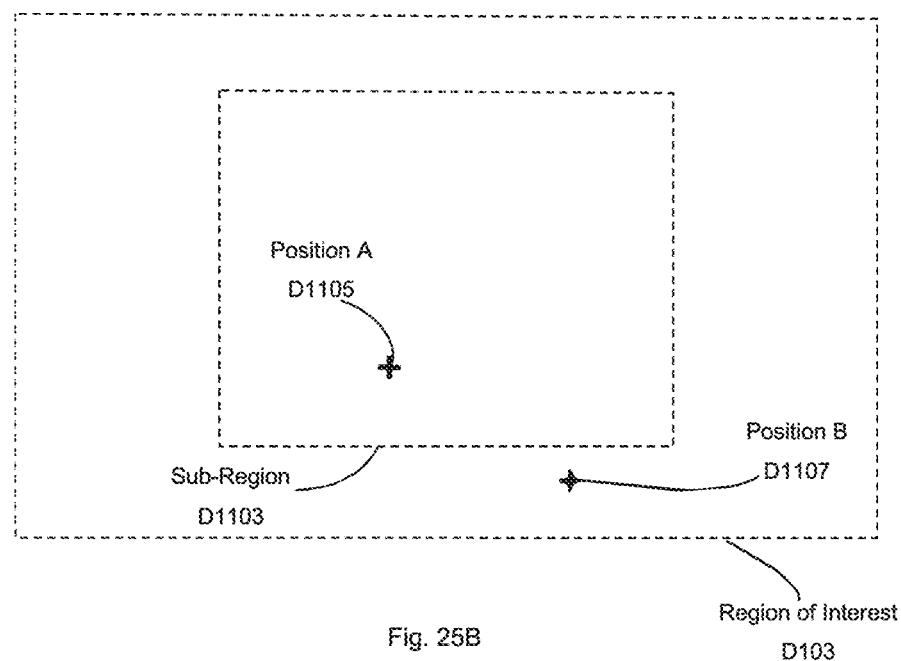
FIG. 25B shows the mapping between real-world coordinates and screen coordinates used by the application program in FIG. 25A, according to some embodiments.

In Eq. 10, x.sub.h is the coordinate position D314 associated with the object D105, x.sub.c is the cursor position on the screen, mapped 0-1, and b.sub.l and b.sub.r are the positions of the left and right bounds of a sub-region within the region of interest D103. As illustrated in FIG. 25B, the entire region of the display D1102 is represented by a sub-region D1103 contained entirely within the region of interest D103. Positions (for example, position A D1105) within the sub-region D1103 are linearly mapped to positions (for example, D1106) within the display D1102. Positions (for example, position B D1107) outside the sub-region D1103 but still within the region of interest D103 are mapped to the nearest position (for example, D1108) on the border of the display region D1102. This reduces the likelihood of the user unintentionally removing the object of interest D105 (usually the user's hand or pointing finger) from the sub-region while attempting to move the indicator D1101 to a position near a border of the display.

In scenarios where the region of interest D103 is immediately in front of the video display D107, the sub-region D1103 may be defined to be aligned to the video display D107, so that the indicator D1101 will appear to be aligned with the object of interest D105. If the region of interest D103 is relatively thin, for example less than 5 cm, and the sub-region D1103 is defined in this way, then the system approximates, in terms of user-interaction, a "touch-screen" without limitations on the size of the video display D107, and without requiring direct contact between the user and video display's D107 surface (for example, the video display and user may be on opposite sides of a window). As will be appreciated, the system D100 can be used with a variety of video display sizes, and may include not only computer monitors (whether CRT or LCD type displays), but also may include rear projection style television monitors, large flat screen LCD monitors, and forward projection style presentation systems.

In scenarios where the region of interest D103 is not immediately in front of a large video display D107, and the active image region D208 is sufficiently deep that the orientation of the object of interest is found in the orientation calculation process D609, a vector may be extended from the object of interest's position to the video display D107 using the angle of orientation to detect the position on the video display that the user is "pointing to."

Most often, however, the active image region D208 is not sufficiently deep to accurately calculate the orientation in process block D609. In these scenarios, where the region of interest D103 is not immediately in front of a large video display D107 and the orientation is not calculated, Eq. 10 may be applied where the sub-region D1103 is smaller than the video display. The processor then maps the absolute position of the object of interest D105 to the position indicator such that movements of the object of interest D105 are scaled to larger movements of the location of the position indicator on the video display, which allows the entire area of the video display to be easily reached by the user (for example the sub region D1103 may be defined to be at most 750 mm in width and proportional in height, a size that is easily reached by most users). When setup in this way, the system still provides the user the feeling of "pointing to the screen."

Figure 26A:
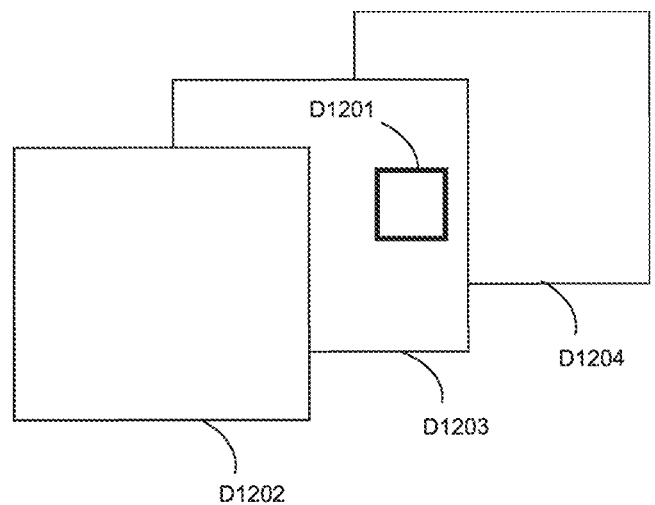
FIGS. 26A and 26B are examples of an application program that is controlled by the multicamera control system, where the object of interest controls a screen pointer in a three dimensional virtual reality environment, according to some embodiments.
Figure 26B:
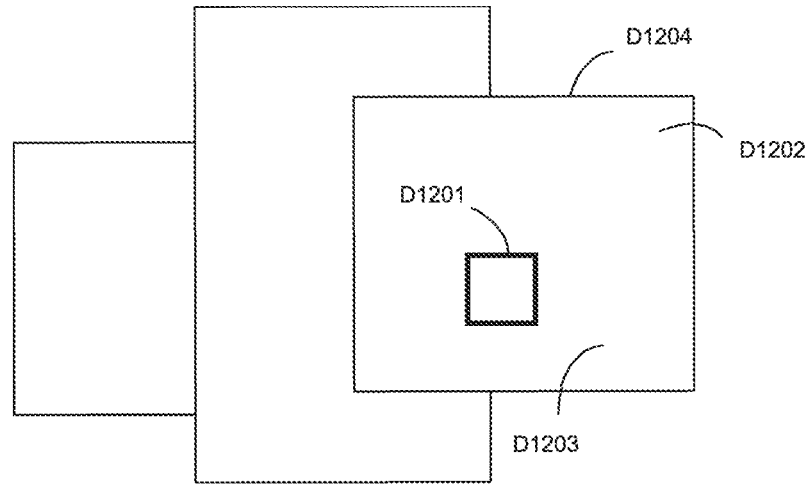

In another variation of this form of user interface, the user causes a representation of an indicator to move within a representation of a three dimensional virtual environment (examples are presented in FIG. 26A and FIG. 26B). The virtual environment may be rendered using projective transforms, so that the depths of the virtual environment are implied by the image presented on the video display D107. Techniques for rending this sort of virtual environment include OpenGL. Eq. 10 is used to remap the x, y, and z coordinates (the sub-region 1103 becomes, for example, a cube).

Applications that are controlled by a movable on screen indicator (for example, FIGS. 25A, 26A, and 26B), whose control has been discussed, typically present graphic representations of data or interactive elements (for example, a button D1109 or an object representation D1202). The user is expected to cause the indicator D1101 to be positioned over one of these objects, or if a three-dimensional virtual environment is presented, touches or interacts with the object. For a two-dimensional interface, this condition may be detected by comparing the remapped indicator position D1106 to the bounds (for example, D1110) of the graphic representation of the object, where this condition is true if the indicator position is within the object bounds. For the three-dimensional interface, this condition may be detected by comparing the bounds D1203 of either the entire indicator D1101, or if finer control is required, a part of the indicator, with the bounds D1204 of the object D1202. The user optionally receives feedback indicating that the cursor is positioned over an object. Feedback may be of a variety of forms, including an audio cue and/or a change in the graphical representation of either or both the cursor and object. The user may then activate, manipulate, or move the object that is under the cursor. The user is expected to indicate his intention to activate, manipulate, or move the object by performing a gesture.

The motion of the object of interest D105 may optionally be interpreted and classified by the gesture detection module D315 as described above with respect to FIG. 17. The gesture detection process D315 may utilize the data produced from any component of the system. The final coordinates D314, image coordinates D310 and D311, or a combination of D310, 311, and 314, may be sampled over time and provided as input to the gesture detection process D315. A variety of gestures (for example, "hovering" and "poking") have been successfully detected using this data as input to a gesture detection process D315.

In scenarios where the application's state (that is, whether or not the indicator D1101 is over a button D1109) is known and is conveyed to the gesture detection module D315. One gesture that the user performs to indicate the intention to activate the object (for example screen objects D1109, D1202) that is under the cursor D1101 is to cause the cursor to hover over the object (examples D1109, D1202) for longer than a predefined duration. This gesture performed by the user is detected by monitoring the application's state and triggering the gesture when the application state remains unchanged for the predetermined duration. The application need not be created specifically for the multicamera control system D100, as techniques exist that can unobtrusively monitor an application's state (in the Windows operating system by setting a "hook" using the Windows SDK function "SetWindowsHookEx") and emulating a mouse "click" (in the Windows operating system by using the Windows SDK function "SendInput").

In some scenarios, the application state may not be available and may not be monitored. In this case, some exemplary gestures that indicate the intention to active the object (for example screen objects D1109, D1202) under the cursor D1101 are holding the hand stationary ("hovering"), or poking the hand quickly forward and back.

A method by which "hovering" has been detected is by keeping a history of the position of the object of interest D105, where that history contains all records of the position and state for a predefined duration of time, ending with the most recent sample. That duration represents the minimum duration that the user must hold the hand stationary. The minimum and maximum position, separately in each of the three (x,y,z) dimensions, is found within the history. If the object of interest D105 was present within the region of interest D103 in all samples of the history, and the distance between the minimum and maximum is within a predefined threshold for each of the three dimensions, then the "hovering" gesture is reported. Those distance thresholds represent the maximum amount that the object of interest D105 is allowed to move, plus the maximum amount of variation (or "jitter") expected to be introduced into the hand position by the various components of the system. The typical method in which this gesture is reported, where the system is emulating a mouse as described above, is to emulate a mouse "click." Gestures representing additional operations of the mouse, "double clicks" and "dragging," have also been detected and those operations have been emulated.

In addition, gestures that are independent of the position of the indicator relative to an object may optionally be detected and given meaning by the application that may or may not be dependent on the application's state. An application that uses this style of interaction typically does not explicitly use or display the object of interest's position D317 or other positions. These applications can be wholly or primarily controlled with only the interpretations of the positions made by this system. These applications also need not be created specifically for this system because the interpretations made by this system can be used to simulate an action that would be performed on a traditional user input device, such as a keyboard or joystick.

Many useful interpretations depend directly on the absolute position of the object of interest D105 within the region of interest D103. (Alternately, the indicator position D1105 within the sub-region D1103 may be used in an equivalent manner). One method of making these interpretations is to define boxes, planes, or other shapes. A state is triggered on if the position (for example the position defined by block D314, or alternately by the remapped coordinates from remapping process D317) of the object of interest D105 is found to be within a first box (or beyond the border defined by the first plane), and had not been in the immediately preceding observation (either because it was elsewhere within the region of interest D103, or was not detected). This state is maintained until the hand position is not found to be within a second box (or beyond the border defined by the second plane), at which time the state is triggered off. The second box must contain the entire first box, and is typically larger. The use of a larger box reduces occurrences of the state unintentionally triggering on and off when the object of interest D105 is detected to be near the border of the boxes, where a very small motion or minor noise in the image signals would otherwise cause the position D317 to otherwise drift in and out of the box. Typically one of three methods of interpreting this state is used, depending on the intended use of the gesture. In one method, the gesture directly reflects the state with an on and off trigger. When emulating a keyboard key or joystick fire button, it is "pressed" when the state is triggered on, and "released" when the state is triggered off. In another method, the gesture is only triggered by the transition of the state from off to on. When emulating a keyboard key or joystick button, the key is "clicked." Although the duration and off state are not reported to the application, they are maintained so that the gesture will not be repeated until after the state is triggered off, so that each instance of the gesture requires a clearly defined intent by the user. A third method is to trigger the gesture when by the transition of the state from off to on, and to periodically re-trigger the gesture at predefined intervals so long as the state remains on. This emulates that way in which, holding a key down on a keyboard, causes the character to repeat in some applications.

One way in which boxes or planes, for the above techniques, may be defined within the region of interest D103 is as follows. By defining a first plane (D1501 in FIG. 27A) and second plane D1502 that divides the region of interest into "fire" D1503 and "neutral" D1504 regions (the gesture reported when the object of interest D105 is in the region D1505 between the planes depends on the previous positions of the object, as described above), the above technique can detect the object of interest D105 (typically a hand) "pushing" forward, which is one gesture for emulating a fire button on a joystick, or causing the application to respond in a way that is commonly associated with the pressing of a joystick button (for example, the firing of a weapon in a video game).

Figure 27:
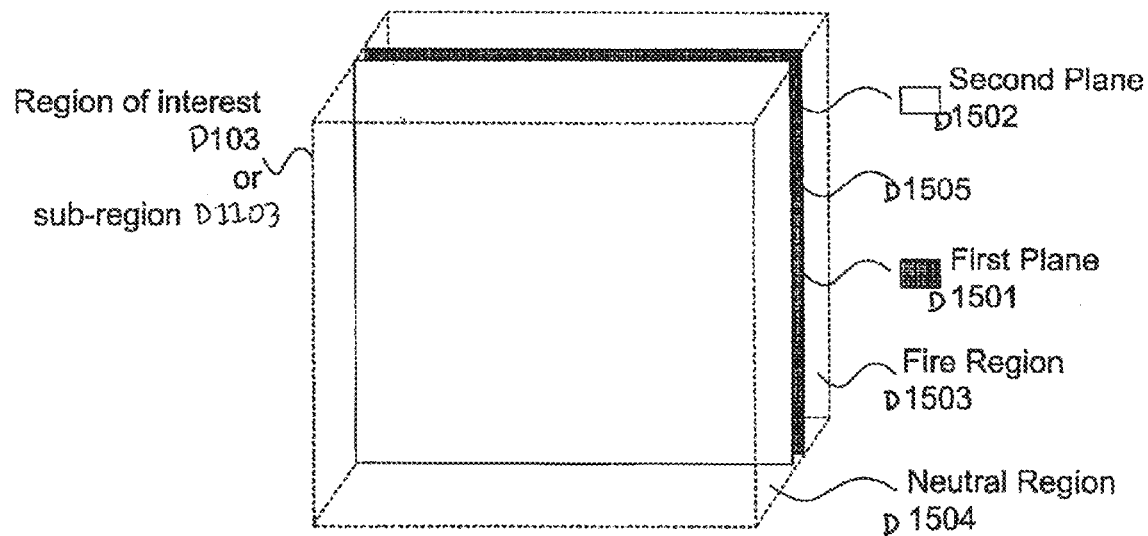
FIG. 27A shows the division of the region of interest into detection planes used by a gesture detection method to identify a gesture that may be associated with the intention to activate, according to some embodiments.
FIG. 27B shows the division of the region of interest into detection boxes used by a gesture detection method to identify a gesture that may be associated with selecting a cursor direction, according to some embodiments.
FIG. 27C shows an alternate division of the region of interest into direction detection boxes used by a gesture detection method to identify a gesture that may be associated with selecting a cursor direction, according to some embodiments.
FIG. 27D illustrates in greater detail the relationship of neighboring divisions of FIG. 27C, according to some embodiments.
Figure 27:
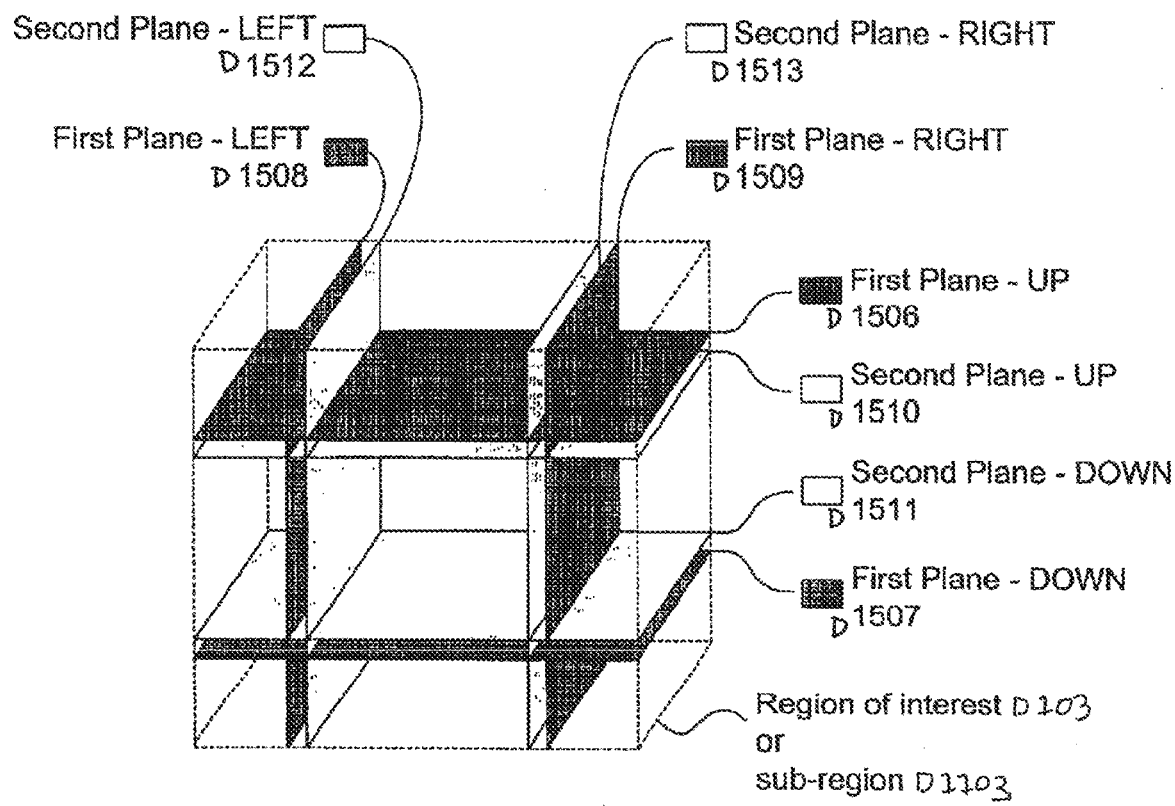

Another technique in which boxes or planes, for the above techniques, may be defined within the region of interest D103 is as follows. Planes of the first type D1506, D1507, D1508, D1509 are defined that separate each of the left, right, top and bottom portions of the region of interest D103, overlapping in the corner regions as illustrated in FIG. 27B. Planes of the second type are labeled as D1510, D1511, D1512, D1513. Each pair of first and second planes is processed independently. This combination of planes emulates the four directional cursor keys, where a hand in a corner triggers two keys, commonly interpreted by many applications as the four secondary 45 degree (diagonal) directions. Emulating the keyboard cursor in this method allows a variety of existing applications to be controlled by system D100, including, for example, Microsoft® PowerPoint® which responds to the emulated cursor keys (e.g., the up and down arrow keys) by advancing to the next or previous slide in a presentation sequence.

Figure 27C:
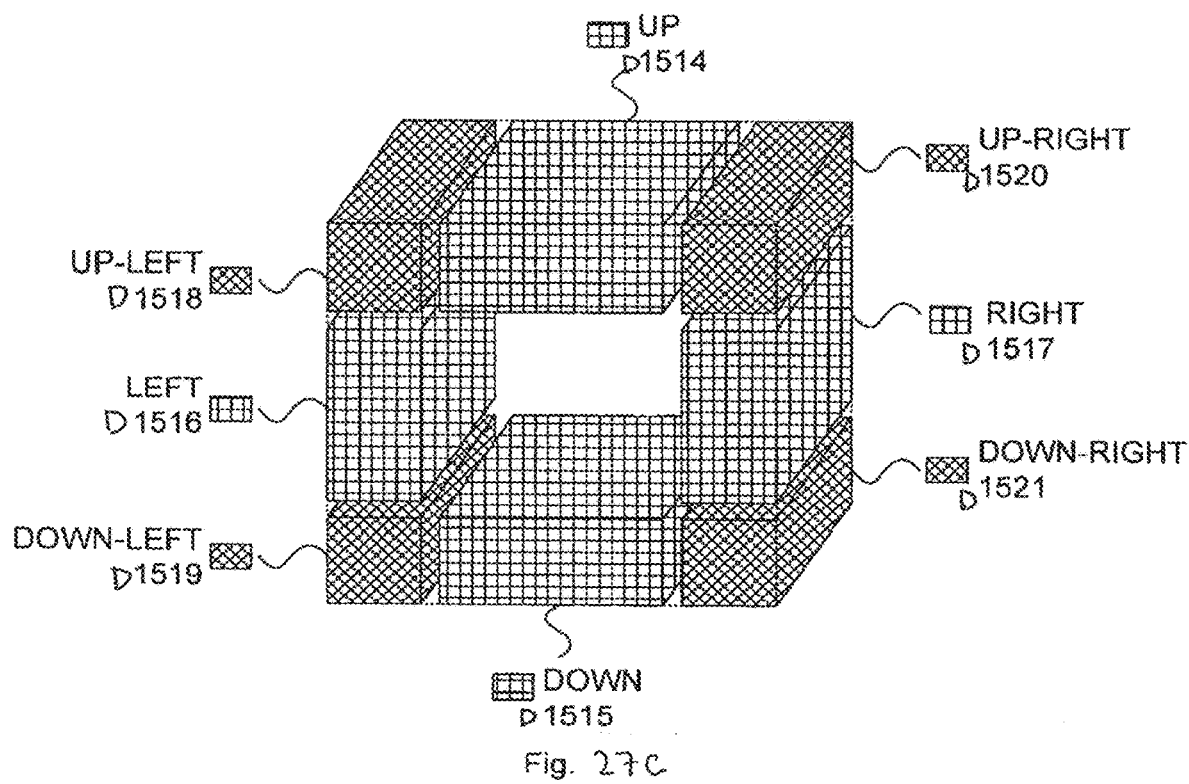
Figure 27D:
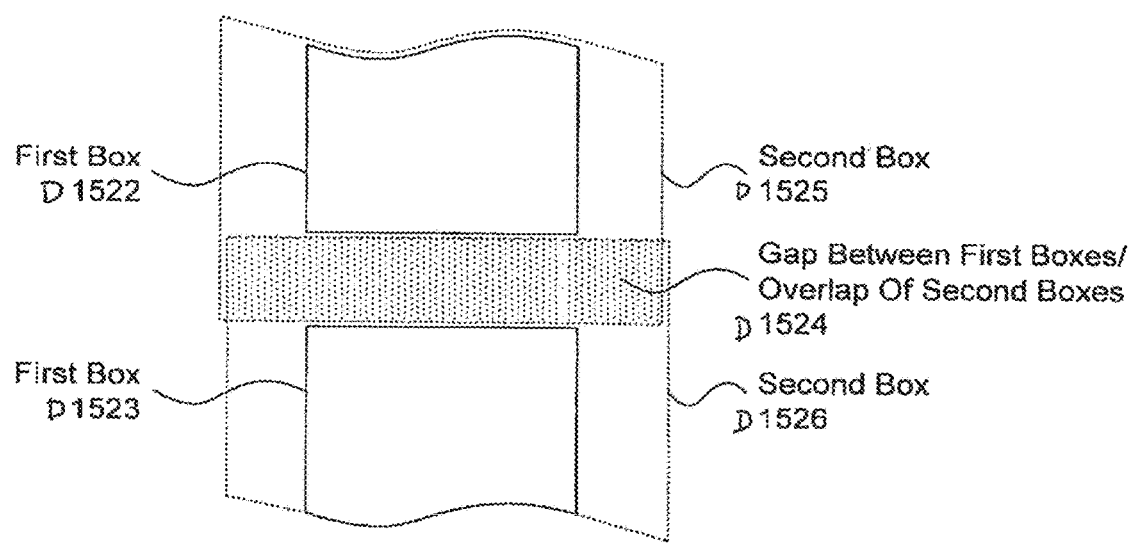

Another method of emulating control of discreet directions applies for applications that expect the four 45 degree direction states to be explicitly represented. Boxes D1514, D1515, D1516, D1517 are defined for each of the four primary (horizontal and vertical) directions, with additional boxes D1518, D1519, D1520, D1521 defined for each of the secondary 45 degree (diagonal) directions as illustrated FIG. 27C. For clarity, only boxes of the first type are illustrated. A gap is placed between these boxes. FIG. 27D illustrates how neighboring boxes are defined. The gap between boxes of the first type D1522, D1523 assures that the user intentionally causes the object of interest D105 to enter the box, while the gap D1524 is filled by overlapping boxes of the second type D1525, D1526, so that the system will report the previous gesture until the user was clearly intended to move the object of interest D105 into either a neighboring box or the central neutral region. This combination of buttons can be used to emulate an eight-directional joystick pad.

A wider class of gestures depend on motion instead of or in addition to position. An example is the gesture of "swiping the hand to the left." This is a one gesture to convey to an application that it is to return to a previous page or state. Through emulation of a keyboard and mouse, this gesture may be used to control information presentation software, in particular Microsoft® PowerPoint®, to go to the previous slide of a presentation sequence. Through emulation of a keyboard and mouse, this gesture causes a web browser to perform the action associated with its "back" button. Similarly, the gesture of "swiping the hand to the right" is one gesture to convey to an application that the user desires to go to the next page or state. For example, this gesture causes presentation software to go to the next slide of a presentation sequence, and causes browser software to go to the next page.

One method for detecting "swiping the hand to the left" is as follows. A thin stripe along the leftmost part of the region of interest D103 is defined as the left-edge region. The position (for example the position defined by block D314, or alternately by the remapped coordinates from remapping process D317) of the object of interest D105 is represented as the following three states: 1. Object of interest is present and not inside the left-edge region 2. Object of interest is present and inside the left-edge region 3. Object of interest is not present within the hand detection region.

A transition from state 1 to state 2 above causes the gesture detection module D315 to enter a state whereby it starts a timer and waits for the next transition. If a transition to state 3 is observed within a predetermined duration of time, the "swiping the hand off to the left" gesture is reported to have occurred. This technique is typically duplicated for the right, upper, and lower edges, and, because the hand position is found in three dimensions, also duplicated to detect "pulling the hand back."

A variety of gesture detection techniques have been discussed. Still other gesture detection techniques (for example, Hidden Markov Layers) are described in research literature, and may be applied in the various implementations of the system D100 described herein.

Referring back to FIGS. 15 and 17, another implementation of the multicamera control system D100 is described in further detail. While FIG. 15 shows a two camera system, it should be understood that the image processor D106 can be configured to receive input from more than two cameras, and may for particular applications include four (4) or more video cameras. In the four camera implementation, components D304-D311 of FIG. 17 are duplicated to support the two additional cameras. Additionally, the combination module D312 is configured to receive four sets of camera-relative presence and position data (similar to data D310 and D311) associated with the object of interest D105 being tracked. The techniques and equations (in particular, Eq. 5 and Eq.6) previously described can be applied to the additional pair(s) of cameras, where the output of the combination module D312 is the average of all the position from each of the camera pairs. The gesture detection module D315 is similarly reconfigured to receive four sets of cameral-relative presence and position data D310, D311 from the two additional detection modules (similar to D308, D309) which are substantially similar to detection modules D310 and D311.

The output from the image processor 106, which now includes processed object position coordinates and gesture information associated with four cameras, can be used by another process or user application program 316. The formulas and geometry (described above) used to calculate coordinate information associated with the object of interest 105 from the two additional cameras are also used.

In one implementation using four cameras, the two additional cameras are positioned at the bottom two corners within the controlled background D104 and are oriented such that the region of interest D103 is within the field of view D205 of each camera. The advantage of a four camera system is that the position of the object of interest D105 can be tracked with greater accuracy. Thus, the application program may include more screen objects with increased density on the video display D107 because the increased tracking accuracy allows objects that are close in proximity to be correctly selected by small movements with the object of interest D105. Moreover, the two additional cameras reduce errors in tracking the object of interest D105 when a portion of the object of interest D105 is occluded within the field of view D205 associated with one or more of the other cameras.

Neutral Position of a Device

According to one general aspect, a method is disclosed. The method includes determining a neutral position of a device in relation to at least a first axis, the device including at least a first control associated with a first plurality of output signals, and measuring an angular displacement of the device about at least the first axis. The method also includes receiving a selection of the first control, and outputting one of the first plurality of output signals based at least upon the selection and the angular displacement.

Implementations may include one or more of the following features. For example, the neutral position of the device may be determined in relation to at least a second axis, orthogonal to the first axis, where the angular displacement may include a first-axis component and a second-axis component. Furthermore, the neutral position of the device may be determined in relation to at least a third axis orthogonal to the first axis and the second axis, where the angular displacement may include a third-axis component. The first axis, the second axis, and/or the third axis may intersect within the device.

The first control may be associated with at least three output signals, or at least nine output signals, where each of the plurality of output signals may correspond to a character, such as an alphanumeric character. The method may further include displaying the output signal, and/or displaying an indication of the angular displacement. The method may also further include defining a plurality of tilt regions about the first axis, wherein one of the first plurality of output signals is also output based upon the plurality of tilt regions. The angular displacement of the device about the first axis may be measured as 0.degree., where a first tilt region encompasses an angular displacement of 0.degree., or the first tilt region may be defined as a region encompassing approximately −30.degree. to 0.degree. about the first axis, where the second tilt region is defined as a region encompassing approximately 0.degree. to +30.degree. about the first axis. In a further aspect, a first output signal may be output if the angular displacement is within the first tilt region when the selection is received, where a second output signal may be output if the angular displacement is within the second tilt region when the selection is received. A third or fourth output signal may be output if the angular displacement is within the third or fourth tilt region, respectively, when the selection is received.

The method may also define a plurality of first-axis tilt regions about the first axis and a plurality of second-axis tilt regions about the second axis, where the one of the first plurality of output signals may also be output based upon the plurality of first-axis tilt regions and/or the plurality of second-axis tilt regions. When the selection is received, a first output signal may be output if the first-axis component is within a first first-axis tilt region and if the second-axis component is within a first second-axis tilt region, a second output signal may be output if the first-axis component is within a second first-axis tilt region and if the second-axis component is within the first second-axis tilt region, a third output signal may be output if the first-axis component is within the second first-axis tilt region and if the second-axis component is within a second second-axis tilt region, and/or a fourth output signal may be output if the first-axis component is within the second first-axis tilt region and if the second-axis component is within the second second-axis tilt region.

Alternatively, in another aspect, when the selection is received, a first output signal may be output if the first component is within a first first-axis tilt region and if the second-axis component is within a first second-axis tilt region, a second output signal may be output if the first component is within the first first-axis tilt region and if the second-axis component is within a second second-axis tilt region, a third output signal may be output if the first component is within the first first-axis tilt region and if the second-axis component is within a third second-axis tilt region, a fourth output signal may be output if the first component is within a second first-axis tilt region and if the second-axis component is within the first second-axis tilt region, a fifth output signal may be output if the first component is within the second first-axis tilt region and if the second-axis component is within the second second-axis tilt region, a sixth output signal may be output if the first component is within the second first-axis tilt region and if the second-axis component is within the third second-axis tilt region, a seventh output signal may be output if the first component is within a third first-axis tilt region and if the second-axis component is within the first second-axis tilt region, an eighth output signal may be output if the first component is within the third first-axis tilt region and if the second-axis component is within the second second-axis tilt region, and/or a ninth output signal may be output if the first component is within the third first-axis tilt region and if the second-axis component is within the third second-axis tilt region.

According to another general aspect, a device is disclosed. The device includes a tilt sensor configured to determine a neutral position of a device in relation to at least a first axis, and further configured to measure an angular displacement of the device about at least the first axis. The device also includes at least a first control associated with a first plurality of output signals, and a processor configured to receive a selection of the first control and further configured to output one of the first plurality of output signals based at least upon the selection and the angular displacement.

Implementations may include one or more of the following features. For example, the first axis and the second axis may intersect at a center of the device, or at a periphery portion of the device. The device may further include at least second through tenth controls each associated with second through tenth pluralities of output signals, respectively. The first control may be a button, and/or the device may be a telephone. The displacement signal may be measured using a tilt sensor, which may be a gyroscope. The device may further include a display configured to display the output signal, and/or configured to display an indication of the angular displacement, and the device may further include a keyboard configured to input the selection.

According to another general aspect, a computer program product, tangibly stored on a computer-readable medium, is disclosed. The computer program product is operable to cause a computer to perform operations including determining a neutral position of a device in relation to at least a first axis, the device including at least a first control associated with a first plurality of output signals, and measuring an angular displacement of the device about at least the first axis. The computer program product is also operable to cause a computer to perform operations including receiving a selection of the first control, and outputting one of the first plurality of output signals based at least upon the selection and the angular displacement.

According to another general aspect, a telephone device is disclosed. The telephone device includes a tilt sensor configured to determine a neutral position of the telephone device in relation to at least a roll axis, and further configured to measure an angular displacement of the telephone device about the roll axis. The telephone device also includes at least first through eighth buttons each associated with at least four alphanumeric characters. Furthermore, the telephone device includes a processor configured to receive a selection of the first button and further configured to output one of the at least four alphanumeric characters based at least upon the selection and the angular displacement.

The details of one or more implementations are set forth in the accompanying drawings and the description below. Other features will be apparent from the description and drawings, and from the claims.

FIG. 28 depicts the exterior appearance of a device according to one exemplary implementation, in a state where the device is in the neutral position. The hardware environment of device E100 includes a keypad including at least a first control E102 for entering text data and user commands into the device E100, a display E105 for displaying text and images to a user, and an indicator, such as a tilt indicator E106, for displaying an indication of angular displacement or tilt orientation about at least one axis.

Display E105 displays the graphics, images, and text that comprise the user interface for the software applications used by this implementation, as well as the operating system programs necessary to operate the device E100. A user of device E100 uses first control E102 to enter commands and data to operate and control the operating system programs as well as the application programs.

Display E105 is configured to display the GUI to a user of device E100. A speaker may also be present also generate voice and sound data received from the application programs operating on device E100, such as a voice from another user generated by a telephone application program, or a ring tone generated from a ring tone application program. A microphone may also be used to capture sound data generated by the user, for example, when the user is speaking to another user during a telephone call via device E100. Furthermore, tilt indicator E106 is configured to indicate the angular displacement or tilt orientation of device E100, to provide visual feedback to the user of device E100 and to make the user aware of the tilt orientation that will be used to interpret a control selection.

The operation of device E100 is based upon its orientation in two states: the "neutral" position, and a "selection" position corresponding to the position of the device prior to, at the time of, or after the selection of first control E102. More specifically, and as described fully below, the output of an output signal by device E100 is dependent upon the angular displacement between the neutral position and the selection position, in relation to at least one axis, where the angular displacement has an angular displacement component for each axis of interest.

FIG. 28, for example, depicts device E100 in one contemplated three-axis neutral position. In particular, orthogonal X, Y and Z-axes intersect at the center of device E100, where the X-axis extends parallel to the longitudinal direction of device E100. According to this exemplary neutral position, a rotation around the X-axis would effectuate a rolling motion, a rotation around the Y-axis would effectuate a pitching motion, and a rotation around the Z-axis would effectuate a yawing motion. These roll, pitch, and yaw motions are generically referred to herein as "tilt" motions.

The determination of the number of axes of interest, and the location and orientation of the axes with relation to device E100, is a device-specific and application-specific determination, and no limitation of any of these characteristics is inferred in the following description. For example, where it is undesirable or impossible to manipulate the device in a yawing motion, or where the number of output signals may be effectively controlled using motion about one or two axes, the neutral position of the device may be determined with regard to these one or two axes alone. Furthermore, the at least one axis may not intersect device E100, or the at least one axis may extend along a periphery or edge portion of device E100. Additionally, one of the axes may extend parallel along the longitudinal direction of device E100 or it may extend at an angle to the longitudinal direction of device E100. In any regard, the neutral position is aligned with an axis relative to the Earth, such as a magnetic or true North axis, or an axis pointing to the center of the Earth, or toward the horizon, with an axis relative to the user, the device, or other axis.

With regard to telephony, a one-axis neutral position is provided in the case where angular displacement is to be measured with regard to roll rotation around the X-axis, or a two-axis neutral position is provided in the case where angular displacement is to be measured with regard to roll and pitch rotation around the X-axis and Y-axis, respectively. In either case, the X-axis and Y-axis intersect at the center of the device, with the X-axis extending longitudinally parallel to the longitudinal direction of the device. Other neutral position orientations are contemplated as well.

When inputting characters into a device such as a telephone, the user typically holds the device at a positive (upwards) pitch angle while looking into the display. In that regard, the X-axis of the telephone in the neutral position may be defined at a similar upwards angle, such that flattening the angle of the telephone with regard to the ground would be registered as a pitched forward tilting motion. In other instances, of course, an X-axis which is parallel to the ground is the "neutral" X-axis position.

Although device E100 is illustrated in FIG. 28 as a mobile telephone, in further aspects device E100 may include a desktop PC, a laptop, a workstation, a midrange computer, a mainframe, a handheld or tablet computer, a personal data assistant ("PDA") or another type of embedded system such as a computer keyboard or a remote control.

Figure 29:
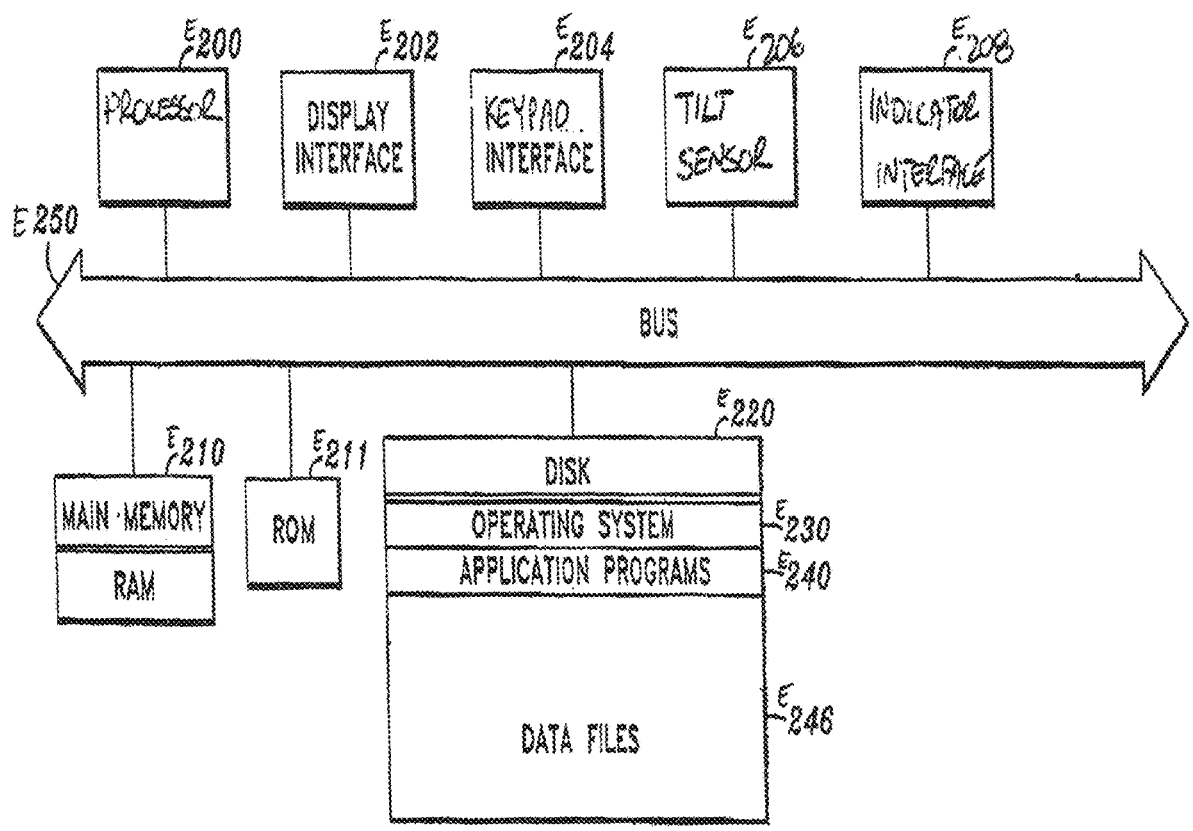
FIG. 29 depicts an example of an internal architecture of the implementation of FIG. 28, according to some embodiments.

FIG. 29 depicts an example of an internal architecture of the implementation of FIG. 28. The computing environment includes processor E200 where the computer instructions that comprise an operating system or an application are processed; display interface E202 which provides a communication interface and processing functions for rendering graphics, images, and texts on display E105; keypad interface E204 which provides a communication interface to the keypad, including first control E102; tilt sensor E206 for measuring angular displacement of device E100 about at least a first axis; indicator interface E208 which provides a communication interface to the indicators, including tilt indicator E106, random access memory ("RAM") E210 where computer instructions and data are stored in a volatile memory device for processing by processor E200; read-only memory ("ROM") E211 where invariant low-level systems code or data for basic system functions such as basic input and output ("I/O"), startup, or reception of keystrokes from the keypad are stored in a non-volatile memory device; and optionally a storage E220 or other suitable type of memory (e.g. such as random-access memory ("RAM"), read-only memory ("ROM"), programmable read-only memory ("PROM"), erasable programmable read-only memory ("EPROM"), electrically erasable programmable read-only memory ("EEPROM"), magnetic disks, optical disks, floppy disks, hard disks, removable cartridges, flash drives), where the files that comprise operating system E230, application programs E240 and data files E246 are stored. The constituent devices and processor E200 communicate with each other over bus E250.

RAM E210 interfaces with bus E250 so as to provide quick RAM storage to processor 200 during the execution of software programs such as the operating system application programs, and device drivers. More specifically, processor E200 loads computer-executable processes from memory media into a field of RAM E210 in order to execute software programs. Data is stored in RAM E210, where the data is accessed by processor E200 during execution.

Also shown in FIG. 29, storage E220 stores computer-executable code for an operating system E230, application programs E240 such as word processing, spreadsheet, presentation, graphics, image interpretation training, gaming, or other applications, and data files E246. Although it is possible to use the above-described implementation, it is also possible to implement the functions according to the present disclosure as a dynamic link library ("DLL"), or as a plug-in to other application programs such as an Internet web-browser such as the MICROSOFT® Internet Explorer web browser.

Processor E200 is one of a number of high-performance computer processors, including an INTEL® or AMD® processor, a POWERPC® processor, a MIPS® reduced instruction set computer ("RISC") processor, a SPARC® processor, an HP ALPHASERVER® processor, an ACORN® RISC Machine ("ARM®") architecture processor, or a proprietary computer processor for a computer or embedded system, without departing from the scope of the present disclosure. In an additional arrangement, processor E200 in device E100 is more than one processing unit, including a multiple CPU configuration found in high-performance workstations and servers, or a multiple scalable processing unit found in mainframes.

Operating system E230 may be MICROSOFT® WINDOWS NT®/WINDOWS® 2000/WINDOWS® XP Workstation; WINDOWS NT®/WINDOWS® 2000/WINDOWS® XP Server; a variety of UNIX®-flavored operating systems, including AIX® for IBM® workstations and servers, SUNOS® for SUN® workstations and servers, LINUX® for INTEL® CPU-based workstations and servers, HP UX WORKLOAD MANAGER® for HP® workstations and servers, IRIX® for SGI® workstations and servers, VAX/VMS for Digital Equipment Corporation computers, OPENVMS® for HP ALPHASERVER®-based computers, MAC OS® X for POWERPC® based workstations and servers; SYMBIAN OS®, WINDOWS MOBILE® or WINDOWS CE®, PALM®, NOKIA® OS ("NOS"), OSE®, or EPOC® for mobile devices, or a proprietary operating system for computers or embedded systems. The application development platform or framework for operating system E230 may be: BINARY RUNTIME ENVIRONMENT FOR WIRELESS® ("BREW®"); Java Platform, Micro Edition ("Java ME") or Java 2 Platform, Micro Edition ("J2ME®"); PYTHON™, FLASH LITE®, or MICROSOFT® .NET Compact.

Tilt sensor E206 detects the orientation of device E100, as described below, and is a gyroscope, an optical sensor, and/or other type of tilt sensor. An optical sensor, for example, may be used to detect the orientation of device E100 using an optical flow of a sequence of images from a camera embedded in device E100 to determine the motion and orientation of device E100. Optical flow describes the apparent relative velocity of features within a sequence of images. Since optical flow is relative to the camera, motion of the camera will result in apparent velocities of features in the camera view. The motion of the camera is calculated from the apparent velocities of features in the camera view. Position or orientation are also calculated relative to the neutral position, over an extended span of time. Although tilt sensor E206 has been described as an optical sensor using an optical flow approach for tracking the tilt or inclination of device E100 using camera, in other aspects the tilt or inclination of device E100 is tracked without using the optical flow approach, such as by using an accelerometer.

Computer readable memory media stores information within device E100, and is volatile or non-volatile. Memory may be capable of providing mass storage for device E100. In various different implementations, the memory may be a floppy disk device, a hard disk device, an optical disk device, or a tape device. While FIGS. 28 and 29 illustrate one possible implementation of a computing system that executes program code, or program or process steps, other types of computers or devices may also be used as well.

Figure 30:
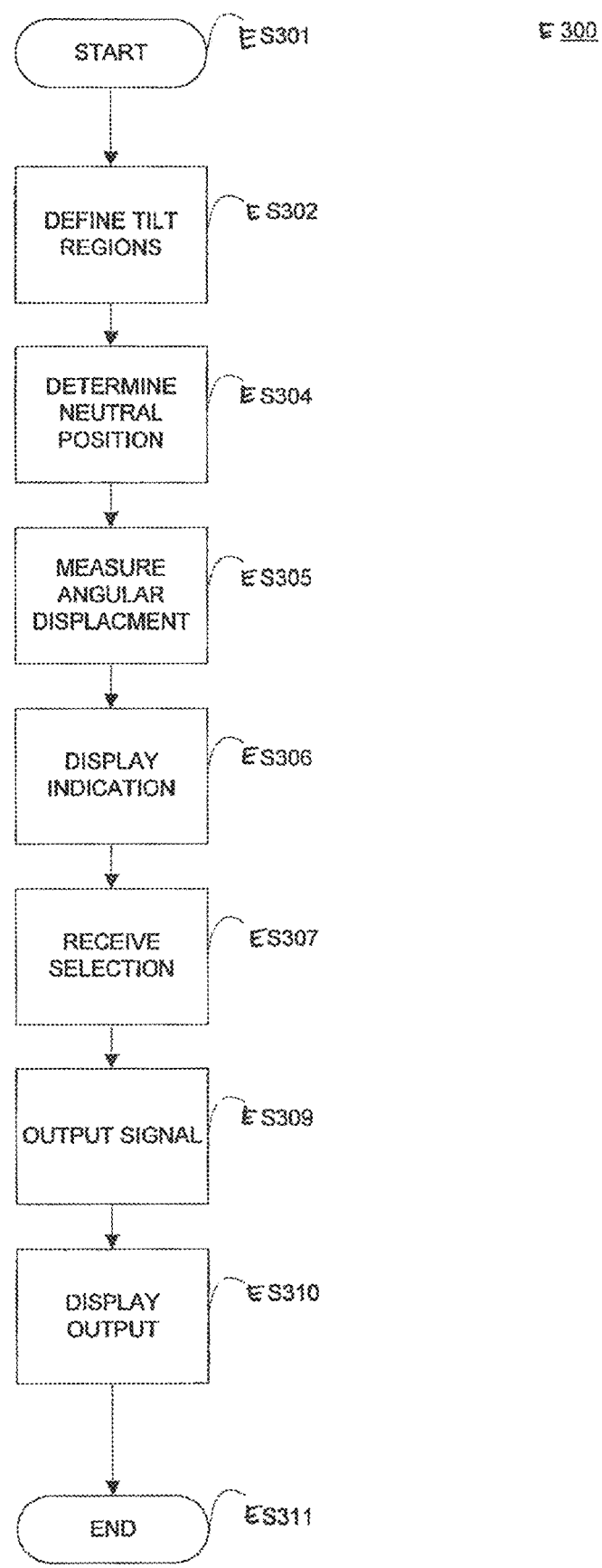
FIG. 30 is a flowchart illustrating a method in accordance with another exemplary implementation, according to some embodiments.

FIG. 30 is a flowchart illustrating a method in accordance with another exemplary implementation. Briefly, the method includes determining a neutral position of a device in relation to at least a first axis, the device including at least a first control associated with a first plurality of output signals, and measuring an angular displacement of the device about at least the first axis. The method also includes receiving a selection of the first control, and outputting one of the first plurality of output signals based at least upon the selection and the angular displacement.

In more detail, method E300 begins (step ES301), and a plurality of tilt regions are defined about a first axis (step ES302). As is described in more detail below, the output of an output signal is based at least upon the angular displacement of a device upon the selection of a first control. In accordance with one aspect, tilt 'regions' are defined such that, upon the selection of the control, if the angular displacement falls within a particular tilt region or band of angles, an output associated with the tilt region is output.

FIGS. 31A to 31D illustrates several example tilt regions with regard to a hypothetical neutral axis, labeled the "N-axis," where the neutral represents the neutral X, Y and/or Z-axis. Each of the X, Y, or Z-axis can have individually-determined tilt regions, a common tilt region definition can be applied to multiple axes, or axes can have no defined tilt regions.

Figure 31A:
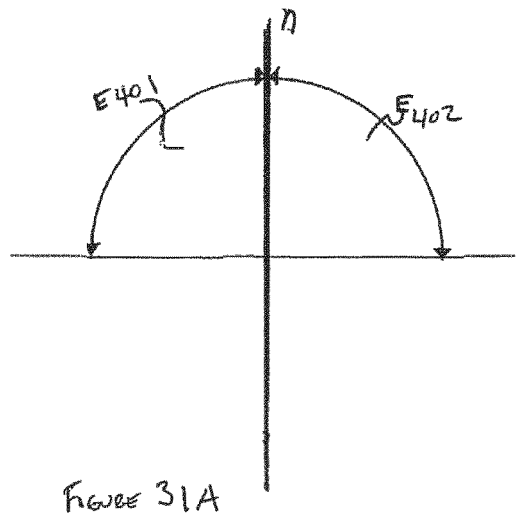
FIGS. 31A to 31D depict examples of tilt regions that are defined about a neutral axis, according to some embodiments.

FIG. 31A illustrates an example of two tilt regions defined about the neutral axis. An angular displacement from approximately −90.degree. to 0.degree. about the neutral axis is within region E401, and an angular displacement from approximately 0.degree. to approximately 90.degree. about the neutral example is within region E402. An angular displacement from approximately 91.degree. to −91.degree., indicative of a device that is upside down, does not correspond to any region, and an angular displacement of exactly 0.degree. is in either region E401 or E402.

Where the neutral axis represents the X-axis, an angular displacement in region E401 would result from a negative roll of the device (to the left), and an angular displacement in region E402 would result from a positive roll of the device (to the right). Where the neutral axis represents the Y-axis, an angular displacement in region E401 would result from a negative pitch (forward) the device, and an angular displacement in region E402 would result from a positive pitch (rearward) of the device. Where the neutral axis represents the Z-axis, an angular displacement in region E401 would result from a negative yaw (counterclockwise), and an angular displacement in region E402 would result from a positive yaw (clockwise). Although two tilt regions are depicted, any number of tilt regions may be defined, depending largely upon the sensitivity of the tilt sensor, the number of output signals associated with each control and the ability of the user to discriminate between small angles when manipulating the device.

In any case, the signal output by the device is dependent upon the angular displacement and the tilt region. For example, the device outputs a first of a plurality of signals if the angular displacement of the device is within a first region, and a second of a plurality of signals if the angular displacement of the device is within a second region, even if the same control is selected in both circumstances. Although FIG. 28 illustrates regions E401 and E402 as encompassing .+−.90.degree. bands, in a similar aspect tilt region E401 defines a region encompassing approximately −30.degree. to 0.degree. about the neutral axis, and the tilt region E402 defines a region encompassing approximately 0.degree. to +30.degree. about the neutral axis.

Figure 31B:
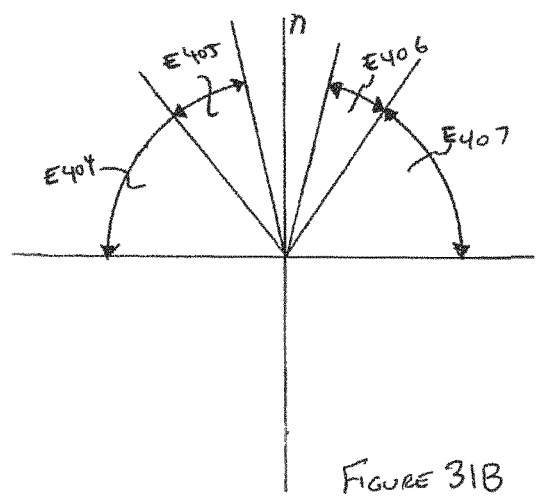

FIG. 31B illustrates an example of four tilt regions defined about the neutral axis, with a dead space between regions at 0.degree. about the neutral axis. Due to the insensitivity of a tilt sensor, the inability of a user to discriminate, or for other reasons, it is often desirable define a dead space between two otherwise-adjacent regions. Where the neutral axis represents the Y-axis, an angular displacement of between approximately 91.degree. to −91.degree., indicative of a device which is upside down, or an angular displacement of approximately 0.degree. does not correspond to any tilt region. If a control is selected when the device is not oriented in a tilt region, a default output is output, the last output is output, no output is output, an output associated with the closest tilt region or a complementary tilt region is output, or another type of output is output.

An angular displacement in region E404 would result from a hard negative pitch of the device, although an angular displacement in region E405 would also result from a negative pitch which is lesser in magnitude than a region E404 negative pitch. An angular displacement in region E407 would result from a hard positive pitch of the device, although an angular displacement in region E406 would also result from a positive pitch which is lesser in magnitude than a region E407 negative pitch.

Figure 31C:
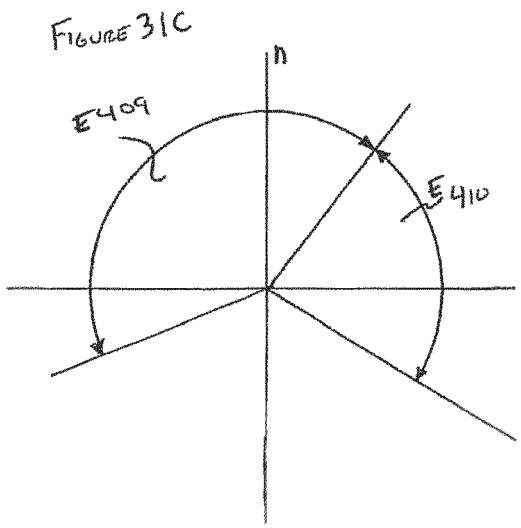

FIG. 31C illustrates an example of two tilt regions defined about the neutral axis, where the area around 0.degree. about the neutral axis is substantially within a first region. In particular, where the neutral axis represents the X-axis, the device would remain in region E409 if negatively rolled, if unmoved from the neutral position, or if modestly rolled in the positive direction. In order for the device to be oriented in region E410, a hard positive roll would have to occur. The tilt regions depicted in FIG. 31C would be desirable, for instance, where region E409 represents a default desired output, and where an affirmative, high magnitude manipulation of the device would be necessary to place the device in region E410, thus overriding the default desired output. In the FIG. 31C example, tilt region E409 encompasses an angular displacement of 0.degree., where the angular displacement of the device is in tilt region E409 if the angular displacement about the first axis is measured as 0.degree.

Figure 31D:
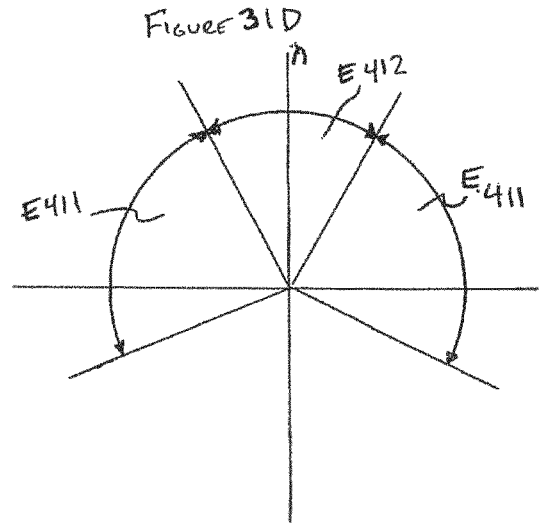

FIG. 31D illustrates an example of two tilt regions defined about the neutral axis, where a single region occupies angular displacement bands on both sides of the neutral axis. More particularly, region E412 is defined by the area surrounding 0.degree. about the neutral axis, and region E411 occupies symmetrical angular bands in the positive and negative angular directions. Where the neutral axis represents the Z-axis, an angular displacement in region E411 would result from a high-magnitude positive or negative yaw. An angular displacement in region E412 would result from a more modest positive or negative yaw, or from the orientation of the device remaining in the neutral position.

In any of the above described examples, the neutral axis may represent the X, Y, and/or Z-axis, thus effectively multiplying the total number of available tilt regions. For example, if the neutral axis in the FIG. 31A example represents the X-axis, and the neutral axis in the FIG. 31B example represents the Y-axis, a total of eight tilt regions would be available, since the four pitch tilt regions of FIG. 31B would each be divided into the two roll tilt regions of the FIG. 31A example. Assuming that each axis has an equal number n tilt regions, the total number of tilt regions for a two-axis arrangement is $n^2$ and the total number of tilt regions for a three-axis arrangement is $n^3$.

Finally, it is contemplated that in some instances the angular displacement itself, and not the tilt region, will be determinative of the output signal, and thus would be unnecessary to define tilt regions. Furthermore, tilt regions are also defined implicitly in the case where the range of motion about a desired axis is divided equally by the number of output signals, where each output signal corresponds to a mathematically-determined range of angles.

Returning to FIG. 30, the neutral position of a device is determined in relation to at least a first axis, the device including at least a first control associated with a first plurality of output signals (step ES304).

Figure 32:
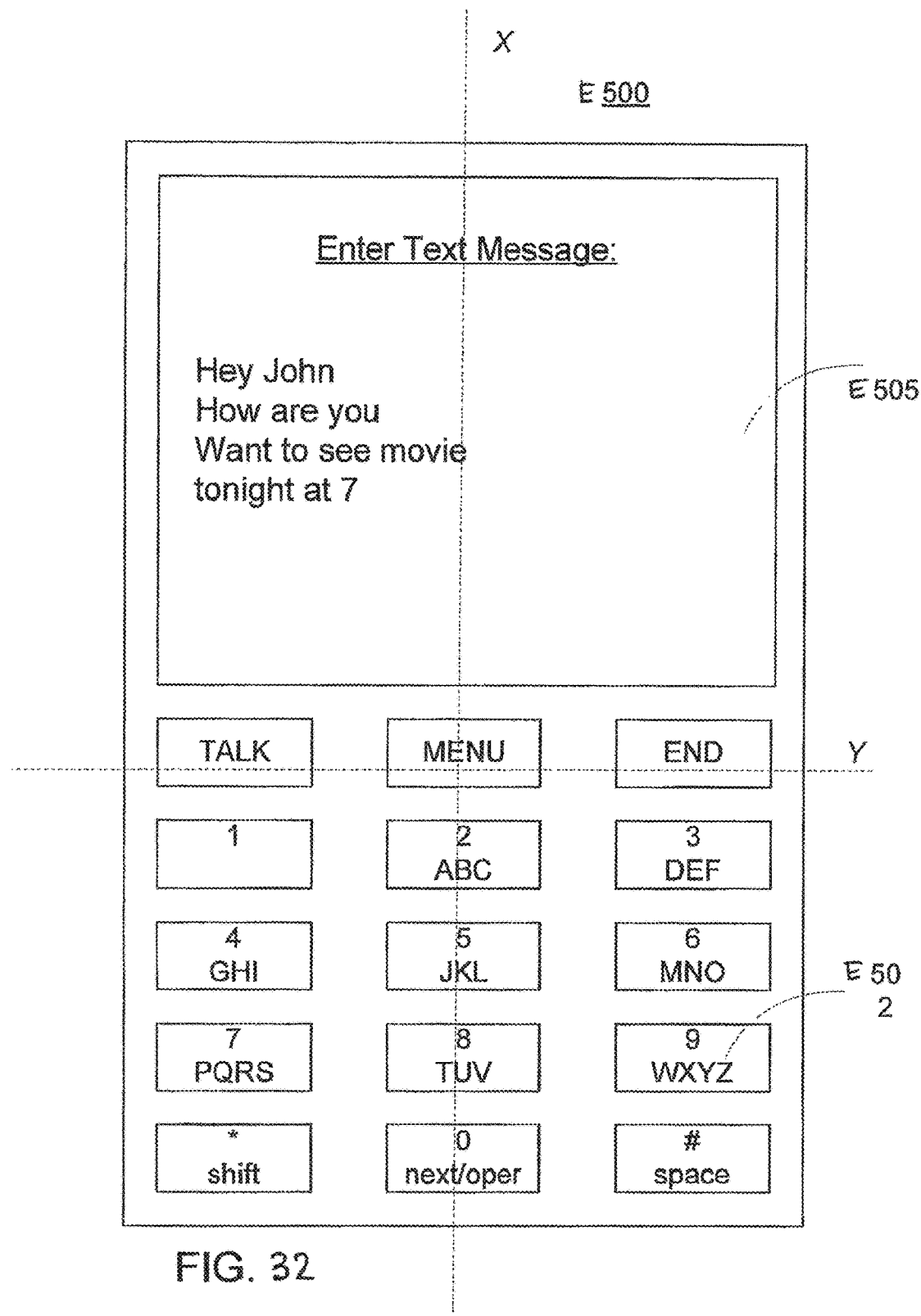
FIG. 32 illustrates a top exterior view of an example device according to another exemplary implementation, according to some embodiments.

FIG. 32 illustrates a top exterior view of an example device according another exemplary implementation. Device E500, a mobile telephone, has a keypad including at least first control E502 associated with a first plurality of output signals. In the illustrated example, first control E502 is a key, or button, on the keypad or keyboard of device E500, where each individual control represents a multiple of alphanumeric characters or symbols. Specifically, first control E502 is labeled "9", and corresponds to four output signals indicative of the characters "W", "X", "Y", and "Z", or twelve output signals indicative of the case-sensitive characters "W", "X", "Y", "Z", "w", "x", "y", "z", and the symbols ",", ".", "/", and "". There is no limit for the number of output signals or characters that can correspond to a single control. In particular aspects, first control E502 is associated with a plurality of output signals, such as three output signals, or nine output signals. Each of the plurality of output signals may correspond to a character, such as an alphanumeric character or a symbol.

The neutral position of device E500 is determined, for example, when device E500 is powered on, prior to or after a selection of the first control, or at the site of manufacture. In one aspect, a memory buffer stores output data of the tilt sensor, and the neutral position of device E500 is reconstructed from the orientation of device E500 when a control is selected and the output data. In another aspect, the neutral position is a factory pre-set condition, such as the case where the neutral X-axis is defined as extending perpendicular to the center of the Earth, such that an angular displacement is measured if device E500 faces any direction other than up. In a further aspect, a processor, a tilt sensor, and the memory communicate to determine a common neutral position based upon the average position of device E500 whenever the control is ordinarily selected. Moreover, in an additional aspect, the neutral position is user-selectable. In any regard, the neutral position operates effectively to reset the tilt sensor to 0.degree. across each axis of interest, where any motion of device E500 away from the neutral position serves to register an angular displacement. In relation to the user of device E500 or the Earth, the neutral position is a flat position, a vertical upright position, or a canted or tilted position.

In an additional aspect, the neutral position of device E500 is determined in relation to at least a second axis, orthogonal to the first axis, where the angular displacement includes a first-axis component and a second-axis component. In a further aspect, the neutral position of device E500 is determined in relation to at least a third axis orthogonal to the first axis and the second axis, where the angular displacement includes a third-axis component. The first axis, the second axis, and/or the third axis intersect within the device E500, outside of device E500, or along a peripheral portion or edge of device E500.

Since device E500 includes a tilt sensor that detects the orientation of the device, entry of text into the device is facilitated. For example, the tilt sensor detects a degree to which the device has been rolled to the left, to the right, or pitched up or down, where the tilt orientation or angular displacement of the device about the axes of interest indicates how selection of control E502 is interpreted and output. For example, if control E502 corresponds to multiple characters, the orientation of device E502 identifies which of the multiple characters is output when control E502 is selected, or identify a case in which the appropriate character is output.

Using the orientation of the device to identify a character to be output enables a character to be output each time a single control is selected, increasing the speed of text entry by reducing the number of control selections required to enter text. Because a fixed number of controls selections represents entry of a character, a user may specify a subsequent character immediately after a current character has been specified, eliminating the need to wait for a predetermined amount of time before specifying the subsequent character, also increasing the speed of text entry.

As indicated above, the neutral position of the device is a reference orientation from which an angular displacement is measured about at least one axis, to the selection position, the selection position corresponding to the position of the device prior to, at the time of, or after the selection of a control such as the first control. In one aspect, the neutral position of the device is determined in relation to one axis, and the neutral position is determined as a "flat" position, where the one axis is parallel to the ground. In another aspect, the neutral position of the device is determined in relation to two axis, and the neutral position is ergonomically determined as the orientation of a device as it would commonly be held by a user of the device. In a further aspect, the neutral position of the device is determined in relation to three axis, where one axis is determined as parallel to a magnetic North-South axis, one axis is determined as parallel to an East-West axis, and the third axis is determined as facing towards and away from the center of the Earth.

Returning to FIG. 30, an angular displacement of the device is measured about at least the first axis (step ES305). In particular, a tilt sensor, such as tilt sensor E206, measures the angular displacement between the current position of the device and the neutral position, where the angular displacement includes a component for each axis of interest. In one aspect, the tilt sensor E206 measures the angular displacement of the device at the moment the control is selected. Since the selection of the control itself may affect the orientation of the device, in another aspect the tilt sensor measures the angular displacement of the device a time before or after the control is selected.

The tilt sensor detects the orientation of the device. For example, the tilt sensor detects a degree to which the device has been rolled to the left or right, pitched up or down, or yawed clockwise or counterclockwise. In one aspect, the tilt sensor measures at least two discrete levels of roll tilt about the X-axis, in which case the device may be said to be rolled left, rolled right, or not rolled left or right. In addition, the tilt sensor measures at least two discrete levels of pitch tilt about the Y-axis in the forward or backward direction, in which case the device may be said to be pitched up, pitched down, or not pitched up or down. Further, the tilt sensor measures at least two discrete levels of yaw tilt about the Z-axis, in which case the device may be said to be yawed clockwise, yawed counterclockwise, or not yawed. In such an implementation, the tilt sensor indicates that the device has been rolled to the left when the device has been rolled between 15.degree. and 45.degree. to the left. As another example, the tilt sensor indicates that the device has not been pitched forward or backwards when the device has been pitched less than 15.degree. forward and less than 15.degree. backward. In another implementation, the tilt sensor may indicate more than three levels of tilt in each of the left-to-right and forward or backwards directions. In such an implementation, each of the levels of tilt in a particular direction corresponds to a range of degrees in which the device has been tilted.

An indication of the angular displacement is displayed (step ES306). As described above, it is possible that the orientation of the neutral position may not be instinctive to a user. Furthermore, each axis may have two or more tilt regions in each direction about each axis. For these and other reasons, an indicator is provided to display either an indication of the angular displacement, or an indication of the tilt region to which the angular displacement corresponds, in real-time or near real-time. If the angular displacement is measured at a time before or after the control is selected, the indicator estimates the appropriate angular displacement or indication of the tilt region at the time based upon all available information. If the neutral position is defined in relation to more than one axis, the user can determine which axis the indicator is indicating, the indicator can have a default or preset axis of interest, or the determination may be context sensitive.

Figure 33A:
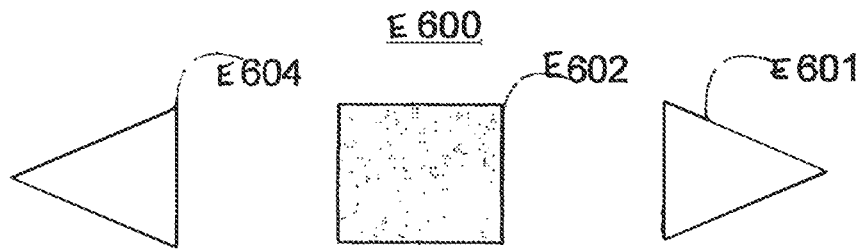
FIGS. 33A to 33E illustrate example indicators according to some embodiments.
Figure 33B:
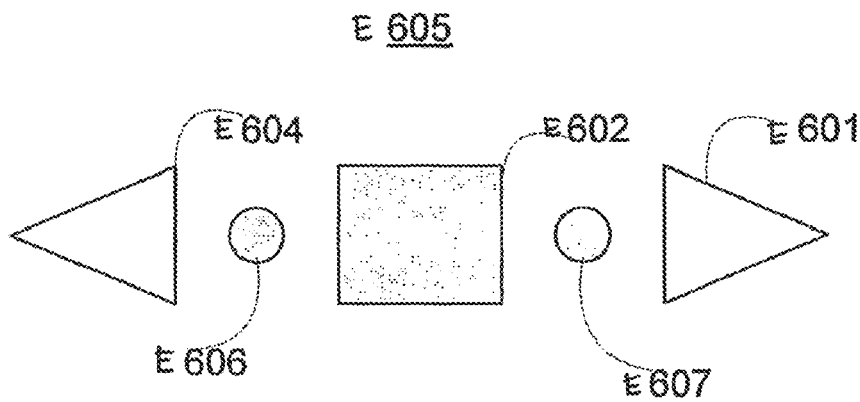

FIGS. 33A to 33B illustrate example indicators according to one exemplary aspect. In FIG. 33A, indicator E600 indicates the orientation of the device on a display. The indicator provides visual feedback so that the user is aware of the orientation of the device that will be used to interpret a control selection.

Indicator E600 includes positive tilt indicator E601 and negative tilt indicator E604, that point in the negative (left) and positive (right) directions, respectively. In addition, indicator E600 includes center indicator E602 that is visually distinguished from positive tilt indicator E601 and negative tilt indicator E604 when the device is not tilted, such as when the device is in the neutral position or in a position that is unregistered by the tilt sensor, such as upside down. One of the tilt indicators is illuminated or otherwise visually distinguished from the other tilt indicator and center indicator E602 when the device is tilted in the indicated direction. Furthermore, center indicator E602 is illuminated or otherwise visually distinguished from positive tilt indicator E601 and negative tilt indicator E604 when the device is not rolled to the left of the right. The center indicator, for example, would be illuminated when the device is oriented as illustrated in FIG. 28. Positive tilt indicator E601 would be illuminated when the device is oriented as illustrated in region E402 of FIG. 31A, and negative tilt indicator E604 would be illuminated when the device is oriented as illustrated in region E401 of FIG. 31A.

Figure 33C:
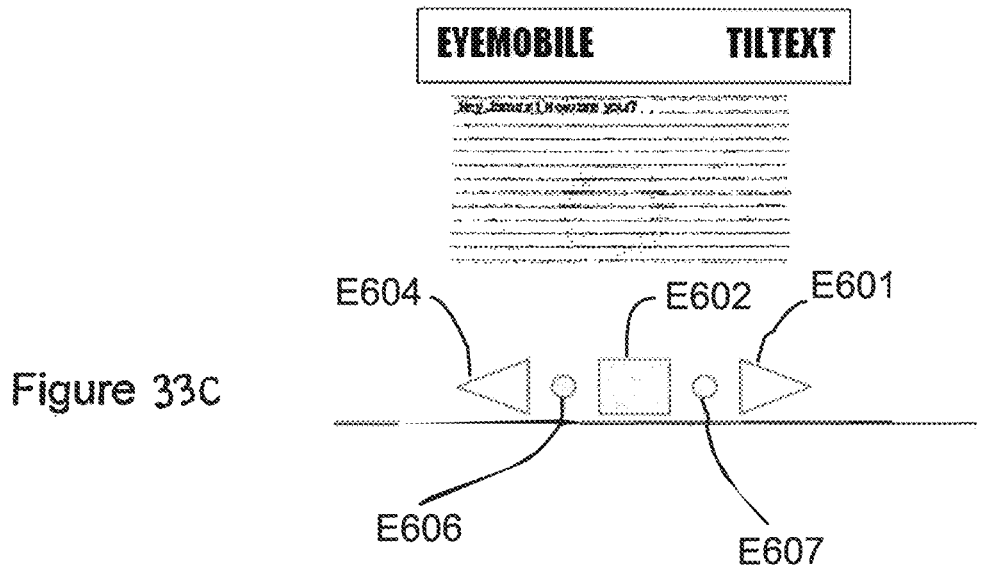

In another implementation illustrated in FIGS. 33B and 33C, indicator E605 also includes two partial tilt indicators E606 and E607 that also point in the negative and positive directions, respectively. Each of the partial tilt indicators is located between center indicator E604 and either negative tilt indicator E604 or positive tilt indicator E601. The partial tilt indicators are illuminated or otherwise visually distinguished from the other components of indicator E605 when the device is tilted partially in an indicated direction. In one implementation, both the partial tilt indicator and the center indicator are illuminated when the device is partially tilted partially in the corresponding direction. For example, negative tilt indicator E604 would be illuminated when the device is oriented in tilt region E404 of FIG. 31B, negative partial tilt indicator E606 and center indicator E602 would be illuminated when the device is oriented in tilt region E405 of FIG. 31B, center indicator 602 would be illuminated when the device is oriented in the neutral position, as illustrated in FIG. 28, positive partial tilt indicator E607 and center indicator 602 would be illuminated when the device is oriented in tilt region E406 of FIG. 31B, and positive tilt indicator E601 would be illuminated when the device is oriented in tilt region E407 of FIG. 31B. Any number of tilt indicators or partial tilt indicators are contemplated for each axis. For an axis having several dozen associated tilt regions, for example, the same number, more or fewer tilt indicators may be used to provide visual feedback.

Figure 33D:
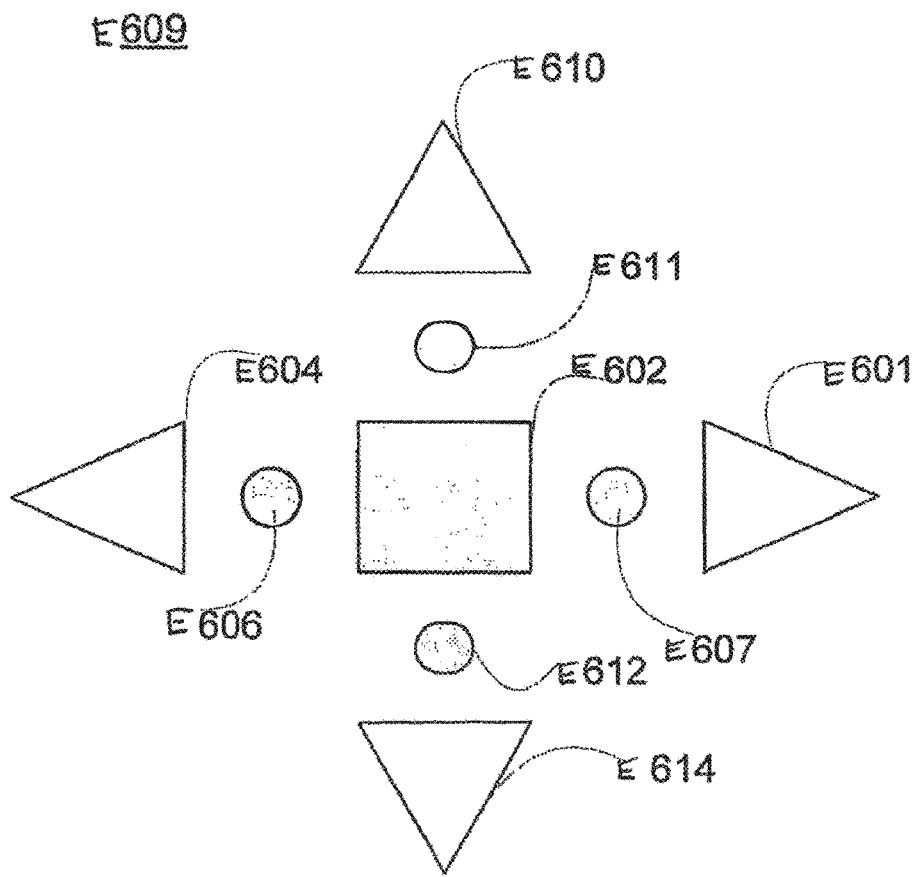
Figure 33E:
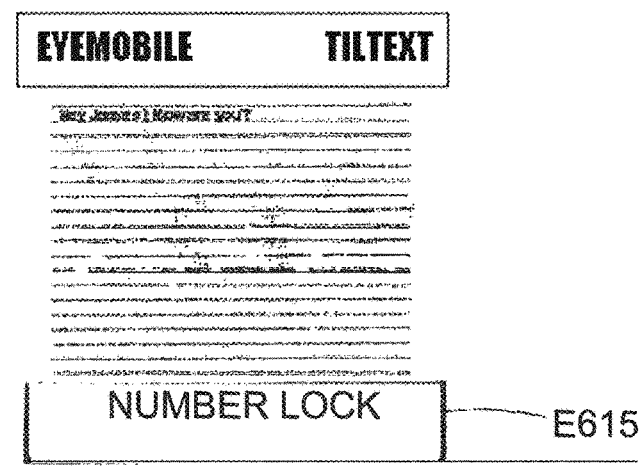

FIG. 33D illustrates a two-axis tilt indicator which may be presented on the display. Although the axes discussed in conjunction with FIG. 33D are referred to as the pitch (forward and backward) and roll (left and right) axes, these designations are arbitrary, and one set of indicators could also be the yaw axis, or another axis. Indicator E609 operates similarly to indicator E605 with regard to one axis, however, indicator E609 also integrates a pitch tilt indicator comprising negative pitch indicator E610, partial negative pitch indicator E611, partial positive pitch indicator E612, and positive pitch indicator E614, to the previously described one-axis indicator E605, which was described as a roll indicator. In another aspect illustrated in FIG. 33E, the indicator includes a single feature E615 that indicates the significance of the orientation of the device. For example, the single feature indicator indicates whether or not numbers may be output because of the measurement of the angular displacement of the device.

Although the indicator is depicted in FIGS. 28 and 33 as a series of arrows or intuitive lights, in one aspect the indicator is incorporated into the display, such as display E105, or the indicator is a speaker which plays sounds or sound files which describe the tilt of the device to the user via audio. Furthermore, in another aspect, no indication of angular displacement or tilt region is displayed or otherwise generated.

Returning to FIG. 30, a selection of the first control is received (step ES307). In one aspect, the control is a keypad button, and selection occurs when the user depresses the button, thereby enabling a signal to be generated and transmitted to the processor indicating that a selection of the keypad button has occurred. In another aspect, the control is not a physical control, but rather an icon on a touch-sensitive screen. In this aspect, selection occurs when the user touches an area of the touch-sensitive screen associated with the icon, where a touch-sensitive screen application reads the coordinates of the touch, correlates the coordinates with the location of the icon, and transmits a signal indicating that the control has been selected. Other types of control selections are also contemplated.

According to the FIG. 32 implementation, device E500 includes a keypad, or grouping of controls, which enables the user to enter text in order to interact with the GUI presented on display E505. Each control corresponds to multiple output signals, each output signal associated with a characters. In one aspect, the keypad includes eight controls, labeled "2" to "9", that each correspond to multiple letters and a number. For example, the control labeled "2" corresponds to the letters "A," "B," and "C," and the number "2." In addition, other controls included in the keypad perform other text entry functions. For example, the control labeled "*" is used to change the case of a next character that is output. The control labeled "0" is used to advance to a subsequent character after a current character has been specified, and the control labeled "#" is used to insert a "space" character.

One of the first plurality of output signals is output based at least upon the selection and the angular displacement (step ES309), or at least upon the selection, the angular displacement, and the plurality of tilt regions. Since the first control is associated with a first plurality of output signals, the angular displacement, or the angular displacement and the plurality of tilt regions are used to determine which one of the first plurality of output signals are output. In one aspect, the neutral position of the device is determined in relation to one axis, where three tilt regions are defined around that one axis, and where the first control is associated with three tilt regions. In this case, if the angular displacement is in the first tilt region, the first output signal is output, if the angular displacement is in the second tilt region, the second output signal is output, and if the angular displacement is in the third tilt region, the third output signal is output. In an alternative aspect, the output signal is output based upon the angular displacement and the number of output signals associated with the first control, based upon a formula or an algorithm.

Figure 34A:
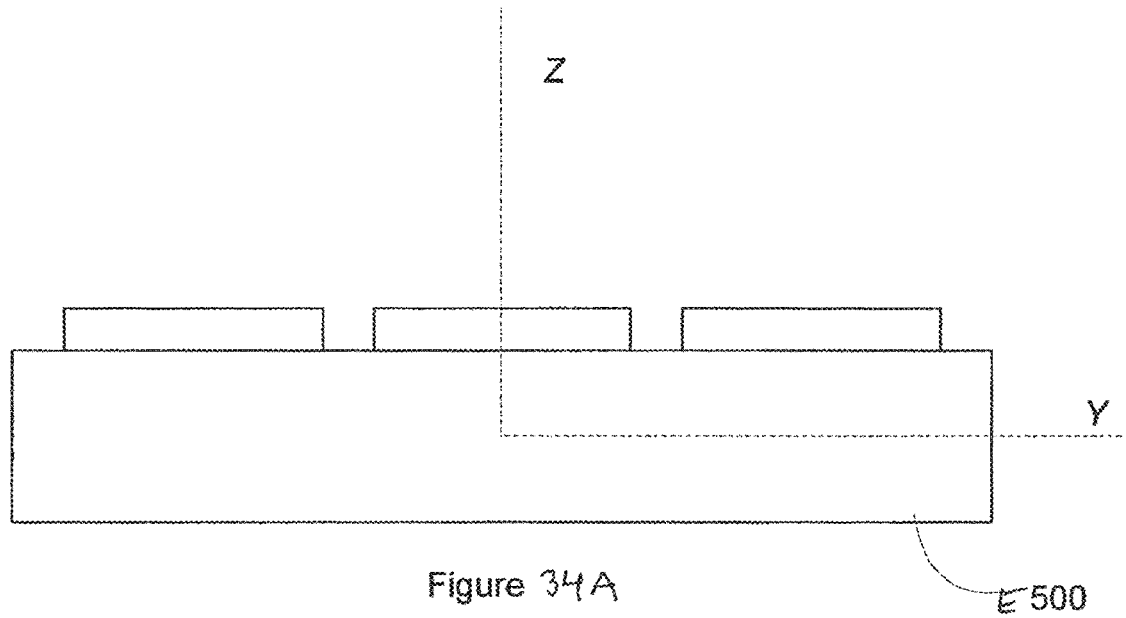
FIGS. 34A and 34B illustrate front and side views, respectively, of the device of FIG. 32, shown in the neutral position, according to some embodiments.
Figure 34B:
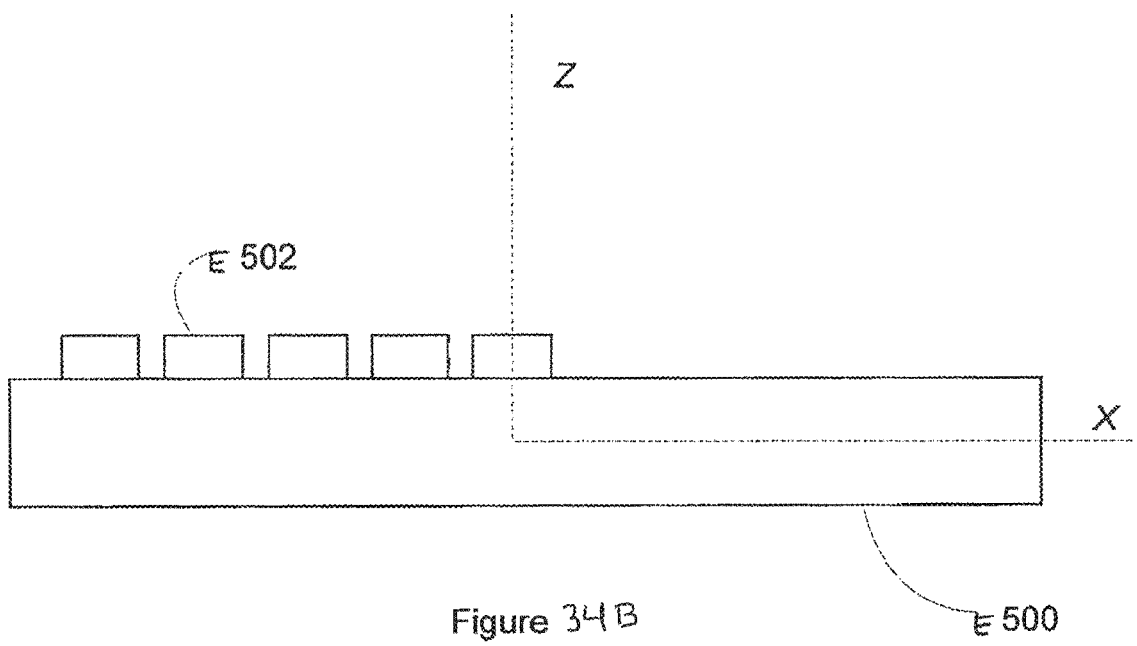
Figure 35A:
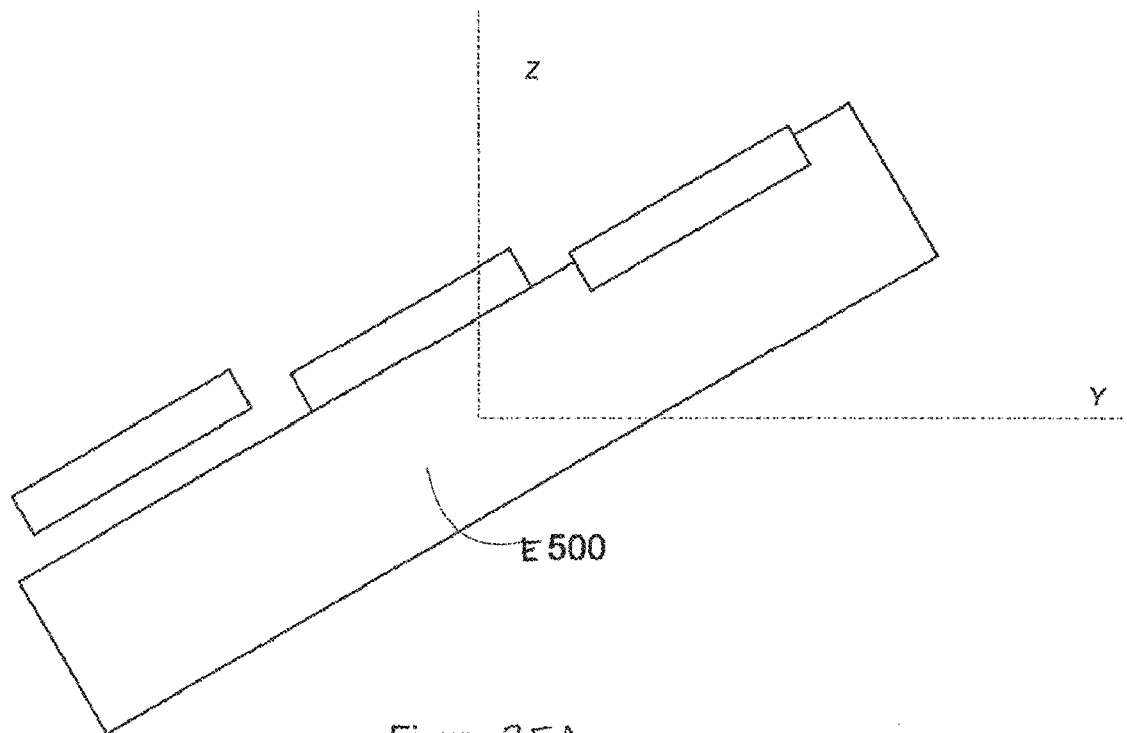
FIGS. 35A and 35B illustrate front views of the device of FIG. 32, shown in a state where the FIG. 32 device is manipulated in a negative roll orientation and a positive roll orientation, respectively, according to some embodiments.
Figure 35B:
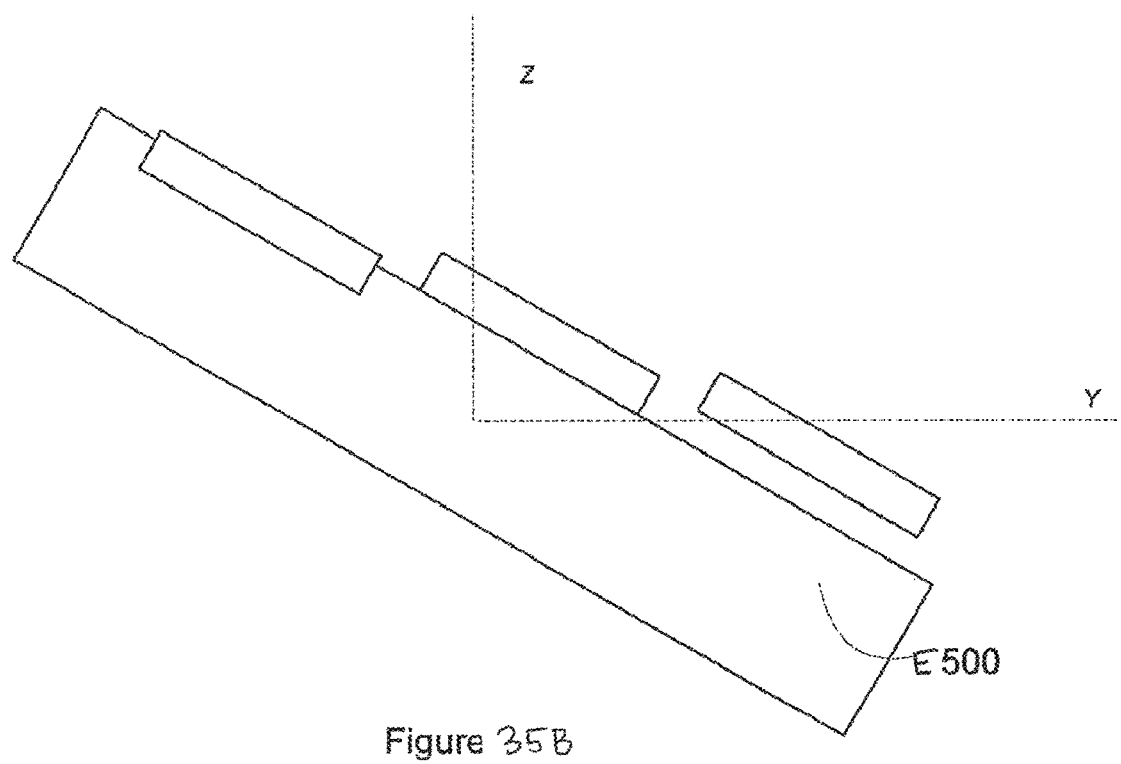
Figure 36A:
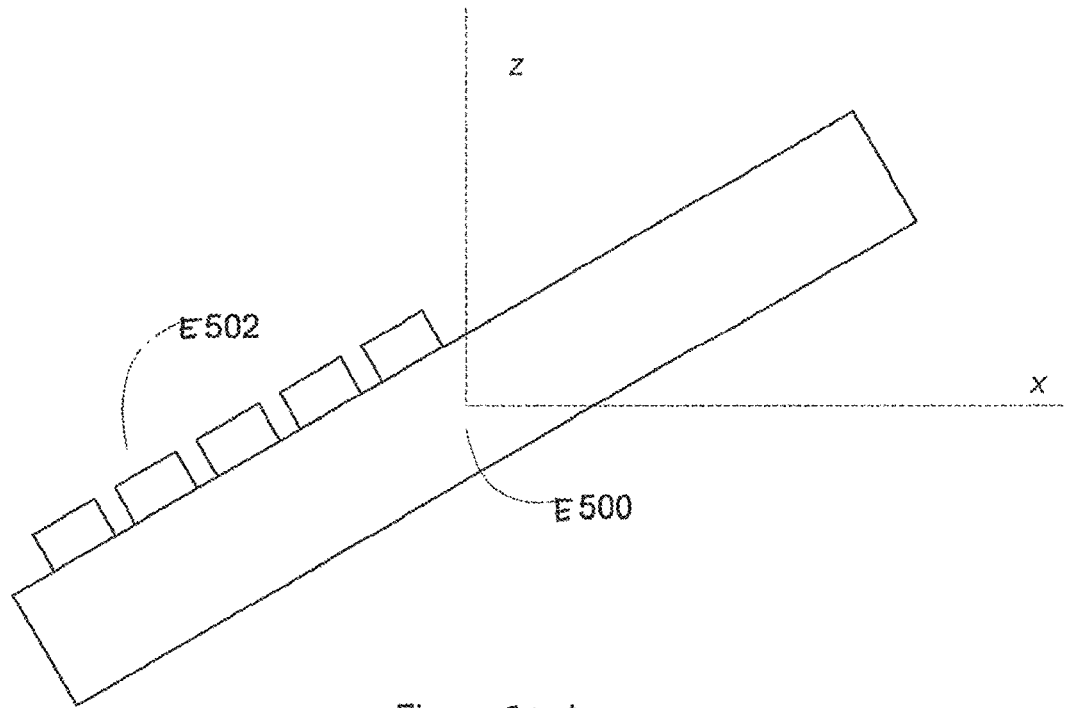
FIGS. 36A and 36B illustrate side views of the device of FIG. 32, shown in a state where the FIG. 32 device is manipulated in a positive pitch orientation and a negative pitch orientation, respectively, according to some embodiments.
Figure 36B:
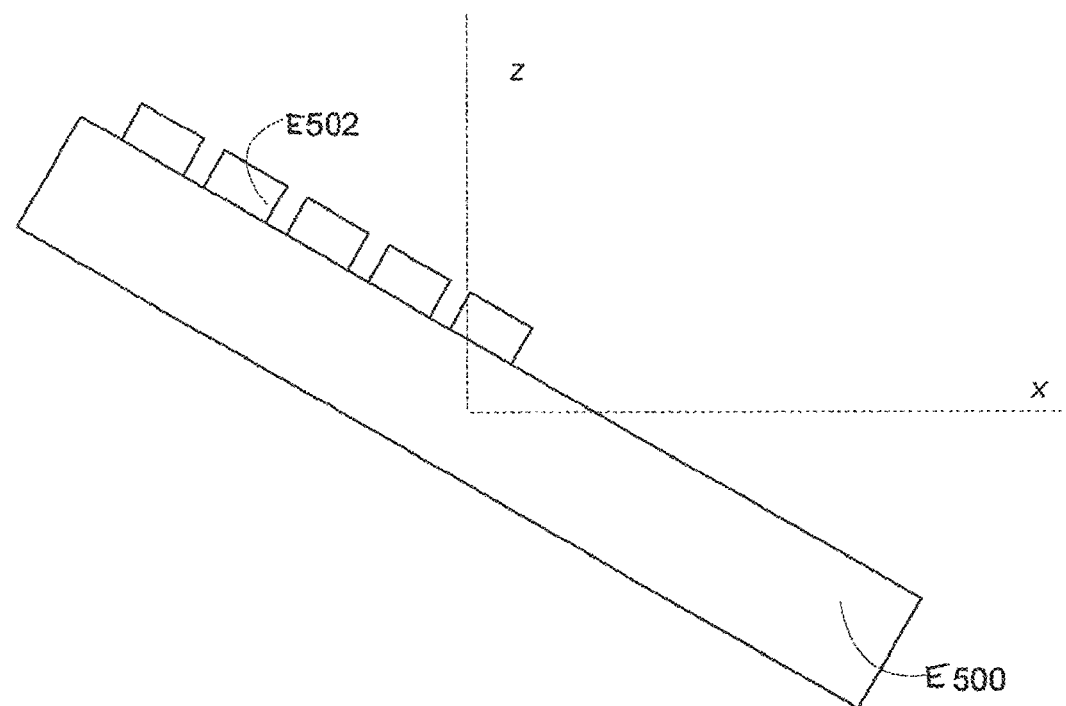

Various figures depict front and side views of the FIG. 32 device in different states of manipulation. In particular, FIGS. 34A and 34B illustrate front and side views, respectively, of device E500 in the neutral position. FIG. 35A illustrates a front view of the device manipulated in a negative roll about the X-axis and FIG. 35B illustrates a front view of the device manipulated in a positive roll about the X-axis. Similarly, FIG. 36A illustrates a side view of the device manipulated in a positive pitch about the Y-axis and FIG. 36B illustrates a side view of the device manipulated in a negative pitch about the Y-axis. In FIGS. 35 and 36, the device has been tilted approximately .+-.30.degree. about the respective axes from the neutral position, shown in FIG. 34.

The orientation of the device, as indicated by the angular displacement measured by the tilt sensor, when a control of the keypad is selected affects the output signal output by the device, affecting, for example, the character generated by the control selection. Each of the multiple characters or output signals represented by a single control of a keypad correspond to a different orientation of the device. When one of the controls of the keypad is selected, the device identifies the plurality of characters that correspond to the selected control and the orientation of the device indicated by the tilt sensor. One of the multiple characters and a case for the character are identified based on the identified orientation, and the identified character is output.

The degree to which the device has been rolled to the left or right when a control is selected affects which one of the multiple characters represented by the control is output. In one implementation, the controls that represent multiple characters represent three letters, and the letters represented by the control are listed from left to right on the control. The device is configured to indicate that the device is rolled left, rolled right, or not rolled left or right. In one such implementation, rolling the device to the left when the control is selected indicates that the leftmost listed character should be output. Similarly, rolling the device to the right when the control is selected indicates that the rightmost listed character should be output. Finally, keeping the device oriented in the neutral position when the control is selected indicates that the center character should be output.

In another implementation, rolling the device to the left when the control is selected indicates that the rightmost listed character should be output, rolling the device to the right when the control is selected indicates that the leftmost listed character should be output, and keeping the device oriented in the neutral position when the control is selected indicates that the center character should be output. Such an implementation may be used, for example, because rolling the device to the left causes the rightmost listed character to appear above and more prominently than the other listed characters, and rolling the device to the right causes the leftmost listed character to appear above and more prominently than the other listed characters.

In other implementations, the controls of the keypad represent more than three characters, such as three letters and a number, or four letters and a number. For example, the control on a conventional telephone labeled "7" corresponds to the letters "P," "Q," "R," and "S," and the number "7." In such a case, the tilt sensor is configured to identify more than three discrete left-to-right roll positions such that one of the more than three characters represented by a selected control may be identified based only on the roll orientation of the device. Each of the discrete roll positions correspond to one of the characters represented by the selected control. For example, if the selected control is the key labeled "7", the device being rolled as illustrated in region E404 of FIG. 31B would indicate that the letter "P" should be output, the device being rolled as illustrated in region E405 of FIG. 31B would indicate that the letter "Q" should be output, the device being rolled as illustrated in region E406 of FIG. 31B would indicate that the letter "R" should be output, the device being rolled as illustrated in region E407 of FIG. 31B would indicate that the letter "S" should be output, and the device being oriented in the neutral position, as illustrated in FIG. 28, would indicate that the number "7" should be output.

While the roll orientation of the device is used to identify a character to be output, the pitch orientation of the device is used to identify a case for the character. In one implementation, the device being pitched (or tilted) forward when a control is selected causes a character that is identified by the roll (left-to-right tilt) orientation of the device to be output in upper case. Similarly, the device not being pitched forward or backward (in a neutral pitch position) when a control is selected causes a character that is identified by the roll (left-to-right tilt) orientation of the device to be output in lower case.

In some implementations, the device being pitched (or tilted) backward may cause a symbol to be output. The symbol may be a symbol corresponding to the number represented by the selected control on a conventional computer keyboard. For example, if the control that represents the number "1" is selected while the device is pitched backward, the symbol "!" may be output, because the symbol "!" corresponds to the number "1" on a conventional computer keyboard (e.g., pressing "Shift" and "1" on a computer keyboard outputs the character "!").

The tilt sensor is capable of detect more tilt positions in the pitch direction than is necessary to indicate the case of the character to be output. As such, the pitch positions that are not used to indicate the case of the character may be used to select the character. For example, a control may represent three letters and a number, and three roll positions may be used to select among the three letters. Two pitch positions may select the case for letters, and a third pitch tilt position may select the number represented by the key.

Furthermore, the tilt sensor independently indicates whether the device has been rolled left, neutral, or right or whether the device has pitched forward, neutral, or backwards, thereby allowing the tilt sensor to indicate whether the device is in one of nine orientations. Each of the nine orientations may correspond to a character and a case for the character.

FIG. 37 is a table showing one possible mapping of device orientations to output signals corresponding to characters and cases that may be output when the control labeled "2" on the keypad is selected. In the illustrated mapping, the device being rolled left and pitched forward causes the capital letter "A" to be output, the device not being rolled or pitched in either direction case the lower case letter "b" to be output, and the device being pitched backwards causes the number "2" to be output. In other implementations in which the tilt sensor may identify more than three roll positions or more than three pitch positions, more orientations that may be mapped to characters and cases are available.

Output signals corresponding to characters are described as being selected based on a first axis angular displacement or tilt position of the device, and output signals corresponding to upper or lower cases for the characters are described throughout as being selected based on a second axis angular displacement or position of the device. In other implementations, the angular displacement in different axes may effectuate the output of signals corresponding to characters or upper and lower cases of characters. In general, any orientation of the device may be mapped to any character and case for the character, regardless of which of the axes was used to select the character or the case.

Figures 38A, 38B:
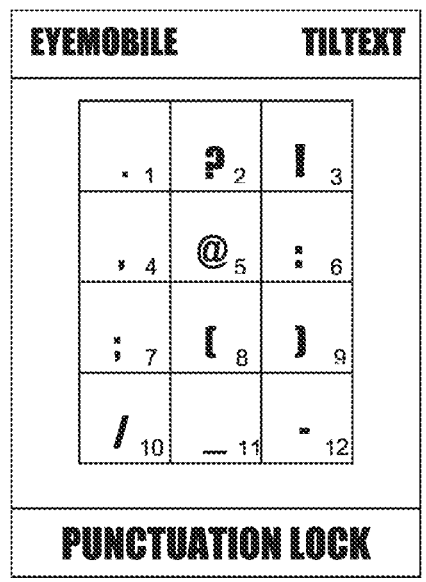
FIGS. 38A and 38B illustrate a menu of symbols that is displayed in accordance with another exemplary implementation, according to some embodiments.

In addition to outputting a signal corresponding to a character that is output in response to selection of a control, the orientation of the device may be used to indicate a menu option that is to be selected. For example, selection of a control that does not correspond to any characters, such as the "1" key on a telephone, causes a menu to be presented on the display of the telephone, where each option of the menu correspond to a different orientation of the telephone. The orientation of the device when a control indicating that a selection from the menu should be made (e.g., an "OK" key, an "Enter" key, or the "1" key) is selected may indicate which of the menu options is selected. In one aspect, a menu of symbols similar to what is illustrated in FIGS. 38A and 38B is displayed when the "1" key is selected. Tilting the device and selecting the "1" key again may cause a corresponding symbol to be output. After a symbol has been output, letters and numbers may be output, as described above, until the "1" key is selected again to display the symbol menu. Fully inverting the device, shaking the device, or otherwise moving the device in a manner that is not interpreted as a tilt of the device generates another menu.

A first output signal is output if the angular displacement is within the first tilt region when the selection is received, where a second output signal is output if the angular displacement is within the second tilt region when the selection is received. Furthermore, a third or fourth output signal is output if the angular displacement is within the third or fourth tilt region, respectively, when the selection is received.

If a plurality of first-axis tilt regions are defined about the first axis and a plurality of second-axis tilt regions are defined about the second axis, the one of the first plurality of output signals may be also output based upon the plurality of first-axis tilt regions and/or the plurality of second-axis tilt regions. When the selection is received, a first output signal may be output if the first-axis component is within a first first-axis tilt region and if the second-axis component is within a first second-axis tilt region, a second output signal may be output if the first-axis component is within a second first-axis tilt region and if the second-axis component is within the first second-axis tilt region, a third output signal may be output if the first-axis component is within the second first-axis tilt region and if the second-axis component is within a second second-axis tilt region, and/or a fourth output signal may be output if the first-axis component is within the second first-axis tilt region and if the second-axis component is within the second second-axis tilt region.

Alternatively, in another aspect, when the selection is received, a first output signal may be output if the first component is within a first first-axis tilt region and if the second-axis component is within a first second-axis tilt region, a second output signal may be output if the first component is within the first first-axis tilt region and if the second-axis component is within a second second-axis tilt region, a third output signal may be output if the first component is within the first first-axis tilt region and if the second-axis component is within a third second-axis tilt region, a fourth output signal may be output if the first component is within a second first-axis tilt region and if the second-axis component is within the first second-axis tilt region, a fifth output signal may be output if the first component is within the second first-axis tilt region and if the second-axis component is within the second second-axis tilt region, a sixth output signal may be output if the first component is within the second first-axis tilt region and if the second-axis component is within the third second-axis tilt region, a seventh output signal may be output if the first component is within a third first-axis tilt region and if the second-axis component is within the first second-axis tilt region, an eighth output signal may be output if the first component is within the third first-axis tilt region and if the second-axis component is within the second second-axis tilt region, and/or a ninth output signal may be output if the first component is within the third first-axis tilt region and if the second-axis component is within the third second-axis tilt region.

The output signal is displayed (step ES310), and method E300 ends (step ES311). The output signal is displayed on a display, such as display E105. In an alternate aspect, the output signal is not displayed.

In the FIG. 32 implementation, device E500 also includes display E505, which is used to present a graphical user interface ("GUI") to a user of device E500. The GUI enables a user of device E500 to perform functions that require the user to enter text into device E500. For example, the user may identify an entry for a person within a phonebook stored on device E500 by entering a name of the person. As another example, the user may add an entry for a person to the phonebook by entering information describing the person, such as the person's name and one or more phone numbers used by the person. Furthermore, the GUI enables the user to specify a text message that is to be sent from device E500 or to specify another textual note that is to be stored on device E500. Device E500 also displays a GUI that enables a user to specify a text message.

Interpreting control selections based on device orientations when the control selections are made increases the number of operations that may be performed with a single control selection. For example, each control selection may be interpreted in a number of manners that is equal to the number of distinct orientations of the device that may be detected. Furthermore, the orientation of the device may indicate how selection of control that do not correspond to any characters may be interpreted. Therefore, a user may be enabled to quickly perform relatively complex operations simply by tilting the device and selecting controls. For example, selecting the "*" key while the device is rolled to the left may cause a particular mode of text entry (e.g., numbers only, all capital letters) to be used for text entry until the next time the "*" key is selected when the device is rolled to the left. In another aspect, the tilt sensor effectuates tilt scrolling, such that, upon receipt of the selection of a control, a user interface is scrolled corresponding to the direction of the tilt. A forward pitch occurring at the time of control selection, for example, would result in the user interface, or a menu item on the user interface, scrolling upward.

According to another general aspect, a computer program product, tangibly stored on a computer-readable medium, is recited. The computer program product is operable to cause a computer to perform operations including determining a neutral position of a device in relation to at least a first axis, the device including at least a first control associated with a first plurality of output signals, and measuring an angular displacement of the device about at least the first axis. The computer program product is also operable to cause a computer to perform operations including receiving a selection of the first control, and outputting one of the first plurality of output signals based at least upon the selection and the angular displacement.

Finally, although a number of implementations have been described or exemplified as a telephone device, it is contemplated that the concepts related herein are by no means limited to telephony, and are in fact applicable to a broad variety of devices, including any device in which the number of controls is minimized due to device design and layout restrictions. Sample devices include computer keyboards, remote controls, watches, joysticks or game controllers, or other computer input or consumer electronic devices.

Accordingly, a number of implementations have been described. Nevertheless, it will be understood that various modifications may be made. For example, elements of different implementations may be combined, supplemented, or removed to produce other implementations. Further, various technologies may be used, combined, and modified to produce an implementation, such technologies including, for example, a variety of digital electronic circuitry, hardware, software, firmware, integrated components, discrete components, processing devices, memory storage devices, communication devices, lenses, filters, display devices, and projection devices.

Game System

Figure 39:
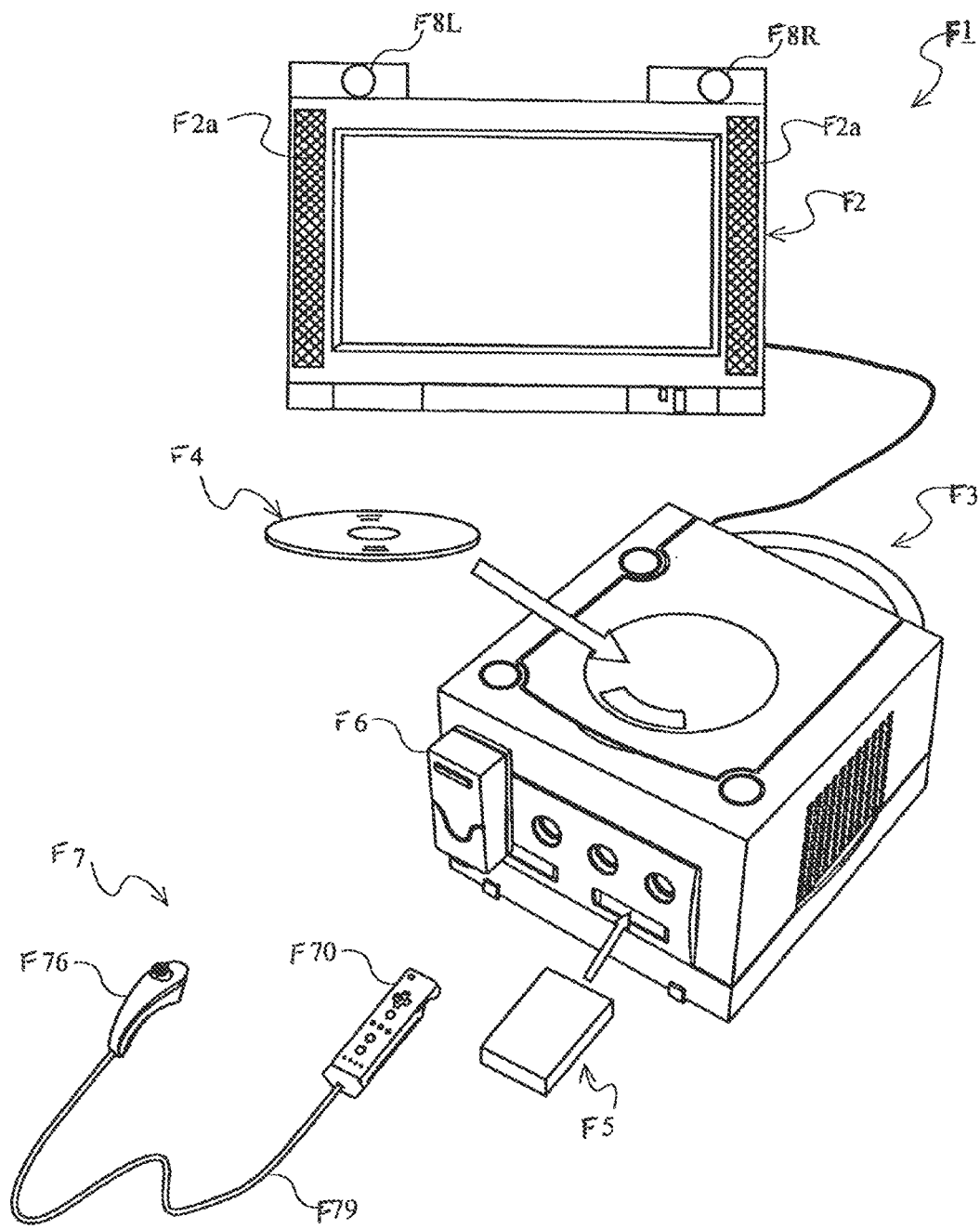
FIG. 39 is an external view illustrating a game system F1 according to some embodiments.

With reference to FIG. 39, a game system 39 according to some embodiments will be described. FIG. 39 is an external view illustrating the game system 39. In the following description, the game system 39 according to some embodiments includes a stationary game apparatus.

As shown in FIG. 39, the game system F1 includes a stationary game apparatus (hereinafter, referred to simply as a "game apparatus") F3, which is connected to a display (hereinafter, referred to as a "monitor") F2 of a home-use television receiver or the like having a speaker F2a via a connection cord, and a controller F7 for giving operation information to the game apparatus F3. The game apparatus F3 is connected to a receiving unit F6 via a connection terminal. The receiving unit F6 receives transmission data which is wirelessly transmitted from the controller F7. The controller F7 and the game apparatus F3 are connected to each other by wireless communication. On the game apparatus F3, an optical disc F4 as an example of an exchangeable information storage medium is detachably mounted. The game apparatus F3 includes a power ON/OFF switch, a game process reset switch, and an OPEN switch for opening a top lid of the game apparatus F3 on a top main surface of the game apparatus F3. When a player presses the OPEN switch, the lid is opened, so that the optical disc F4 can be mounted or dismounted.

Further, on the game apparatus F3, an external memory card F5 is detachably mounted when necessary. The external memory card F5 has a backup memory or the like mounted thereon for fixedly storing saved data or the like. The game apparatus F3 executes a game program or the like stored on the optical disc F4 and displays the result on the monitor F2 as a game image. The game apparatus F3 can also reproduce a state of a game played in the past using saved data stored in the external memory card F5 and display the game image on the monitor F2. A player playing with the game apparatus F3 can enjoy the game by operating the controller F7 while watching the game image displayed on the monitor F2.

The controller F7 wirelessly transmits the transmission data from a communication section F75 included therein (described later) to the game apparatus F3 connected to the receiving unit F6, using the technology of, for example, Bluetooth (registered trademark). The controller F7 has two control units, a core unit F70 and a subunit F76, connected to each other by a flexible connecting cable F79. The controller F7 is an operation means for mainly operating a player object appearing in a game space displayed on the monitor F2. The core unit F70 and the subunit F76 each includes an operation section such as a plurality of operation buttons, a key, a stick and the like. As described later in detail, the core unit F70 includes an imaging information calculation section F74 for taking an image viewed from the core unit F70. As an example of an imaging target of the imaging information calculation section F74, two LED modules F8L and F8R are provided in the vicinity of a display screen of the monitor F2. The LED modules F8L and FOR each outputs infrared light forward from the monitor F2. Although in the present embodiment the core unit F70 and the subunit F76 are connected to each other by the flexible cable, the subunit F76 may have a wireless unit, thereby eliminating the connecting cable F79. For example, the subunit F76 has a Bluetooth (registered trademark) unit as the wireless unit, whereby the subunit F76 can transmit operation data to the core unit F70.

Figure 40:
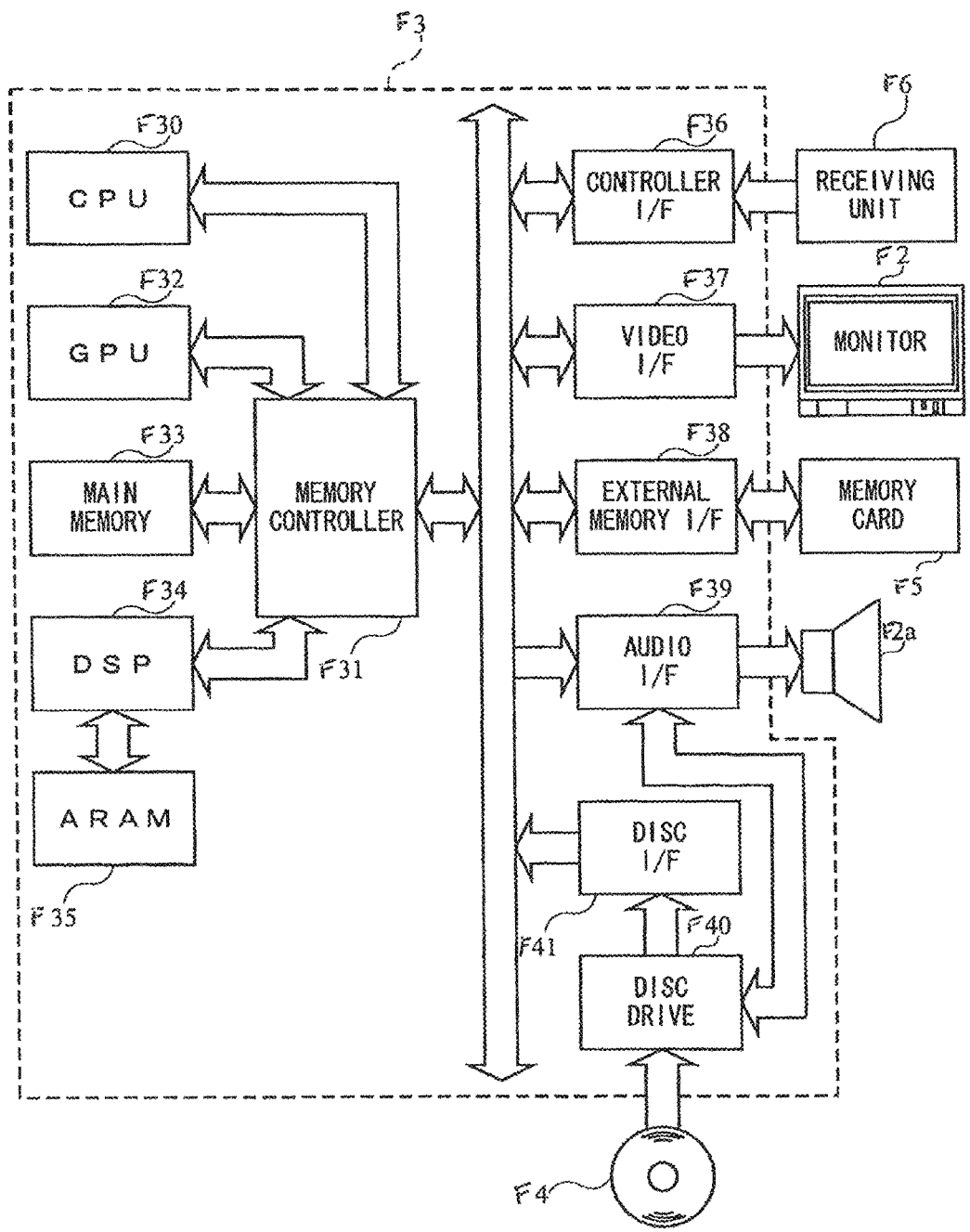
FIG. 40 is a functional block diagram of a game apparatus F3 shown in FIG. 39.

Next, with reference to FIG. 40, a structure of the game apparatus F3 will be described. FIG. 40 is a functional block diagram of the game apparatus F3.

As shown in FIG. 40, the game apparatus F3 includes, for example, a RISC CPU (central processing unit) F30 for executing various types of programs. The CPU F30 executes a boot program stored in a boot ROM (not shown) to, for example, initialize memories including a main memory F33, and then executes a game program stored on the optical disc F4 to perform game process or the like in accordance with the game program. The CPU F30 is connected to a GPU (Graphics Processing Unit) F32, the main memory F33, a DSP (Digital Signal Processor) F34, and an ARAM (audio RAM) F35 via a memory controller F31. The memory controller F31 is connected to a controller I/F (interface) F36, a video I/F F37, an external memory I/F F38, an audio I/F F39, and a disc I/F F41 via a predetermined bus. The controller I/F F36, the video I/F F37, the external memory I/F F38, the audio I/F F39 and the disc I/F F41 are respectively connected to the receiving unit F6, the monitor F2, the external memory card F5, the speaker F2a, and a disc drive F40.

The GPU F32 performs image processing based on an instruction from the CPU F30. The GPU F32 includes, for example, a semiconductor chip for performing calculation process necessary for displaying 3D graphics. The GPU F32 performs the image process using a memory dedicated for image process (not shown) and a part of the storage area of the main memory F33. The GPU F32 generates game image data and a movie to be displayed on the monitor F2 using such memories, and outputs the generated data or movie to the monitor F2 via the memory controller F31 and the video I/F F37, as necessary.

The main memory F33 is a storage area used by the CPU F30, and stores a game program or the like necessary for processing performed by the CPU F30, as necessary. For example, the main memory F33 stores a game program read from the optical disc F4 by the CPU F30, various types of data or the like. The game program, the various types of data or the like stored in the main memory F33 are executed by the CPU F30.

The DSP F34 processes sound data or the like generated by the CPU F30 during the execution of the game program. The DSP F34 is connected to the ARAM F35 for storing the sound data or the like. The ARAM F35 is used when the DSP F34 performs a predetermined process (for example, storage of the game program or sound data already read).

The DSP F34 reads the sound data stored in the ARAM F35, and outputs the sound data to the speaker F2a included in the monitor F2 via the memory controller F31 and the audio I/F F39.

The memory controller F31 comprehensively controls data transmission, and is connected to the various I/Fs described above. The controller I/F F36 includes, for example, four controller I/Fs F36a, F36b, F36c and F36d, and communicably connects the game apparatus F3 to an external device which is engageable via connectors of the controller I/Fs F36a, F36b, F36c and F36d. For example, the receiving unit F6 is engaged with such a connector and is connected to the game apparatus F3 via the controller I/F F36. As described above, the receiving unit F6 receives the transmission data from the controller F7 and outputs the transmission data to the CPU F30 via the controller I/F F36. The video I/F F37 is connected to the monitor F2. The external memory I/F F38 is connected to the external memory card F5 and is accessible to a backup memory or the like provided in the external memory card F5. The audio I/F F39 is connected to the speaker F2a built in the monitor F2 such that the sound data read by the DSP F34 from the ARAM F35, or sound data directly outputted from the disc drive F40 can be outputted from the speaker F2a. The disc I/F F41 is connected to the disc drive F40. The disc drive F40 reads data stored at a predetermined reading position of the optical disc F4 and outputs the data to a bus of the game apparatus F3 or the audio I/F F39.

Figure 41:
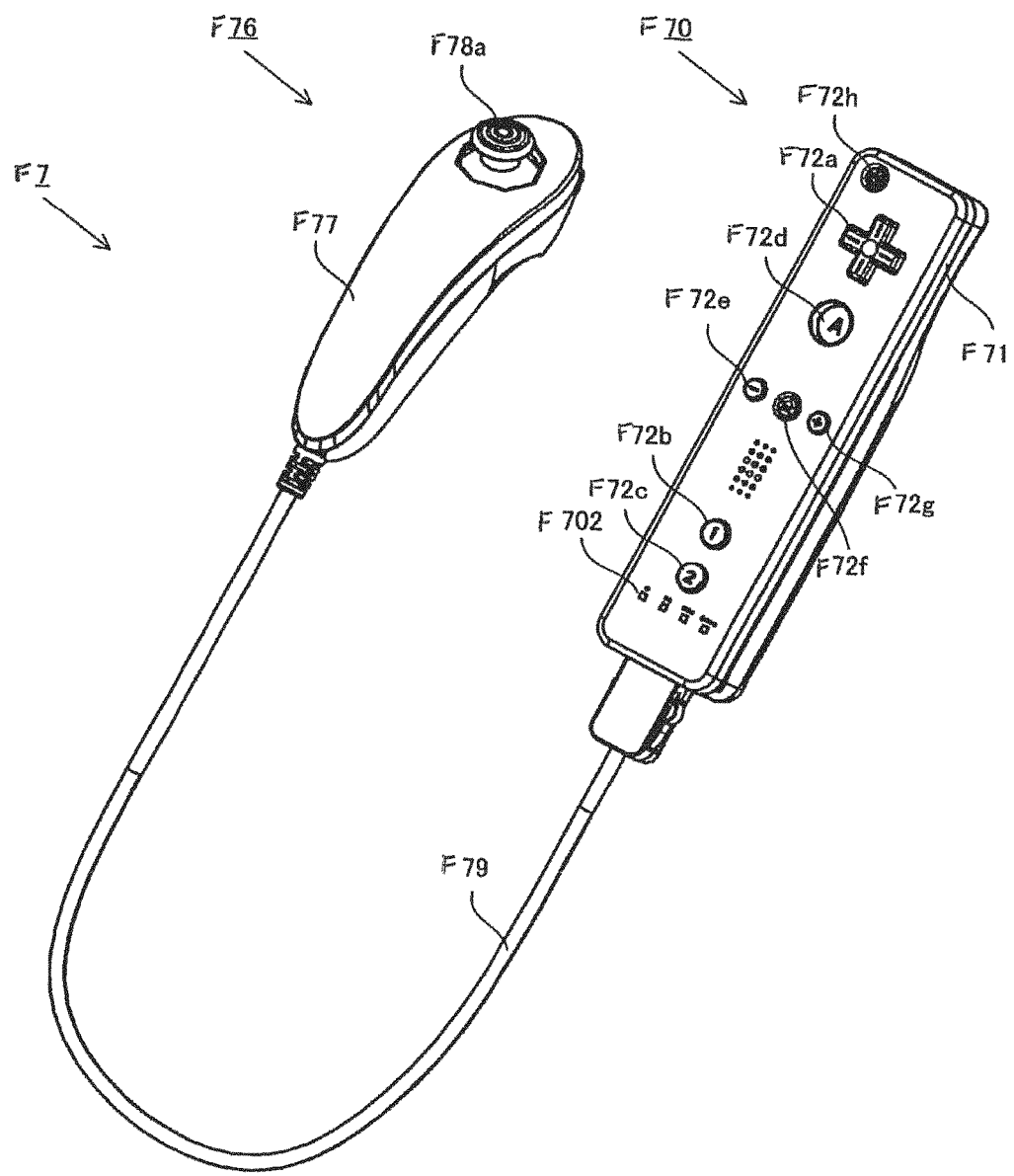
FIG. 41 is a perspective view illustrating an outer appearance of a controller F7 shown in FIG. 39.
Figure 42:
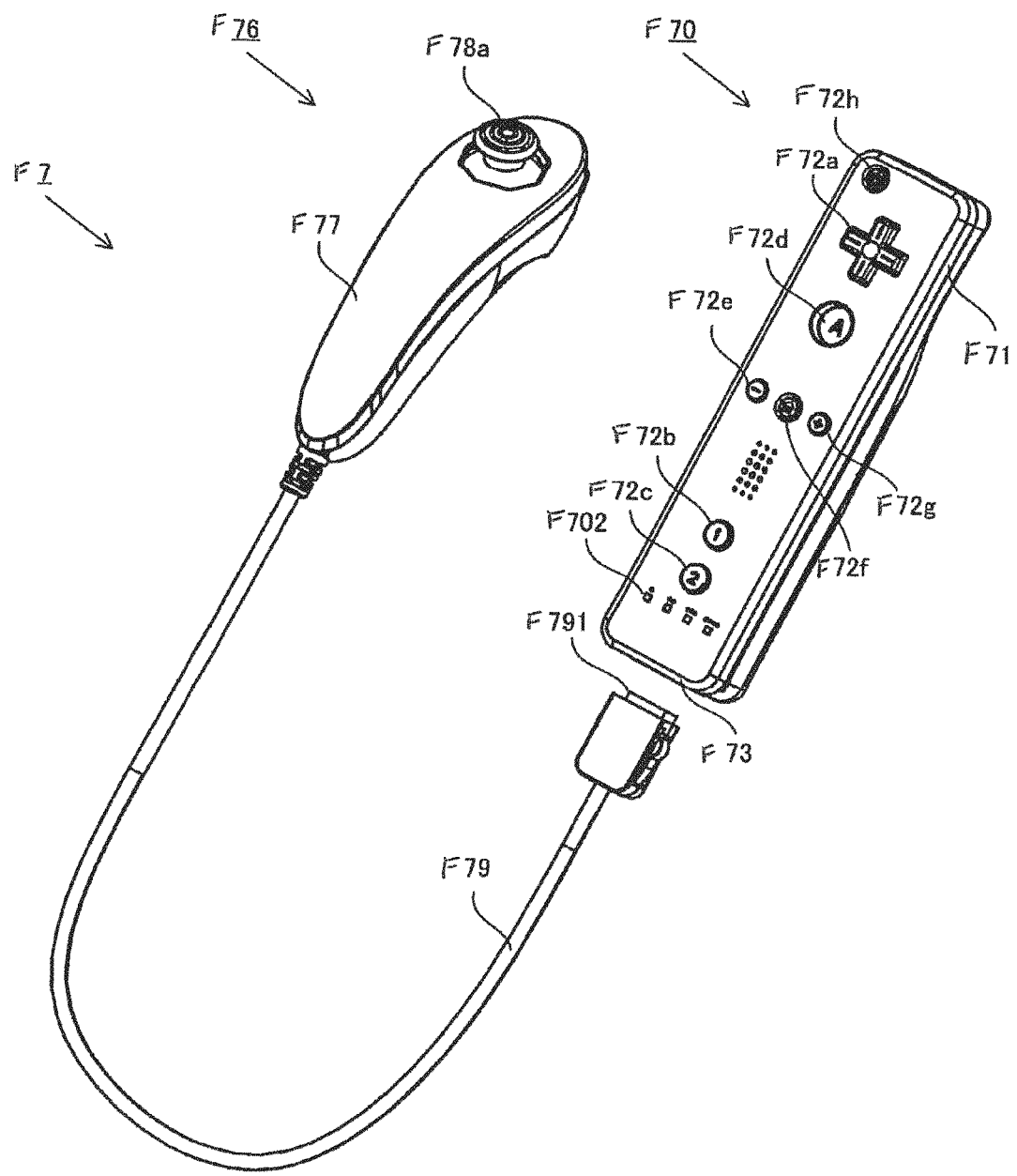
FIG. 42 is a perspective view illustrating a state of a connecting cable F79 of the controller F7 shown in FIG. 41 being connected to or disconnected from a core unit F70.

Next, with reference to FIGS. 41 and 42, the controller F7 will be described. FIG. 41 is a perspective view illustrating an outer appearance of the controller F7. FIG. 42 is a perspective view illustrating a state of the connecting cable F79 of the controller F7 shown in FIG. 41 being connected to or disconnected from the core unit F70.

As shown in FIG. 41, the controller F7 includes the core unit F70 and the subunit F76 connected to each other by the connecting cable F79. The core unit F70 has a housing F71 including a plurality of operation sections F72. The subunit F76 has a housing F77 including a plurality of operation sections F78. The core unit F70 and the subunit F76 are connected to each other by the connecting cable F79.

As shown in FIG. 42, the connecting cable F79 has a connector F791 detachably connected to the connector F73 of the core unit F70 at one end thereof, and the connecting cable F79 is fixedly connected to the subunit F76 at the other end thereof. The connector F791 of the connecting cable F79 is engaged with the connector F73 provided at the rear surface of the core unit F70 so as to connect the core unit F70 and the subunit F76 to each other by the connecting cable F79.

Figure 43:
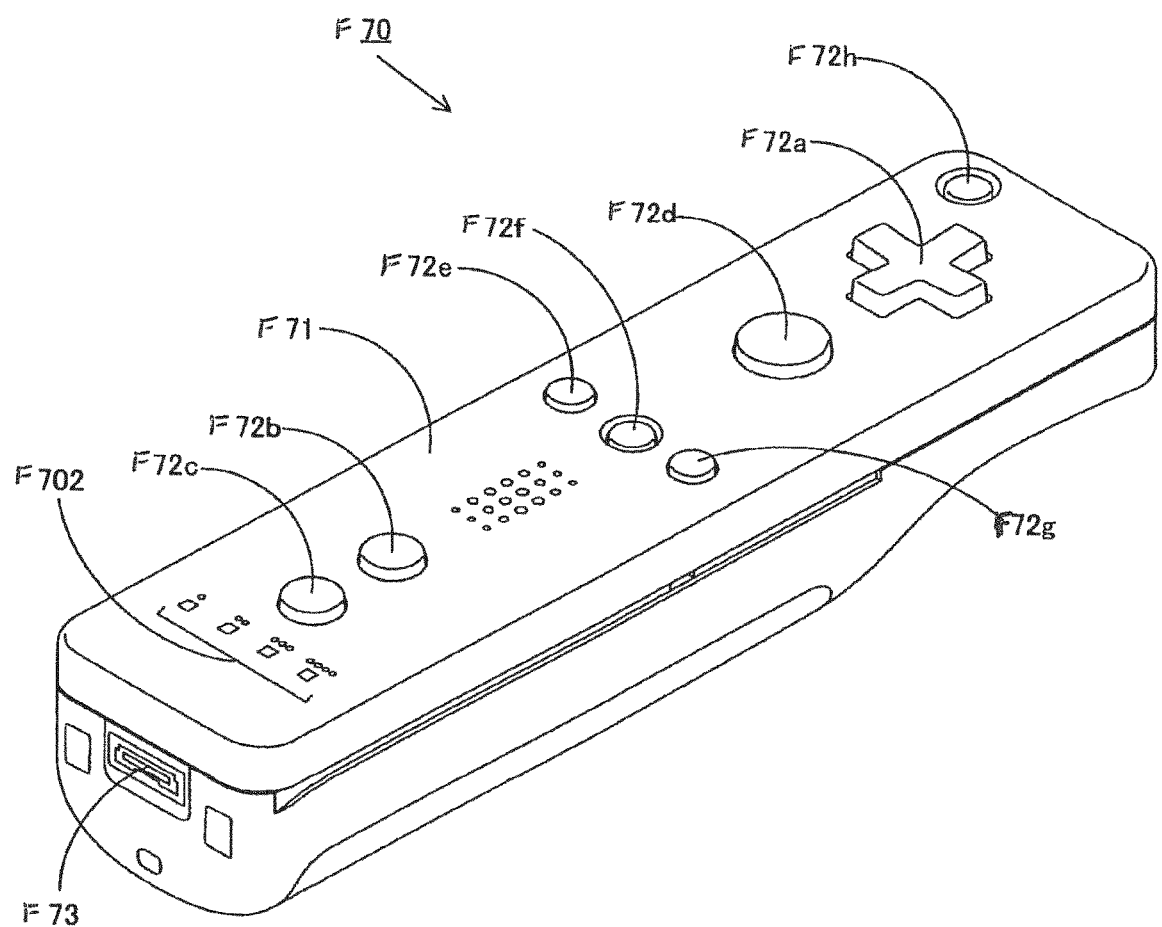
FIG. 43 is a perspective view of the core unit F70 shown in FIG. 41 as seen from the top rear side thereof.
Figure 44:
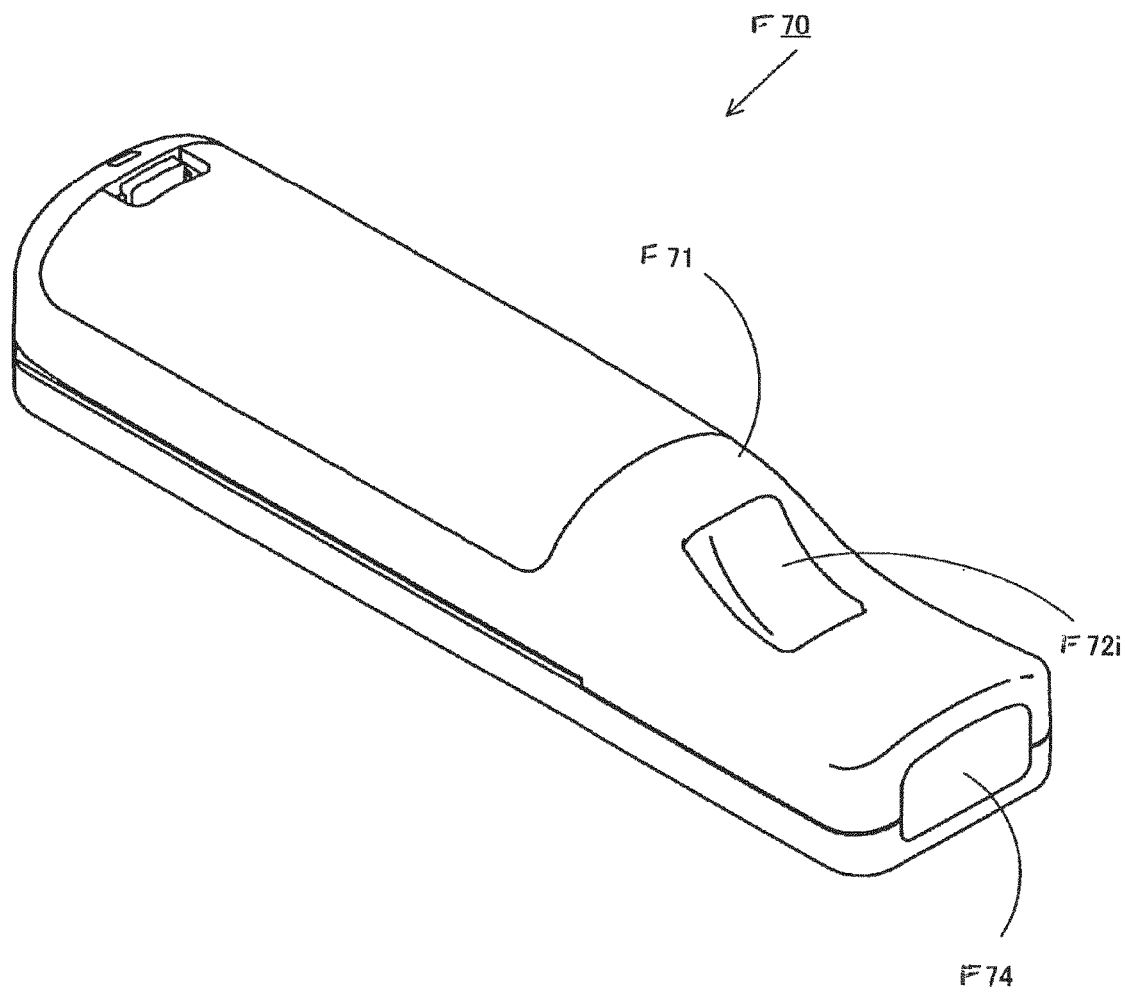
FIG. 44 is a perspective view of the core unit F70 shown in FIG. 41 as seen from the bottom front side thereof.

With reference to FIGS. 43 and 44, the core unit F70 will be described. FIG. 43 is a perspective view of the core unit F70 as seen from the top rear side thereof. FIG. 44 is a perspective view of the core unit F70 as seen from the bottom front side thereof.

As shown in FIGS. 43 and 44, the core unit F70 includes the housing F71 formed by plastic molding or the like. The housing F71 has a generally parallelepiped shape extending in a longitudinal direction from front to rear. The overall size of the housing F71 is small enough to be held by one hand of an adult or even a child.

At the center of a front part of a top surface of the housing F71, a cross key F72a is provided. The cross key F72a is a cross-shaped four-direction push switch. The cross key F72a includes operation portions corresponding to the four directions (front, rear, right and left) represented by arrows, which are respectively located on cross-shaped projecting portions arranged at intervals of 90 degrees. The player selects one of the front, rear, right and left directions by pressing one of the operation portions of the cross key F72*a*. Through an operation on the cross key F72*a*, the player can, for example, instruct a direction in which a player character or the like appearing in a virtual game world is to move or a direction in which the cursor is to move.

Although the cross key F72*a* is an operation section for outputting an operation signal in accordance with the aforementioned direction input operation performed by the player, such an operation section may be provided in another form. For example, the cross key F72*a* may be replaced with a composite switch including a push switch including a ring-shaped four-direction operation section and a center switch provided at the center thereof. Alternatively, the cross key F72*a* may be replaced with an operation section which includes an inclinable stick projecting from the top surface of the housing F71 and outputs an operation signal in accordance with the inclining direction of the stick. Still alternatively, the cross key F72*a* may be replaced with an operation section which includes a disc-shaped member horizontally slidable and outputs an operation signal in accordance with the sliding direction of the disc-shaped member. Still alternatively, the cross key F72*a* may be replaced with a touch pad. Still alternatively, the cross key F72*a* may be replaced with an operation section which includes switches representing at least four directions (front, rear, right and left) and outputs an operation signal in accordance with the switch pressed by the player.

Behind the cross key F72*a* on the top surface of the housing F71, a plurality of operation buttons F72*b*, F72*c*, F72*d*, F72*e*, F72*f* and F72*g* are provided. The operation buttons F72*b*, F72*c*, F72*d*, F72*e*, F72*f* and F72*g* are each an operation section for outputting a respective operation signal assigned to the operation buttons F72*b*, F72*c*, F72*d*, F72*e*, F72*f* or F72*g* when the player presses a head thereof. For example, the operation buttons F72*b*, F72*c*, and F72*d* are assigned with functions of a first button, a second button, and an A button. Further, the operation buttons F72*e*, F72*f* and F72*g* are assigned with functions of a minus button, a home button and a plus button, for example. The operation buttons F72*b*, F72*c*, F72*d*, F72*e*, F72*f* and F72*g* are assigned with respective functions in accordance with the game program executed by the game apparatus F3. In an exemplary arrangement shown in FIG. 43, the operation buttons F72*b*, F72*c* and F72*d* are arranged in a line at the center in the front-rear direction on the top surface of the housing F71. The operation buttons F72*e*, F72*f* and F72*g* are arranged in a line in the left-right direction between the operation buttons F72*b* and F72*d* on the top surface of the housing F71. The operation button F72*f* has a top surface thereof buried in the top surface of the housing F71, so as not to be inadvertently pressed by the player.

In front of the cross key F72*a* on the top surface of the housing F71, an operation button F72*h* is provided. The operation button F72*h* is a power switch for remote-controlling the power of the game apparatus 3 to be on or off. The operation button F72*h* also has a top surface thereof buried in the top surface of the housing F71, so as not to be inadvertently pressed by the player.

Behind the operation button F72*c* on the top surface of the housing F71, a plurality of LEDs F702 are provided. The controller F7 is assigned a controller type (number) so as to be distinguishable from the other controllers F7. For example, the LEDs F702 are used for informing the player of the controller type which is currently set to controller F7 that he or she is using. Specifically, when the core unit F70 transmits the transmission data to the receiving unit F6, one of the plurality of LEDs F702 corresponding to the controller type is lit up.

On the top surface of the housing F71, a sound hole for externally outputting a sound from a speaker F706 shown in FIG. 45, which will be described below, is provided between the operation buttons F72*e*, F72*f*, and F72*g* and the operation button F72*b*.

On a bottom surface of the housing F71, a recessed portion is formed. As described later in detail, the recessed portion is formed at a position at which an index finger or middle finger of the player is located when the player holds the core unit F70. On a rear slope surface of the recessed portion, an operation button F72*i* is provided. The operation button F72*i* is an operation section acting as, for example, a B button. The operation button F72*i* is used, for example, as a trigger switch in a shooting game, or for attracting attention of a player object to a predetermined object.

On a front surface of the housing F71, an image pickup element F743 included in the imaging information calculation section F74 is provided. The imaging information calculation section F74 is a system for analyzing image data taken by the core unit F70 and detecting for the centroid, the size and the like of an area having a high brightness in the image data. The imaging information calculation section F74 has, for example, a maximum sampling period of about 200 frames/sec., and therefore can trace and analyze even a relatively fast motion of the core unit F70. The imaging information calculation section F74 will be described later in detail. On a rear surface of the housing F71, the connector F73 is provided. The connector F73 is, for example, a 32-pin edge connector, and is used for engaging and connecting the core unit F70 with the connector F791 of the connecting cable F79.

Figure 45:
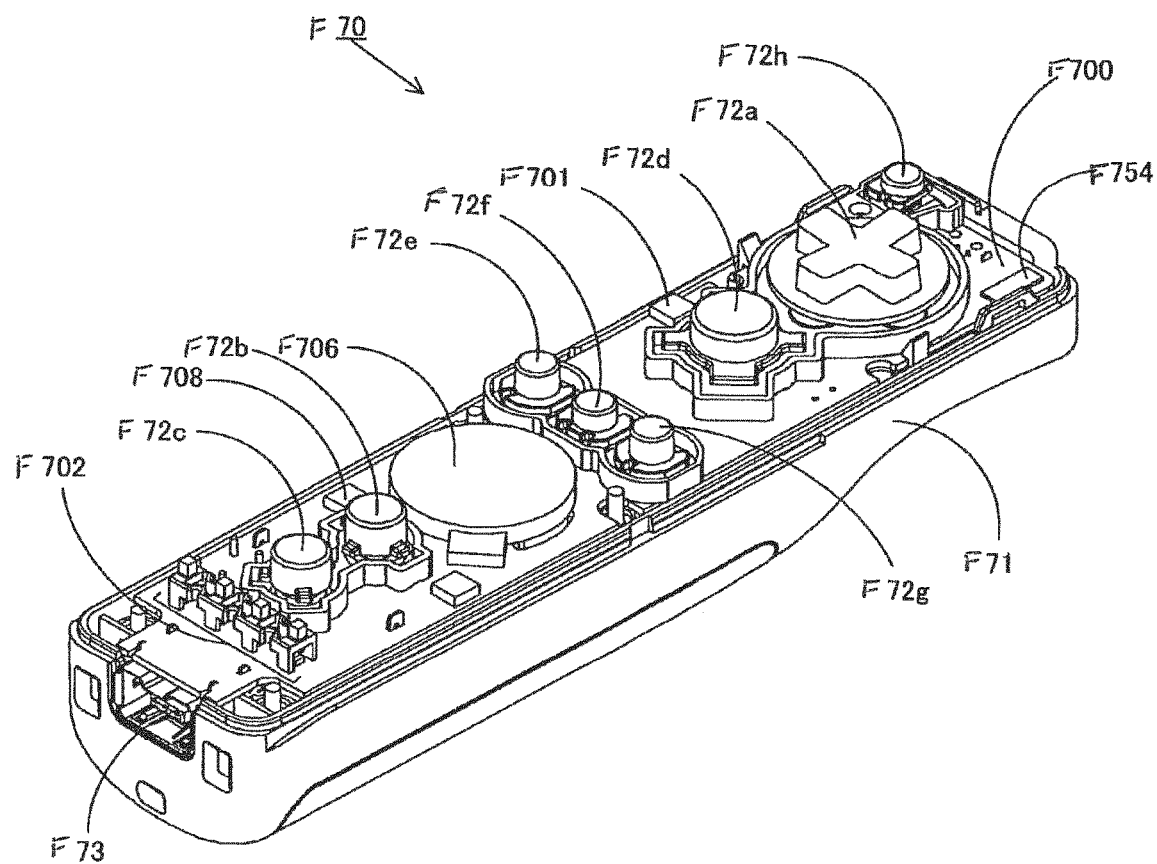
FIG. 45 is a perspective view illustrating a state where an upper casing of the core unit F70 shown in FIG. 41 is removed.
Figure 46:
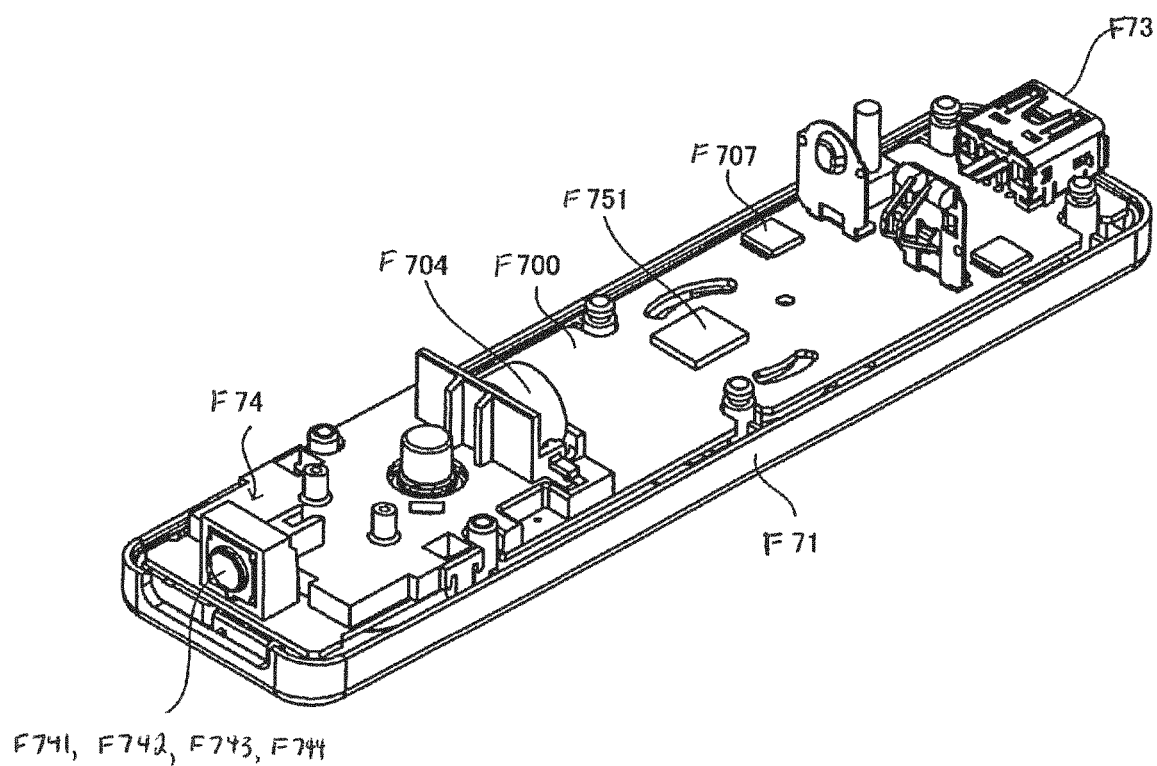
FIG. 46 is a perspective view illustrating a state where a lower casing of the core unit F70 shown in FIG. 41 is removed.

With reference to FIGS. 45 and 46, an internal structure of the core unit F70 will be described. FIG. 45 is a perspective view illustrating, as seen from the rear side of the core unit F70, a state where an upper casing (a part of the housing F71) of the core unit F70 is removed. FIG. 46 is a perspective view illustrating, as seen from the front side of the core unit F70, a state where a lower casing (a part of the housing F71) of the core unit F70 is removed. FIG. 46 is a perspective view illustrating a reverse side of a substrate F700 shown in FIG. 45.

As shown in FIG. 45, the substrate F700 is fixed inside the housing F71. On a top main surface of the substrate F700, the operation buttons F72*a*, F72*b*, F72*c*, F72*d*, F72*e*, F72*f*, F72*g* and F72*h*, an acceleration sensor F701, the LEDs F702, an antenna F754 and the like are provided. These elements are connected to a micro computer F751 (see FIGS. 46 and 55) and the like via lines (not shown) formed on the substrate F700 and the like. The wireless module F753 not shown (see FIG. 55) and the antenna F754 allow the core unit F70 to act as a wireless controller. The quartz oscillator F703 not shown, which is provided in the housing F71, generates a reference clock of the micro computer F751 described later. On the top main surface of the substrate F700, the speaker F706 and an amplifier F708 are provided. The acceleration sensor F701 is provided near the edge of the substrate F700 offset from the center thereof. Therefore, a change of a direction of the gravitational acceleration and an acceleration containing a centrifugal force component can be detected based on a rotation of the core unit F70 about the longitudinal direction thereof, so that a predetermined calculation is used to determine the rotation of the core unit F70 with favorable accuracy based on the acceleration data having been detected.

As shown in FIG. 46, at a front edge of a bottom main surface of the substrate F700, the imaging information calculation section F74 is provided. The imaging information calculation section F74 includes an infrared filter F741, a lens F742, the image pickup element F743 and an image processing circuit F744 located in this order from the front surface of the core unit F70 on the bottom main surface of the substrate F700. At a rear edge of the bottom main surface of the substrate F700, the connector F73 is attached. Further, a sound IC F707 and the micro computer F751 are provided on the bottom main surface of the substrate F700. The sound IC F707, which is connected to the micro computer F751 and the amplifier F708 via lines formed on the substrate F700 and the like, outputs a sound signal to the speaker F706 via the amplifier F708 based on the sound data transmitted from the game apparatus F3. On the bottom main surface of the substrate F700, a vibrator F704 is provided. The vibrator F704 is, for example, a vibration motor or a solenoid. The core unit F70 is vibrated by an actuation of the vibrator F704, and the vibration is conveyed to the player's hand holding the core unit F70. Thus, a so-called vibration-feedback game is realized. The vibrator F704 is disposed slightly toward the front of the housing F71, thereby allowing the housing F71 held by the player to strongly vibrate, that is, allowing the player to easily feel the vibration.

Figure 47:
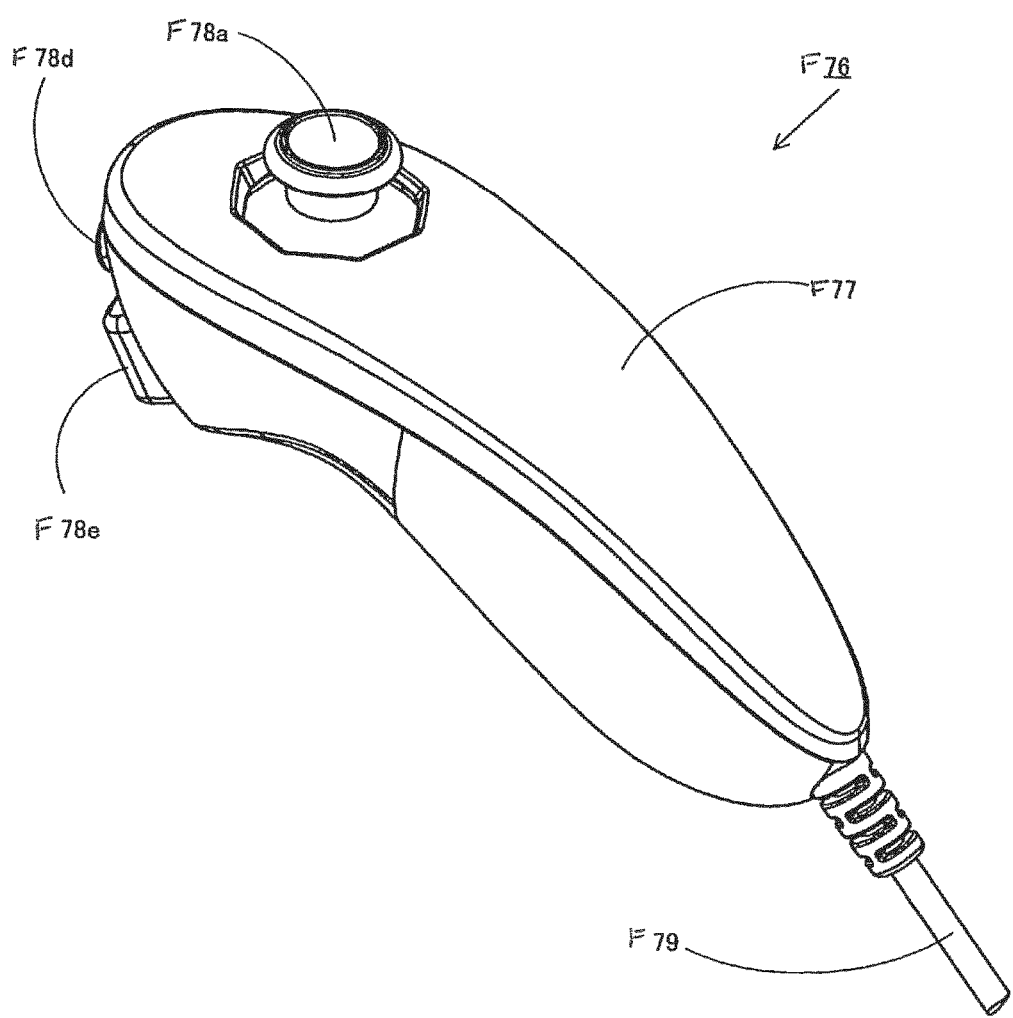
FIG. 47 is a perspective view illustrating a first example of the subunit F76 shown in FIG. 41.
Figure 48:
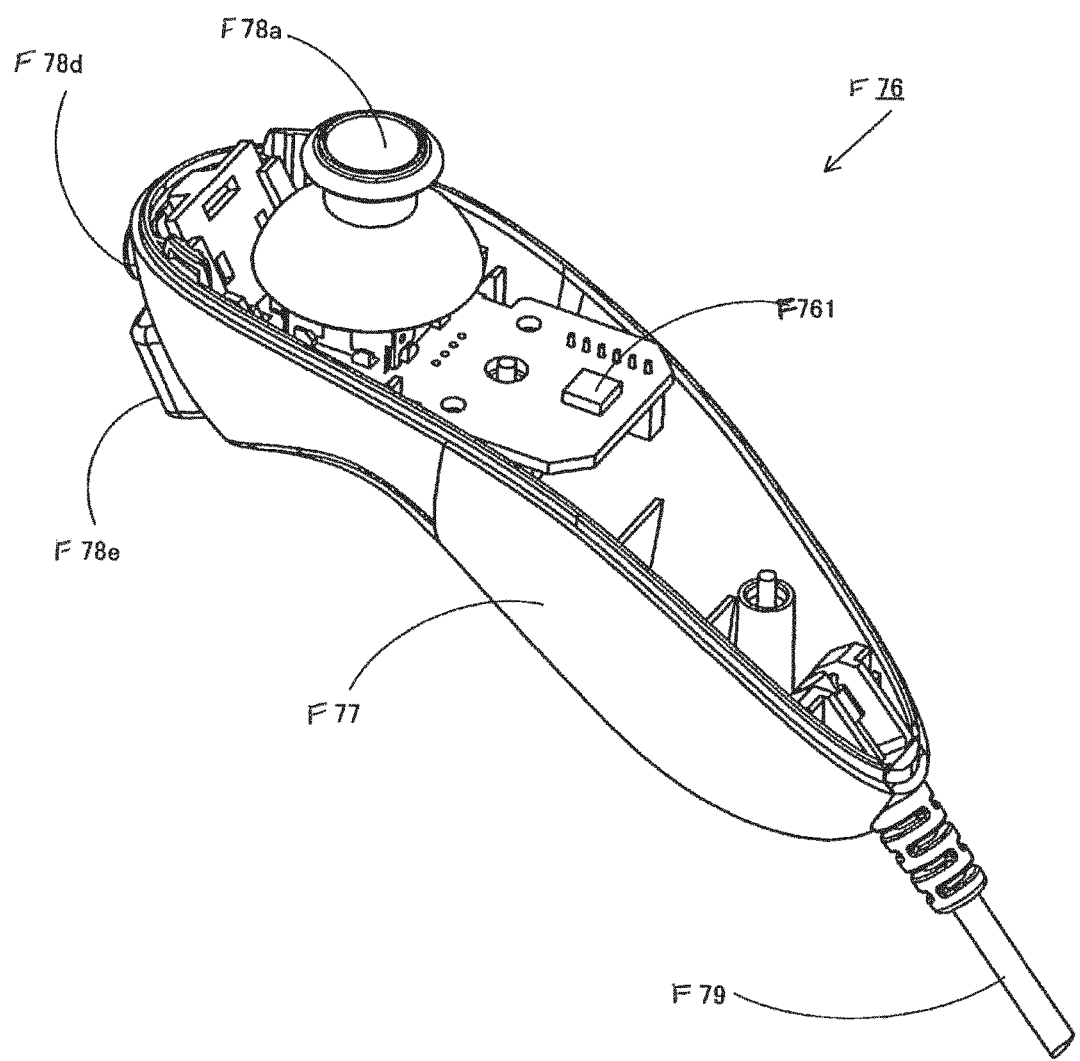
FIG. 48 is a perspective view of a state where an upper casing of the subunit F76 shown in FIG. 47 is removed.
Figure 49A:
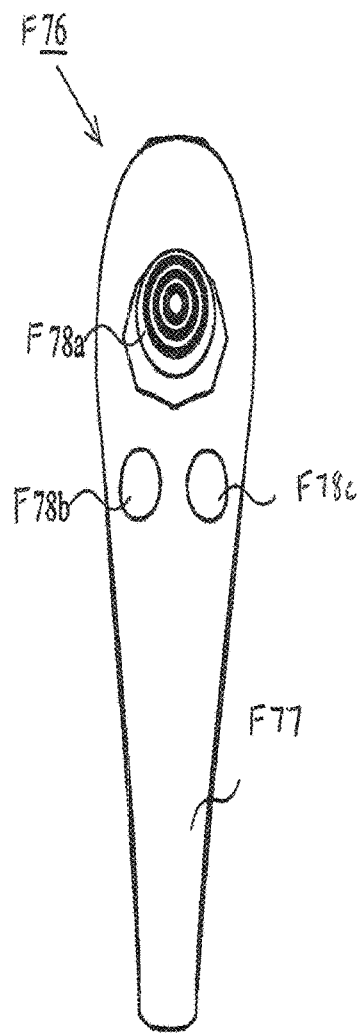
FIGS. 49A, 49B, and 49C are a top view, a bottom view, and a left side view of a second example of the subunit F76 shown in FIG. 41, respectively.
Figure 49B:
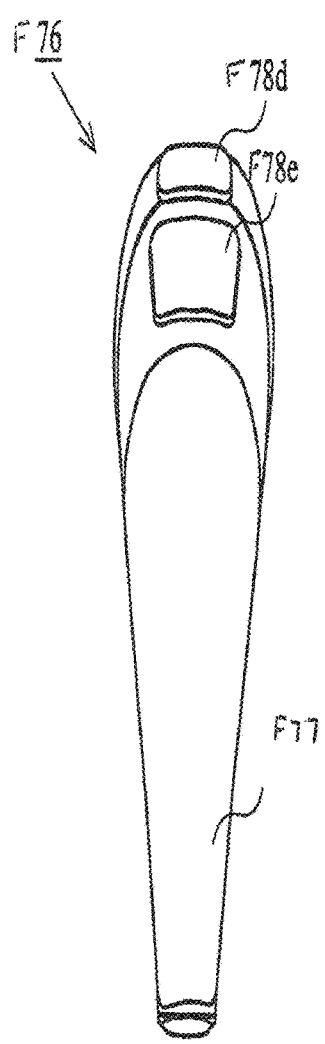
Figure 49C:
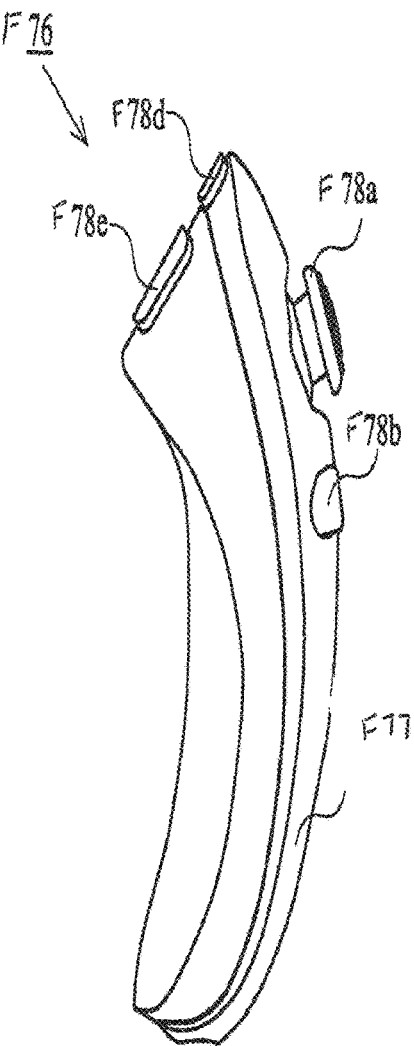
Figure 50:
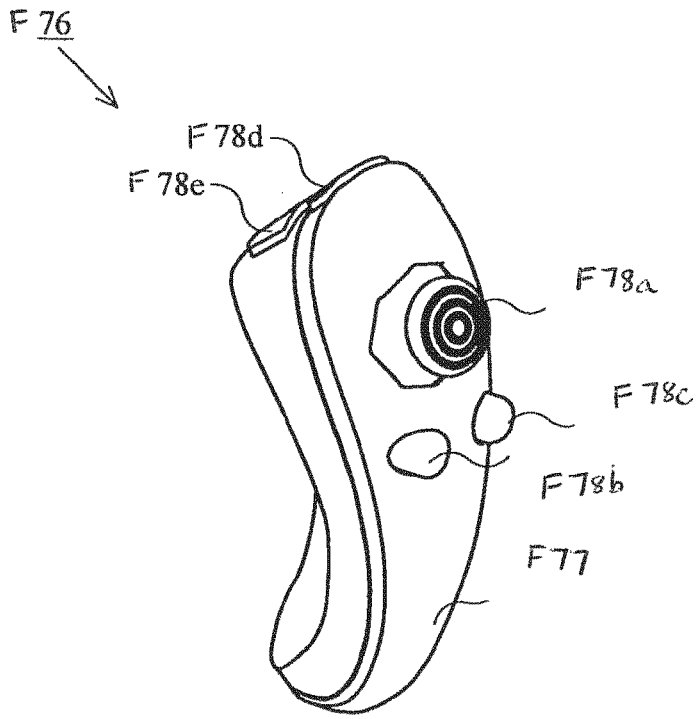
FIG. 50 is a perspective view of the subunit F76 shown in FIG. 41 as seen from the top front side thereof.

With reference to FIGS. 47 to 50, the subunit F76 will be described. FIG. 47 is a perspective view illustrating a first example of the subunit F76. FIG. 48 is a perspective view illustrating a state where an upper casing (a part of the housing F77) of the subunit F76 shown in FIG. 47 is removed. FIG. 49A is a top view illustrating a second example of the subunit F76. FIG. 49B is a bottom view illustrating the second example of the subunit F76. FIG. 49C is a left side view illustrating the second example of the subunit F76. FIG. 50 is a perspective view illustrating the second example of the subunit F76 as seen from the top front side thereof.

As shown in FIG. 47, the subunit F76 includes the housing F77 formed by, for example, plastic molding. The housing F77 extends in a longitudinal direction from front to rear, and has a streamline solid shape including a head which is a widest portion in the subunit F76. The overall size of the subunit F76 is small enough to be held by one hand of an adult or even a child.

In the vicinity of the widest portion on the top surface of the housing F77, a stick F78a is provided. The stick F78a is an operation section which includes an inclinable stick projecting from the top surface of the housing F77 and outputs an operation signal in accordance with the inclining direction of the stick. For example, a player can arbitrarily designate a direction and a position by inclining a tip of the stick in any direction of 360 degrees, whereby the player can instruct a direction in which a player character or the like appearing in a virtual game world is to move, or can instruct a direction in which a cursor is to move.

In front of the housing F77 of the subunit F76, a plurality of operation buttons F78d and F78e are provided. The operation buttons F78d and F78e are each an operation section for outputting a respective operation signal assigned to the operation buttons F78d and F78e when the player presses a head thereof. For example, the operation buttons F78d and F78e are assigned with functions of an X button and a Y button, for example. The operation buttons F78d and F78e are assigned with respective functions in accordance with the game program executed by the game apparatus F3. In an exemplary arrangement shown in FIG. 47, the operation buttons F78d and F78e are aligned from the top to bottom on the front surface of the housing F77.

In FIG. 48, a substrate is fixed in the housing F77. The stick F78a, an acceleration sensor F761 and the like are provided on the top main surface of the substrate. The stick F78a, the acceleration sensor F761 and the like are connected to the connecting cable F79 via lines (not shown) formed on the substrate and the like.

As shown in FIGS. 49A, 49B, 49C and 50, the subunit F76 of the second example includes the housing F77, the stick F78a, the operation buttons F78d and F78e as in the case of the subunit F76 of the first example, and the subunit F76 of the second example has the operation buttons F78b and F78c on the top surface of the housing F77.

Behind the stick F78a on the top surface of the housing F77, the subunit F76 of the second example has a plurality of operation buttons F78b and F78c. The operation buttons F78b and F78c are each an operation section for outputting a respective operation signal assigned to the operation buttons F78b and F78c when the player presses a head thereof. The operation buttons F78b and F78c are assigned with respective functions in accordance with the game program executed by the game apparatus F3. In an exemplary arrangement shown in FIGS. 49A, 49B, and 49C and 50, the operation buttons F78b and F78c are arranged in a line at the center of the top surface of the housing F77 in the left-right direction.

Although the stick F78a is an operation section for outputting an operation signal in accordance with a direction input operation performed by the player as described above, such an operation section may be provided in another form. Hereinafter, with reference to FIGS. 51 to 54, a first through a fifth exemplary modifications, each of which includes the subunit F76 of the second example having an operation section for outputting an operation signal in accordance with the direction input operation, will be described.

Figure 51:
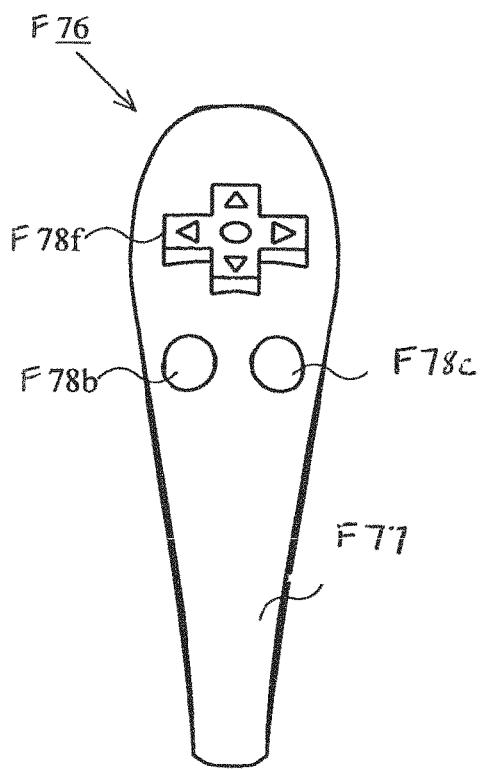
FIG. 51 is a top view illustrating an example of a first modification of the subunit F76 shown in FIG. 41.
Figure 52:
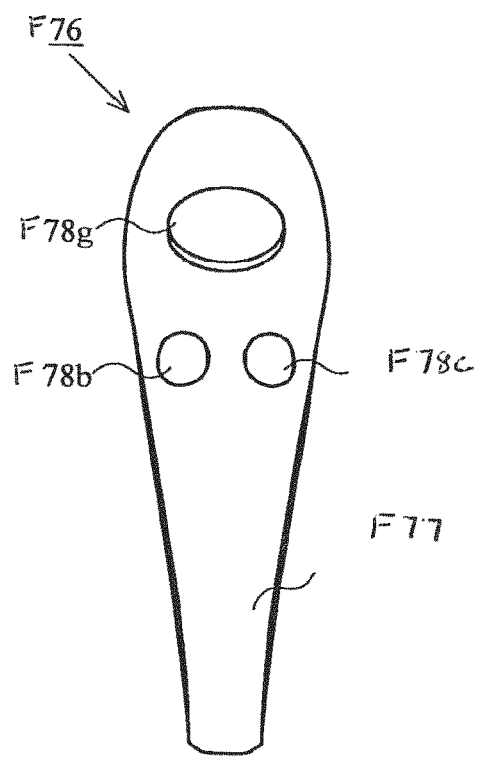
FIG. 52 is a top view illustrating an example of a second modification of the subunit F76 shown in FIG. 41.
Figure 53:
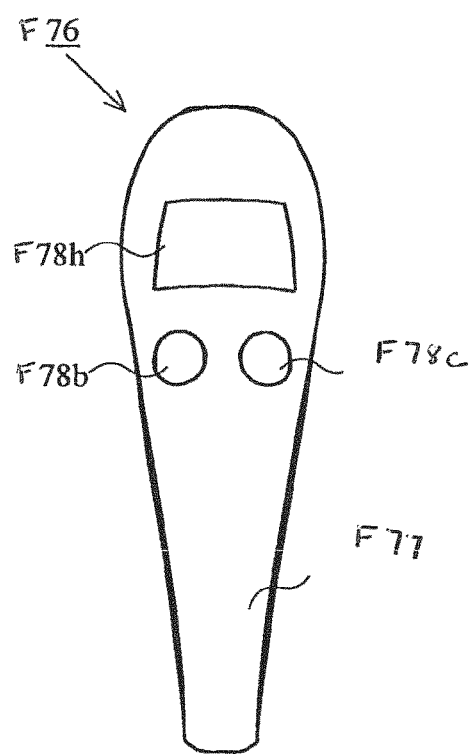
FIG. 53 is a top view illustrating an example of a third modification of the subunit F76 shown in FIG. 41.
Figure 54:
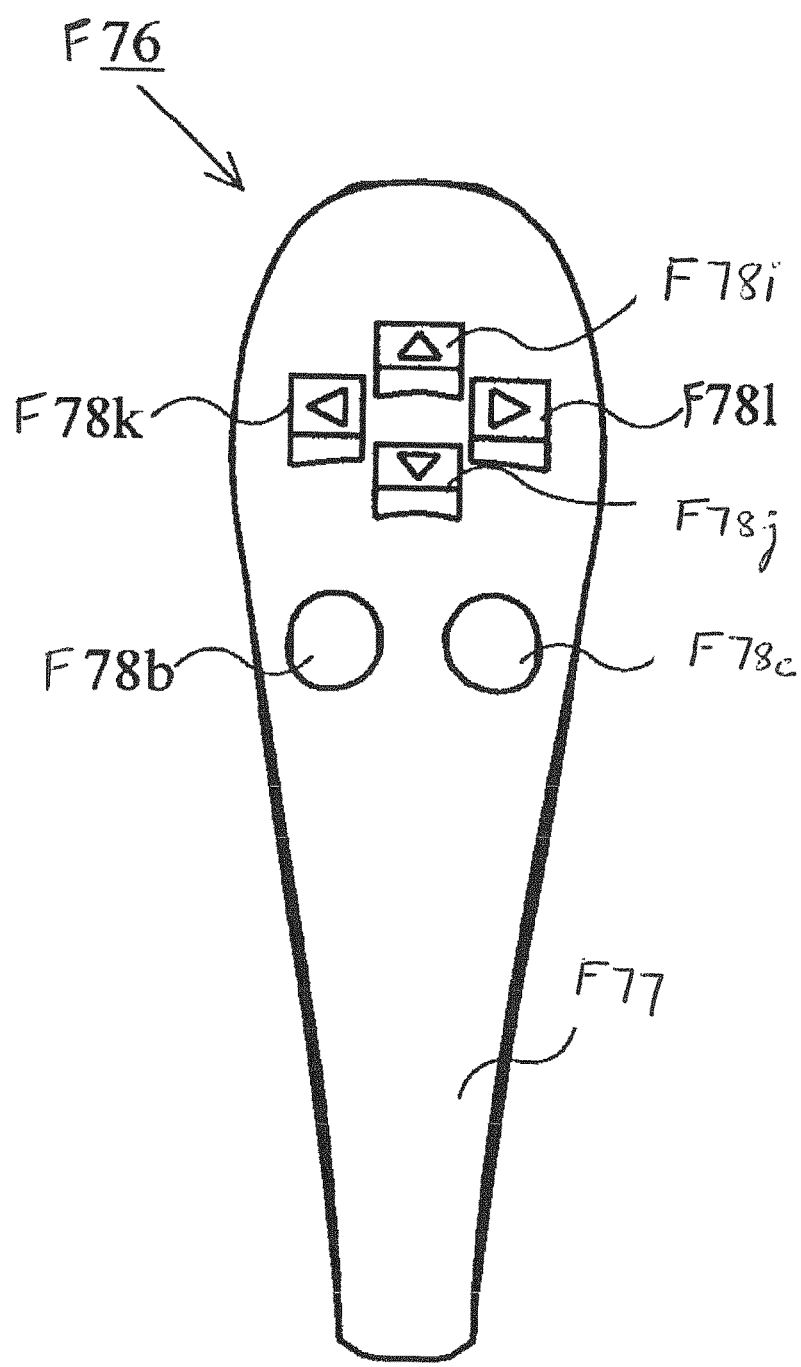
FIG. 54 is a top view illustrating an example of a fourth modification of the subunit F76 shown in FIG. 41.

As the first exemplary modification, as shown in FIG. 51, the subunit F76 may include a cross key F78f similar to the cross key F72a of the core unit F70 instead of the stick F78a. As the second exemplary modification, as shown in FIG. 52, the subunit F76 may include a slide pad F78g which includes a disc-shaped member horizontally slidable and outputs an operation signal in accordance with the sliding direction of the disc-shaped member, instead of the stick F78a. As the third exemplary modification, as shown in FIG. 53, the subunit F76 may include a touch pad F78h instead of the stick F78a. As the fourth exemplary modification, as shown in FIG. 54, the subunit F76 may include an operation section which has buttons F78i, F78j, F78k, and F78l representing at least four directions (front, rear, right and left), respectively, and outputs an operation signal in accordance with the button (F78i, F78j, F78k, or F78l) pressed by a player, instead of the stick F78a. As the fifth exemplary modification, the subunit F76 may include a composite switch including a push switch having a ring-shaped four-direction operation section and a center switch provided at the center thereof, instead of the stick F78a.

Figure 55:
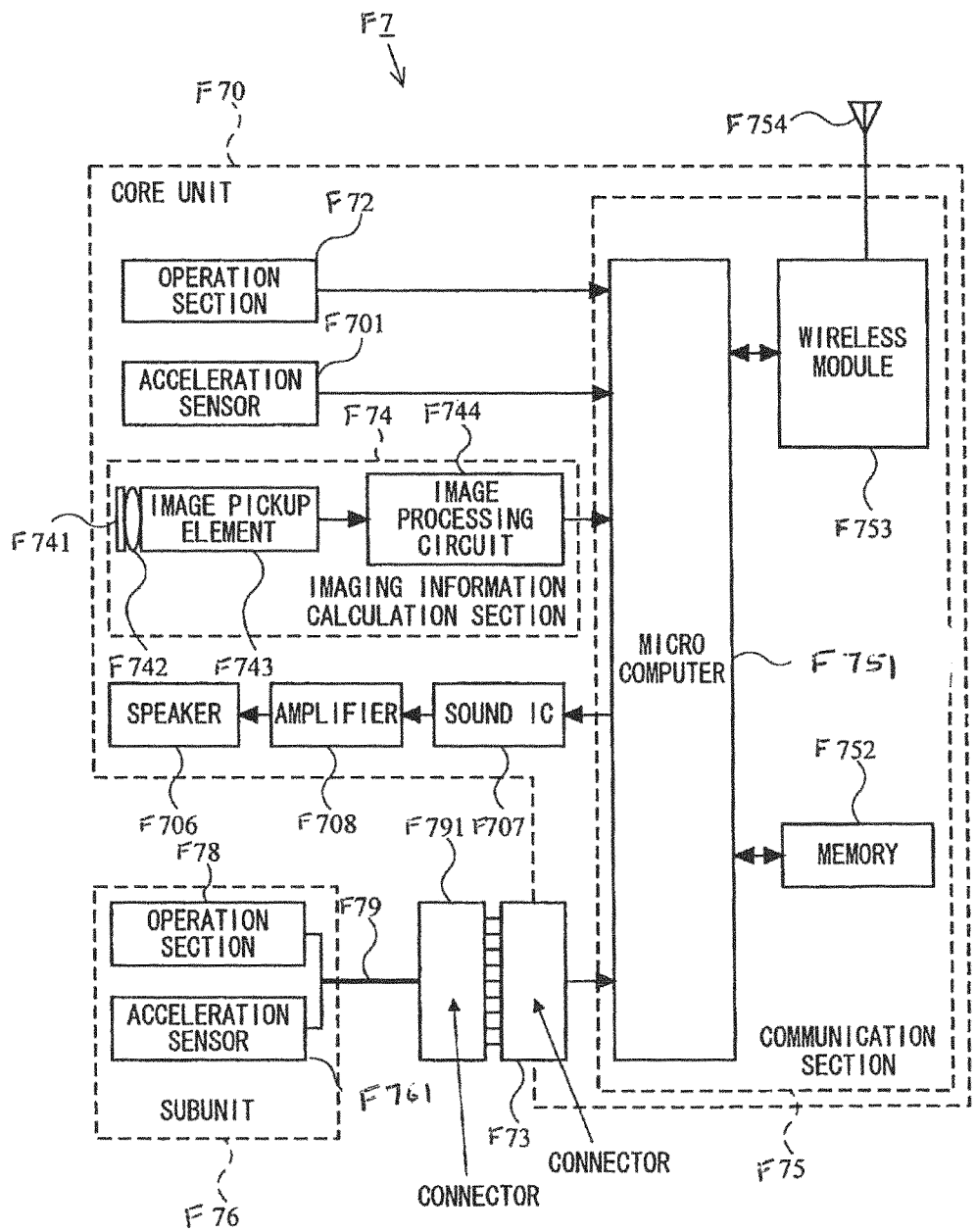
FIG. 55 is a block diagram illustrating a structure of the controller F7 shown in FIG. 41.

Next, with reference to FIG. 55, an internal structure of the controller F7 will be described. FIG. 55 is a block diagram illustrating the structure of the controller F7.

As shown in FIG. 55, the core unit F70 includes the communication section F75 in addition to the operation section F72, the imaging information calculation section F74, the acceleration sensor F701, the speaker F706, the sound IC F707, and the amplifier F708 as described above. Further, the subunit F76, which has the operation section F78 and the acceleration sensor F761 as described above, is connected to the micro computer F751 via the connecting cable F79 and the connectors F791 and F73.

The imaging information calculation section F74 includes the infrared filter F741, the lens F742, the image pickup element F743 and the image processing circuit F744. The infrared filter F741 allows only infrared light to pass therethrough, among light incident on the front surface of the core unit F70. The lens F742 collects the infrared light which has passed through the infrared filter F741 and outputs the infrared light to the image pickup element F743. The image pickup element F743 is a solid-state imaging device such as, for example, a CMOS sensor or a CCD. The image pickup element F743 takes an image of the infrared light collected by the lens F742. Accordingly, the image pickup element F743 takes an image of only the infrared light which has passed through the infrared filter F741 and generates image data. The image data generated by the image pickup element F743 is processed by the image processing circuit F744. Specifically, the image processing circuit F744 processes the image data obtained from the image pickup element F743, identifies a spot thereof having a high brightness, and outputs process result data representing the identified position coordinates and size of the area to the communication section F75. The imaging information calculation section F74 is fixed to the housing F71 of the core unit F70. The imaging direction of the imaging information calculation section F74 can be changed by changing the direction of the housing F71. The housing F71 is connected to the subunit F76 by the flexible connecting cable F79, and therefore the imaging direction of the imaging information calculation section F74 is not changed by changing the direction and position of the subunit F76. As described later in detail, a signal can be obtained in accordance with the position and the motion of the core unit F70 based on the process result data outputted by the imaging information calculation section F74.

The core unit F70 preferably includes a three-axis acceleration sensor F701. Further, the subunit F76 preferably includes a three-axis acceleration sensor F761. The three axis acceleration sensors F701 and F761 each detects for a linear acceleration in three directions, i.e., the up/down direction, the left/right direction, and the forward/backward direction. Alternatively, a two axis acceleration detection means which detects for only a linear acceleration along each of the up/down and left/right directions (or other pair of directions) may be used in another embodiment depending on the type of control signals used in the game process. For example, the three axis acceleration sensors F701 and F761 or the two axis acceleration sensors F701 and F761 may be of the type available from Analog Devices, Inc., or STMicroelectronics N. V. Preferably, each of the acceleration sensors F701 and F761 is of an electrostatic capacitance (capacitance-coupling) type that is based on silicon micromachined MEMS (Micro Electro Mechanical Systems) technology. However, any other suitable acceleration detection technology (e.g., piezoelectric type or piezoresistance type) now existing or later developed may be used to provide the three axis acceleration sensors F701 and F761 or two axis acceleration sensors F701 and F761.

As one skilled in the art understands, the acceleration detection means, as used in the acceleration sensors F701 and F761, are capable of detecting for only acceleration (linear acceleration) along a straight line corresponding to each axis of the acceleration sensor. In other words, each of the direct outputs of the acceleration sensors F701 and F761 is limited to signals indicative of linear acceleration (static or dynamic) along each of the two or three axes thereof. As a result, the acceleration sensors F701 and F761 cannot directly detect movement along a non-linear (e.g., arcuate) path, rotation, rotational movement, angular displacement, tilt, position, attitude, or any other physical characteristic.

However, through additional processing of the acceleration signals output from each of the acceleration sensors F701 and F761, additional information relating to the core unit F70 and the subunit F76 can be inferred or calculated, as one skilled in the art will readily understand from the description herein. For example, by detecting static acceleration (i.e., gravity), the outputs of the acceleration sensors F701 and F761 can be used to infer tilt of the object (core unit F70 or subunit F76) relative to the gravity vector by correlating tilt angles with detected acceleration. In this way, the acceleration sensors F701 and F761 can be used in combination with the micro computer F751 (or another processor) to determine tilts, attitudes, or positions of the core unit F70 and the subunit F76. Similarly, various movements and/or positions of the core unit F70 and the subunit F76 can be calculated or inferred through processing of the acceleration signals generated by the acceleration sensors F701 and F761 when the core unit F70 containing the acceleration sensor F701 or the subunit F76 containing the acceleration sensor F761 is subjected to dynamic accelerations by, for example, the hand of a user, as described herein. In another embodiment, each of the acceleration sensors F701 and F761 may include an embedded signal processor or other type of dedicated processor for performing any desired processing of the acceleration signals outputted from the acceleration detection means prior to outputting signals to micro computer F751. For example, the embedded or dedicated processor could convert the detected acceleration signal to a corresponding tilt angle when the acceleration sensor is intended to detect static acceleration (i.e., gravity). Data representing the acceleration detected by each of the acceleration sensors F701 and F761 is outputted to the communication section F75.

In another exemplary embodiment, at least one of the acceleration sensors F701 and F761 may be replaced with a gyro-sensor of any suitable technology incorporating, for example, a rotating or vibrating element. Exemplary MEMS gyro-sensors that may be used in this embodiment are available from Analog Devices, Inc. Unlike the acceleration sensors F701 and F761, a gyro-sensor is capable of directly detecting rotation (or angular rate) around at least one axis defined by the gyroscopic element therein. Thus, due to the fundamental differences between a gyro-sensor and an acceleration sensor, corresponding changes need to be made to the processing operations that are performed on the output signals from these devices depending on which device is selected for a particular application.

More specifically, when the tilt or attitude is calculated using a gyro-sensor instead of the acceleration sensor, significant changes are necessary. Specifically, when using a gyro-sensor, the value of the tilt is initialized at the start of the detection. Then, data on the angular rate which is output from the gyro-sensor is integrated. Next, a change amount in tilt from the value of the tilt initialized is calculated. In this case, the calculated tilt corresponds to an angle. In contrast, when the acceleration sensor calculates the tilt, the tilt is calculated by comparing the value of the gravitational acceleration of each axial component with a predetermined reference. Therefore, the calculated tilt can be represented as a vector. Thus, without initialization, an absolute direction can be determined with an acceleration detection means. The type of the value calculated as the tilt is also very different between a gyro sensor and an acceleration sensor; i.e., the value is an angle when a gyro sensor is used and is a vector when an acceleration sensor is used. Therefore, when a gyro sensor is used instead of an acceleration sensor or vice versa, data on tilt also needs to be processed through a predetermined conversion taking into account the fundamental differences between these two devices. Due to the fact that the nature of gyroscopes is known to one skilled in the art, as well as the fundamental differences between the acceleration detection means and the gyroscope, further details are not provided herein. While a gyro-sensor is advantageous in that a rotation can be directly detected, an acceleration sensor is generally more cost effective when used in connection with the controller described herein.

The communication section F75 includes the micro computer F751, a memory F752, the wireless module F753 and the antenna F754. The micro computer F751 controls the wireless module F753 for wirelessly transmitting the transmission data while using the memory F752 as a storage area during the process. Further, the micro computer F751 controls the sound IC F707 and the vibrator F704 based on data from the game apparatus F3 having been received by the wireless module F753 via the antenna F754. The sound IC F707 processes sound data transmitted from the game apparatus F3 via the communication section F75, and the like.

Data from the core unit F70 including an operation signal (core key data) from the operation section F72, acceleration signals (core acceleration data) from the acceleration sensor F701, and the process result data from the imaging information calculation section F74 are outputted to the micro computer F751. An operation signal (sub key data) from the operation section F78 of the subunit F76 and acceleration signals (sub acceleration data) from the acceleration sensor F761 are outputted to the micro computer F751 via the connecting cable F79. The micro computer F751 temporarily stores the input data (core key data, sub key data, core acceleration data, sub acceleration data, and process result data) in the memory F752 as the transmission data which is to be transmitted to the receiving unit F6. The wireless transmission from the communication section F75 to the receiving unit F6 is performed periodically at a predetermined time interval. Since game process is generally performed at a cycle of 1/60 sec., data needs to be collected and transmitted at a cycle of a shorter time period. Specifically, the game process unit is 16.7 ms (1/60 sec.), and the transmission interval of the communication section F75 structured using the Bluetooth (registered trademark) technology is 5 ms. At the transmission timing to the receiving unit F6, the micro computer F751 outputs the transmission data stored in the memory F752 as a series of operation information to the wireless module F753. The wireless module F753 uses, for example, the Bluetooth (registered trademark) technology to modulate the operation information onto a carrier wave of a predetermined frequency, and radiates the low power radio wave signal from the antenna F754. Thus, the core key data from the operation section F72 included in the core unit F70, the sub key data from the operation section F78 included in the subunit F76, the core acceleration data from the acceleration sensor F701 included in the core unit F70, the subacceleration data from the acceleration sensor F761 included in the subunit F76, and the process result data from the imaging information calculation section F74 are modulated onto the low power radio wave signal by the wireless module F753 and radiated from the core unit F70. The receiving unit F6 of the game apparatus F3 receives the low power radio wave signal, and the game apparatus F3 demodulates or decodes the low power radio wave signal to obtain the series of operation information (the core key data, the sub key data, the core acceleration data, the sub acceleration data, and the process result data). Based on the obtained operation information and the game program, the CPU F30 of the game apparatus F3 performs the game process. In the case where the communication section F75 is structured using the Bluetooth (registered trademark) technology, the communication section F75 can have a function of receiving transmission data which is wirelessly transmitted from other devices.

Figure 56:
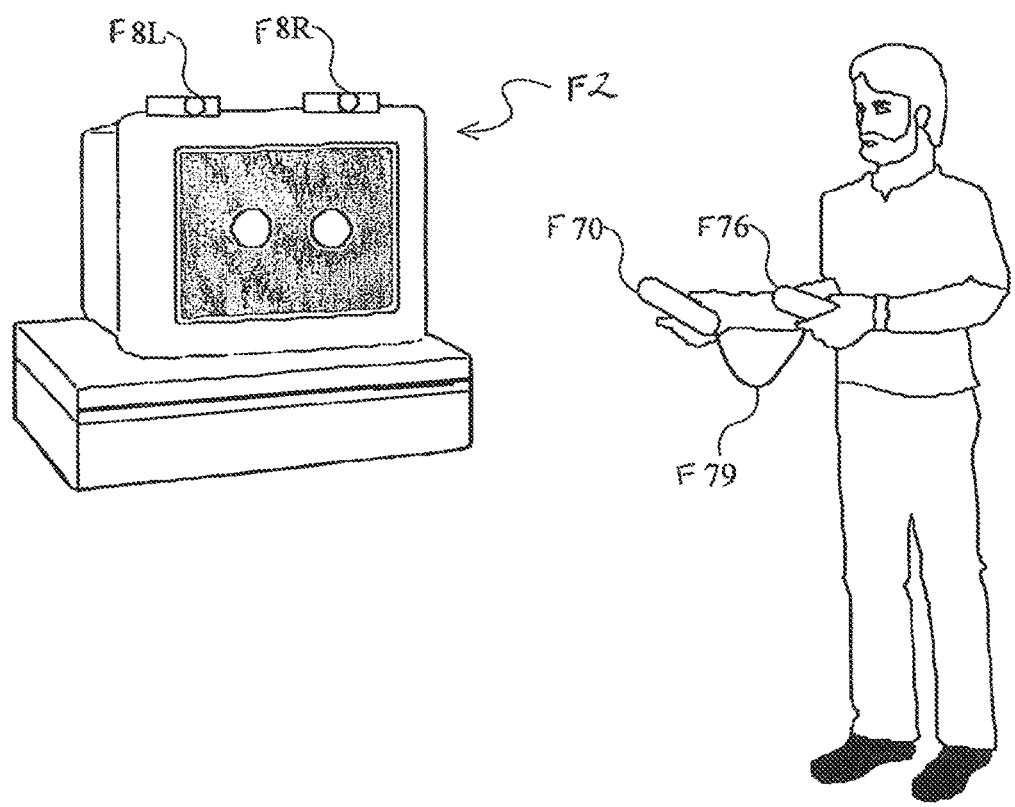
FIG. 56 is a diagram illustrating a state of a game being generally controlled with the controller F7 shown in FIG. 41.
Figure 60:
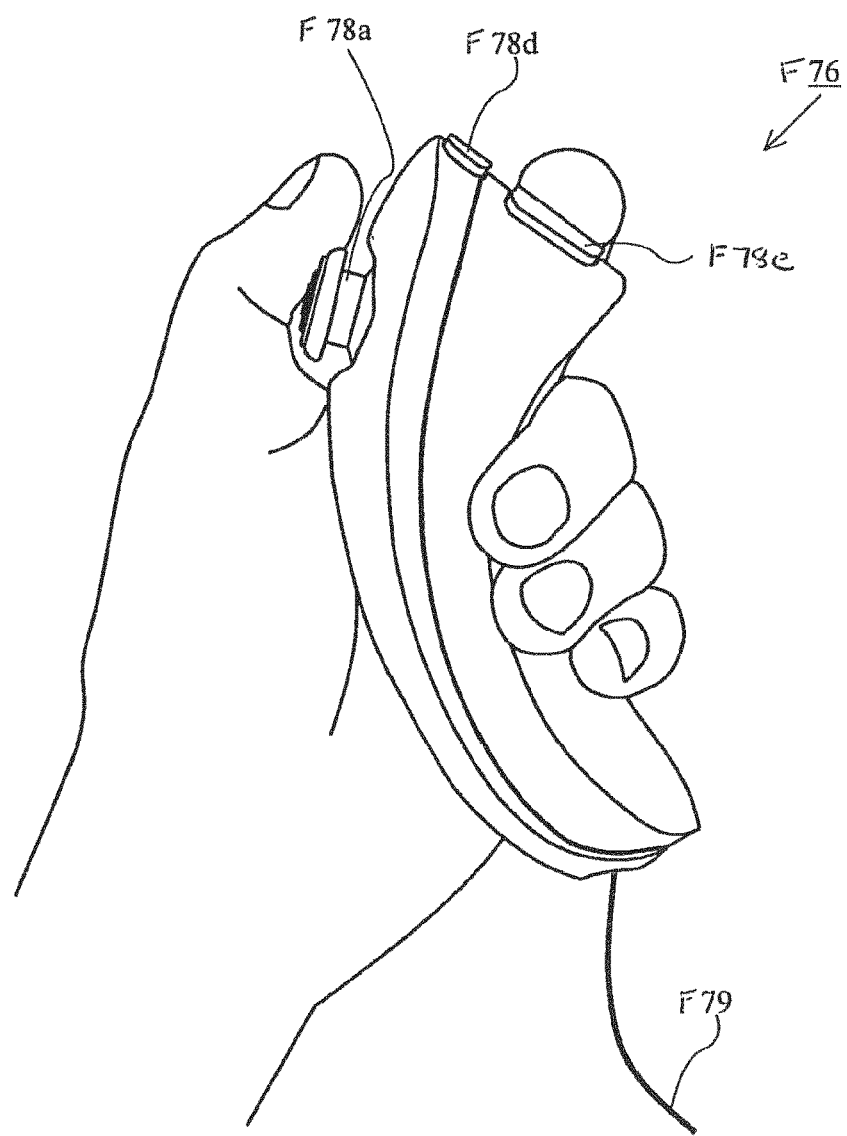
FIG. 60 shows an exemplary state of a player holding the subunit F76 with a left hand as seen from the right side of the subunit F76.

As shown in FIG. 56, in order to play a game using the controller F7 with the game system F1, a player holds the core unit F70 with one hand (for example, a right hand) (see FIGS. 57 and 58), and holds the subunit F76 with the other hand (for example, a left hand) (see FIG. 60). The player holds the core unit F70 so as to point the front surface of the core unit F70 (that is, a side having an entrance through which light is incident on the imaging information calculation section F74 taking an image of the light) to the monitor F2. On the other hand, two LED modules F8L and F8R are provided in the vicinity of the display screen of the monitor F2. The LED modules F8L and FOR each outputs infrared light forward from the monitor F2.

When a player holds the core unit F70 so as to point the front surface thereof to the monitor F2, infrared lights outputted by the two LED modules F8L and F8R are incident on the imaging information calculation section F74. The image pickup element F743 takes images of the infrared lights incident through the infrared filter F741 and the lens F742, and the image processing circuit F744 processes the taken images. The imaging information calculation section F74 detects infrared components outputted by the LED modules F8L and F8R so as to obtain positions and area information of the LED modules F8L and F8R. Specifically, the imaging information calculation section F74 analyzes image data taken by the image pickup element F743, eliminates images which do not represent the infrared lights outputted by the LED modules F8L and F8R from the area information, and identifies points each having a high brightness as positions of the LED modules F8L and F8R. The imaging information calculation section F74 obtains position coordinates, coordinates of the centroid, and the like of each of the identified points having the high brightness and outputs the same as the process result data. When such process result data is transmitted to the game apparatus F3, the game apparatus F3 can obtain, based on the position coordinates and the coordinates of the centroid, operation signals relating to the motion, attitude, position and the like of the imaging information calculation section F74, that is, the core unit F70, with respect to the LED modules F8L and F8R. Specifically, the position having a high brightness in the image obtained through the communication section F75 is changed in accordance with the motion of the core unit F70, and therefore a direction input or coordinate input is performed in accordance with the position having the high brightness being changed, thereby enabling a direction input or a coordinate input to be performed along the moving direction of the core unit F70.

Thus, the imaging information calculation section F74 of the core unit F70 takes images of stationary markers (infrared lights from the two LED modules F8L and F8R in the present embodiment), and therefore the game apparatus F3 can use the process result data relating to the motion, attitude, position and the like of the core unit F70 in the game process, whereby an operation input, which is different from an input made by pressing an operation button or using an operation key, is further intuitively performed. As described above, since the markers are provided in the vicinity of the display screen of the monitor F2, the motion, attitude, position, and the like of the core unit F70 with respect to the display screen of the monitor F2 can be easily calculated based on positions from the markers. That is, the process result data used for obtaining the motion, attitude, position, and the like of the core unit F70 can be used as operation input immediately applied to the display screen of the monitor F2.

Figure 57:
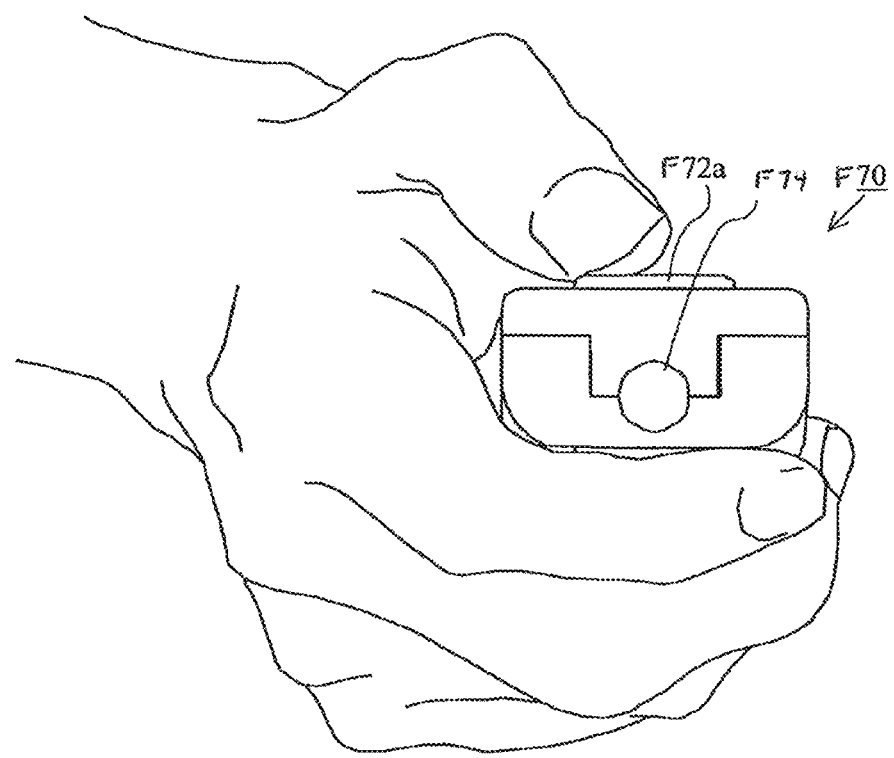
FIG. 57 shows an exemplary state of a player holding the core unit F70 with a right hand as seen from the front surface side of the core unit F70.
Figure 58:
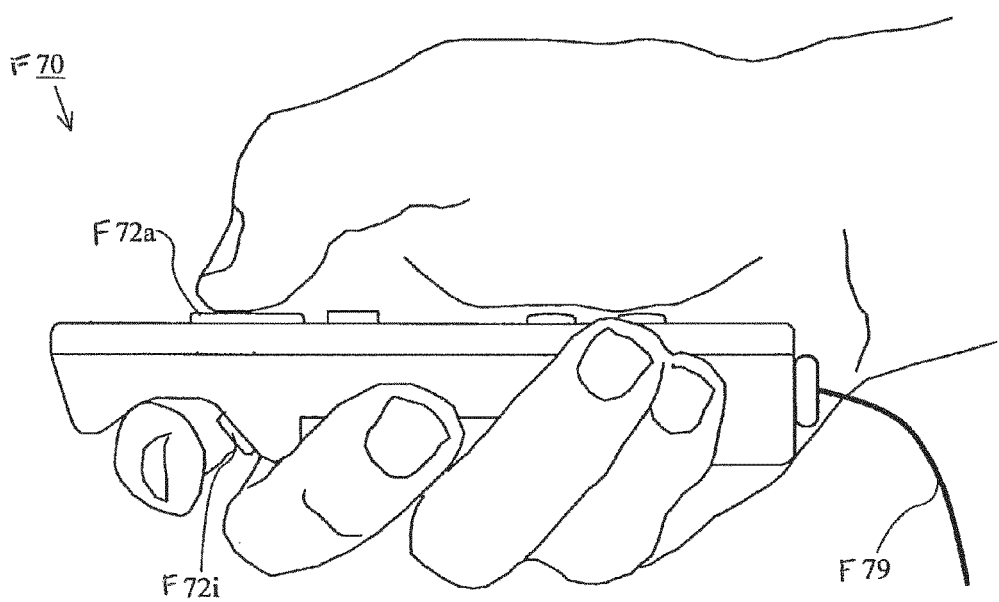
FIG. 58 shows an exemplary state of a player holding the core unit F70 with a right hand as seen from the left side of the core unit F70.

With reference to FIGS. 57 and 58, a state of a player holding the core unit F70 with one hand will be described. FIG. 57 shows an exemplary state of a player holding the core unit F70 with a right hand as seen from the front surface side of the core unit F70. FIG. 58 shows an exemplary state of a player holding the core unit F70 with a right hand as seen from the left side of the core unit F70.

As shown in FIGS. 57 and 58, the overall size of the core unit F70 is small enough to be held by one hand of an adult or even a child. When the player puts a thumb on the top surface of the core unit F70 (for example, near the cross key F72a), and puts an index finger in the recessed portion on the bottom surface of the core unit F70 (for example, near the operation button F72i), the light entrance of the imaging information calculation section F74 on the front surface of the core unit F70 is exposed forward to the player. It should be understood that also when the player holds the core unit F70 with a left hand, the holding state is the same as that described for the right hand.

Thus, the core unit F70 allows a player to easily operate the operation section F72 such as the cross key F72a or the operation button F72i while holding the core unit F70 with one hand. Further, when the player holds the core unit F70 with one hand, the light entrance of the imaging information calculation section F74 on the front surface of the core unit F70 is exposed, whereby the light entrance can easily receive infrared lights from the aforementioned two LED modules F8L and F8R. That is, the player can hold the core unit F70 with one hand without preventing the imaging information calculation section F74 from functioning. That is, when the player moves his or her hand holding the core unit F70 with respect to the display screen, the core unit F7o can further perform an operation input enabling a motion of the player's hand to directly act on the display screen.

Figure 59:
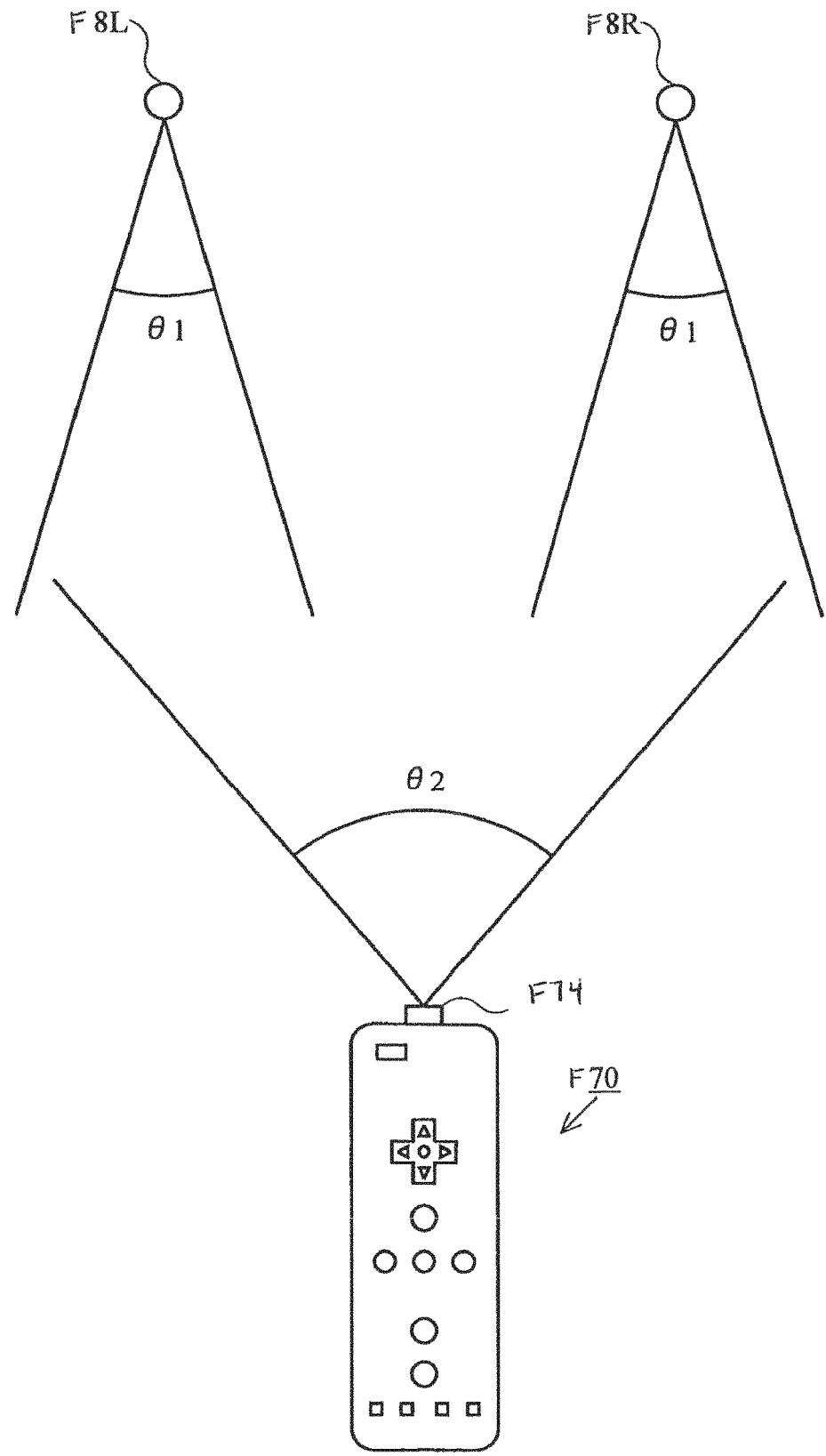
FIG. 59 is a diagram illustrating a viewing angle of a LED module F8L, a viewing angle of a LED module F8R, and a viewing angle of an image pickup element F743.

As shown in FIG. 59, the LED modules F8L and FOR each has a viewing angle .theta.1. The image pickup element F743 has a viewing angle .theta.2. For example, the viewing angle .theta.1 of the LED modules F8L and F8R is 34 degrees (half-value angle), and the viewing angle .theta.2 of the image pickup element F743 is 41 degrees. When both the LED modules F8L and F8R are in the viewing angle .theta.2 of the image pickup element F743, and the image pickup element F743 is in the viewing angle .theta.1 of the LED module F8L and the viewing angle .theta.1 of the LED module F8R, the game apparatus F3 determines a position of the core unit F70 using positional information relating to the point having high brightness of the two LED modules F8L and F8R.

When either the LED module F8L or LED module F8R is in the viewing angle .theta.2 of the image pickup element F743, or when the image pickup element F743 is in either the viewing angle .theta.1 of the LED module F8L or the viewing angle .theta.1 of the LED module F8R, the game apparatus F3 determines a position of the core unit F70 using the positional information relating to the point having high brightness of the LED module F8L or the LED module F8R.

As described above, the tilt, attitude, or position of the core unit F70 can be determined based on the output (core acceleration data) from the acceleration sensor F701 of the core unit F70. That is, the core unit F70 functions as an operation input means for performing an operation in accordance with a player moving a hand holding the core unit F70, for example, upward, downward, leftward, or rightward.

Next, with reference to FIG. 60, a state of a player holding the subunit F76 with one hand will be described. FIG. 60 shows an exemplary state of a player holding the subunit F76 with a left hand as seen from the right side of the subunit F76.

As shown in FIG. 60, the overall size of the subunit F76 is small enough to be held by one hand of an adult or even a child. For example, a player can put a thumb on the top surface of the subunit F76 (for example, near the stick F78a), put an index finger on the front surface of the subunit F76 (for example, near the operation buttons F78d and F78e), and put a middle finger, a ring finger and a little finger on the bottom surface of the subunit F76 so as to hold the subunit F76. It should be understood that also when the player holds the subunit F76 with a right hand, the holding state is similar to that described for the left hand. Thus, the subunit F76 allows the player to easily operate the operation section F78 such as the stick F78a and the operation buttons F78d and F78e while holding the subunit F76 with one hand.

As described above, the tilt, attitude, or position of the subunit F76 can be determined based on the output (sub acceleration data) from the acceleration sensor F761 of the subunit F76. That is, the subunit F76 functions as an operation input means for performing an operation in accordance with the player moving a hand holding the subunit F76, for example, upward, downward, leftward, and rightward.

Figure 61:
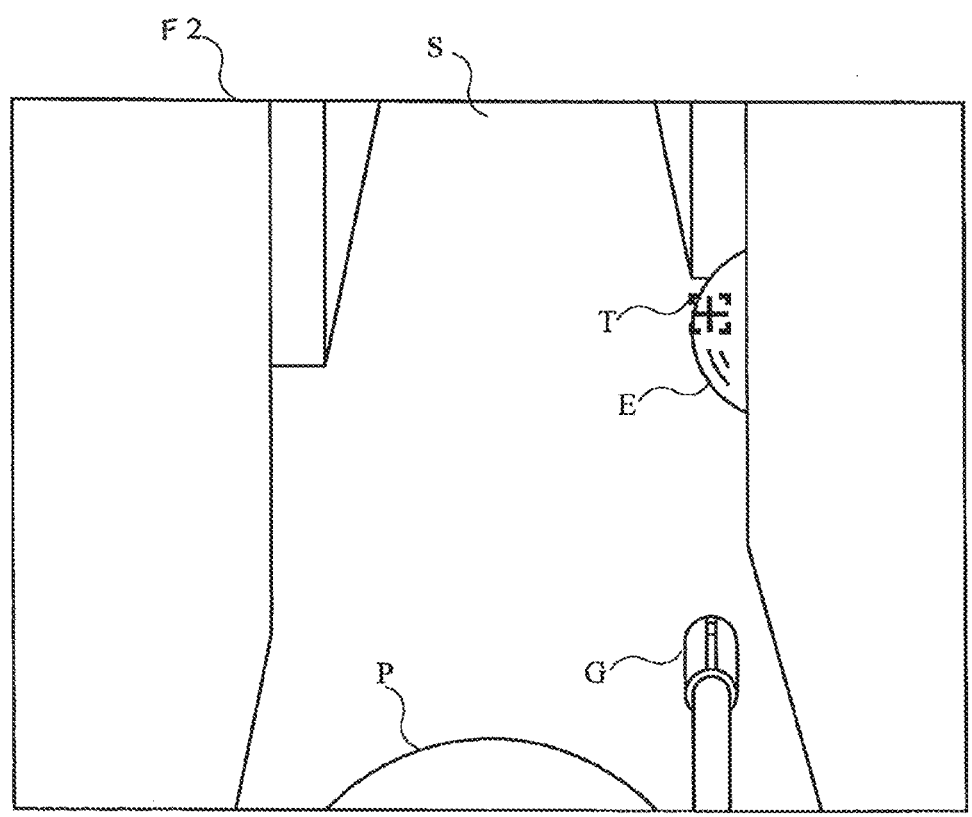
FIG. 61 shows an exemplary game image displayed on the monitor F2 when the game apparatus F3 executes a shooting game.

Here, an exemplary game played using the aforementioned controller F7 will be described. As a first example, a shooting game played using the controller F7 will be described. FIG. 61 is a diagram illustrating an exemplary game image displayed on the monitor F2 when the game apparatus F3 executes the shooting game.

As shown in FIG. 61, a portion of a three-dimensional virtual game space S is displayed on the display screen of the monitor F2. As a game object acting in accordance with an operation of the controller F7, a portion of the player character P and a portion of a gun G held by the player character P are displayed on the display screen. Moreover, the virtual game space S displayed on the display screen represents a field of front vision of the player character P, and for example an opponent character E is displayed as a shooting target in FIG. 61. A target indicating a position at which the player character P shoots the gun G is displayed on the display screen as the target cursor T.

In the shooting game having such a game image displayed on the monitor F2, a player operates the core unit F70 with one hand and operates the subunit F76 with the other hand as shown in FIG. 18 so as to play the game. For example, when the player inclines the stick F78a (see FIGS. 49A, 49B, 49C and 50) on the subunit F76, the player character P is moved in the virtual game space S in accordance with the inclining direction. Further, when the player moves his or her hand holding the core unit F70 with respect to the display screen, the target cursor Tis moved in accordance with the motion, attitude, position, and the like of the core unit F70 with respect to the monitor F2 (LED modules F8L and F8R). When the player presses the operation button F72i (shown in FIG. 44) on the core unit F70, the player character P shoots the gun G at the target cursor T.

That is, while the player uses the stick F78a on the subunit F76 so as to instruct the player character P to move, the player can operate the core unit F70 as if the core unit F70 is a gun for the shooting game, thereby enhancing enjoyment in playing a shooting game. The player can perform an operation of moving the player character P and an operation of moving the target cursor T by using respective units held by different hands, whereby the player can perform the respective operations as independent ones. For example, since the virtual game space S displayed on the display screen is changed in accordance with the movement of the player character P, it is sometimes difficult to keep the target positioned near a position observed by the player in the virtual game space S because, for example, the player may be paying attention to the opponent character E suddenly jumping into the virtual game space S. However, while the player is moving the player character P with one hand (for example, a thumb of a left hand), the player can control a motion of the arm (for example, a right arm) which is not used for moving the player character P such that the core unit F70 has its front surface pointed to the observed position, thereby substantially enhancing flexibility for operating the controller F7 and increasing the reality of the shooting game. Further, in order to move the target cursor T, the player moves the controller. However, the operation of moving the controller does not hinder the player from performing a direction instruction operation for moving the player character P, thereby enabling the player to stably perform the two direction instruction operations. That is, by using the controller F7, the player can freely use his or her left and right hands and can perform a new operation having increased flexibility, which cannot be achieved using a physically single controller.

In a second example, a player inclines the stick F78a on the subunit F76 so as to move the player character P in the virtual game space S in accordance with the inclining direction as in the first example. The player moves a hand holding the core unit F70 with respect to the display screen so as to move a sight point of a virtual camera in accordance with a position of the core unit F70 with respect to the monitor F2 (LED modules F8L and F8R). These operations allow the player to observe a position to which the core unit F70 is pointed in the virtual game space S while operating the stick F78a on the subunit F76 so as to instruct the player character P to move.

In the above description, the controller F7 and the game apparatus F3 are connected to each other by wireless communication. However, the controller F7 and the game apparatus F3 may be electrically connected to each other by a cable. In this case, the cable connected to the core unit F70 is connected to a connection terminal of the game apparatus F3.

Moreover, in the present embodiment, only the core unit F70 among the core unit F70 and the subunit F76 of the controller F7 has the communication section F75. However, the subunit F76 may have the communication section for wirelessly transmitting the transmission data to the receiving unit F6. Further, both the core unit F70 and the subunit F76 may have the respective communication sections. For example, the respective communication sections included in the core unit F70 and the subunit F76 may wirelessly transmit the transmission data to the receiving unit F6, or the communication section of the subunit F76 may wirelessly transmit the transmission data to the communication section F75 of the core unit F70, and the communication section F75 of the core unit F70 may wirelessly transmit, to the receiving unit F6, the received transmission data from the subunit F76 and the transmission data of the core unit F70. In these cases, the connecting cable F79 for electrically connecting between the core unit F70 and the subunit F76 can be eliminated.

In the above description, the receiving unit F6 connected to the connection terminal of the game apparatus F3 is used as a receiving means for receiving transmission data which is wirelessly transmitted from the controller F7. Alternatively, the receiving means may be a receiving module built in the game apparatus F3. In this case, the transmission data received by the receiving module is outputted to the CPU F30 via a predetermined bus.

Although in the present embodiment the imaging information calculation section F74 included in the core unit F70 is described as an example of a determining section for outputting a signal (process result data) in accordance with a motion of the core unit F70 body, the imaging information calculation section F74 may be provided in another form. For example, the core unit F70 may include the acceleration sensor F701 as described above, or may include a gyro sensor. The acceleration sensor or the gyro sensor can be used to determine a motion or attitude of the core unit F70, and, therefore, can be used as a determining section for outputting a signal in accordance with the motion of the core unit F70 body using the detection signal for the motion or attitude. In this case, the imaging information calculation section F74 may be eliminated from the core unit F70, or sensor and the imaging information calculation section can be used in combination.

Further, although in the present embodiment only the core unit F70 includes the imaging information calculation section F74, the subunit F76 may also include a similar imaging information calculation section.

Further, when the controller F7 includes a plurality of units, each of which may have a plurality of operation means such as the imaging information calculation section, the acceleration sensor, the gyro sensor, the stick, the cross key, and the operation button, various combination of the operation means can realize various controllers. Here, the operation means included in the core unit F70 and the subunit F76 are classified into an operation means A and an operation means B. The operation means A, such as the imaging information calculation section F74, the acceleration sensors F701 and F761, and the gyro sensor, outputs a signal in accordance with the movement of the unit body. The operation means B, such as the stick, the cross key, the operation button, the touch pad, outputs a signal in accordance with the player pressing a button, tilting a component, or touching the same.

When the core unit F70 includes the operation means A and the subunit F76 includes the operation means B, the player can move one hand holding the core unit F70 while the player makes an input with a finger of the other hand holding the subunit F76 as in the case of a conventional controller. That is, the player can perform different operations with a right and a left hands, respectively, thereby realizing a new operation which cannot be performed by a conventional controller. In this case, according to various embodiments, operation data outputted by the operation means A corresponds to first operation data, and operation data outputted by the operation means B corresponds to second operation data. Further, the controller may be constructed such that the subunit F76 may include the operation means A, the core unit F70 may include the operation means A, and the subunit F76 may include the operation means A and the operation means B. In this manner, the player can move both hands individually, thereby realizing an increasingly improved operation. In this case, according to various embodiments, operation data outputted by the operation means A of the subunit F76 corresponds to third operation data.

Further, when the core unit F70 and the subunit F76 each includes the operation means A, the player can move one handholding the core unit F70 while the player can move the other hand holding the subunit F76 so as to make an input. That is, the player can move a right and a left hands individually, thereby realizing a new operation which cannot be performed by a conventional controller. In this case, according to various embodiments, operation data outputted by the respective operation means A of the core unit F70 and the subunit F76 correspond to first operation data and second operation data. Further, each of the core unit F70 and the subunit F76 may include both the operation means A and the operation means B. In this manner, the player can perform operations by moving both hands and using fingers of both hands, thereby realizing a new operation. In this case, according to various embodiments, operation data outputted by the operation means B of the core unit F70 corresponds to first key operation data, and operation data outputted by the operation means B of the subunit F76 corresponds to second key operation data.

Furthermore, when each of the core unit F70 and the subunit F76 includes the operation means A, one of the core unit F70 or the subunit F76 may include various types of operation means A. As described above, when the operation means A includes the imaging information calculation section, a direction, a position, and the like of the unit with respect to the imaging target (marker) can be calculated, thereby enabling an operation based on the direction and the position of the unit with respect to the monitor F2. On the other hand, when the operation means A includes the acceleration sensor or the gyro sensor, a tilt, an attitude, a position, and the like of the unit itself can be calculated, thereby enabling an operation based on the attitude and the position of the unit. Accordingly, when the core unit F70 includes the imaging information calculation section and one of the acceleration sensor or the gyro sensor, and the subunit F76 includes the acceleration sensor or the gyro sensor, the core unit F70 can perform the aforementioned two operations. In this case, according to various embodiments, operation data outputted by the imaging information calculation section of the core unit F70 corresponds to first operation data, operation data outputted by the acceleration sensor or the gyro sensor of the subunit F76 corresponds to second operation data, and operation data outputted by the acceleration sensor or the gyro sensor of the core unit F70 corresponds to third operation data.

In the present embodiment, image data taken by the image pickup element F743 is analyzed so as to obtain position coordinates and the like of an image of infrared lights from the LED modules F8L and F8R, and the core unit F70 generates process result data from the obtained coordinates and the like and transmits the process result data to the game apparatus 3. However, the core unit F70 may transmit data obtained in another process step to the game apparatus F3. For example, the core unit F70 transmits to the game apparatus F3 image data taken by the image pickup element F743, and the CPU F30 may perform the aforementioned analysis so as to obtain process result data. In this case, the image processing circuit F744 can be eliminated from the core unit F70. Alternatively, the core unit F70 may transmit, to the game apparatus F3, the image data having been analyzed halfway. For example, the core unit F70 transmits to the game apparatus F3 data indicating a brightness, a position, an area size and the like obtained from the image data, and the CPU F30 may perform the remaining analysis so as to obtain process result data.

Although in the present embodiment infrared lights from the two LED modules F8L and F8R are used as imaging targets of the imaging information calculation section F74 in the core unit F70, the imaging target is not restricted thereto. For example, infrared light from one LED module or infrared lights from at least three LED modules provided in the vicinity of the monitor F2 may be used as the imaging target of the imaging information calculation section F74. Alternatively, the display screen of the monitor F2 or another emitter (room light or the like) can be used as the imaging target of the imaging information calculation section F74. When the position of the core unit F70 with respect to the display screen is calculated based on the positional relationship between the imaging target and the display screen of the monitor F2, various emitters can be used as the imaging target of the imaging information calculation section F74.

The aforementioned shapes of the core unit F70 and the subunit F76 are merely examples. Further, the shape, the number, setting position and the like of each of the operation section F72 of the core unit F70 and the operation section F78 of the subunit F76 are merely examples. In various embodiments, the shape, the number, the setting position, and the like of each of the core unit F70, the subunit F76, the operation section F72, and the operation section F78 may vary and still fall within the scope of various embodiments. Further, the imaging information calculation section F74 (light entrance of the imaging information calculation section F74) of the core unit F70 may not be positioned on the front surface of the housing F71. The imaging information calculation section F74 may be provided on another surface at which light can be received from the exterior of the housing F71.

Further, although the speaker F706, the sound IC F707, and the amplifier F708 as described above are included in the core unit F70, any devices at hand capable of outputting a sound may be included in either the subunit F76 or the core unit F70.

Thus, the controller according to various embodiments allows a player to operate both the core unit F70 and the subunit F76 included therein so as to enjoy a game. For example, the core unit F70 has a function of outputting a signal in accordance with a motion of the unit body including the imaging information calculation section F74 and the accelerator sensor F701, and the subunit F76 has a function of outputting a signal in accordance with a direction input operation performed by the player. For example, when used is a controller into which the core unit F70 and the subunit F76 are integrated, the whole controller has to be moved so as to output a signal in accordance with the motion of the unit body, thereby exerting some influence on the direction input operation. Further, the integration of the core unit F70 and the subunit F76 causes the opposite influence, that is, flexibility, which is realized by separation between the core unit F70 and the subunit F76, is substantially reduced. As another example, the core unit F70 may have a function of outputting a signal in accordance with a motion of the unit body including the imaging information calculation section F74 and the acceleration sensor F701, and the subunit F76 may have a function of outputting a signal in accordance with the motion of the unit body including the acceleration sensor F761. Therefore, the player can move both hands holding the different units individually so as to make an input. Accordingly, the core unit F70 and the subunit F76 can be separated into a right unit and a left unit as in the case of a conventional controller for the game apparatus, and simultaneously the core unit F70 and the subunit F76 allow the player to freely use his or her right and left hands, thereby providing the player with a new operation, which cannot be performed by the integrated controller. Further, the controller can be operated with substantially enhanced flexibility, thereby providing a player with a game operation having increased reality.

The game controller and the game system according to various embodiments can realize an operation having increased flexibility, and are useful as a game controller which includes two independent units and is operated by a player holding the two independent units, a game system including the game controller, and the like.

Motion Control for Gaming Devices

In some embodiments, a gaming device, such as a mobile gaming device, receives inputs in the form of motion. For example, a human holding a mobile gaming device may make commands or provide instructions by tilting the device, moving the device in some direction, rotating the device, shaking the device, hitting the device against something, tossing the device, or providing any other motion-based inputs to the device. The motions may translate to one or more commands or instructions used in a game. The motions may also translate to commands or instructions or requests used for other purposes, e.g., beyond the play of a game. Commands, instructions, requests, and specifications may include: (a) an instruction to place a bet; (b) a specification of the size of a bet; (c) an instruction to begin a game; (d) an instruction to pursue a particular strategy in a game; (e) an instruction to hold a particular card in a game of video poker; (f) an instruction to hit in a game of blackjack; (g) an instruction to cash out; (h) an instruction to switch games; (i) a specification of a particular type of game to play; (j) an instruction to make a particular selection in a bonus round; (k) a request to order a drink; (l) a request to order food; (m) an instruction to summon a casino representative; (n) a request to redeem comp points; (o) a request to receive a comp benefit; (p) an instruction to open up a line of communication with another person (e.g., with a friend who is also in a casino); (q) an instruction to make a withdrawal from an account (e.g., from a bank account); (r) an instruction to fund an account (e.g., to fund an account a player has with a casino with gaming credits); (s) a request to make a purchase; (t) a request to purchase show tickets; (u) an instruction to make a reservation at a restaurant; (v) a request for information; (w) a request for information about a pay table (e.g., about the payouts on a pay table); (x) a request for a location of a particular room; (y) a request to check into a hotel room; (z) a request to reserve a hotel room; (aa) a request to check on show times; (ab) a request to claim a jackpot; (ac) a request to make a phone call; (ad) a specification of a phone number; (ad) a request to access a network; (ae) a request to access the Internet; (af) a specification of a Web or URL address; (ag) a request to receive information about another player; (ah) a request to see information about a game outcome of another player; (ai) a request to see information about the gaming history of another player; (aj) a request to receive information about one or more players, dealers, gaming devices, or game tables (e.g., a request to see the most recent outcomes for any of the aforementioned); and any other request, instruction, command, or specification. The mobile gaming device may include hardware and/or software for detecting motions. The mobile gaming device may work in conjunction with external hardware or software for detection motions. The mobile gaming device or another device may include software for translating motions detected into instructions that can be used in conducting a game or in any other fashion.

Herein, "motion control" may include using motion as an input to a game, using motion as a command, and/or using motion as instructions. Motion control may include using the motion of a mobile gaming device to provide inputs to the games played on the mobile gaming device, to select games to play, to indicate a player's desire to cash out, or to provide various other instructions or indications.

1. TECHNOLOGIES. Various technologies may be used to enable motion control. Such technologies may include technologies for sensing motion, including such information as acceleration, velocity, angular motion, displacement, position, angular displacement, angular velocity, angular acceleration, impact shocks, and any other information that may be associated with motion. Technologies may include sensors, including hardware sensors. Technologies may also include software for translating information received from sensors into information about the position, trajectory, or other spatial information about a mobile gaming device. For example, software may be used to translate acceleration information into position information, e.g., through double integration. Various technologies may or may not be described in the following references, each of which is hereby incorporated by reference herein: (1) United States Patent Application 20040046736 "Novel man machine interfaces and applications"; (2) United States Patent Application 20030100372 "Modular entertainment and gaming systems"; (3) U.S. Pat. No. 7,058,204 "Multiple camera control system"; (4) U.S. Pat. No. 5,534,917 "Video image based control system"; (5) United States Patent Application 2006081453 "ORIENTATION-SENSITIVE SIGNAL OUTPUT"; (6) United States Patent Application 20060098873 "Multiple camera control system"; (7) U.S. Pat. No. 6,850,221 "Trigger operated electronic device"; (8) United States Patent Application 20070072680 "Game controller and game system"; (9) United States Patent Application 20070066394 "VIDEO GAME SYSTEM WITH WIRELESS MODULAR HANDHELD CONTROLLER"; (10) United States Patent Application 20070050597 "Game controller and game system"; (11) United States Patent Application 20070049374 "Game system and storage medium having game program stored thereon"; (12) United States Patent Application 20060139322 "Man-machine interface using a deformable device"; (13) U.S. Pat. No. 6,676,522 "Gaming system including portable game devices"; (14) U.S. Pat. No. 6,846,238 "Wireless game player"; (15) U.S. Pat. No. 6,702,672 "Wireless interactive gaming system"; (16) U.S. Pat. No. 7,148,789 "Handheld device having multiple localized force feedback"; (17) U.S. Pat. No. 7,209,118 "Increasing force transmissibility for tactile feedback interface devices"; (18) U.S. Pat. No. 6,965,868, "System and method for promoting commerce, including sales agent assisted commerce, in a networked economy"; and (19) U.S. Pat. No. 7,058,204, "Multiple camera control system".

1.1. CAMERA IN THE DEVICE. A camera on the mobile gaming device may capture images. As the mobile gaming device moves, different images will likely be captured by the camera. Stationary objects may appear to move between the images captured in successive frames. From the apparent motion of the stationary objects, the motion of the mobile gaming device may be inferred.

1.2. EXTERNAL CAMERAS. External cameras, such as stationary wall-mounted cameras, may film the mobile gaming device and/or the player holding the mobile gaming device. From footage of the mobile gaming device, algorithms may infer the motion of the mobile gaming device.

1.3. EXTERNAL READERS (E.G., RANGE FINDERS). External sensors or readers may detect the motion of the mobile gaming device. For example, ultrasound waves or lasers may be bounced off the mobile gaming device. From changes in the reflected sound or light, the motion of the mobile gaming device may be inferred.

1.4. ACCELEROMETERS. A mobile gaming device may include built-in accelerometers. These may detect changes in velocity, which may be used to infer other aspects of motion, such as change in position or velocity.

1.5. GYROSCOPE SENSORS. A mobile gaming device may contain internal gyroscopes. These may detect an orientation of the mobile gaming device. Information from a gyroscope may be used to infer other information, such as angular displacement.

1.6. POSITION DETECTORS INTERNAL (GPS). A mobile gaming device may include position detectors, such as sensors for a global positioning system or for a local positioning system. Position, when measured over time, may be used to infer other aspects of motion, such as velocity or acceleration.

1.7. POSITION DETECTORS EXTERNAL. External detectors may measure the position of a mobile gaming device. For example, the mobile gaming device may emit a signal in all directions. Based on the time it takes the signal to reach various fixed detectors, the position of the mobile gaming device may be inferred.

1.8. RFID. DETECT AS THE SIGNAL STRENGTH OF AN RFID GETS STRONGER OR WEAKER. A mobile gaming device may contain a radio frequency identification (RFID) tag or other radio frequency emitting device. Based on the reception of the signal from the RFID tag, information about the position of the mobile gaming device may be inferred. For example, if the signal received is weak, it may be inferred that the mobile gaming device is far from a fixed receiver. If the received signal is strong, it may be inferred that the mobile gaming device is near to the fixed receiver.

2. SWITCH FOR MOTION COMMANDS. ENABLE SWITCH FOR THE MOTION COMMAND. PRESS MOTION BUTTON, AND WHILE PRESSED, MOTION WORKS. COULD BE A CONSTANT COMMAND OR TOGGLE ON OR OFF TO MAKE THE COMMAND BE IN FORCE. TO ENABLE THAT YOU'RE IN MOTION CONTROL MODE, YOU COULD GO THROUGH ALL THESE MOTIONS. In various embodiments, motion control may alternately enabled or disabled. At some times motion control may be in use, while at other times motion control may not be in use. For example, at a first time a the motion of a mobile gaming device may cause decisions to be made in a game, while at a second time the motion of a mobile gaming device may not have any effect on a game. When motion control is enabled, a player may be able to conveniently engage in game play. When motion control is off, a player may move a mobile gaming device inadvertently without worry that such movement will affect a game. Thus, there may be reasons at various times to have motion control enabled, and reasons at various times to have motion control disabled.

2.1. TOGGLE ON AND OFF. In various embodiments, a player must provide continuous, substantially continuous, or persistent input in order to maintain the enablement of motion control. Continuous input may include continuous pressure, such as the continuous pressing and holding of a button. Continuous input may include continuous squeezing of buttons or of the device (e.g., the mobile gaming device) itself. In some embodiments, continuous input may include repeated pressing of a button such that, for example, each button press occurs within a predetermined time interval of the previous button press. In various embodiments, continuous input may include continuous contact. For example, to maintain the enablement of motion control a player must maintain a finger or other appendage in constant contact with a touch sensitive device (e.g., on the mobile gaming device). In various embodiments, a continuous input may require the player to continuously supply heat, such as body heat through contact. In various embodiments, continuous input may require the player to continuously supply a finger print, e.g., through keeping a finger in continuous contact with fingerprint reader. In various embodiments, continuous input may include continuous noise or sound generation, e.g., continuous humming by the player.

So long as a player provides a continuous input, the player may be able to move the mobile gaming device or some other device in order to control action in a game or to otherwise provide commands, instructions or other inputs. For example, to provide an input using motion, a player may press a button on a mobile gaming device and, while the button is pressed, move the mobile gaming device around. Should the player let go of the button, the motion of the mobile gaming device would cease to be used as an input. Should the player then resume pressing the button, the player may once again use the motion of the mobile gaming device as an input.

In various embodiments, a continuous input may be provided to the mobile gaming device, e.g., when the player holds a button on the mobile gaming device. In various embodiments, a player may provide continuous input to another device. For example, the player may hold down a foot pedal. The foot pedal may be in communication with the mobile gaming device, either directly or indirectly, or the foot pedal may be in communication with another device which would be controlled by the motion of the mobile gaming device. Thus, based on whether the foot pedal is pressed, a determination may be made as to whether the motion of the mobile gaming device will be used to control a game or to provide other input.

In some embodiments, a continuous input from the player is necessary to disable motion control. In the absence of the continuous input (e.g., if a button is not pressed), the motion of the mobile gaming device will be used to control a game or to provide other direction.

2.2. CONSTANT COMMAND. In various embodiments, a single input, set or inputs, or an otherwise limited set of inputs may switch motion control on or off. For example, a player may press a button to switch motion control on. The player may press the same button again to switch motion control off. As another example, a player may flip a switch one way to switch motion control on, and may flip the switch the other way to switch motion control off. As another example, a player may select from a menu an option to enable motion control. The player may later select another option from the menu to disable motion control.

Once motion control has been enabled (e.g., with a single press of a button), the motion of the mobile gaming device may be used to control a game or to provide other directions. No further input to enable motion control may be required beyond the initial flipping of a switch or pressing of a button, for example.

2.2.1. MOTION CONTROL GOES OFF WHEN: In some embodiments, motion control may be automatically disabled under certain circumstances. For example, when the player has selected from a menu an option to enable motion control, motion control may remain enabled until some triggering condition occurs which will cause motion control to be automatically disabled.

2.2.1.1. NO MOTION FOR A WHILE. If, for some period of time, there has been no motion, no significant motion, no detectable motion, and/or no motion that is translatable into a coherent instruction, then motion control may be automatically switched off. Motion control may be automatically switched off after 30 seconds, for example.

2.2.1.2. DEVICE LOWERED OR PUT IN POCKET. If a mobile gaming device has been lowered then motion control may be disabled. For example, it may be presumed that a player has put down a mobile gaming device and is no longer playing the mobile gaming device, therefore motion control may be disabled automatically. If a mobile gaming device has been placed in a player's pocket, motion control may be disabled automatically. If, for example, the sensors in the mobile gaming device no longer detect light, and/or detect proximate body heat, motion control may be disabled.

2.2.2. KEYBOARD LOCKING TO AVOID SWITCHING ON MOTION CONTROL ACCIDENTALLY. In various embodiments, a key, switch, or other input device may be manipulated (e.g., pressed) in order to enable motion control. It is possible, in some embodiments, that a player would inadvertently press a button or otherwise manipulate an input device so as to enable motion control. In various embodiments, a key pad of a mobile gaming device may be locked. For example, the player may press a key or sequence of keys that lock the keypad so that that the same input devices which would enable motion control are temporarily non-functional. In various embodiments, only the input devices that could be used to enable motion control are disabled.

2.3. In various embodiments, an alert is provided when motion control is enabled. For example, a mobile gaming device may beep, buzz, or emit a tone when motion control is enabled. A text message may be displayed, lights may flash, or other visual alerts may be output when motion control is enabled. In various embodiments, a voice output may be used to alert a player that motion control is enabled.

In various embodiments, an alert may indicate that motion control has been disabled. The alert may take the form of text, flashing lights, audio, voice, buzzing, vibrating, or any other form.

3. USE OF VERY PRECISE OR DEFINITIVE MOTION FOR IMPORTANT THINGS (WHERE MONEY IS ON THE LINE), AND LESS PRECISE MOTION FOR LESS IMPORTANT THINGS. THIS WAY, ACCIDENTS LIKE "BET MAX" ARE AVOIDED. ALSO, CERTAIN BETS, LIKE "BET MAX" ARE NOT ALLOWED WHEN MOTION IS ON. In various embodiments, the nature or degree of motion required to provide an instruction may depend on the nature of the instruction itself. Some instructions may require a motion encompassing relatively small displacements, small accelerations, small changes in angle, and/or other small changes. Other instructions may require a motion encompassing relatively large displacements, relatively large accelerations, relatively large changes in angle, or relatively large amounts of other changes. What constitutes a large displacement, acceleration, change in angle, or other change may be defined in various ways, e.g., by some threshold. Thus, for example, a displacement of more than six inches may be considered large or at least may be considered sufficient for one type of instruction. Some instructions may require motions with a large number of repetition or a long sequence of motion (e.g., the device is moved up then down, then side to side, then up again). Some instructions may require motions with little repetition or with a small sequence of motion (e.g., up then down).

3.1. SIZE OF BET. The nature of motion required may depend on the size of a bet placed. For a player to place a large bet (e.g., a bet greater than a certain threshold amount), the player may be required to use motions encompassing large displacements, accelerations, changes in angle, and or other large changes. For a smaller bet, the player may use motions encompassing smaller changes. In various embodiments, the degree of motion may not itself specify the size of a bet. For example, making a motion encompassing a large displacement may not in and of itself specify that a bet should be $25. The specification of a bet may still require a precise sequence of motions, such as one motion for each digit describing the bet, or such as one motion for each credit bet. However, a large bet may require that each of the motions used be more expansive or more emphasized than what would be required with a smaller bet. What constitutes a large bet may vary, and may include any bet that is greater than some threshold, such as $10. Further, there may be multiple thresholds of bets, with each threshold requiring a more emphatic or expansive set of motions.

3.2. SIZE OF POTENTIAL PAYOUT. The nature of motion required may depend on the size of a potential payout. For example, a player may be engaged in a game of video poker and may receive an intermediate outcome comprising five cards. If the intermediate outcome includes four cards to a royal flush, the player may have a large potential payout should he complete the royal flush. Accordingly, when the player selects cards to keep and/or cards to discard, expansive or emphatic motion may be required. If the intermediate outcome does not make a large payout likely, then less expansive or emphatic motions may be required for the player to choose discards. In various embodiments, a mobile gaming device, casino server, or other device may determine whether or not a large payout is possible and/or the probability of a large payout. Based on the size of the payout, the probability of the payout, and/or the possibility of the payout, the nature of the motion required to make a decision in a game may be varied.

3.3. MAKING A SUBOPTIMAL DECISION. In various embodiments, the motion required to make an optimal decision may be less than that required to make a suboptimal decision. For example, to make a blackjack decision that maximizes a player's expected winnings may require a relatively small displacement, while to make another decision may require a large displacement. In various embodiments, a mobile gaming device, casino server, or other device may determine a strategy that maximizes a player's expected winnings, that maximizes a potential payout for the player, or that maximizes some other criteria for the player. The mobile gaming device may accept relatively less expansive motions which provide instruction to follow the best strategy, while the mobile gaming device may require relatively more expansive motions if such motions correspond to an instruction to follow a strategy other than the best strategy.

4. CALIBRATION SEQUENCE, TUTORIAL. MAY BE REQUIRED SO YOU CAN'T LATER CLAIM THAT YOU DIDN'T MEAN TO MAKE A BET. In various embodiments, a player may go through an exercise to calibrate a mobile gaming device to his way of providing motion. Each player may be unique. For example, each player may have arms of a different length, hands of a different size, different body mechanics, different muscle strengths, and other differences which may affect the way a player moves a mobile gaming device. Thus, a player may go through a process of training the mobile gaming device to recognize the individual player's motions. In various embodiments, the mobile gaming device may guide the player through a sequence of steps in order to calibrate the mobile gaming device. The mobile gaming device may provide the player with instructions, e.g., using the screen display of the mobile gaming device or using voice prompts.

4.1. MAKE A MOTION X TIMES. OK, THIS WILL BE HOW YOU BET. In various embodiments, the mobile gaming device may instruct the player to make a particular motion. Exemplary instructions may include: "move the mobile gaming device up"; "move the mobile gaming device up 6 inches"; "move the mobile gaming device down"; "move the mobile gaming device left"; "move the mobile gaming device right"; "tilt the mobile gaming device left"; "tilt the mobile gaming device right"; "rotate the screen of the mobile gaming device towards you"; "shake the mobile gaming device"; "tap the mobile gaming device against something". The mobile gaming device may instruct the player to make a sequence of motions. Exemplary instructions may include: "move the mobile gaming device up and then to the right"; "move the mobile gaming device up, then down, then up again"; "tilt the mobile gaming device left and move it left". The mobile gaming device may instruct the player to perform a given motion one or more times. For example, the mobile gaming device may instruct the player to perform a given motion five times. When the player performs a motion multiple times, the mobile gaming device may have more data with which to establish an "average" motion or an expected range of motion which will be used to correspond to a given instruction. In various embodiments, a player may be asked to repeat the same motion several times in succession. In various embodiments, a player may be asked to perform a number of different motions such that certain motions are repeated, but not necessarily right after one another. Throughout the process of a player making motions (e.g., while holding the mobile gaming device), the mobile gaming device or another device may record data about the motions. For example, the mobile gaming device may record the amount of displacement, the amount of acceleration, the speed, the time taken to complete a motion, the amount of angular rotation, and/or any other aspects of the motion. In the future, the mobile gaming device or other device may associate similar data with the same motion. For example, if a player was asked to move a mobile gaming device in a particular way and if data was recorded about the way in which the player actually did move the mobile gaming device, then it may be assumed that if similar data is received in the future then the player has again tried to move the mobile gaming device in the same particular way. In various embodiments, certain motions from the player may not be accepted. For example, the mobile gaming device may have software with inbuilt expectations about what an "up" motion should be. If the mobile gaming device has asked the player to move the mobile gaming device "up" and the mobile gaming device detects what it interprets as a downward motion, then the mobile gaming device may take various actions. The mobile gaming device may ask the player to please try again. The mobile gaming device may tell the player that he has not followed instructions and that he should have moved the mobile gaming device up.

4.2. TEST. In various embodiments, a player may be asked to perform a motion of his choice. The mobile gaming device may then try to identify the motion. The mobile gaming device may indicate, for example, whether the motion was up, down, to the left, etc. The mobile gaming device may indicate the instruction that the motion was interpreted as. For example, the mobile gaming device may indicate that the motion was a "discard first card" instruction or that the motion was a "spin reels" motion. After a mobile gaming device indicates its interpretation of a motion, the player may confirm whether or not the mobile gaming device was correct. For example, the player may press a "correct" or "incorrect" button on the mobile gaming device. If the mobile gaming device has incorrectly identified one or more player motions, then the player may be asked to go through a process of training, e.g., an additional process of training. In various embodiments, training may continue until the mobile gaming device can successfully identify all player motions and/or all player instructions (e.g., until the mobile gaming device is correct on 50 straight trials).

4.3. TUTORIAL. In various embodiments, a training session or tutorial may be geared towards a player. The mobile gaming device, another device, or a human (e.g., a casino representative) may show the player which motions to use for various instructions. For example, the mobile gaming device may tell the player to tilt the mobile gaming device twice to the left to discard the first card in a game of video poker. The player may then be asked to try the motion one or more times. At some point, a player may be tested as to his understanding of which motions perform which commands. The player may be asked to do various things, such as to initiate a game, such as to make a "double down" decision in blackjack, such as to cash out, or such as any other thing. In various embodiments, the player may be required to repeat the tutorial and/or may be prevented from gaming using motion control until he passes a test of his knowledge of which motions perform which instructions. Passing may include, for example, providing accurate motions for all 10 things one is asked to do. In some embodiments, a player may be required to take a game-specific tutorial and/or to pass a game-specific test prior to playing a particular game. The game may require specialized motions and it may therefore be prudent for the player to take a tutorial on such motions. Absent taking a game-specific test or tutorial, a player may still be allowed to play other games.

4.4. SIGN OR OTHERWISE VERIFY YOU WENT THROUGH THE TUTORIAL. In various embodiments, a player may be asked to confirm or verify that he completed a tutorial, such as a tutorial which instructs the player on what motions to use for particular instructions. The player may confirm by providing a biometric reading (e.g., by touching his thumb to a touchpad), by signing something (e.g., by signing the screen of his mobile gaming device with a stylus), by recording a voiced statement to the effect that he has completed the tutorial, or by providing any other confirmation.

4.5. MOTION AIDS, CAN BE TURNED ON OR OFF. FOR EXAMPLE, LITTLE ARROWS ON THE SCREEN EXPLAIN HOW TO MOVE THE DEVICE TO MAKE VARIOUS BETS. BUT AS YOU GET USED TO THESE, YOU CAN TURN THE ARROWS OFF. In various embodiments, a player may be provided with various aids or hints during a game, the aids telling the player how to provide certain instructions. For example, text displayed on the screen of a mobile gaming device may tell the player what motion to make to "hit", what motion to make to "stand", and so on. In a game of video poker, a voice may be emitted from the mobile gaming device telling the player how to discard the first card, how to discard the second card, and so on. For example, the voice may say, "tilt the device forward to discard the third card". In another example, arrows may appear showing the player how to move the device to provide a particular instruction. For example, an arrow pointing left that is superimposed on a card may tell the player to tilt the device left in order to discard the card. In various embodiments, the aids or hints may be turned on or off by the player. An inexperienced player may wish to have the aids on. However, eventually the player may become so familiar with the motion control that the player may wish to turn off the aids. The mobile gaming device may then no longer provide hints or aids as to what motions to make in order to provide a particular instruction. In some embodiments, hints or aids may appear automatically or by default, such as when a player first begins playing a new type of game (e.g., such as when the player first starts playing video poker). In some embodiments, the default setting is not to have aids.

4.6. CUSTOMIZE MOTIONS. I WANT X TO MEAN Y. THESE CAN BE COMPLICATED SETS OF INSTRUCTIONS. In various embodiments, a player may customize the motions that will correspond to various instructions. The mobile gaming device may take the player through a calibration sequence where the mobile gaming device asks the player what motion he would like to make to correspond to a given instruction. The player may be asked to make the motion some number of times, such as a fixed number of times or such as a number of times needed in order for the player to establish a consistency of motion or for the mobile gaming device to extract the essential parameters of the motion. The calibration sequence may proceed through one or more instructions until the player has created a motion corresponding to each. In various embodiments, each instruction may correspond to a default motion. The player may have the opportunity to change the default motion to another motion that better suits his preferences. In various embodiments, a player may wish for a motion to correspond to a sequence of instructions, e.g., a long or complicated sequence of instructions. For example, the player may wish for a single motion to correspond to the following sequence: (1) bet $5; (2) initiate a game of video poker; and (3) automatically choose discards in accordance with optimal strategy. The motion may be a motion where the player shakes the mobile gaming device twice, for example. Thus, in various embodiments, a simple motion may be used to execute a lengthy or complicated set of instructions. This may allow a player to conveniently perform desired sequences of actions.

5. THERE MAY BE CONFIRMATION. A DISPLAY MAY SAY, "YOU HAVE MOTIONED TO BET 10." In various embodiments, following a motion made by a player (e.g., following the player moving the mobile gaming device), a confirmation or an interpretation of the player's motion may be output. The mobile gaming device or another device may make such a confirmation. The mobile gaming device may display a message on its display screen indicating how the player's motion has been interpreted. For example, the mobile gaming device may display a message indicating that the player has instructed that a bet of 10 be placed on a game. The mobile gaming device may also output a message in the form of audio (e.g., using synthetic voice) or in any other format. The player may have the opportunity to view the message and to take action if he believes his motions have been misinterpreted as the wrong instructions. For example, the mobile gaming device may output an audio message using synthetic voice. The audio message may say, "You have chosen to stand. Shake the mobile gaming device if this is not your intention." The player may have some limited period of time in which to take an action to prevent the mobile gaming device from carrying out the misconstrued instruction. If the player takes no action, the instruction that has been construed by the mobile gaming device may be carried out. The player may also have the opportunity to confirm an interpretation of his motion and, for example, to thereby cause his instructions to be executed more quickly. For example, the player may shake a mobile gaming device once to confirm an interpretation of the player's prior motion by the mobile gaming device, and to thereby allow the mobile gaming device to execute the player's instruction.

5.1. THERE MAY BE VERIFICATION. A PERSON MUST MOTION AGAIN TO COMPLETE A BET. In some embodiments, a player must confirm an interpretation of a motion before his instruction will be executed. In some embodiments, a person must repeat a motion one or more times (e.g., the player must provide the same instruction two or more times) before the instruction will be carried out. In some embodiments, higher levels of verification may be required for instructions with greater consequence, such as instructions to bet large amounts or such as instructions provided when a player has the potential to win a large payout. For example, a player may have 3 seconds to stop a mobile gaming device from executing its interpretation of an instruction to bet $50, but only 1 second to stop a mobile gaming device from executing its interpretation of an instruction to bet $5.

6. MOTION TO VERIFY PLAYER IDENTITY. FOR EXAMPLE, EACH PLAYER MAY MOVE A DEVICE IN A UNIQUE WAY. In various embodiments, the motion of a mobile gaming device or other device may be used as a biometric or as a way to presumably uniquely identify a person. It may be presumed, for example, that each person has a different way in which they would move a mobile gaming device. Software within a mobile gaming device or within another device may capture motion data (e.g., using accelerometers, gyroscopes, cameras, etc.). The software may then determine salient features or statistics about the motion. For example, the software may determine a degree of curvature or loopiness to the motion, a maximum acceleration, a maximum speed, a total displacement, a presence of vibrations, and/or any other characteristics of the motion. When a player attempts to verify his identity by supplying a motion sample (e.g., by moving a mobile gaming device), software may compare his newly supplied motion to a motion previously supplied by the purported player. If the motions match (e.g., if the values of salient features of the motion are the same within some confidence interval), then the player may be presumed to be who he says he is. Having confirmed his identity, a player may be granted certain privileges, such as the right to engage in gaming activities using the mobile gaming device.

6.1. ENTER A PASSWORD WITH MOTION. A PASS-SEQUENCE OF MOTIONS. In various embodiments, a player may enter a password using a set of motions. A password may comprise, for example, a sequence of directional motions, such as "up", "down", "left", and "right". A password may consist of 7 such motions, for example. A player may use such a password to verify his identity, for example. Having provided a correct password, a player may be granted certain privileges, such as the right to engage in gaming activities using the mobile gaming device.

7. STANDARD MOTION USED ACROSS MULTIPLE GAMES. In various embodiments, two or more games may receive similar instructions. For example, two or more games may each receive similar instructions as to how much a player wishes to bet. In various embodiments, a given motion may have the same interpretation (e.g., may convey the same instruction or set of instructions) across multiple games. A player may thereby need to learn to use certain motions only once, yet be able to play many games using those motions.

7.1. In various embodiments, a set of standards may be developed, where such standards indicate what motions are to correspond to what instructions. Games that conform to such standards may be labeled as such. For example, a game that accepts a certain set of motions for standard instructions in the game may be associated with a claim that says, "Conforms to Motion 5.0 Standards" or some similar claim. In various embodiments, there may be multiple different standards. A given game may be capable of accepting motions according to multiple different standards. In various embodiments, a player may choose which standard he wishes for a game to employ. For example, a player may have learned to use motions based on a first standard and so may indicate that a game should use the first standard in interpreting his motions as opposed to using a second standard.

7.2. CASHOUT. An instruction which may be common to two or more games is an instruction to cash out. Such an instruction may correspond to a standard motion, such as shaking the mobile gaming device up and down twice.

7.3. QUIT A GAME. An instruction which may be common to two or more games is an instruction to quit the game. Such an instruction may correspond to a standard motion.

7.4. INITIATE A GAME. An instruction which may be common to two or more games is an instruction to initiate or start play of the game. Following such an instruction in a slot machine game, for example, the reels (or simulated reels) may begin to spin. Following such an instruction in a game of video poker, for example, an initial set of five cards may be dealt. Such an instruction may correspond to a standard motion, such as tapping the mobile gaming device against something.

7.5. MAKING A BET. Instructions which may be common to two or more games may include instructions to specify a bet size. One common instruction may be an instruction to increment a bet by one unit or one credit. Such an instruction would, for example, increase a bet from $3 to $4, or a bet from $0.75 to $1.00. One common instruction may be an instruction to increment a bet by a fixed monetary value, such as by 1 quarter or by one dollar. With instructions available to increment bets, a player may specify a bet size by repeatedly incrementing a bet until it reaches the desired size. In various embodiments, instructions to decrement a bet may also be available and may also be standardized. An exemplary such instruction may include an instruction to reduce a bet size by one credit.

7.5.1. NUMERALS. In various embodiments, a bet size may be specified with numerals. Standard instructions based on motions may be available for specifying numerals. For example, a first motion may correspond to the number "1", a second motion may correspond to the number "2", and so on.

7.6. REPEAT LAST ACTION. An instruction may include an instruction to repeat a prior action, such as the last action performed. For example, if the player has just used a first motion to instruct a mobile gaming device to discard the first card in a hand of video poker, the player may use a second motion to instruct the mobile gaming device to repeat the last instruction (i.e., the instruction indicated by the first motion), and to apply the last instruction to the second card in the hand of video poker. In various embodiments, an instruction may include an instruction to repeat a prior game. The instruction may indicate that the amount bet and the number of pay lines played from the prior game should be repeated with the current game. Instructions to repeat a prior action, to repeat a most recent action, or to repeat a game may be common to one or more games, and thus may have standard motion associated with them.

7.7. REPEAT LAST ACTION FROM THIS SITUATION. An instruction may include an instruction to repeat an action from a similar situation in the past. For example, if a player is playing a game of blackjack, the player may provide an instruction to make the same decision that he had made in a previous game in which he had the same point total and in which the dealer had the same card showing. Such an instruction may be associated with a motion. Such a motion may be standardized across two or more games.

7.8. MOTION GENERATES RANDOM NUMBERS. In some embodiments, motion is used to generate one or more random numbers used in a game. For example, readings from various sensors on the mobile gaming device may be captured when the mobile gaming device is moving. Such readings may be converted into numbers (e.g., using some algorithm). The numbers may, in turn, be used in an algorithm for generating a game outcome. In some embodiments, numbers generated by motion are used as the only input to an algorithm for generating an outcome. In some embodiments, numbers generated from the motion of a mobile gaming device may be paired with other numbers (e.g., with random numbers generated by a separate internal algorithm of the mobile gaming device; e.g., with a number representing a time) in order to generate the outcome of a game.

7.8.1. THE IMAGE CAPTURED IS CONVERTED INTO A RANDOM NUMBER. In some embodiments, an image captured from a camera of a mobile gaming device may be converted into a number. In some embodiments, a sequence of images captured during the motion of a mobile gaming device may be used in combination to generate a random number. For example, numbers representing pixel values may be combined using some function to arrive at a number, e.g., a random number.

7.8.2. THE POSITIONS ARE USED AS A RANDOM NUMBER. In some embodiments, the various positions (e.g., coordinates in two-dimensional or three-dimensional space) to which a mobile gaming device is moved are used to generate numbers, such as random numbers. In some embodiments, accelerations, velocities, durations of motions, paths taken, angular changes, angular accelerations, and any other aspect of motion may be used to generate numbers.

7.9. MOVE THE MOBILE GAMING DEVICE TO KEEP REELS SPINNING. WHEN YOU STOP MOVING, THE REELS STOP. In some embodiments, a player may move a mobile gaming device to draw out the duration of a game. For example, the reels in slot machine game may continue to spin as the player continues to move the mobile gaming device. The reels may stop spinning once the player has stopped moving the mobile gaming device.

8. NEW ARRANGEMENT OF GAME SYMBOLS TO MAKE MOTION CONTROL EASIER. In various embodiments, game indicia, game controls, or other visuals used in a game may be arranged on a display screen of a mobile gaming device in a way that makes it intuitive for a player to interact with such visuals. For example, a player may have available to him four possible motions: (1) tilt the mobile gaming device forward, or away from himself; (2) tilt the device left; (3) tilt the device right; and (4) tilt the device backwards, or towards himself. To make such motions intuitive to use, visuals in a game may be clearly situated in one of four areas of a display screen, namely the top, bottom, left side, and right side. A player may thus readily interact with a visual on top of the screen using a forward tilting motion, with a visual on the left side of the screen using a left tilting motion, with a visual on the right side of the screen using a right tilting motion, and with a visual at the bottom of the screen using a backwards tilting motion. In various embodiments, indicia or other visuals are displayed in an area of a display screen such that the direction of such area from the center of the display screen corresponds to a direction of motion that a player must use in order to interact with such indicia.

8.1. IN VIDEO POKER, CARDS ARE ARRANGED AROUND THE PERIPHERY OF THE SCREEN. THIS WAY, YOU CAN TILT FORWARD, RIGHT, BACK, LEFT, AND MORE CLEARLY INDICATE WHICH CARD TO HOLD. In some embodiments, the cards dealt in a game of video poker may be displayed respectively at the four corners of a display screen on the mobile gaming device, with a fifth card displayed perhaps in the center of the screen. A player may indicate that he wishes to discard a particular card by tilting the mobile gaming device towards the corner of the display screen in which the particular card is displayed. To discard the card in the center, for example, the player may move the mobile gaming device up and down. Thus, by displaying cards in an arrangement other than a linear arrangement, intuitive motion control is facilitated.

8.1.1. PENTAGONAL DISPLAY. In various embodiments, a display may have the shape of a pentagon. A pentagonal display may allow for each corner of the display to be occupied by a different card in a game of video poker, for example. A player may then be able to tilt or otherwise move the mobile gaming device in the direction of one of the corners in order to hold or discard the card which is shown in that corner. In various embodiments, displays of other shapes may be used. The shape of a display may be chosen which most conveniently or intuitively corresponds to a game. In some embodiments, the hardware used for a display may itself maintain a standard form, such as a rectangular form. However, the display may simulate another display which is of a different shape. For example, a rectangular display may simulate a pentagonal display by only illuminating a pentagonal portion of the display screen.

8.2. BETTING BUTTONS MAY ALSO BE ALLOCATED AROUND THE PERIPHERY OF THE SCREEN. In various embodiments, control buttons or control-related visuals may be situated in areas of a display screen that make interaction with such buttons using motion intuitive. Control visuals may correspond to instructions that may be used in a game. Control visuals may include rectangular areas of a display screen labeled "spin", "bet max", "bet 1" "cash out". Control visuals may correspond to any other instructions. Control buttons may be clearly located, for example, near the top, bottom, left, or right side of a display screen. The player may then tilt the mobile gaming device in the same direction as is represented by the location of a control visual relative to the center of the display screen in order to convey the instruction indicated by the control visual. For example, if a control visual labeled "spin" is located on the right side of a display screen, the player may tilt the mobile gaming device to the right in order to spin the reels of a slot machine game (e.g., in order to start a new game).

8.3. BINARY SEARCH SETUP FOR PLAYING WITH MOTION. FOR EXAMPLE, THIS ALLOWS YOU TO MAKE FINE-GRAINED DECISIONS WITH LIMITED INPUTS (E.G., WITH ONLY RIGHT,

LEFT, FORWARD, BACK). In various embodiments, a player may specify an instruction from a range or continuum of possible instructions using a limited set of possible motions (e.g., using only two motions, such as a motion to the left and a motion to the right). To begin with, any instruction may be possible. With each motion a player makes, the player may eliminate a portion of the instructions from consideration. For example, with each motion, the player may eliminate approximately half the remaining possible instructions from consideration. Eventually, after a sequence of motions, only a single instruction will remain. This instruction may then be executed by the mobile gaming device. In some embodiments, a set of possible instructions may be visually indicated with a list on a display screen. The player may tilt the mobile gaming device forward to select the top half of the remaining instructions on the list, and may tilt the mobile gaming device backwards to select the bottom half of the remaining instructions on the list. The remaining instructions may be highlighted, or the instructions which have been eliminated from consideration may disappear. After a sequence of motions from the player, only a single instruction may remain, and may be executed by the mobile gaming device.

9. IT IS POSSIBLE TO HAVE A DEVICE THAT A PERSON DOESN'T NEED TO LOOK AT. MOTION INPUTS CAN OBVIATE THE NEED TO PRESS BUTTONS. THE DEVICE CAN BUZZ TO TELL YOU A GAME IS OVER, AND PERHAPS HOW MUCH YOU'VE WON. In various embodiments, a mobile gaming device may include a device with no display screen. The device may include speakers or other audio output devices. In various embodiments, a mobile gaming device may include a display device, but the display device may not be in use. In various embodiments, a person may play a game using motion control. The person may be informed of a game outcome via voice output from the mobile gaming device. For example, the mobile gaming device may broadcast a synthetic voice telling the player that "the player has lost" or that "the player has won $10". A player may also be informed of an outcome with other audio effects. For example, the sound of chimes may represent a win while a buzzer may represent a loss. The player may then play another game. In this way, the player may proceed to play game after game, without ever looking at the device. A player may thus play, for example, in a dark room. A player may also play while driving or while his vision is otherwise occupied.

10. YOU CAN PRACTICE THIS DEVICE WHEN YOU ARE IN THE CASINO OR EVEN AT HOME. In various embodiments, a player may use motion control on a mobile gaming device in a practice mode, a learning mode, a free play mode, or in some other mode where the player has no money at risk or where the player has a reduced amount of money at risk (e.g., as compared to normal play). The use of motion control in a practice mode may allow the player to learn how to use motion control or may alleviate reservations the player might have with regard to motion control. In various embodiments, a switch, button, or other means of selection may allow a player to switch from practice mode to real mode and/or the other way around. In some embodiments, a mobile gaming device may automatically go into practice mode when it is outside of designated or legal gaming areas, such as when it is off the casino floor. A mobile gaming device may detect its own location using positioning technologies, such as GPS, for example.

10.1. USE A VIDEO GAME CONTROLLER LIKE THE WII TO PRACTICE. In various embodiments, a device other than a mobile gaming device may be used in order to simulate the use of a mobile gaming device. For example, a device used in a computer game console may be used to simulate the use of a mobile gaming device. An exemplary such device is a controller for Nintendo's® Wii™ system which takes as inputs the motions a player makes with the controller. In various embodiments, for example, a Wii console or some other computer console may display graphics representative of casino game graphics or otherwise representative of graphics that might appear on the display screen of a mobile gaming device. The player may move the controller in the same way that he would move the actual mobile gaming device. The graphics displayed may then change as they would on an actual mobile gaming device. Thus, a player may simulate the experience of using a mobile gaming device with a controller for a computer game console. When the player later uses a real mobile gaming device in a casino, for example, the player may benefit from having practiced before.

11. CUSTOMIZE TO YOUR GESTURES. TRAIN THE DEVICE AS TO HOW EXTREME YOU WANT YOUR GESTURES. SOME PEOPLE WANT MODERATE GESTURES. OTHERS WANT TO MAKE EMPHATIC GESTURES. In various embodiments, a person may calibrate the mobile gaming device to recognize or to respond to various degrees or types of gestures. Some people may naturally make large or sweeping motions, while other people may prefer more subdued motions. A person may be asked, e.g., through prompts displayed on a mobile gaming device, to make one or more motions while holding the mobile gaming device. The mobile gaming device may note various characteristics of the motion based on sensor readings (e.g., based on readings from accelerometers stored in the mobile gaming device). For example, the mobile gaming device may note whether the motions made by the person have large or small displacements, rapid or gradual accelerations, long or short durations, and/or whether the motions made by a person have any of two alternate characteristics or have any of three or more alternate characteristics. The mobile gaming device, a casino server, or another device may then store information about the nature of a person's motions. When, in the future, the person provides motions as a means for conveying instructions, the motions may be registered or followed only if such motions matched those provided during the calibration phase. For example, if a person used large and expansive motions during calibration, the person may not be able to provide instruction using small, subdued motions.

12. EXAMPLES OF MOTIONS. Following are some exemplary instructions that may be provided in a game and/or that may be provided to a mobile gaming device. Associated with the exemplary instructions are exemplary motions of a device, such as of a mobile gaming device, that may be used by a player to indicate a desire that the instructions be carried out.

12.1. HOW TO BET. To provide an instruction to bet one credit, a player may shake the mobile gaming device once. To add an extra credit, the player may shake the mobile gaming device again. To add another extra credit, the player may shake the mobile gaming device again, and so on.

12.2. HOW TO STAND. To provide an instruction to stand in a game of blackjack, a player may tilt a mobile gaming device to the left. To provide an instruction to hit, the player may tilt the gaming device to the right. To provide an instruction to split, the player may move the gaming device down then up.

12.3. HOW TO SELECT A GAME. To select a game, a player may tilt the mobile gaming device to the right. Each time the player tilts the mobile gaming device to the right, a different game from a list of games may be highlighted. When the player's desired game is highlighted, the player may tap the mobile gaming device against something.

12.4. HOW TO START A GAME. To start a game, a player may move the mobile gaming device in a clockwise circular motion in a plane parallel to the ground.

12.5. HOW TO MAKE A SELECTION IN A BONUS ROUND. To make a selection in a bonus round, a player may continue tilting the mobile gaming device to the right, with each tilt highlighting a different selection (e.g., a different door with a hidden present behind it). When the player's desired selection is highlighted, the player may tap the mobile gaming device against something to make the selection.

12.6. HOW TO CASH OUT. To cash out, a player may move the mobile gaming device up and down three times. Cashing out may include transferring a balance of credit stored locally on a mobile gaming device to a balance stored centrally, such as with a casino server. Cashing out may include causing a mobile gaming device or a nearby device (e.g., a device with which the mobile gaming device is in communication) to print out a ticket which is redeemable for cash.

13. USE MOTION OF THE MOBILE DEVICE TO CONTROL A STATIONARY GAMING DEVICE OR OTHER DEVICE. In various embodiments, the motion of a mobile gaming device may be used to control action at a stationary gaming device or at any other device. In various embodiments, the motion of a mobile gaming device may be used to provide instructions to a stationary gaming device or to any other device. The mobile gaming device may be in communication with the stationary gaming device, either directly (e.g., through direct wireless contact), or indirectly (e.g., with signals relayed through one or more intermediary devices, such as the casino server). In various embodiments, motions of the mobile gaming device may provide instructions to a stationary gaming device, where such instructions may include instructions to bet, to initiate a game, to cash out, to choose a particular choice from among several choices in a bonus round, to bet a particular amount, to discard a particular card, to make a particular decision in blackjack, to claim a jackpot, to call over a casino representative, or to take any other action. In various embodiments, the motions of a mobile gaming device may be translated in a direct or linear fashion to the motions of a cursor or pointer on the screen of a stationary gaming device. For example, when the mobile gaming device is moved to the right, the cursor may move to the right of the screen, and when the mobile gaming device is moved to the left, the cursor may move to the left of the screen. A player may activate or manipulate a control on the stationary gaming device by moving the mobile gaming device in such a way as to position the cursor on the stationary gaming device over the desired control. The player may then provide a final motion, such as shaking the mobile gaming device, to cause the control to be activated. Thus, for example, a player may move a mobile gaming device to the right in order to move a cursor on the screen of a stationary gaming device to the right to be positioned over a "bet" button (e.g., a rendition of a "bet" button). The player may then shake the mobile gaming device to actually place a bet of 1 credit. A player may use the mobile gaming device to control other devices as well, such as ATM machines or vending machines. For example, a player may use the motion of a mobile gaming device to select a product in a vending machine and to then purchase the product. For example, the products in a vending machine may have associated indicator lights. When the player moves the mobile gaming device the indicator light associated with one product may go off and the indicator light associated with another product may go on. The second product may lie in a direction from the first product which is the same direction that was indicated by the motion of the mobile gaming device. In some embodiments, a person may use the motions of a mobile device, such as a mobile gaming device, to control a point of sale terminal.

14. USE OF MOTION AND OTHER TYPES OF INPUT. In various embodiments, a player need not exclusively use motion control to play a game or to perform other actions with a mobile gaming device. For example, a player may specify a bet size by pressing a key pad, but may actually start a game using a motion, such as shaking the mobile gaming device. In some embodiments, a player may have a choice of ways in which to convey a given instruction. The same instruction may be conveyed through motion or through other means, such as through button presses. Thus, according to a player's fancy, the player may choose one way or the other for providing the same instruction.

The following are embodiments, not claims:

A. A method comprising:
detecting a first signal from a motion sensor, in which the first signal endures throughout a first period of time;
determining whether a second signal has endured throughout the first period of time;
determining, if the second signal has endured throughout the first period of time, an instruction based on the first signal; and
executing the instruction in a gambling game if the second signal has endured throughout the first period of time.

B. The method of embodiment A in which detecting a first signal includes detecting a first signal from a motion sensor contained within a mobile gaming device, in which the first signal endures throughout a first period of time.

C. The method of embodiment B in which the motion sensor comprises an accelerometer.

D. The method of embodiment B in which the motion sensor comprises a camera.

E. The method of embodiment B further including detecting a second signal from a button on the mobile gaming device, in which the second signal is generated through the application of pressure to the button.

F. The method of embodiment E in which determining whether a second signal has endured throughout the first period of time includes determining whether continuous pressure has been applied to the button throughout the first period of time.

G. The method of embodiment E in which the instruction is one of: (a) an instruction to place a bet; (b) an instruction to place a bet of a certain amount; (c) an instruction to begin the gambling game; (d) an instruction to discard a card; (e) an instruction to receive another card; (f) an instruction to receive no further cards; (g) an instruction to select an option in a bonus round; (h) an instruction to cash out; (i) an instruction to select a pay line; and (j) an instruction to begin a bonus round.

H. The method of embodiment E in which the first signal is generated through motion of the mobile gaming device.

I. A method comprising:
detecting a first signal from a motion sensor of a mobile gaming device;
interpreting the first signal as a specification of a first bet in a first game to be
played at the mobile gaming device, the first bet denominated in valueless currency;
detecting a second signal from the motion sensor;
interpreting the second signal as a specification of a second bet in a second game to be played at the mobile gaming device, the second bet denominated in valuable currency; and
determining an outcome of the second game only if the first game has been completed.

J. The method of embodiment I in which the valueless currency is not exchangeable for United States dollars, and in which the valuable currency is exchangeable for United States dollars.

K. The method of embodiment I in which the second signal has similar characteristics to the first signal.

L. The method of embodiment I further including displaying, prior to detecting the first signal, a message on a display screen of the mobile gaming device, the message providing instructions to move the mobile gaming device in a particular way in order specify the first bet.

M. The method of embodiment I further including:
asking the player to provide a first proof of his identity following the completion of the first game;
asking the player to provide a second proof of his identity prior to determining the outcome; and
verifying that the second proof matches the first proof.

N. The method of embodiment M in which the first proof is a first fingerprint supplied to the mobile gaming device, and in which the second proof is a second fingerprint supplied to the mobile gaming device.

O. A method comprising:
receiving a signal indicative of a bet at a mobile gaming device with a rectangular display screen;
determining five cards;
displaying a first of the five cards in a first corner of the display screen;
displaying a second of the five cards in a second corner of the display screen;
displaying a third of the five cards in a third corner of the display screen;
displaying a fourth of the five cards in a fourth corner of the display screen;
determining a particular card of the five cards to be discarded;
determining a sixth card;
replacing the particular card with the sixth card;
determining a payout based on the sixth card and based on cards of the five cards that were not discarded; and
adjusting a credit balance based on the payout.

P. The method of embodiment O further including displaying a fifth of the five cards in the center of the display screen.

Q. The method of embodiment O in which determining a particular card of the five cards to be discarded includes:
detecting a motion of the mobile gaming device;
determining that the first of the five cards is to be discarded if the motion is a tilting of the mobile gaming device towards the first corner of the display screen;
determining that the second of the five cards is to be discarded if the motion is a tilting of the mobile gaming device towards the second corner of the display screen;
determining that the third of the five cards is to be discarded if the motion is a tilting of the mobile gaming device towards the third corner of the display screen; and
determining that the fourth of the five cards is to be discarded if the motion is a tilting of the mobile gaming device towards the fourth corner of the display screen.

R. The method of embodiment O in which determining a payout includes determining a payout based on the sixth card, based on cards of the five cards that were not discarded, and based on the rules of video poker.

The following sections I-X provide a guide to interpreting the present application.

I. Determining

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database, or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed, and does not imply that numerical methods must be used, and does not imply that an algorithm or process is used.

The term "determining" does not imply that any particular device must be used. For example, a computer need not necessarily perform the determining.

II. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device, article or other product is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

III. Terms

The term "product" means any machine, manufacture and/or composition of matter, unless expressly specified otherwise.

The term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car, and a wheel. The phrase "at least one of", when such phrase modifies a plurality of things does not mean "one of each of" the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "represent" and like terms are not exclusive, unless expressly specified otherwise. For example, the term "represents" does not mean "represents only", unless expressly specified otherwise. In other words, the phrase "the data represents a credit card number" describes both "the data represents only a credit card number" and "the data represents a credit card number, and the data also represents something else".

The term "whereby" is used herein only to precede a clause or other set of words that express only the intended result, objective, or consequence of something that is previously and explicitly recited. Thus, when the term "whereby" is used in a claim, the clause, or other words that the term "whereby" modifies do not establish specific further limitations of the claim or otherwise restricts the meaning or scope of the claim.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g., 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

IV. Disclosed Examples and Terminology are not Limiting

Neither the Title (set forth at the beginning of the first page of the present application) nor the Abstract (set forth at the end of the present application) is to be taken as limiting in any way as the scope of the disclosed invention(s). An Abstract has been included in this application merely because an Abstract of not more than 150 words is required under 37 C.F.R. § 1.72(b).

The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

The preambles of the claims that follow recite purposes, benefits, and possible uses of the claimed invention only and do not limit the claimed invention.

The present disclosure is not a literal description of all embodiments of the invention(s). Also, the present disclosure is not a listing of features of the invention(s) which must be present in all embodiments.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

V. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

A "processor" means one or more microprocessors, central processing units (CPUs), computing devices, microcontrollers, digital signal processors, or like devices or any combination thereof, regardless of the architecture (e.g., chip-level multiprocessing/multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves, and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g., sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g., the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

VI. Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application.

Applicants intend to file additional applications to pursue patents for subject matter that has been disclosed and enabled but not claimed in the present application.

VII. 35 U.S.C. § 112, Paragraph 6

In a claim, a limitation of the claim which includes the phrase "means for" or the phrase "step for" means that 35 U.S.C. § 112, paragraph 6, applies to that limitation.

In a claim, a limitation of the claim which does not include the phrase "means for" or the phrase "step for" means that 35 U.S.C. § 112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. § 112, paragraph 6, applies to that step(s).

With respect to a means or a step for performing a specified function in accordance with 35 U.S.C. § 112, paragraph 6, the corresponding structure, material, or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. § 112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function that is a method, one structure for performing this method includes a computing device (e.g., a general purpose computer) that is programmed and/or configured with appropriate hardware to perform that function. Also included is a computing device (e.g., a general purpose computer) that is programmed and/or configured with appropriate hardware to perform that function via other algorithms as would be understood by one of ordinary skill in the art.

VIII. Disclaimer

Numerous references to a particular embodiment do not indicate a disclaimer or disavowal of additional, different embodiments, and similarly references to the description of embodiments which all include a particular feature do not indicate a disclaimer or disavowal of embodiments which do not include that particular feature. A clear disclaimer or disavowal in the present application shall be prefaced by the phrase "does not include" or by the phrase "cannot perform".

IX. Incorporation By Reference

Any patent, patent application or other document referred to herein is incorporated by reference into this patent application as part of the present disclosure, but only for purposes of written description and enablement in accordance with 35 U.S.C. § 112, paragraph 1, and should in no way be used to limit, define, or otherwise construe any term of the present application, unless without such incorporation by reference, no ordinary meaning would have been ascertainable by a person of ordinary skill in the art. Such person of ordinary skill in the art need not have been, in any way limited, by any embodiments provided in the reference.

Any incorporation by reference does not, in and of itself, imply any endorsement of, ratification of or acquiescence in any statements, opinions, arguments or characterizations contained in any incorporated patent, patent application or other document, unless explicitly specified otherwise in this patent application.

X. Prosecution History

In interpreting the present application (which includes the claims), one of ordinary skill in the art shall refer to the prosecution history of the present application, but not to the prosecution history of any other patent or patent application, regardless of whether there are other patent applications that are considered related to the present application, and regardless of whether there are other patent applications that share a claim of priority with the present application.

XI Some Embodiments

In various embodiments, a distributed gaming system enables participants to engage in gaming activities from remote and/or mobile locations. The possible gaming activities include gambling, such as that provided by casinos. Gambling activities may include any casino-type gambling activities including, but not limited to, slot machines, video poker, table games (e.g., craps, roulette, blackjack, pai gow poker, Caribbean stud poker, baccarat, etc.), the wheel of fortune game, keno, sports betting, horse racing, dog racing, jai alai, and other gambling activities. The gaming activities can also include wagering on any type of event. Events can include, for example, sporting events, such as horse or auto racing, and athletic competitions such as football, basketball, baseball, golf, etc. Events can also include such things that do not normally involve wagering. Such events may include, without limitation, political elections, entertainment industry awards, and box office performance of movies. Gaming can also include non-wagering games and events. Gaming can also include lotteries or lottery-type activities such as state and interstate lotteries. These can include all forms of number-selection lotteries, "scratch-off" lotteries, and other lottery contests. The gaming system may be implemented over a communications network such as a cellular network or a private wireless and/or wireline network. Examples of the latter include Wi-Fi and WiMAX networks. In some embodiments, the gaming system communications network is entirely independent of the Internet. In some embodiments, the gaming system operation makes minimal use of the Internet, such that only information for which there are no security issues is transmitted via the Internet and/or such that information may be encrypted. In various embodiments, the communications network enables players to participate in gaming from remote locations (e.g., outside of the gaming area of a casino). Also, the system may enable players to be mobile during participation in the gaming activities. In various embodiments, the system has a location verification or determination feature, which is operable to permit or disallow gaming from the remote location depending upon whether or not the location meets one or more criteria. The criterion may be, for example, whether the location is within a pre-defined area in which gaming is permitted by law.

As shown in FIG. 1, for example, gaming system 10 may include at least one user 12. The system may include additional users such that there is at least a first user 12 and a second user 14. Multiple users may access a first gaming system 10, while other multiple users access a second gaming system (not shown) in communication with first gaming system 10. Users 12 and 14 may access system 10 by way of a gaming communication device 13. Gaming communication device 13 may comprise any suitable device for transmitting and receiving electronic communications. Examples of such devices include, without limitation, mobile phones, personal data assistants (PDAs), computers, mini-computers, etc. Gaming communication devices 13 transmit and receive gaming information to and from communications network 16. Gaming information is also transmitted between network 16 and a computer 18, such as a server, which may reside within the domain of a gaming service provider 20. The location of computer 18 may be flexible, however, and computer 18 may reside adjacent to or remote from the domain of gaming service provider 20. Various embodiments may not include a gaming service provider. The computer 18 and/or gaming service provider 20 may reside within, adjacent to, or remote from a gaming provider (not shown in FIG. 1). The gaming service provider may be an actual controller of games, such as a casino. As an example, a gaming service provider may be located on the grounds of a casino and the computer 18 may be physically within the geographic boundaries of the gaming service provider. As discussed, however, other possibilities exist for remote location of the computer 18 and the gaming service provider 20. Computer 18 may function as a gaming server. Additional computers (not expressly shown) may function as database management computers and redundant servers, for example.

In various embodiments, software resides on both the gaming communication device 13 and the computer 18. Software resident on gaming communication device 13 may be operable to present information corresponding to gaming activities (including gambling and non-gambling activities discussed herein) to the user. The information may include, without limitation, graphical representations of objects associated with the activities, and presentation of options related to the activities and selectable by the user. The gaming communication device software may also be operable to receive data from the computer and data input by the user. Software resident on the computer may be able to exchange data with the gaming communication device, access additional computers and data storage devices, and perform all of the functions described herein as well as functions common to known electronic gaming systems.

Gaming information transmitted across network 16 may include any information, in any format, which is necessary or desirable in the operation of the gaming experience in which the user participates. The information may be transmitted in whole, or in combination, in any format including digital or analog, text or voice, and according to any known or future transport technologies, which may include, for example, wireline or wireless technologies. Wireless technologies may include, for example, licensed or license-exempt technologies. Some specific technologies which may be used include, without limitation, Code Division Multiple Access (CDMA), Global System for Mobile Communication (GSM), General Packet Radio Service (GPRS), Wi-Fi (802.11x), WiMAX (802.16x), Public Switched Telephone Network (PSTN), Digital Subscriber Line (DSL), Integrated Services Digital Network (ISDN), or cable modem technologies. These are examples only and one of ordinary skill will understand that other types of communication techniques are also contemplated. Further, it will be understood that additional components may be used in the communication of information between the users and the gaming server. Such additional components may include, without limitation, lines, trunks, antennas, switches, cables, transmitters, receivers, computers, routers, servers, fiber optical transmission equipment, repeaters, amplifiers, etc.

In some embodiments, the communication of gaming information takes place without involvement of the Internet. However, in some embodiments, a portion of the gaming information may be transmitted over the Internet. Also, some or all of the gaming information may be transmitted partially over an Internet communications path. In some embodiments, some information is transmitted entirely or partially over the Internet, but the information is either not gaming information or is gaming information that does not need to be maintained secretly. For instance, data that causes a graphical representation of a table game on the user's gaming communication device might be transmitted at least partially over the Internet, while wagering information transmitted by the user might be transmitted entirely over a non-Internet communications network.

Figure 2:
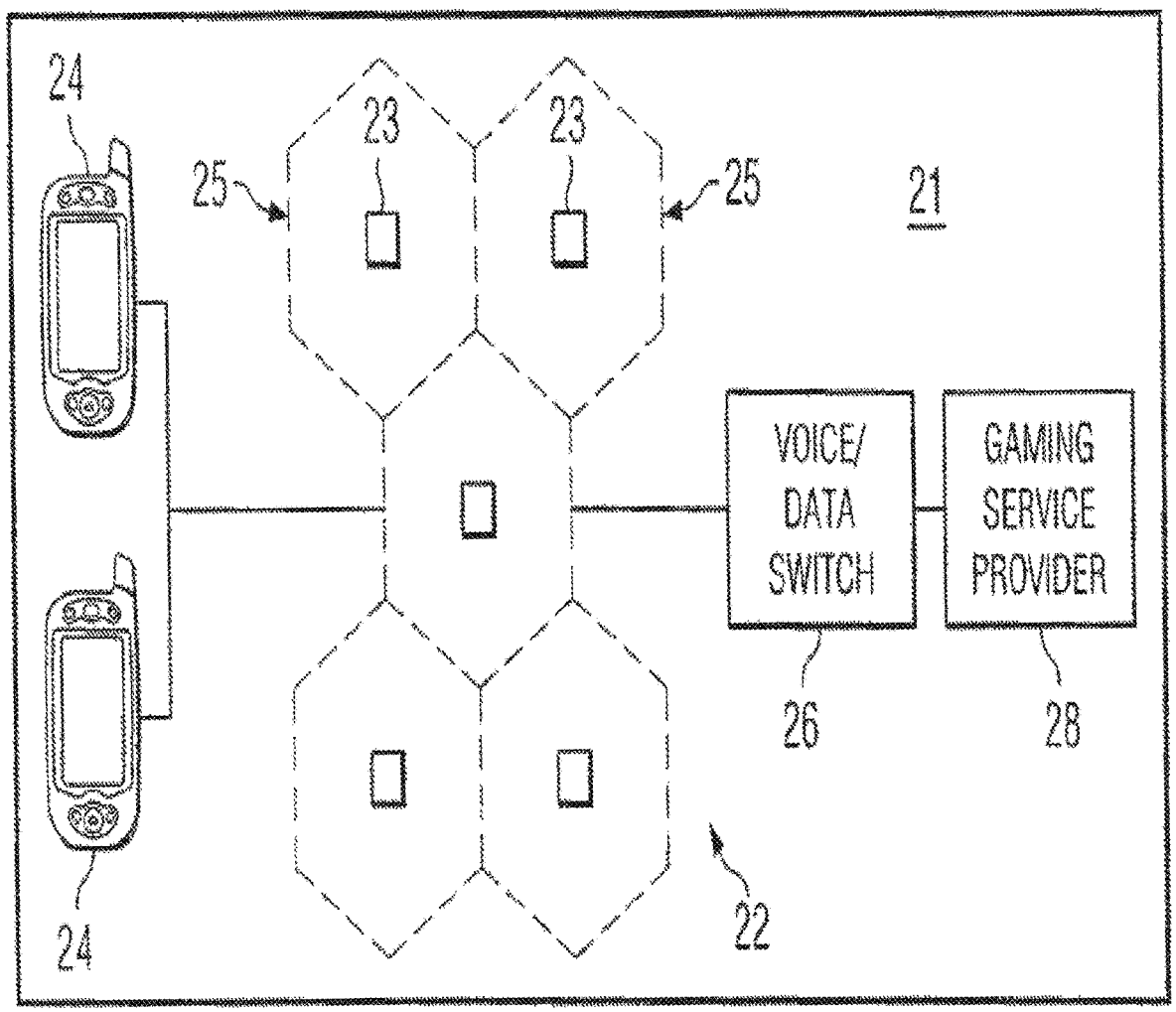
FIG. 2 shows a communications network according to some embodiments.

According to some embodiments, as shown in FIG. 2 for example, the communications network comprises a cellular network 22. Cellular network 22 comprises a plurality of base stations 23, each of which has a corresponding coverage area 25. Base station technology is generally known, and the base stations may be of any type found in a typical cellular network. The base stations may have coverage areas that overlap. Further, the coverage areas may be sectorized or non-sectorized. The network also includes mobile stations 24, which function as the gaming communication devices used by users to access the gaming system and participate in the activities available on the gaming system. Users are connected to the network of base stations via transmission and reception of radio signals. The communications network also includes at least one voice/data switch, which may be connected to the wireless portion of the network via a dedicated, secure landline. The communications network may also include a gaming service provider, which is likewise connected to the voice/data switch via a dedicated, secure landline. The voice/data switch may be connected to the wireless network of base stations via a mobile switching center (MSC), for example and the landline may be provided between the voice/data switch and the MSC.

Users access the gaming system by way of mobile stations which are in communication with, and thus part of, the communications network. The mobile station may be any electronic communication device that is operable in connection with the network as described. For example, in this particular embodiment, the mobile station may comprise a cellular telephone.

In various embodiments, in the case of a cellular network for example, the gaming system is enabled through the use of a private label carrier network. Each base station is programmed by the cellular carrier to send and receive private secure voice and/or data transmissions to and from mobile station handsets. The handsets may be pre-programmed with both gaming software and the carrier's authentication software. The base stations communicate via private T1 lines to a switch. A gaming service provider leases a private T1 or T3 line, which routes the calls back to gaming servers controlled by the gaming service provider. Encryption can be installed on the telephones if required by a gaming regulation authority, such as a gaming commission.

The cellular network may be a private, closed system. Mobile stations communicate with base stations and base stations are connected to a centralized switch located within a gaming jurisdiction. At the switch, voice calls are transported either locally or via long distance. Specific service provider gaming traffic is transported from the central switch to a gaming server at a host location, which can be a casino or other location.

As subscribers launch their specific gaming application, the handset will only talk to certain base stations with cells or sectors that have been engineered to be wholly within the gaming jurisdiction. For example, if a base station is close enough to pick up or send a signal across state lines, it will not be able to communicate with the device. When a customer uses the device for gaming, the system may prohibit, if desired, the making or receiving voice calls. Moreover, voice can be eliminated entirely if required. Further, the devices may not be allowed to "connect" to the Internet. This ensures a high level of certainty that bets/wagers originate and terminate within the boundaries of the gaming jurisdiction and the "private" wireless system cannot be circumvented or bypassed. Although in some embodiments some data and/or voice traffic may be communicated at least partially over the Internet, the communication path may not include the Internet in other embodiments. Alternatively, in some embodiments, certain non-gaming information may be transported over a path which includes the Internet, while other information relating to the gaming activities of the system is transported on a path that does not include the Internet.

Figure 3:
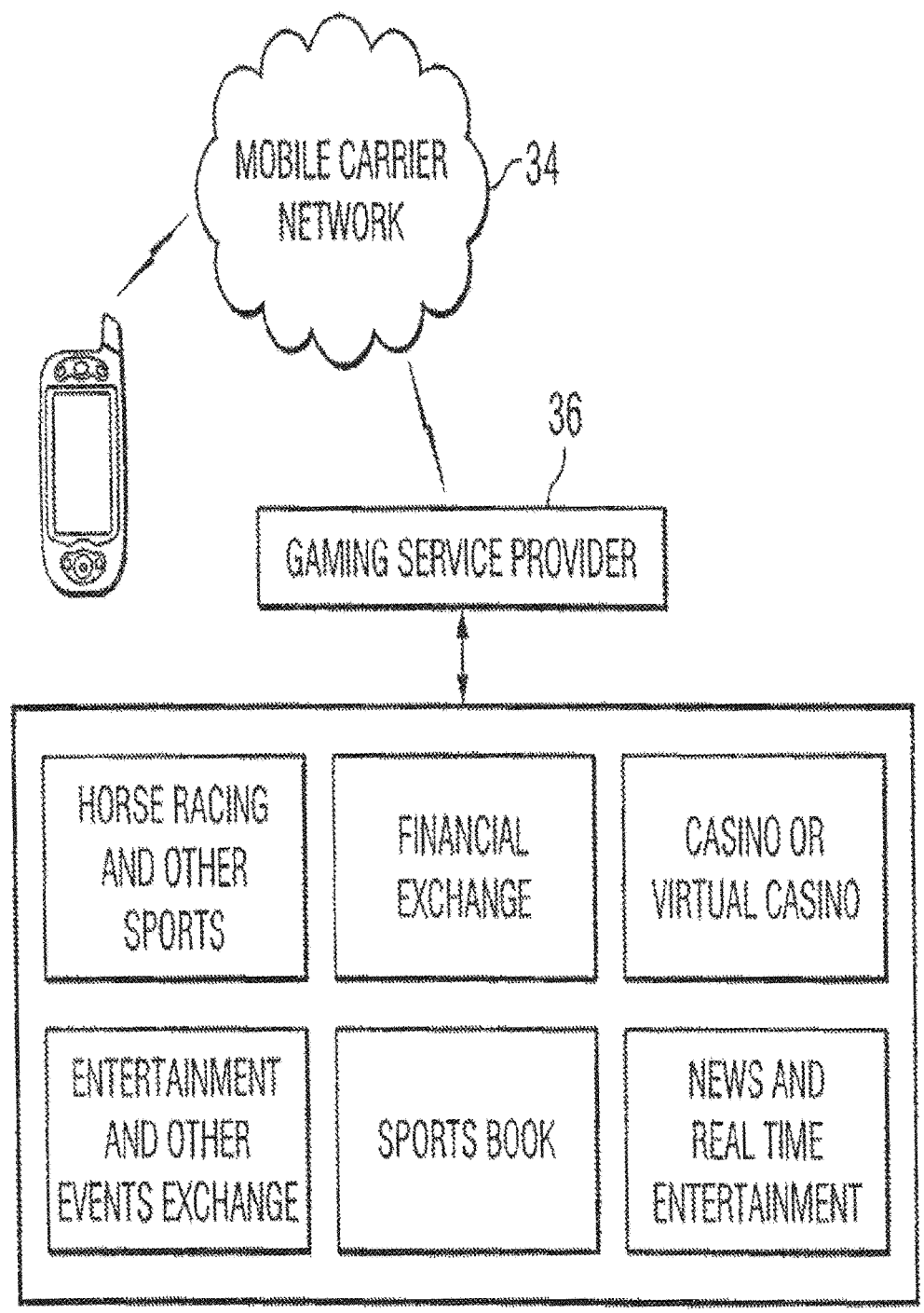
FIG. 3 shows a gaming service provider in communication with a gaming communication device according to some embodiments.

As shown in FIG. 3, a gaming communication device 32 is in communication with a gaming service provider over a network 34. The gaming service provider preferably has one or more servers, on which are resident various gaming and other applications. As shown in FIG. 3, some example gaming applications include horse racing and other sports, financial exchange, casino and/or virtual casino, entertainment and other events exchange, and news and real time entertainment. Each of these applications may be embodied in one or more software modules. The applications may be combined in any possible combination. Additionally, it should be understood that these applications are not exhaustive and that other applications may exist to provide an environment to the user that is associated with any of the described or potential activities.

Figure 4:
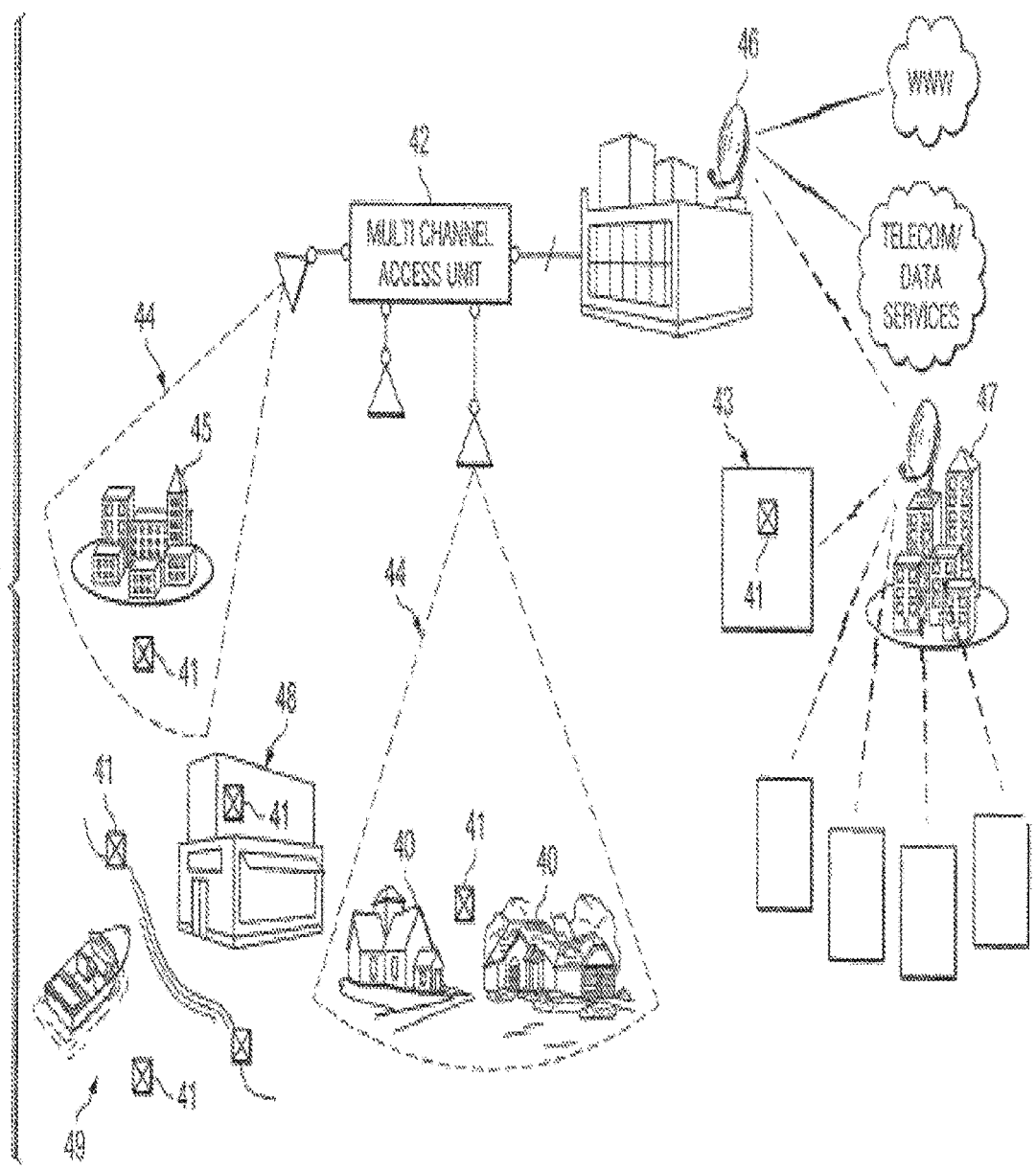
FIG. 4 shows a communications network according to some embodiments.

In another embodiment, as shown in FIG. 4, for example, the communications network comprises a private wireless network. The private wireless network may include, for example, an 802.11x (Wi-Fi) network technology to cover "Game Spots" or "Entertainment Spots." In FIG. 4, various Wi-Fi networks are indicated as networks 41. Networks 41 may use other communications protocols to provide a private wireless network including, but not limited to, 802.16x (WiMAX) technology. Further, networks 41 may be interconnected. Also, a gaming system may comprise a combination of networks as depicted in FIG. 4. For example, there is shown a combination of private wireless networks 16, a cellular network comprising a multi-channel access unit or sectorized base station 42, and a satellite network comprising one or more satellites 46.

With respect to the private wireless network, because the technology may cover small areas and provide very high-speed throughput, the private wireless network is particularly well-suited for gaming commission needs of location and identity verification for the gaming service provider products. The gaming spots enabled by networks 41 may include a current casino area 48, new areas such as swimming pools, lakes, or other recreational areas 49, guest rooms and restaurants such as might be found in casino 48 or hotels 45 and 47, residential areas 40, and other remote gaming areas 43. The configuration of the overall gaming system depicted in FIG. 4 is intended only as an example and may be modified to suit various embodiments.

In some embodiments, the system architecture for the gaming system includes:
(1) a wireless LAN (Local Access Network) component, which consists of mostly 802.11x (Wi-Fi) and/or 802.16x WiMAX technologies; robust security and authentication software; gaming software; mobile carrier approved handsets with Windows® or Symbian® operating systems integrated within; and
(a) CDMA-technology that is secure for over-the-air data protection;
(b) at least two layers of user authentication, (that provided by the mobile carrier and that provided by the gaming service provider);

(c) compulsory tunneling (static routing) to gaming servers;
(d) end-to-end encryption at the application layer; and
(e) state-of-the-art firewall and DMZ technologies;
(2) an MWAN (Metropolitan Wireless Access Network), which consists of licensed and license-exempt, point-to-point links, as well as licensed and license-exempt, point-to-multi-point technologies;
(3) private MAN (Metropolitan Access Network) T1 and T3 lines to provide connectivity where wireless services cannot reach; and
(4) redundant private-line communications from the mobile switch back to the gaming server.

Each of the "Game Spots" or "Entertainment Spots" is preferably connected via the MWAN/MAN back to central and redundant game servers. For accessing the private wireless networks 41, the gaming communication devices may be Wi-Fi- or WiMAX-enabled PDAs or mini-laptops, and do not have to be managed by a third-party partner.

In various embodiments, the gaming system includes a location verification feature, which is operable to permit or disable gaming from a remote location depending upon whether or not the location meets one or more criteria. A criterion may be, for example, whether the location is within a pre-defined area in which gaming is permitted by law. As another example, a criterion may be whether the location is in a no-gaming zone, such as a school. The location verification technology used in the system may include, without limitation, "network-based" and/or "satellite-based" technology. Network-based technology may include such technologies as multilateration, triangulation and geo-fencing, for example. Satellite-based technologies may include global positioning satellite (GPS) technology, for example.

As previously discussed, the cellular approach preferably includes the use of at least one cellular, mobile, voice and data network. For gaming in certain jurisdictions, such as Nevada for example, the technology may involve triangulation, global positioning satellite (GPS) technology, and/or geo-fencing to avoid the potential for bets or wagers to be made outside Nevada state lines. In some embodiments, the network would not cover all of a particular jurisdiction, such as Nevada. For instance, the network would not cover areas in which cellular coverage for a particular base station straddled the state line or other boundary of the jurisdiction. This is done in order to permit the use of location verification to insure against the chance of bets originating or terminating outside of the state. Triangulation may be used as a method for preventing gaming from unapproved locations. Triangulation may be accomplished, for example, by comparing the signal strength from a single mobile station received at multiple base stations, each having GPS coordinates. This technology may be used to pinpoint the location of a mobile station. The location can then be compared to a map or other resource to determine whether the user of the mobile station is in an unapproved area, such as a school. Alternatively, GPS technology may be used for these purposes.

Figure 5:
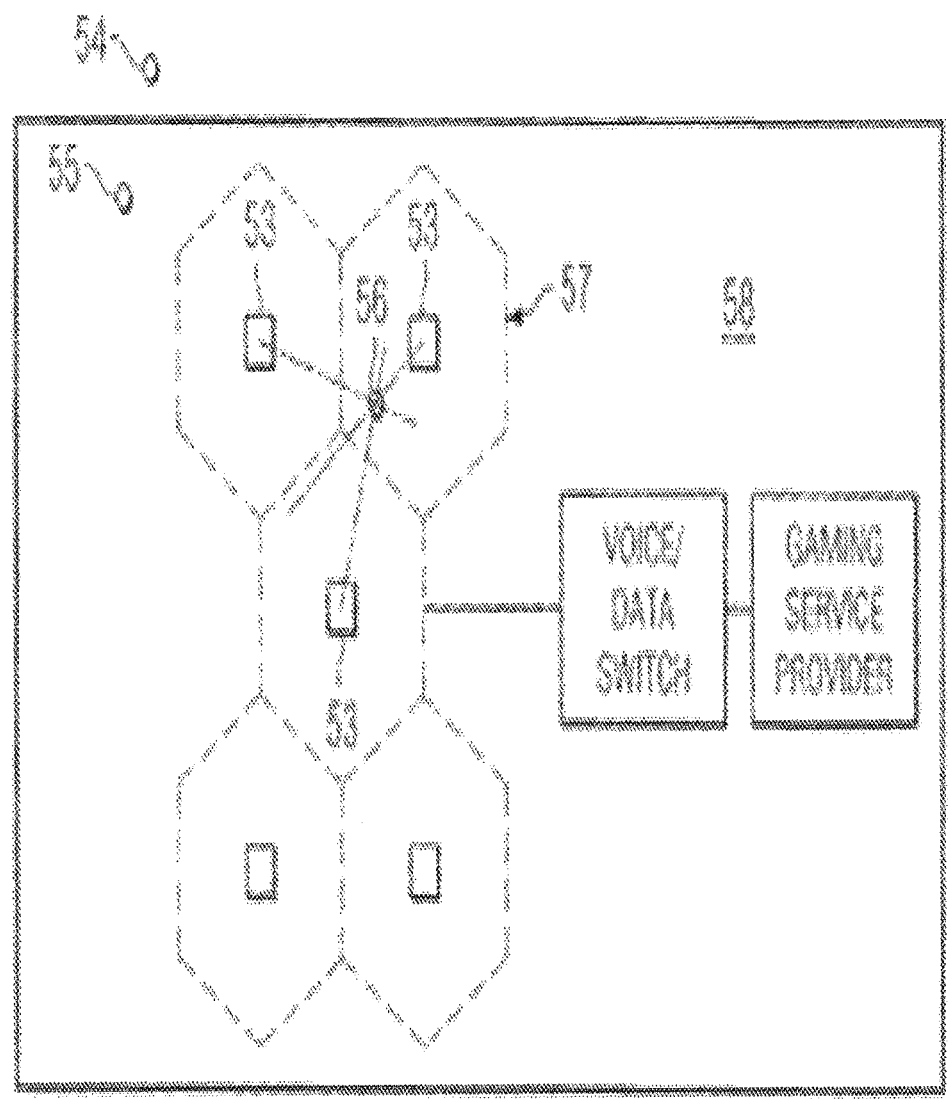
FIG. 5 shows a gaming system according to some embodiments.

As shown in FIG. 5, the gaming system includes a plurality of gaming communication devices 54, 55, and 56. Device 54 is located outside the gaming jurisdiction 58. Devices 55 and 56 are both located inside gaming jurisdiction 58. However only device 56 is located within geo-fence 57, which is established by the coverage areas of a plurality of base station 53. Thus, geo-fencing may be used to enable gaming via device 56 but disable gaming via devices 54 and 55. Even though some gaming communication devices that are within the gaming jurisdiction 58, such as device 55, are not permitted access to the gaming system, the geo-fence 57 ensures that no gaming communication devices outside jurisdiction 58, such as device 54, are permitted access.

Geo-fencing may not specify location. Rather, it may ensure that a mobile station is within certain boundaries. For instance, geo-fencing may be used to ensure that a mobile station beyond state lines does not access the gaming system. Triangulation on the other hand May specify a pinpoint, or near-pinpoint, location. For example, as shown in FIG. 5, device 56 is triangulated between three of the base stations 53 to determine the location of device 56. Triangulation may be used to identify whether a device, such as a mobile station, is located in a specific spot where gambling is unauthorized (such as, for example, a school). Preferably, the location determination technology utilized in conjunction with the present invention meets the Federal Communication Commission's (FCC's) Phase 2 E911 requirements. Geological Institute Survey (GIS) mapping may also be utilized to compare identified coordinates of a gaming communication device with GIS map features or elements to determine whether a device is in an area not authorized for gaming. It should be noted that any type of location verification may be used such as triangulation, geo-fencing, global positioning satellite (GPS) technology, or any other type of location determining technology, which can be used to ensure, or provide an acceptable level of confidence, that the user is within an approved gaming area.

In various embodiments, location verification is accomplished using channel address checking or location verification using some other identifying number or piece of information indicative of which network or portion of a network is being accessed by the gaming communication device. Assuming the usage of an identifying number for this purpose, then according to one method of location checking, as an example, a participant accesses the gaming system via a mobile telephone. The identifying number of the mobile telephone, or of the network component being accessed by the mobile telephone, identifies the caller's connection to the mobile network. The number is indicative of the fact that the caller is in a defined area and is on a certain mobile network. A server application may be resident on the mobile telephone to communicate this information via the network to the gaming service provider. In a some embodiments, the identifying number or information is passed from a first network provider to a second network provider. For example, a caller's home network may be that provided by the second provider, but the caller is roaming on a network (and in a jurisdiction) provided by the first provider. The first provider passes the identifying information through to the second provider to enable the second provider to determine whether the caller is in a defined area that does or does not allow the relevant gaming activity. In various embodiments, the gaming service provider either maintains, or has access to, a database that maps the various possible worldwide mobile network identifying numbers to geographic areas. Various embodiments contemplate using any number or proxy that indicates a network, portion of a network, or network component, which is being connected with a mobile telephone. The identifying number may indicate one or more of a base station or group of base stations, a line, a channel, a trunk, a switch, a router, a repeater, etc.

In various embodiments, when the user connects his mobile telephone to the gaming server, the gaming server draws the network identifying information and communicates that information to the gaming service provider. The software resident on the gaming communication device may incorporate functionality that will, upon login or access by the user, determine the user's location (based at least in part on the identifying information) and send a message to the gaming service provider. The identifying number or information used to determine location may be country-specific, state-specific, town-specific, or specific to some other definable boundaries.

In connection with any of the location determination methods, the gaming system may periodically update the location determination information. This may be done, for example, during a gaming session, at pre-defined time intervals to ensure that movement of the gaming communication device to an unauthorized area is detected during play, and not just upon login or initial access.

Thus, depending on the location determination technology being used, the decision whether to permit or prohibit a gaming activity may be made at the gaming communication device, at the gaming server, or at any of the components of the telecommunication network being used to transmit information between the gaming communication device and the gaming server (such as at a base station, for example).

An aspect of the private wireless network related to preventing gaming in unauthorized areas is the placement of sensors, such as Radio Frequency Identification (RFID) sensors on the gaming communication devices. The sensors trigger alarms if users take the devices outside the approved gaming areas. Further, the devices may be "tethered" to immovable objects. Users might simply log in to such devices using their ID and password.

Figure 6:
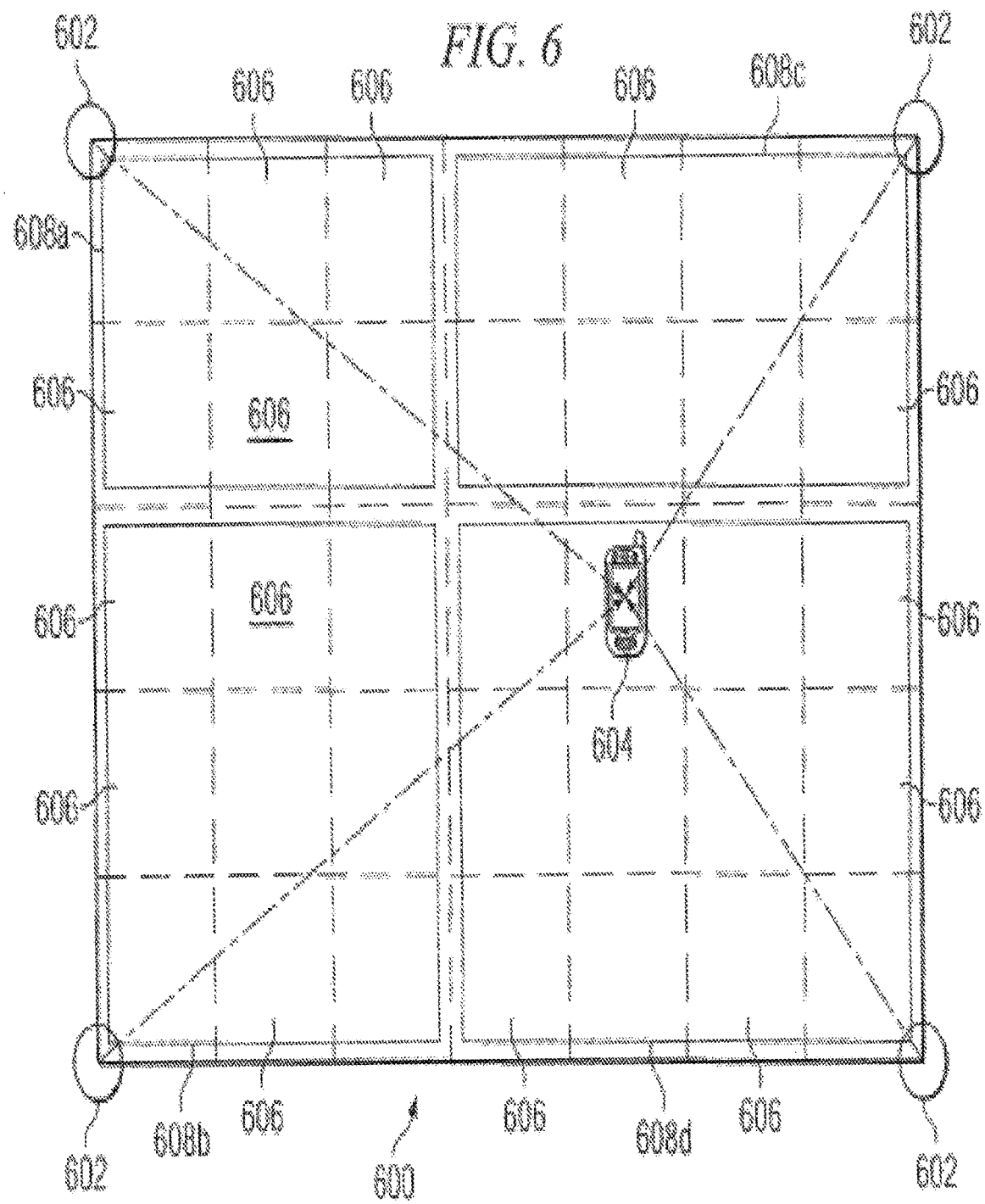
FIG. 6 shows a wireless gaming system according to some embodiments.
Figure 7:
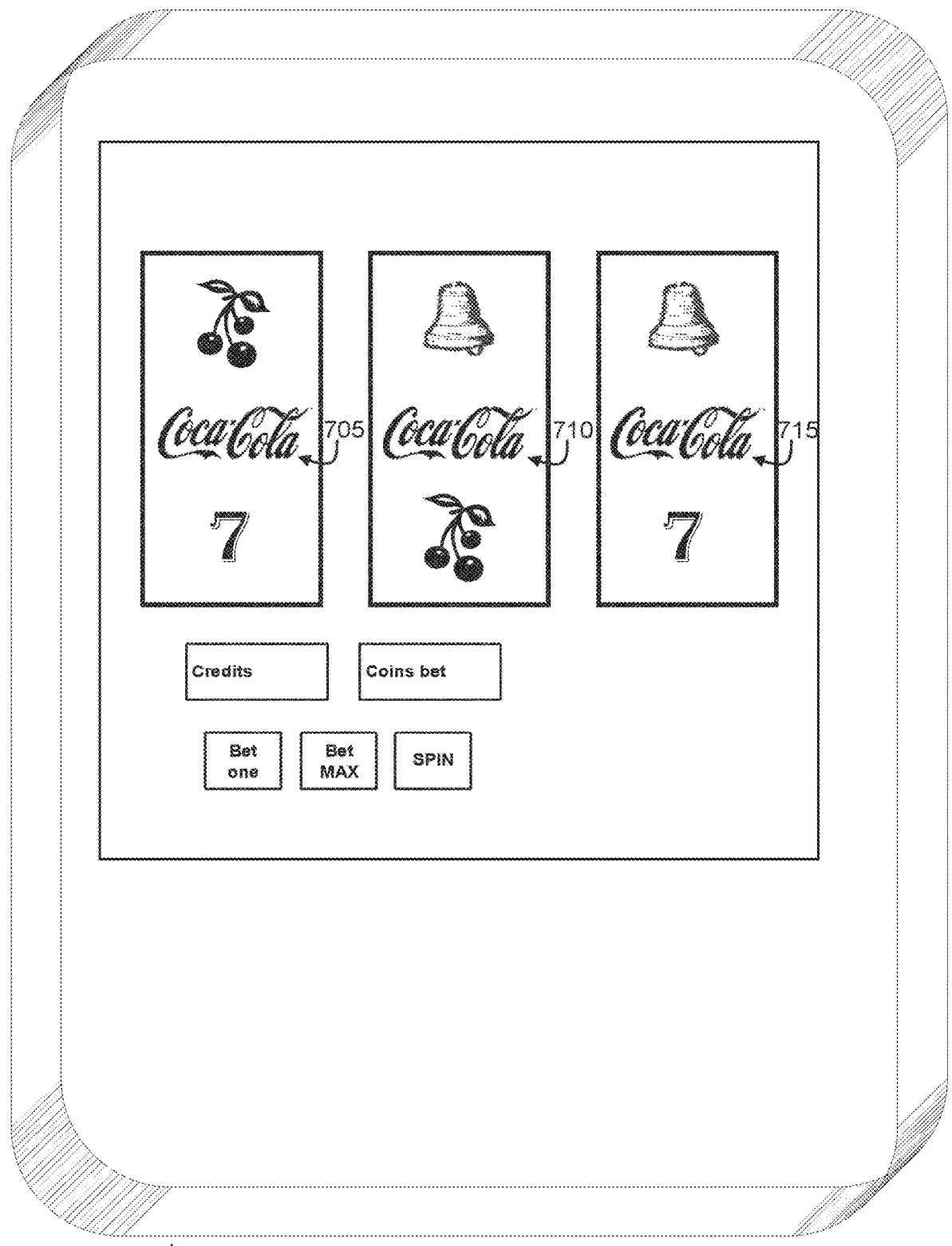
FIG. 7 shows a mobile gaming device with promotional content according to some embodiments.

In various embodiments, a gaming system may include the ability to determine the location of the gaming communication device within a larger property, such as a casino complex. This may allow certain functionalities of the device to be enabled or disabled based upon the location of the device within the property. For example, government regulations may prohibit using the device to gamble from the guest rooms of a casino complex. Therefore, particular embodiments may include the ability to determine the location of the device within the property and then disable the gambling functionality of the device from a guest room, or other area where gambling is prohibited. FIG. 6 illustrates an example of a wireless gaming system in which the location of a gaming communication device 604 may be determined in accordance various embodiments.

As shown in FIG. 6, a wireless gaming system comprises a wireless network that at least partially covers casino complex 600 in which one or more gaming communication devices 604 may be used to participate in a variety of gaming activities. The wireless network may comprise at least three signal detection devices 602, although various embodiments may include fewer or greater than three signal detection. As shown in FIG. 6, the wireless network comprises four signal detection devices 602, each located at one corner of casino complex 600. In various embodiments, these signal detection devices may comprise wireless access points, wireless routers, wireless base stations, satellites, or any other suitable signal detection device. Furthermore, although signal detection devices 602 are illustrated as being located on the boundaries of casino complex 600, signal detection devices may be located anywhere inside or outside of casino complex 600, provided the signal detection devices are operable to receive signals originating from a gaming communication device 604 inside casino complex 600. In various embodiments, signal detection devices 602 may also be used to transmit, as well as receive, signals to gaming communication device 604.

In various embodiments, casino complex 600 may be divided into one or more zones 608, which represent different areas of the casino complex, such as the lobby, guest rooms, restaurants, shops, entertainment venues, and pool areas. For example, as shown in FIG. 6, zone 608a may correspond to the casino lobby, zone 608b may correspond to guest rooms, zone 608c may correspond to restaurants, and zone 608d may correspond to the gaming floor of the casino. Each zone 608 may be further divided into one or more sub-zones 606, each specifying a particular location within zone 608. Sub-zones 606 may be arranged in a grid formation, each sub-zone 606 having a uniform size. In some embodiments, each sub-zone may comprise 9 square feet (i.e., 3 feet by 3 feet). In some embodiments, each sub-zone may comprise 100 square feet (i.e., 10 feet by 10 feet). The choice of the size of an area covered by a sub-zone may depend on administrator preferences, technical limitations of the wireless network, and governmental regulations, as well as other considerations.

Particular embodiments may use this mapping of casino complex 600 into a plurality of zones 608 and sub-zones 606 to determine the location of gaming communication device 604 within the complex. These embodiments may utilize the signal received by signal detection devices 602 from gaming communication device 604 to determine the location of the device.

In various embodiments, the location of gaming communication device 604 may be determined based upon the strength of the signal received by each signal detection device 602 from device 604. In various embodiments, this may be accomplished using a Received Signal Strength Indication (RSSI) value or any other suitable indication of signal strength. Generally, the closer a sub-zone is to a signal detection device, the stronger the signal the signal detection device will receive from a gaming communication device located in that sub-zone. Therefore, given a plurality of signal strength readings taken from different points in the casino complex (i.e., signal detection devices 602), these different signal strength readings may be used to determine the location of the device.

With this in mind, each sub-zone 606 of casino complex 600 may be associated with a reference set of signal strengths received by the signal detection devices from a device located in that particular sub-zone. Typically, these values are generated, and periodically recalibrated, by taking a reference reading from a gaming communication device located that sub-zone. After each sub-zone is associated with a reference set of signal strengths, these reference signal strengths may be compared with the signal strengths received by the signal detection devices from a gaming communication device. Since each sub-zone has a unique set of signal strengths, this comparison may be used to identify the particular zone in which the gaming communication device is located.

In various embodiments, the location of gaming communication device 604 may be determined based upon an elapsed time between the transmission of the signal from device 604 and the receipt of the signal by each signal detection device 602. In various embodiments, this elapsed time may be determined based on a Time Difference of Arrival (TDOA), or any other suitable technology. As before in the case of signal strengths, each sub-zone 606 may be associated with a predetermined, or reference, set of elapsed times from transmission to receipt of a signal from a gaming communication device. This set of elapsed times will be different for each sub-zone of the casino complex, as the time it takes a signal to reach each signal detection device will depend on the proximity of the sub-zone to each base station. By comparing the time from transmission to receipt of a signal received by the signal detection devices from a gaming communication device, the sub-zone in which the device is located may be determined.

Once the location of the gaming communication device has been determined, particular embodiments may then enable and/or disable particular functions of the device based on this determination. For example, as mentioned previously, particular embodiments may disable the gaming communication device's gambling functionality from a user's guest room, while still allowing the user to use other device functions, such as purchasing merchandise or services, or buying tickets to an entertainment event. Once the user leaves his or her guest room, the gambling functionality of the gaming communication device may be enabled. Similarly, particular embodiments may prevent the gaming communication device from being used to make financial transactions from the casino floor. Once the user leaves the casino floor, such functionality may be enabled. Similarly, other functionalities of the gaming communication device may be enabled or disabled based upon the location of the device within the property in accordance with various embodiments.

In various embodiments, the various functionalities of the gaming communication device may be enabled or disabled based upon the zone 608 in which the device is located. In such embodiments, each zone 608 of the casino complex may be associated with a set of allowed activities. For example, the "lobby" zone 608*a* of the casino complex may have all activities allowed, while the "guest room" zone 608*b* of the property may have all activities allowed except gambling. Based upon the gaming communication device's location, the functionality of the gaming communication device may be limited to the set of allowed activities for the zone in which the device is located. As the gaming communication device travels from zone to zone, the location of the device may be re-determined, and the functionality of the device may be updated to reflect the set of allowed activities for the zone in which the device is now located.

Various embodiments may also use the location determination to send location-specific information to the gaming communication device. For example, a reminder that an entertainment event to which the user has tickets is about to begin may be sent to the user's device if the device (and therefore the user) is located in a different part of the casino complex. In another embodiment, a user may be alerted that the user's favorite dealer is on the casino floor if the user is located in his or her guest room.

In various embodiments, the location of the gaming communication device may be used to deliver goods and services purchased or ordered by the user of the device. For example, in various embodiments, the user may purchase food and beverages using the device. The location of the device may then be used to deliver the food and beverages to the user, even if the user relocates to another sub-zone after placing his or her order.

The determination of the gaming communication device's location may also be used to provide the user with directions to another part of the casino complex. For example, a user that is located on the casino floor that wishes to go to a specific restaurant within the complex may be given direction based upon his or her location. These directions may then be updated as the user progresses towards his or her desired location. In the event the user gets off-course, the location determination, which may be updated during the user's travel, may be used to alert the user that he/she has gotten off-course and then plot a new course to the desired destination.

It should be understood that the foregoing descriptions encompass but some of the implementation technologies that may be used, according to various embodiments. Other technologies may be used and are contemplated, according to various embodiments. Various embodiments may be performed using any suitable technology, either a technology currently existing or a technology which has yet to be developed.

User Profiles

According to various embodiments, the wireless gaming system can incorporate a user profile element. One or more user profiles may be created, maintained, and modified, for example, on one or more of the servers of the gaming system. Generally, the user profiles include information relating to respective users. The information may be maintained in one or more databases. The information may be accessible to the gaming server and/or to one or more mobile devices. The devices which may access the information may, according to certain embodiments, include gaming devices or gaming management devices. Gaming management devices may include wireless devices used by casino staff to provide gaming services or gaming management services.

Various embodiments include software and/or hardware to enable the provision, modification, and maintenance of one or more user profiles. Thus, one or more user profiles may each comprise a set of data maintained in a data storage device. The data set(s) for each respective user profile may reflect any of a number of parameters or pieces of information, which relate to the particular user(s) corresponding to the profile(s). Although not intended to be exhaustive, such information may include, for example, gaming activity preferences, such as preferred game and/or game configuration, preferred screen configuration, betting preferences, gaming location preferences, dining, and other service preferences, and so forth. The information may also include user identity information, such as name, home address, hotel name and room number, telephone numbers, social security numbers, user codes, and electronic files of fingerprint, voice, photograph, retina scan, or other biometric information. User profile information may also include information relating to the user, but not determined by the user or the user's activities. Such information may include any information associated with, or made part of, a profile. For example, an entity such as a casino, may include as part of a profile certain rules governing the distribution of promotions or offers to the user. User profile information can include any codes, account numbers, credit information, approvals, interfaces, applications, or any other information which may be associated with a user. Thus, user profile information may include any information that is particular to a given user. For example, profile information may include the location(s) at which a particular user has played, skill levels, success levels, types of games played, and betting styles, and trends of information relating to the user's activities.

In various embodiments, user profile information may include concierge or other service information that is associated with a user. Concierge services may include restaurant services, entertainment services, hotel services, money management services, or other appropriate services that may be offered to the user of a gaming device. For example, restaurant services may include, without limitation, services that allow the user to order drinks, order food, make reservations, or perform other restaurant related activities. As another example, entertainment services may include, without limitation, services that allow the user to purchase show tickets, arrange appointments or services, virtually shop, arrange transportation, or perform other entertainment related activities. Hotel services may include, for example, services that allow the user to check in, check out, make spa appointments, check messages, leave messages, review a hotel bill, or perform other guest-related activities. Money management services may include, for example, services that allow the user to transfer funds, pay bills, or perform other money management activities.

The gaming system may be configured to establish a new profile for any user who is using a gaming device for the first time. Alternatively, a new profile may be established for a prior user who has not played for a predetermined time period. The gaming system may set up the profile, monitor user activities, adjust the profile, and adjust information (such as graphics) displayed to the user. The gaming system may be configured to use the profile information to alter the presentation of gaming information to the user. For example, if a prior user has returned to the gaming system, the system may consult the profile for the user and determine that in the prior session of gaming the user lost money on craps but won money on blackjack. Based on this information, the system may adjust the default gaming screen and present a blackjack table for the user. As a further example, the profile information may indicate that the majority of the user's prior blackjack time was spent on $25 minimum tables. The system may, accordingly, make a further adjustment to the gaming environment and make the blackjack table being presented a $25 table. In this sense, the gaming system enables personalized wireless gaming based on one or more criteria maintained in a user profile.

The user profiles may be established, maintained, and periodically updated as necessary to enable a gaming provider to provide an enhanced, current, and/or customized gaming experience. Updates may be undertaken based on any suitable trigger, such as the occurrence of an event, the occurrence of a user activity, or the passage of a certain predetermined time period. Any or all of the profile information may be updated.

Alerts

In some embodiments, the gaming system may be configured to initiate one or more alerts to one or more users based on any number of criteria. For instance, an alert may be based on the location of a user. The system may also be configured to keep track of other non-location dependent parameters. The initiation of an alert may depend on a time parameter. Gaming alerts can also be based on this and/or other information maintained in a user profile. Alerts can be prioritized for presentation and the content and display of the alerts may be customized by the user or another entity. As a related concept, the system may be configured to provide directions and/or maps. Another related concept involves enabling a user to view a certain activity or area remotely. The alert may be generated in response to the existence of data within a user profile. Additionally, the content and presentation of the alert may be determined based on information in the user profile. Thus, when the alerts occur and what the alerts indicate may be customized or tailored according to user preferences (or any other information maintained about the user (e.g., in a user profile).

In some embodiments, an alert may be presented or displayed to the user in a format determined, at least in part, by any of the parameters described or contemplated herein. For example, if the user is located outdoors, the display may be automatically brightened in order to allow the user to more easily view the alert. The alert may be presented in any one or a combination of textual, visual, oral, or other information exchange formats. Alerts presented to users on the screen of a gaming communication device, for example, may be configured in any desirable manner. Preferably, the information is displayed in a way as to most effectively utilize the screen real estate to convey the alert message. Thus, different alerts of differing types, or having differing priorities, can be displayed differently on the gaming device. For example, a more important alert can be displayed as a popup while secondary alerts scroll at the bottom of the screen. The player can register for alerts and determine his own particular alert configuration preferences.

According to some embodiments, directional information may be provided to one or more users. The directional information may be associated with an alert. The directional information may be based on any of the parameters described herein (e.g., profiles, alerts, locations, changes in play or other activities, etc.). Directions may be given to activities, locations, seats, tables, recreational spots, restaurants, change cages, information booths, casinos, hotels, sports venues, theaters, etc. For example directions may be given to a particular table or gaming area, a casino other than the one where the user is presently located or where another user is located, a restaurant that is specified in a user profile, a sports book area of a casino, a hotel room, etc.

The directions can be presented orally, textually, and/or graphically (e.g., as map with zoom capabilities). An example of how directions would be provided involves a user profile indicating that the user likes to play high-limit blackjack on Saturday nights, but that the user does not have a particular casino preference. If the user enters any casino for which the system is operable, the system provides the user with an alert inviting the player to the high-limit blackjack tables and directional information in the form of a visual route. Another example involves a user leaving a sports book in a casino and the user has indicated that he wants to play craps. The device gives walking directions to the craps tables. Another example involves a user that has a preferred list of dinner restaurants. At a predetermined time (e.g., 8:00 pm), the system presents the user with the list, lets the user make a selection and a reservation. The system then provides the user with verbal directions from the user's current location to the selected restaurant. The system may also be configured to provide ancillary information based, at least in part, on the alert, the profile, or the directional information being provided. For example, the system may notify a user that the user will need a cab, or will need to take the tram, or will need a jacket and tie, or will need an umbrella, etc. depending on where the user is going and the route he is taking.

According to various embodiments, the system enables a user to view a certain activity or area remotely. For example, cameras (or other viewing devices) may be disposed throughout a casino property (or other relevant area). At kiosks, or on the wireless gaming devices, users can "peek" into one or more selected areas to see the activity in the selected area(s). For example, from the pool, a user can tell if the craps tables have changed limits or are filling up with people. From the craps table, a user can see if the restaurant or bar is becoming crowded.

According to various embodiments, the operation of the alerts module and the alerts methods are integrated with various techniques for managing user profile information. An example of this aspect is that the system may be configured to recognize that a user has certain preferred dealers or stickmen when playing certain casino games. When those dealers or stickmen are on duty, and if the user is located in a certain area, or within a certain distance, an alert may be sent inviting the user to participate in the gaming activity at the particular table where the dealer or stickman is on duty.

Thus, when user profile information indicates that a one or more predetermined criteria are met, the system may send an alert to the corresponding user or to another user. For example, the system may "learn" that a player is a fan of certain sports teams. The system monitors information about upcoming events that involve those teams and, at a predetermined time, checks to see if the user has placed a bet on the event(s). If not, the system invites the user to visit a sports book to make a bet. As another example, the system knows a user prefers $10 minimum tables and alerts the user to the opening of a seat at such a table. As another example, the alerts can be triggered by information which is not directly related to or associated with the particular user (e.g., non-user specific information). For instance, an alert might be triggered by a certain time or the occurrence of a certain event (e.g., the odds given on a certain sports event changing by a certain predetermined amount).

Service Applications

According to various embodiments, gaming services may be provided as an application add-on to a pre-existing communication or data service. Thus, gaming service applications may be made available to customers of a pre-existing communication or data service. For example, customers of a particular wireless telephone or data service may be offered any one or combination of the various gaming service applications discussed herein as an additional feature that is bundled with the telephone or data service. Although this document may refer to the communication service bundled with offered gaming service applications as including pre-existing communication services, it is recognized that the gaming services applications may be offered and accepted as part of a package with newly-activated communications service plan. In still other embodiments, the gaming service may be established first and the communication service may be added later.

The gaming service applications bundled with, or otherwise offered in conjunction with communication services, may be customized to meet the needs of the customers, service providers, or both. For example, a service provider may elect to make certain gaming service applications available to only a subset of the service providers' customers. Accordingly, not all customers associated with a service provider may be offered gaming services. As an another example of customized gaming service applications, a communication service may offer customers a number of gaming service plans which may provide different levels of service. For example, certain services such as advertisement services and/or promotional services may be free to customers of the communications service. Such levels of service may be customer-selected, service provider-selected, or both.

Customers may be billed separately for add-on gaming services, or in conjunction with the invoice the customer already receives for the pre-existing communications service. For instance, in certain embodiments, gaming services may be billed as an add-on in the same way that Caller ID services, call waiting services, and call messaging services result in fees that are in addition to the basic fees associated with communication services.

Peer-to-Peer Wireless Gaming

According to various embodiments, gaming services enable peer-to-peer wireless gaming. Specifically, the system may enable multiple players to participate in the same gaming activity at the same time from dispersed locations. This may be particularly desirable in the case of certain games such as, but without limitation, horse racing, poker, and blackjack. The system may also enable a single player to participate in multiple positions with respect to a particular game. For example, a user may be permitted to play multiple hands of blackjack. Particular aspects include such features as providing assistance to a user in finding a particular activity. For example, a first player may want to play poker at a six-person table. The gaming system may be used to identify such a poker table that has a position available for the first user's participation. Additionally or alternatively, a first player might want to play poker at the same table as a second player, and the system may be configured to assist the first player in finding a game in which the second player is already participating.

Location determination techniques may be incorporated to enable peer-to-peer gaming or related services. For example, a "buddy network" may be established to track members of a selected group. For example, a group of friends might all be in a gambling jurisdiction but be located at various dispersed places within that jurisdiction. The gaming system allows the establishment of a private buddy network of peers for this group of friends. The system enables one or more members of the group to track one or more other members of the group. In various embodiments, the system may also allow messages from and to one or more group members. For example, the system also allows members to invite other members to participate in certain wireless gaming activities. Additionally or alternatively, the system may allow members of the group to bet on the performance of another member of the group who is participating in a virtual or actual game.

Location determination techniques may also be incorporate to establish an "alert system." The alert system may be used to invite certain types of players to participate in a gaming activity. Criteria may then be used to identify users of gaming devices that meet the criteria. For example, a gaming participant may wish to initiate a gaming activity with other users of gaming devices that qualify as "high rollers" or "high stakes gamers." As other examples, a celebrity user may wish to initiate a gaming activity with other celebrities, or a senior citizen may wish to initiate a gaming activity with other senior citizens. In each instance, the user may identify criteria that may then be used to identify other gaming participants that meet these criteria for the initiation of a peer-to-peer gaming event.

It should be understood that the foregoing descriptions encompass but some of the implementation technologies that may be used, according to various embodiments. Other technologies may be used and are contemplated, according to various embodiments. Various embodiments may be performed using any suitable technology, either a technology currently existing or a technology which has yet to be developed.

Gaming and Wireless System

Various embodiments include a gaming system including hand-held personal gaming devices. The gaming system is adapted to present one or more games to a user of one of the hand-held gaming devices.

In various embodiments, the gaming system includes a portable gaming device or interface. The portable gaming device has a display for displaying game information to a player, at least one input device for receiving input from the player and is capable of receiving and sending information to a remote device/location. The gaming system also includes a game server for generating game data, transmitting game data to the portable gaming device, and receiving information, such as player input, from the portable gaming device. The gaming system further includes a payment transaction server for validating payment and establishing entitlement of a player to play a game via the portable gaming device as provided by the game server.

In various embodiments, the gaming system includes one or more stationary gaming machines or other devices capable of printing tickets having a value associated therewith. The portable gaming device includes a ticket reader for reading ticket information for use by the payment transaction server in verifying the associated value for permitting the player to play the game.

In one or more embodiments, the portable gaming devices communicate with other devices (such as the game server) via a wireless communication channel. Appropriate relays and transceivers are provided for permitting the wireless communication.

In one or more embodiments, the portable gaming device includes a plurality of interfaces for changing the configuration of the gaming device or interacting with one or more transaction servers. In some embodiments, a login interface is provided for receiving login information regarding a user of the device. In various embodiments, the number of interfaces or other functions or features displayed or permitted to be accessed are configured depending upon the user of the device. In the event a gaming representative identifies himself, interfaces permitting access to a variety of control functions may be provided. In the event a player identifies themselves, such control functions may not be accessible, but instead only consumer-related functions may be accessible such as game play.

In one or more embodiments the gaming system includes one or more transaction servers, such as a food transaction server. Using an interface of the portable gaming device a player or other user may request services from the food transaction server. For example, a player may request food, drink, a restaurant reservation, or other service.

One or more embodiments comprise a method of playing a game via a portable gaming device associated with a gaming network. In some embodiments, a player obtains a portable gaming device, such as by checking out the device from the hostess station of a restaurant or the front desk of a hotel/casino. The player provides value to the gaming operator, such as a credit card or cash deposit. This value is associated with the server and matched with a ticket number, player tracking number or other identifier.

The game device is configured for player play using the login interface. The act of logging in may be performed by the player or the gaming operator. The player next establishes entitlement to obtain services, such as the playing of a game, by showing the existence of value. In some embodiments, the player scans his ticket using the ticket reader of the device. The scanned information is transmitted to the payment transaction server for verifying entitlement of the player to play a game or obtain other services. In the event the entitlement is verified, then the player is permitted to engage in the play of a game or request service.

In the event a player wishes to play a game, the player indicates such by selecting a particular game using a game play interface. Upon receipt of such an instruction, the game server generates game data and transmits it to the personal gaming device. The transmitted data may comprise sound and video data for use by the personal gaming device in presenting the game. The player is allowed to participate in the game by providing input to the game server through the personal gaming device. The game server determines if the outcome of the game is a winning or losing outcome. If the outcome is a winning outcome, an award may be given. This award may be cash value which is associated with the player's account at the payment transaction server. If the outcome is a losing outcome, then a bet or wager placed by the player may be lost, and that amount deducted from the player's account at the transaction server.

Figure 8:
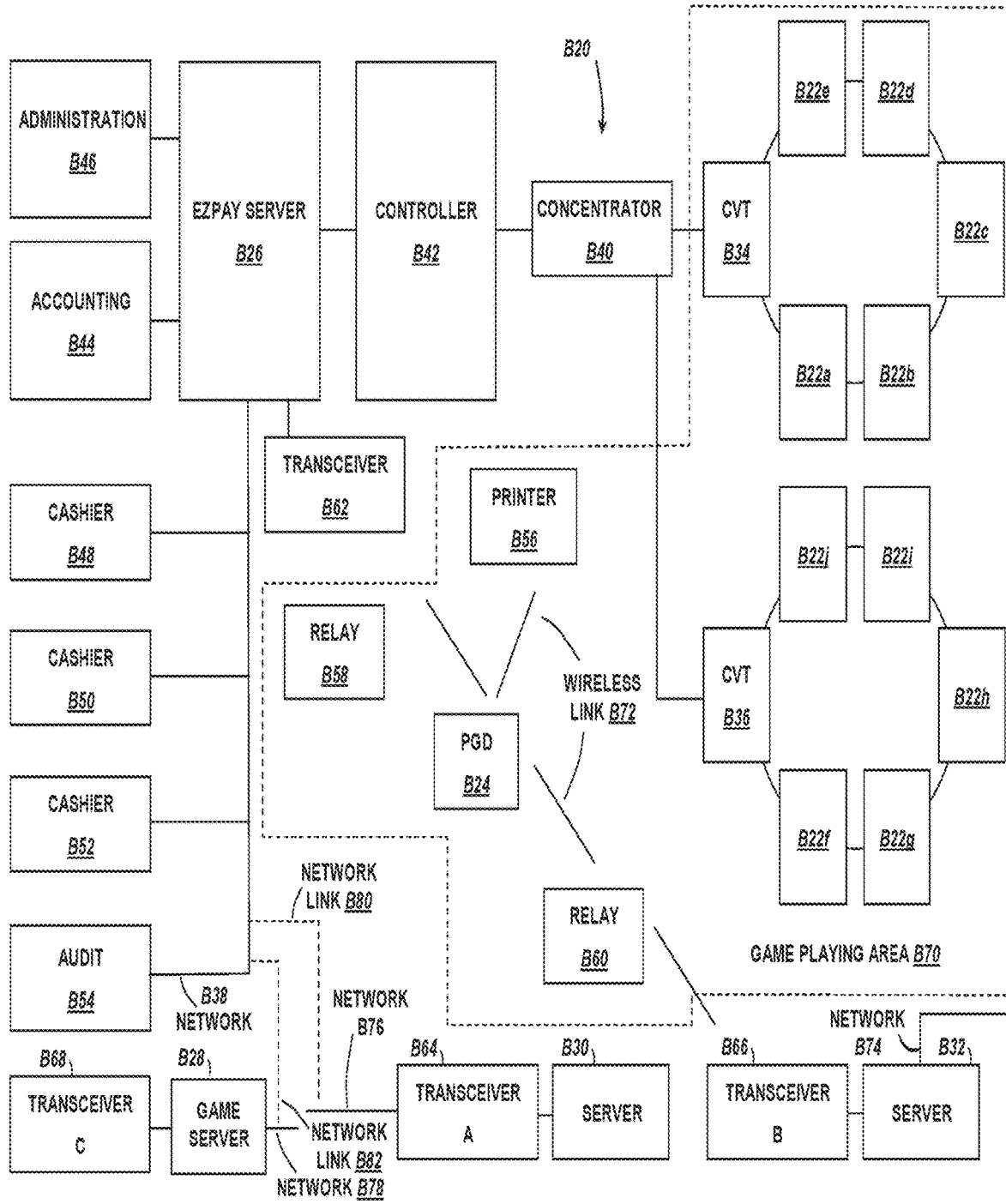
FIG. 8 is a block diagram of a gaming system in accordance with some embodiments.

FIG. 8 is a block diagram of a gaming system in accordance with various embodiments.

As illustrated, the gaming system B20 includes a plurality of gaming machines B22a, B22b, B22c, B22d, B22e, B22f, B22g, B22h, B22i, B22j. In some embodiments, these gaming machines B22a, B22b, B22c, B22d, B22e, B22f, B22g, B22h, B22i, B22j are of the stationary type. In general, the gaming machines B22a, B22b, B22c, B22d, B22e, B22f, B22g, B22h, B22i, B22j are arranged to present one or more games to a player. In various embodiments, the games are of the type requiring the placement of a wager or bet and are of the type by which a player receiving a winning outcome is provided an award, such as a monetary award. These devices may comprise, for example, video poker and slot machines. In addition, the gaming system B20 includes one or more hand-held, portable gaming devices (PGDs) B24. The PGD B24 is also arranged to present one or more games to a player, and as described below, may be used as an access point for a variety of other services. The device referred to herein as a "personal gaming device" may be referred to by other terminology, such as a portable gaming interface, personal game unit or the like, but regardless of the name of the device, such may have one or more of the characteristics herein.

In addition, in various embodiments, the PGD B24 is in communication with at least one gaming server B28. As described below, in various embodiments, the one or more games which are presented via the PGD B24 to the player are provided by the gaming server B28.

The gaming machines B22a, B22b, B22c, B22d, B22e, B22f, B22g, B22h, B22i, B22j and each PGD B24 is in communication with a payment system referred to herein as the "EZ-Pay" system. This system includes a server B26 for receiving and transmitting information. In general, the EZ Pay system is utilized to accept payment from a player for the playing of games and obtaining of other goods and services, and for paying a player winnings or awards.

In the embodiments illustrated, the gaming system B20 includes other servers B30, B32 for transmitting and/or receiving other information. In some embodiments, one server B30 comprises a prize transaction server. Another server B32 comprises a food transaction server. In a some embodiments, information may be transmitted between the PGD B24 and these servers B30, B32.

The EZ Pay system, according to various embodiments, will now be described in more detail with reference to FIG. 9. The EZ Pay system may constitute an award ticket system which allows award ticket vouchers to be dispensed in lieu of the traditional coin awards or reimbursements when a player wins a game or wishes to cash out. These tickets may also be used by gaming machines and other devices for providing value, such as for payment of goods or services including as a bet or ante for playing a game.

Figure 9:
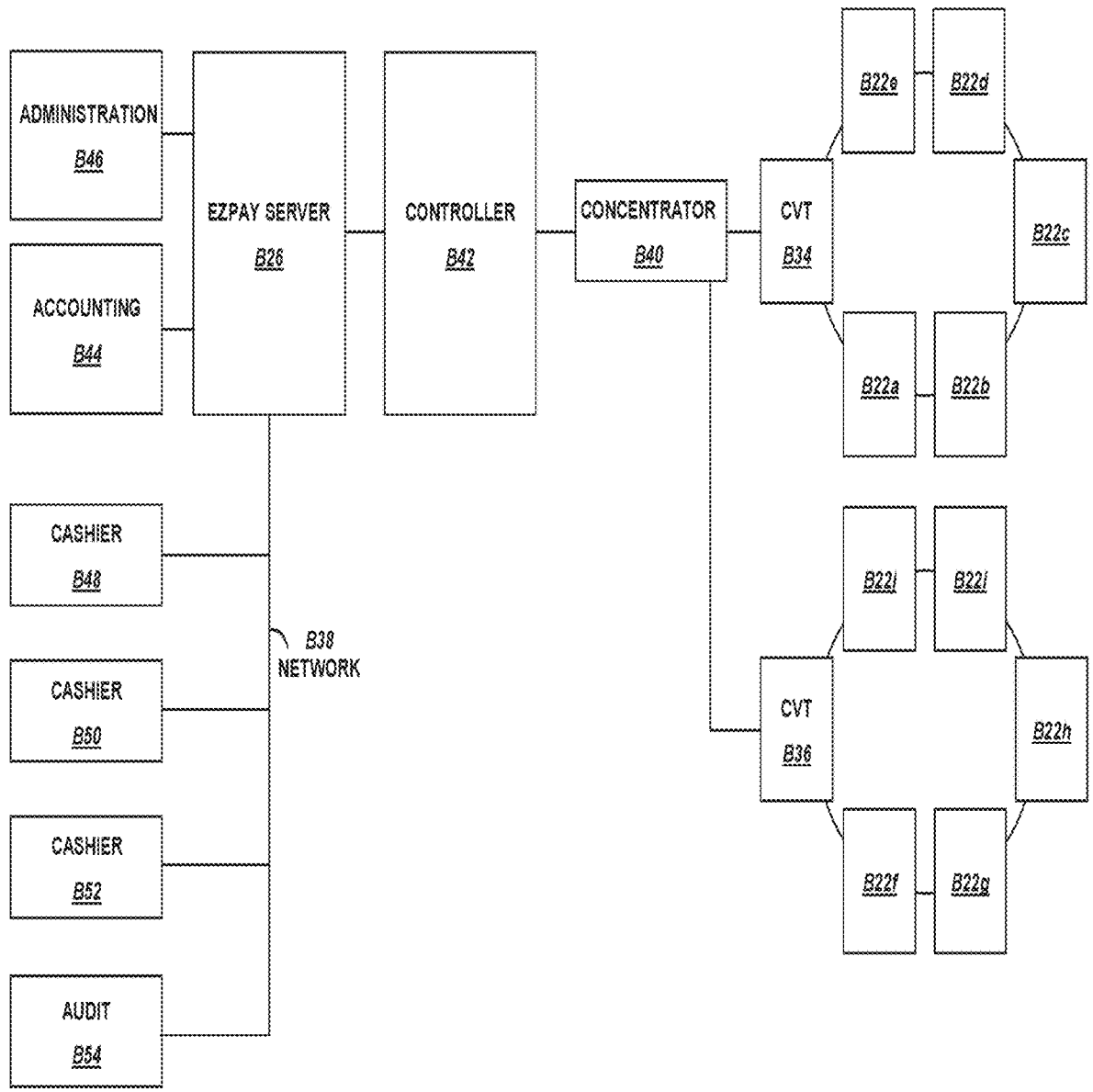
FIG. 9 is a block diagram of a payment system forming a part of the gaming system illustrated in FIG. 8, according to some embodiments.

FIG. 9 illustrates some embodiments of such a system in block diagram form. As illustrated, a first group of gaming machines B22a, B22b, B22c, B22d, and B22e is shown connected to a first clerk validation terminal (CVT) B34 and a second group of gaming machines B22f, B22g, B22h, B22i, and B22j is shown connected to a second CVT B36. All of the gaming machines print ticket vouchers which may be exchanged for cash or accepted as credit or indicia in other gaming machines. When the CVTs B34,B36 are not connected to one another, a ticket voucher printed from one gaming machine may only be used as indicia of credit in another gaming machine which is in a group of gaming machines connected to the same CVT. For example, an award ticket printed from gaming machine B22a might be used as credit of indicia in gaming machines B22b, B22c, B22d, and B22e, which are connected to the common CVT B34, but may not be used in gaming machines B22f, B22g, B22h, B22i, and B22j since they are each connected to the CVT B36.

The CVTs B34, B36 store ticket voucher information corresponding to the outstanding ticket vouchers that are waiting for redemption. This information is used when the tickets are validated and cashed out. The CVTs B34, B36 store the information for the ticket vouchers printed by the gaming machines connected to the CVT. For example, CVT B34 stores ticket voucher information for ticket vouchers printed by gaming machines B22a, B22b, B22c, B22d, and B22e. When a player wishes to cash out a ticket voucher and the CVTs B34, B36 are not connected to one another, the player may redeem a voucher printed from a particular gaming machine at the CVT associated with the gaming machine. To cash out the ticket voucher, the ticket voucher is validated by comparing information obtained from the ticket with information stored with the CVT. After a ticket voucher has been cashed out, the CVT marks the ticket as paid in a database to prevent a ticket voucher with similar information from being cashed multiple times.

Multiple groups of gaming machines connected to the CVTs B34, B36 may be connected together in a cross validation network B38. The cross validation network typically comprises one or more concentrators B40 which accept input from two or more CVTs and enables communications to and from the two or more CVTs using one communication line. The concentrator B40 is connected to a front end controller B42 which may poll the CVTs B34, B36 for ticket voucher information. The front end controller B42 is connected to an EZ pay server B26 which may provide a variety of information services for the award ticket system including accounting B44 and administration B46.

The cross validation network allows ticket vouchers generated by any gaming machine connected to the cross validation network to be accepted by other gaming machines in the cross validation network B38. Additionally, the cross validation network allows a cashier at a cashier station B48, B50, B52 to validate any ticket voucher generated from a gaming machine within the cross validation network B38. To cash out a ticket voucher, a player may present a ticket voucher at one of the cashier stations B48, B50, B52. Information obtained from the ticket voucher is used to validate the ticket by comparing information on the ticket with information stored on one of the CVTs B34, B36 connected to the cross validation network B38. As tickets are validated, this information may be sent to another computer B54 providing audit services.

As described above, the gaming system B20 may also include one or more hand-held PGDs B24. In various embodiments, the PGD B24 is a portable device capable of transmitting and receiving information via a wireless communication link/network.

Referring again to FIG. 8, the gaming system B20 may include a printer B56, wireless communication relays B58 and B60, and wireless transceivers B62, B64, B66 and B68 connected to the remote transaction servers B26, B28, B30 and B32. In various embodiments, a player may obtain the PGD B24, and after being provided with the appropriate authority, may play one or more games and/or obtain other services including food services or accommodation services.

Figure 10:
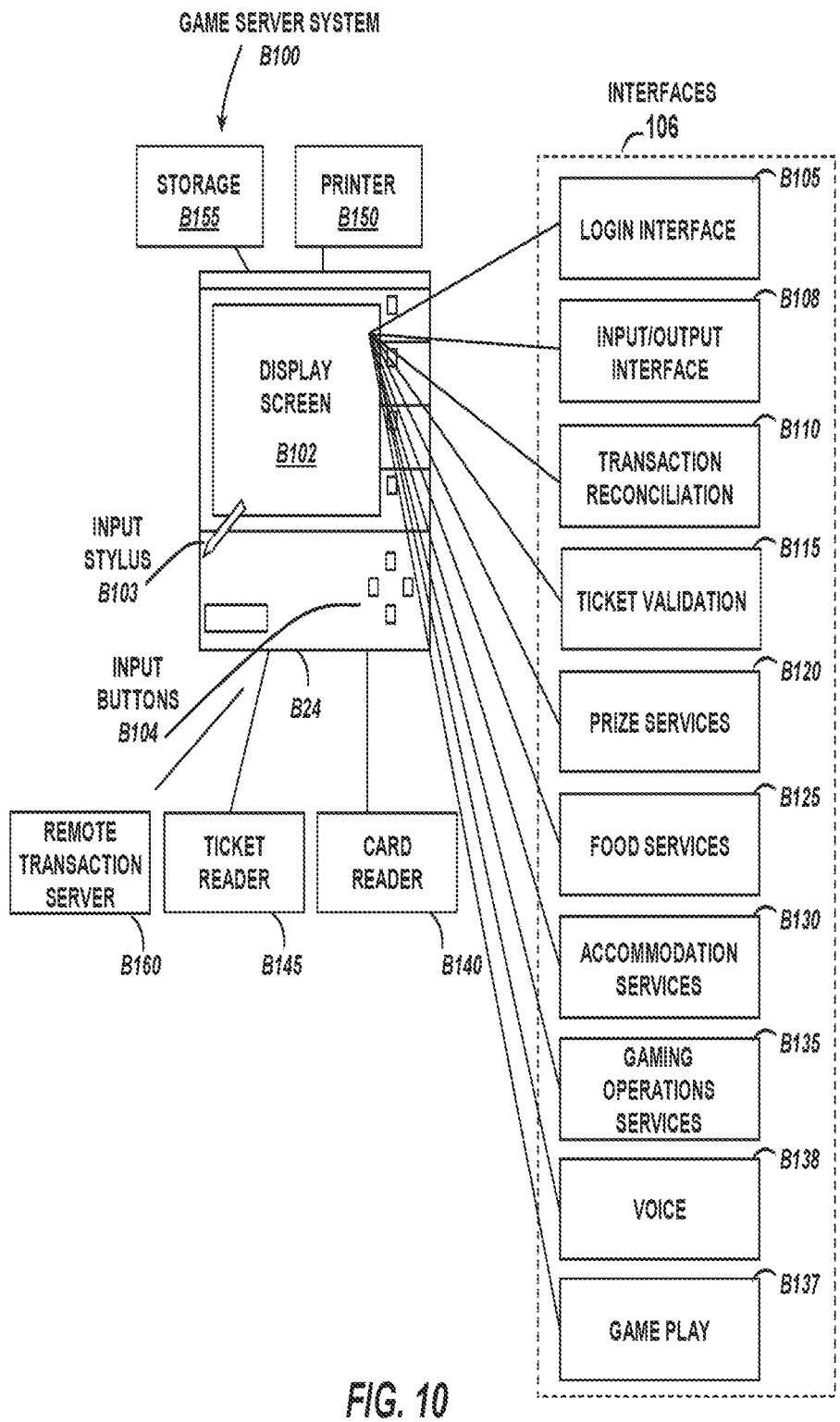
FIG. 10 is a schematic diagram of a portable gaming device of the gaming system illustrated in FIG. 8, according to some embodiments.

FIG. 10 illustrates the PGD B24 and a block diagram of a game and service system which may be implemented by the gaming system B20 illustrated in FIG. 8. In various embodiments, the game and service system B100 is comprised of at least one PGD B24 and a number of input and output devices. The PGD B24 is generally comprised of a display screen B102 which may display a number of game service interfaces B106. These game service interfaces B106 are generated on the display screen B102 by a microprocessor of some type (not shown) within the PGD B24. Examples of a hand-held PGD B24 which may accommodate the game service interfaces B106 shown in FIG. 10 are manufactured by Symbol Technologies, Incorporated of Holtsville, N. Y. The interface or menu data may be stored in a local memory, or the data may be transmitted to the PGD B24 from a remote location (such as a data server). This reduces the memory requirement of the device.

The game service interfaces B106 may be used to provide a variety of game service transactions and gaming operations services, including the presentation for play by a user of one or more games. The game service interfaces B106, including a login interface B105, an input/output interface B108, a transaction reconciliation interface B110, a ticket validation interface B115, a prize services interface B120, a food services interface B125, an accommodation services interface B130, a gaming operations interface B135, and a game play interface B137 may be accessed via a main menu with a number of sub-menus that allow a game service representative or player to access the different display screens relating to the particular interface.

In one or more embodiments, some or all of the interfaces may be available to a user of the PGD B24. For example, in one or more embodiments, the PGD B24 may have a dual purpose of both being usable by a player to play games and engage in other activities, and also be used by gaming operations personnel for use in providing services to players and performing administrative functions. In various embodiments, certain PGDs B24 may be specially configured for use only by players, and other PGDs B24 may be specially configured for use only by gaming or other personnel. In such event, the interfaces B106 may be custom programmed.

In one or more embodiments, only certain interfaces B106 may be displayed, depending on the status of the user of the PGD B24. In some embodiments, the particular interfaces B106 which are displayed and thus accessible for use are determined by the status of the user as indicated through a login function. In various embodiment, when the PGD B24 is operable (such as when a power button is activated) the default status for the PGD B24 is the display of the login interface B105. Once a user of the PGD B24 has logged in, then the status of the PGD display is changed.

In one or more embodiments, the login interface B105 may allow a game service representative to enter a user identification of some type and verify the user identification with a password. When the display screen B102 is a touch screen, the user may enter the user/operator identification information on a display screen comprising the login interface B105 using an input stylus B103 and/or using one or more input buttons B104. Using a menu on the display screen of the login interface, the user may select other display screens relating to the login and registration process. For example, another display screen obtained via a menu on a display screen in the login interface may allow the PGD B24 to scan a finger print of the game service representative for identification purposes or scan the finger print of a game player.

In the event a user identifies themselves as a gaming operator or representative, then the PGD B24 may be arranged to display one or more other interfaces such as those listed above and described in detail below. In one or more embodiments, the default status or login may be a "player" mode login.

In various embodiments, the login interface B105 may allow a player to identify themselves to configure the PGD B24 to permit the player to access a plurality of player services, such as playing games and the like. In various embodiments, the login interface B105 includes a request that the user identify themselves as a "player" or "authorized personnel." In the event "authorized personnel" is selected, then the above-referenced user identification (including password) may be requested. If "player" is selected, then in various embodiments the player is requested to provide an EZ pay ticket. As described in more detail below, in various embodiments, a player who wishes to play one or more games or obtain other goods or services uses an EZ pay ticket to provide the credit or payment therefor. The ticket may be obtained from a cashier or by play of another gaming device (such as devices B22a, B22b, B22c, B22d, B22e, B22f, B22g, B22h, B22i, B22j in FIG. 8). The ticket may be verified through the EZ pay system described above.

In various embodiments, the PGD B24 includes a ticket reader B145 and a card reader B140. In some embodiments, the ticket reader B145 may be of a variety of types. In some embodiments, the reader comprises a bar-code reading optical scanner. In this arrangement, a user of the PGD B24 may simply pass the bar-coded ticket in front of the bar-code reader. In some embodiments, the card reader B140 comprises a magnetic-stripe card type reader for reading information associated with a magnetic stripe of a card, such as a player tracking card.

After having provided the appropriate authorization, access may be provided to the user of the PGD B24 of one or more of the following interfaces B106.

In one or more embodiments, an authorized user may be provided with access to the input/output interface B108. In a various embodiments, such access is only provided to a game service operator and not a player. In one or more embodiments, the input/output interface B108 permits a user to select, from a list of devices stored in memory on the PGD B24, a device from which the PGD may input game service transaction information or output game service transaction information. For example, the PGD B24 may communicate with the ticket reader B145. As another example, the PGD B24 may input information from the card reader B140. Such input may be useful, for example, if a game service operator wishes to verify the authenticity of a player tracking card or the like.

The PGD B24 may output game and service transaction information to a number of devices. For example, to print a receipt, the PGD B24 may output information to a printer B150. In this game service transaction, the PGD B24 may send a print request to the printer B150 and receive a print reply from the printer B150. The printer B150 may be a large device at some fixed location, or a portable device carried by the game service representative. As another example, the output device may be the card reader B140 that is able to store information on a magnetic card or smart card. Other devices which may accept input or output from the PGD B24 are personal digital assistants, microphones, keyboard, storage devices, gaming machines and remote transaction servers.

The PGD B24 may communicate with the various input mechanisms and output mechanisms using both wire and wire-less communication interfaces. For example, the PGD B24 may be connected to the printer B150 by a wire connection of some type. However, the PGD B24 may communicate with a remote transaction server B160 via a wire-less communication interface including a spread spectrum cellular network communication interface. An example of a spread spectrum cellular network communication interface is Spectrum 24 offered by Symbol Technologies of Holtsville, N.Y., which operates between about 2.4 and 2.5 Gigahertz. The information communicated using the wireless communication interfaces may be encrypted to provide security for certain game service transactions such as validating a ticket for a cash pay out. Some devices may accommodate multiple communication interfaces. Such a spread spectrum network is but one possible communication scheme.

Another type of interface that may be stored on the PGD B24 is the award ticket validation interface B115. In some embodiments, this interface is only available to an authorized game service representative, and not a player. Some embodiments of the award ticket interface B115 may accommodate the EZ pay ticket voucher system and validate EZ pay tickets as previously described. However, when other ticket voucher systems are utilized, the award ticket validation interface B115 may be designed to interface with the other ticket voucher systems. Using the award ticket validation interface B115, a game service representative may read information from a ticket presented to the game service representative by a game player using the ticket reader and then validate and pay out an award indicated on the ticket.

In various embodiments, the award ticket contains game service transaction information which may be verified against information stored on a remote transaction server B160. To validate the ticket may require a number of game service transactions. For example, after obtaining game service transaction information from the award ticket, the PGD B24 may send a ticket validation request to the remote transaction server B160 using the spread spectrum communication interface and receive a ticket validation reply from the remote server B160. In particular, the validation reply, and the validation request may be for an EZ pay ticket. After the award ticket has been validated, the PGD B24 may send a confirmation of the transaction to the remote server B160. Details of the game service transaction information validation process are described with the reference to FIG. 12. In various embodiments, the award ticket interface may be configured to validate award information from a smart card or some other portable information device or validate award information directly from a gaming machine.

As game and service transactions are completed, game and service transaction information may be stored on a storage device B155. The storage device B155 may be a remote storage device or a portable storage device. The storage device B155 may be used as a back-up for auditing purposes when the memory on the PGD B24 fails and may be removable from the PGD B24.

A type of game service interface that may be stored on the PGD B24 is the prize service interface B120. As an award on a gaming machine (i.e., machines B22a, B22b, B22c, B22d, B22e, B22f, B22g, B22h, B22i, B22j in FIG. 8) or while playing a game via the PGD B24, a game player may receive a ticket (such as issued by other machine) that is redeemable for merchandise including a bicycle, a computer or luggage or receive such an award directly (such as while playing the PGD B24 itself). Using the prize service interface B120, a game service representative or player may validate the prize service ticket and then check on the availability of certain prizes. For example, when the prize service ticket indicates the game player has won a bicycle, the game service representative may check whether the prize is available in a nearby prize distribution center. Alternatively, a player may be permitted to do the same thing. In some embodiments, a player may be awarded a prize of a particular level, there being one or more particular prizes on that level. In such events, the player may use the interface B120 to determine what prizes are currently available in the prize level just awarded. The PGD B24 may validate a prize ticket and check on the availability of certain prizes by communicating with a remote prize server. Further, the game service representative may have the prize shipped to a game player's home or send a request to have the prize sent to a prize distribution location.

The game service transactions needed to validate the prize ticket including a prize validation request and a prize validation reply, to check on the availability of prizes and to order or ship a prize may be implemented using various display screens located within the prize interface. The different prize screens in the prize service interface B120 may be accessed using a menu located on each screen of the prize service interface. In some embodiments, the prize service interface B120 may be configured to validate prize information from a smart card or some other portable information device or validate award information directly from a gaming machine.

A type of game service interface that may be stored on the PGD B24 is the food service interface B125. As an award on a gaming machine or as compensation for a particular amount of game play, a game player may receive a free food or drink. Using the food service interface B125, the player may redeem the food or drink award, or a game service representative may validate such an award (for example, the award may be provided to a player of a gaming device B22a in the form of a ticket) and check on the availability of the award. For example, when the game player has received an award ticket valid for a free meal, the food service interface may be used to check on the availability of a dinner reservation and make a dinner reservation. As another example, the PGD B24 may be used to take a drink or food order by the player thereof. Such an order may be processed via the remote food server B32 (see also FIG. 8). The transactions needed to validate a food ticket or award, to check on the availability of food services, request a food service and receive a reply to the food service request may be implemented using various display screens located within the food service interface B125. These display screens may be accessed using a menu located on each screen of the food service interface. In some embodiments, the food service interface may be configured to validate food service information from a smart card or some other portable information device.

Another type of game service interface that may be stored on the PGD B24 is an accommodation service interface B130. As an award for game play or as compensation for a particular amount of game play, a game player may receive an award in the form of an accommodation service such as a room upgrade, a free night's stay, or other accommodation prize. Using the accommodation service interface B130, the player may check on the availability of certain accommodation prizes. For example, when the game player has received an award for a room upgrade, the accommodation service interface may be used to check on the availability of a room and to make a room reservation. Regardless of whether the player has won an accommodation award, the player may utilize the accommodation service interface B130 to reserve a room (such as an additional night's stay) or an upgrade to a room. In some embodiments, a player of a game may be issued a ticket (such as from a free-standing game device B22a, B22b, B22c, B22d, B22e, B22f, B22g, B22h, B22i, B22j in FIG. 8), and a gaming representative may use the accommodation service interface B130 in order to validate the player's award ticket and check on the availability of the award and institute the award. As another example, the PGD B24 may be used to order a taxi or some other form of transportation for a player at a gaming machine preparing to leave the game playing area. The game playing area may be a casino, a hotel, a restaurant, a bar or a store.

The PGD B24 may validate the accommodation service award and check on the availability of certain accommodation awards by communicating with a remote accommodation server. The transactions needed to validate the accommodation ticket, check on the availability of accommodation services, request an accommodation service and receive a reply to the accommodation service request may be implemented using various display screens located within the accommodation service interface. These display screens may be accessed using a menu located on each screen of the accommodation service interface. In some embodiments, the accommodation service interface may be configured to validate accommodation service information from a smart card or some other portable information device.

A type of game service interface that may be stored on the PGD B24 is a gaming operations service interface B135. Using the gaming service interface B135 on the PGD B24, a game service representative may perform a number of game service transactions relating to gaming operations. For example, when a game player has spilled a drink in the game playing area, a game service representative may send a request to maintenance to have someone clean up the accident and receive a reply from maintenance regarding their request. The maintenance request and maintenance reply may be sent and received via display screens selected via a menu on the screens of the gaming operations service interface. As another example, when a game service representative observes a damaged gaming machine such as a broken light, the game service representative may send a maintenance request for the gaming machine using the PGD B24. In one or more embodiments, a player may be permitted various options through the gaming service interface B135. For example, a player may be permitted to request a gaming service representative or attendant using the interface B135.

A type of game service interface that may be stored on the PGD B24 is a transaction reconciliation interface B110. In various embodiments, the PGD B24 contains a memory storing game service transaction information. The memory may record the type and time when a particular game service transaction is performed. At certain times, the records of the game service transactions stored within the PGD B24 may be compared with records stored at an alternate location. For example, for an award ticket validation, each time an award ticket is validated and paid out, a confirmation is sent to a remote server B160. Thus, information regarding the award tickets, which were validated and paid out using the PGD B24, should agree with the information regarding transactions by the PGD stored in the remote server B160. The transaction reconciliation process involves using the transaction reconciliation interface B110 to compare this information. In various embodiments, only a gaming service representative (and not a player) is permitted access to the transaction reconciliation interface B110.

A type of game service interface that may be stored on the PGD B24 is a voice interface B138. Using the spread spectrum cellular or other communication network incorporated into the PGD, a player and/or game service representative may use the PGD B24 as a voice communication device. This voice interface B138 may be used to supplement some of the interfaces previously described. For example, when a game player spills a drink the game service representative may send maintenance request and receive a maintenance reply using the voice interface B138 on the PGD B24. As another example, when a game player requests to validate a food service such as free meal, such a request may be made by the player or a game service representative at a restaurant or other location using the voice interface B138 on the PGD B24. In some embodiments, a player may be permitted to contact a player of another PGD B24, such as by inputting a code number assigned to the PGD B24 through which communication is desired. Such would permit, for example, a husband and wife using two different PGDs B24 to communicate with one another. The voice interface B138 may also permit a player to contact the front desk of a hotel/casino, an operator of a switchboard at the gaming location or the like.

A type of game service interface that may be stored on the PGD B24 is a game play interface B137. In various embodiments, a player is permitted to access the game play interface B137 in order to select from one or more games for play. The game play interface B137 may include a menu listing one or more games which the player may play via the PGD B24. In various embodiments, game play is facilitated with the game server B28 (see FIG. 8).

In one or more embodiments, the gaming control code is not resident at the PGD B24, but instead at a secure, remote server. Referring to FIG. 8, game play data is transmitted from the game server B28 to the PGD B24, and from the PGD B24 to the game server B28. Preferably, the PGD B24 is adapted to receive and process data, such as by receiving video data and processing the data to present the information on the display B102. Likewise, the PGD B24 is arranged to accept input and transmit that input or instruction to the game server B28. This arrangement has the benefit that nearly all aspects of the play of a game can be monitored, as it requires the game play data to pass to or from a remote location. This avoids, for example, storage of the gaming software at the PGD B24 where it might be tampered with, copied or the like.

In one or more embodiments, each PGD B24 has a unique identifier which is utilized to identify which PGD B24 data is transmitted from and to which data is to be transmitted to. In some embodiments, the game server B28 may thus be used to present the same or different games to a plurality of players using different PGDs B24, with the game data regarding a particular game being played at a particular PGD B24 being directed to that PGD B24 using its particular identifier.

As will be appreciated by those of skill in the art, the PGD B24 may have a variety of configurations. As stated above, the PGD B24 may be used in the gaming system B20 in which gaming code is not stored directly at the PGD. In such an embodiment, the PGD B24 may have a much more limited amount of data memory. In some embodiments, the PGD B24 includes a processor for executing control code, such as that necessary to operate the display B102, accept input from the stylus B103 or input buttons B104 or the like. In addition, the PGD B24 preferably includes a buffer memory for accepting data transmitted from the game server B28. This data may comprise data for displaying game information, such as video and sound content.

Various aspects of the use of the PGD B24 described above will now be described. In one or more embodiments, the PGD B24 may be used directly by a player. In various embodiments, a player may use the PGD B24 to play one or more games, and obtain products and services, such as food.

Figure 11A:
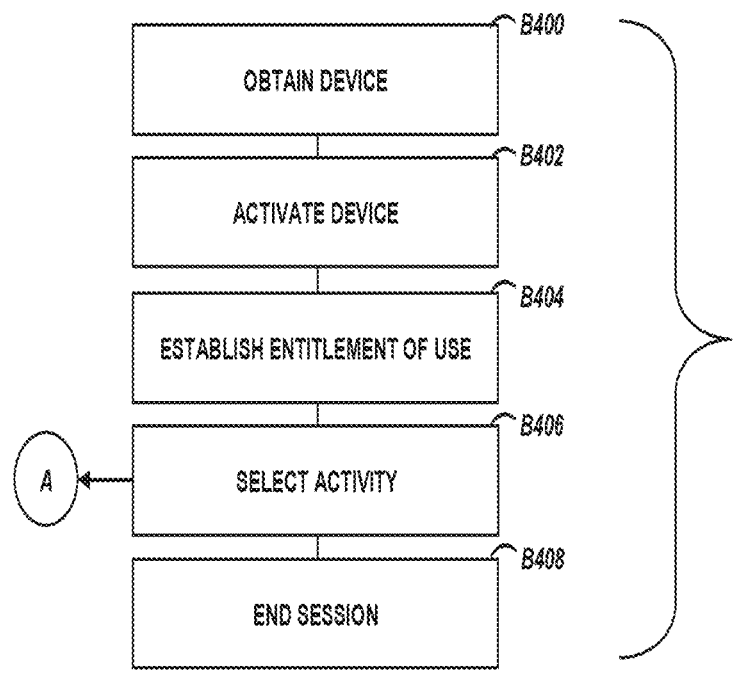
FIG. 11(a) is a flow diagram of a method of use of a portable gaming device by a player, according to some embodiments.
Figure 11B:
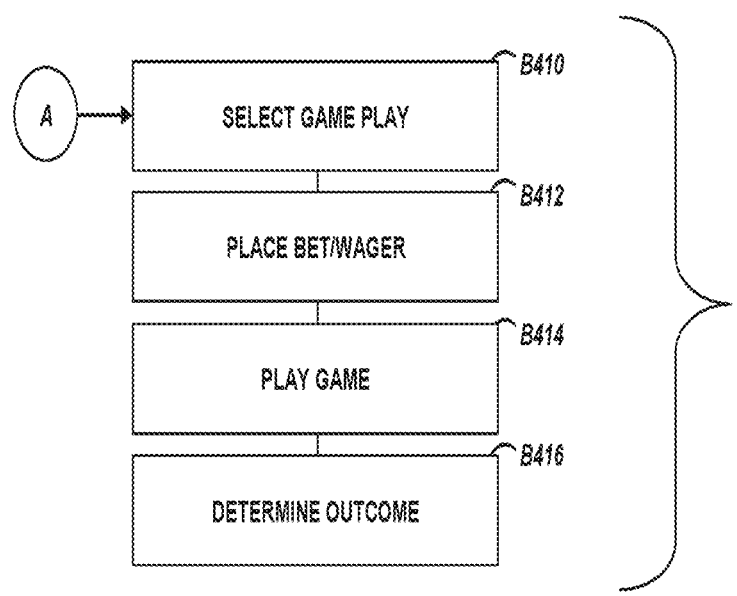
FIG. 11(b) is a flow diagram of a particular method of using the portable gaming device by a player, according to some embodiments.

A method of use of the PGD B24, according to some embodiments, is illustrated in FIGS. 11(a) and 11(b). In general, a player must first obtain a PGD B24. For example, a player may check out a PGD B24 from a gaming operator. The player then establishes entitlement to use the PGD B24. In some embodiments, the player must indicate player status at the login interface, and obtain a valid ticket in order to activate the PGD B24. Once activated, the player is permitted to engage in a variety of transactions using the interfaces B106, such as playing a game, redeeming prizes and awards, placing food and drink orders, placing reservations, seeking gaming operator support, and seeking a variety of other goods and services as described in more detail below.

One example of a method of use of the PGD B24 by a player will be described with reference to FIG. 11(a). In a first step B400, the player first obtains the PGD B24. In some embodiments, a gaming operator may have certain locations at which a player may obtain the PGD B24, such as the front desk of a hotel/casino, the hostess stand at a restaurant, from a gaming attendant or other location as desired. In some embodiments, a gaming operator may actually permit a player to retain the PGD B24, such as by renting, selling or giving the PGD B24 away to a player.

In a step B402, the PGD B24 is activated. In some embodiments, this step includes turning on the PGD B24 (such as with a power switch) and logging in. In some embodiments, when the PGD B24 is turned on, the login interface B105 is automatically displayed. The login interface B105 may include "player" and "authorized personnel" buttons which may be activated using the stylus B103. The player may indicate "player" status by selecting the player button with the stylus B103.

In some embodiments, the gaming operator may log the player in. For example, when a player obtains the PGD B24 from a hostess at a restaurant, the hostess may log in the player in player mode. In some embodiments, the gaming operator may have certain PGDs B24 which are for use by players and certain others which are for use by gaming personnel. In such event, the PGDs B24 which are configured for player status may automatically be configured for player mode after being turned on.

In a step B404, a player establishes entitlement to use the PGD B24. In some embodiments, this step comprises the player providing a valid ticket which is verifiable using the EZ pay portion of the gaming system B20. In some embodiments, a player may have obtained a ticket through play of a gaming machine, such as gaming machines B22a, B22b, B22c, B22d, B22e, B22f, B22g, B22h, B22i, B22j of the gaming system B20. In some embodiments, a player may be issued a ticket by a game service representative. For example, a player may provide credit at a cashier cage (such as with a credit card or cash) and be issued a ticket. A player may also pay cash or the like to a restaurant hostess and be issued a ticket.

Once the player has a ticket, the ticket may be scanned using the ticket reader B145 of the PGD B24. For example, the player may pass the ticket in front of the ticket reader B145. Once the information is read by the PGD B24, the data may be transmitted to the EZ pay server B26 for validation. Preferably, this validation confirms that the particular ticket is authorized, including the fact that it is outstanding and has value associated therewith.

In one or more embodiments, entitlement may be established in other manners. For example, in some embodiments, entitlement may be established with a player tracking or identification card which may be read using the card reader B140 of the PGD B24.

Establishing entitlement to use the PGD B24 may ensure that the player has funds for paying to obtain services and products available by use of the PGD B24. In one or more embodiments, however, this step may be eliminated. For example, in some embodiments, a player may be permitted to use the PGD B24 and then pay for goods or services in other manners. In some embodiments, a player may, for example, order food and then pay the server for the food using a room charge or cash at the time the food is delivered. In some embodiments, a player may use a credit card to pay to play games or to pay for food or the like. In such event, a credit card may be read by the card reader B140 at the time the services or products are to be provided or are ordered by the player.

In a step B406, the player is then permitted to select one or more selections from the interfaces B106. As stated above, a player may not be permitted access to all of the interfaces B106. In any event, a player may select, such as with the stylus B103, a service from the group of interfaces B106. An example of the engagement of a particular activity using the PGD B24 will be described below with reference to FIG. 11(b).

Once a player no longer desires to engage in any more activities using the PGD B24, the use session of the PGD B24 is ended in a step B408, and in one or more embodiments, the PGD B24 is returned to the gaming operator. In various embodiments, once a player no longer wishes to use the PGD B24, the player returns the PGD B24 to the gaming operator. At that time, the gaming operator may confirm that all transactions using the PGD B24 are closed or complete, and pay the player any winnings. In some embodiments, a player B24 is issued a new ticket representing the player's credit (including any payments made in order to first use the PGD B24, plus any winnings, less any expenditures).

An example of a method of using the PGD B24 wherein the player has selected the option of game play using the game play interface B137 will be described in detail with reference to FIG. 11(b). In a step B410 (which step comprises a particular embodiment of step B406 of FIG. 11(a)), a player has selected the event or service of "game play" using the game play interface B137.

In some embodiments, when a player has selected the game play interface B137, a menu may be displayed to the player of the one or more games which the player may be permitted to play. In some embodiments, when the player selects the game play interface B137, a signal is transmitted from the PGD B24 to the remote game server B28 instructing the game server B28 that the player wishes to play a game. In response, the game server B28 may send the latest game menu to the PGD B24 for display. In this arrangement, the menu of games which is available may be continuously updated at one or more central locations (such as the server B28) instead of at each PGD B24.

If the system B20 permits the player to select a game from a menu of games, then the method includes the step of the player selecting a particular game to be played. Once a game is selected, or if only a single game option is provided, then game play begins. In some embodiments, the game server B28 transmits data to the PGD B24 for use by the PGD B24 in presenting the game, such as video and audio content.

In some embodiments, in a step B412 a player is required to place a bet or ante to participate in a game. In some embodiments, the player may place the bet or ante using the EZ pay system. As stated above, the player preferably establishes entitlement to use the PGD B24 with an EZ pay ticket or other entitlement, which ticket demonstrates that the player has monies or credits on account which may be used to pay for goods and services. These services include game play services.

In some embodiments, when the player establishes entitlement to use the PGD B24, the value of the player's credits or monies are displayed to the player so that the player is visually reminded of these amounts. When a player begins play of a game, the player may input a bet and ante which is no more than the value of the credits or monies which the player has on account. Once a player has placed a bet or ante, that information is transmitted to the EZ pay server B26 and is deducted from the player's account. A new credit value is then displayed at the PGD B24 to the player.

In various embodiments, a player may provide credit for a bet or ante in other manners. For example, a player may swipe a credit card through the card reader B140 in order to provide the necessary credit for the bet or ante.

In a step B414, the player is then permitted to engage in the game. In some embodiments, game play comprises the game server B28 executing game code and transmitting information to the PGD B24 for presenting certain aspects of the game to the player. When necessary, the player is permitted to provide input, and the input data is transmitted from the PGD B24 to the game server B28.

As one example of a game, the game may comprise video poker. In this embodiment, the game server B28 executes code for randomly generating or selecting five cards. Data representing video images of the cards is transmitted to the PGD B24, where the images of the five dealt cards are displayed on the display screen B102.

The instruction "draw" or "stay" may be displayed to the player. At that time, the player may select one or more of the cards to hold or replace. In the event the player elects to replace any card, that instruction is transmitted to the game server B28 which then randomly generates or selects replacement cards. The replacement card data is transmitted to the PGD B24 and images of the replacement cards are displayed.

In the event the hand of five cards (including any replacement cards) is determined by the game server B28 to comprise a predetermined winning hand, then the player may be paid a winning amount. If not, then the player loses his bet or ante. This step comprises step B416 of the method, that of determining the outcome of the game.

If the outcome is a winning outcome, then the player may be paid a winning by crediting the player's account through the EZ pay server B26. In that event, the player's credits value as displayed is updated to reflect the player's winnings.

A player may then elect to play the game again, play a different game, or select one or more other services offered. In some embodiments, a "return to main menu" button or the like may be displayed to the player at all times, permitting the player to return to a display including the various interfaces B106.

In some embodiments, when the player has completed use of the PGD B24, the player returns the PGD B24 to the gaming operator. For example, the player may return the PGD B24 to a cashier cage or a game service operator. In various embodiments, the game service operator or other party then issues the player a ticket for any credit or value which remains in the player's account. The PGD B24 may then be deactivated so that it readied for use by another player. In some embodiments, the PGD B24 may be deactivated by turning its power off. In some embodiments, a "logout" interface or option may be provided which causes the PGD B24 to return to a default state seeking the login of a player or user.

The PGD B24 may be used by a game service operator. Several examples of a method of such use are detailed below in conjunction with FIGS. 8 and 9.

When a game service representative contacts a game player seeking a game service in the game playing area B70 (see FIG. 8), the game service representative uses an appropriate game service interface on the display screen of the PGD B24, as described with reference to FIG. 10, to provide the game service requested by the game player. For example, when a game player requests an EZ pay ticket validation, the game service representative brings the EZ pay ticket validation interface onto the display screen of the PGD B24 using menus available on the display screen B102. Then, the game service representative scans the EZ pay ticket using a ticket reader connected to the PGD B24 to obtain unique ticket information. Next, the PGD B24 sends an EZ pay ticket validation request using the wire-less communication interface to the EZ pay server B26.

In various embodiments, the ticket validation request is composed of one or more information packets compatible with the wire-less communication standard being employed. Using a wireless link B72, the one or more information packets containing the ticket validation request are sent to the transceiver B62 connected to the EZ pay server. The transceiver B62 is designed to receive and send messages from the one or more PGDs B24 in the game playing area B70 in a communication format used by the PGDs. Depending on the location of the PGD B24 in the game playing area B70, the communication path for the information packets to and from the PGD B24 may be through one or more wire-less communication relays including B58 and B60. For example, when the PGD B24 is located near gaming machine B22a, the communication path for a message from the PGD B24 to the EZ pay server B26 may be from the PGD B24 to the relay B60, from the relay B60 to the relay B58, from the relay B58 to the transceiver B62 and from the transceiver B62 to the EZ pay server B26. As the location of the PGD B24 changes in the game playing area B70, the communication path between the PGD B24 and the EZ pay server B26 may change.

After receiving an EZ pay ticket validation reply from the EZ pay server B26, the EZ pay ticket may be validated using an appropriate display screen on the PGD B24. After cashing out the ticket, the game service representative may send a confirmation of the transaction to the EZ pay server B26 using the PGD B24. The transaction history for the PGD B24 may be stored on the PGD B24 as well as the EZ pay server B26. Next, a receipt for the transaction may be printed out. The receipt may be generated from a portable printer carried by the game server representative ad connected to the PGD B24 in some manner or the receipt may be generated from a printer B56 at a fixed location.

After providing a number of game services comprising a number of game service transactions to different game players in the game playing area B70 using the PGD B24, a game service representative may log-off of the PGD B24 and return it to location for secure storage. For example, at the end of a shift, the game service representative may check the PGD B24 at some of the locations, the device is unassigned to the particular game service representative and then may be assigned to another game service representative. However, before the PGD B24 is assigned to another game service representative, the transaction history stored on the PGD B24 may be reconciled with a separate transaction history stored on a transaction server such as the EZ pay server B26.

The assigning and unassigning of the PGD B24 to a game service representative and the transaction reconciliation are performed for security and auditing purposes. Another security measure which may be used on the PGD B24 is a fixed connection time between the PGD B24 and a transaction server. For example, after the PGD B24 has been assigned to a game service representative and the game service representative has logged on the PGD B24, the PGD B24 may establish a connection with one or more transaction servers including the EZ pay server B26, a server B28, a server B30, or a server B32. The connection between a transaction server and the PGD B24 allows the PGD B24 to send information to the transaction server and receive information from the transaction server. The length of this connection may be fixed such that after a certain amount of time the connection between the PGD B24 and the transaction server is automatically terminated. To reconnect to the transaction server, the login and registration process must be repeated on the PGD B24.

A transaction server may provide one or more game service transactions. However, the PGD B24 may connect with multiple transaction servers to obtain different game service transactions. For example, server B30 may be a prize transaction server allowing prize service transactions and server B415 may be a food transaction server allowing food service transactions. When a game service representative receives a prize service request from a game player, the PGD B24 may be used to contact the prize transaction server B30 using a wire-less communication link between the PGD B24 and a transceiver B64 connected to the prize transaction server B30. Similarly, when a game service representative receives a food service request from a game player, the PGD B24 may be used to contact the food transaction server B32 using a wire-less communication link between the PGD B24 and a transceiver B66 connected to the food transaction server B32.

The different transaction servers including the servers B26, B28, B30, B32 may be on separate networks or linked in some manner. For example, server B32 is connected to network B74, server B26 is connected to network B38, server B30 is connected to network B76, and server B28 is connected to network B78. In this embodiment, a network link B80 exists between network B76 and network B38. Thus, server B26 may communicate with server B30 via the network link B80. A communication link between different servers may allow the servers to share game service transaction information and allow different communication paths between the PGDs and the transaction servers. Likewise, a network link B82 exists between network B78 and network B38, permitting the game server to communicate with the EZ pay server B26.

Figure 12:
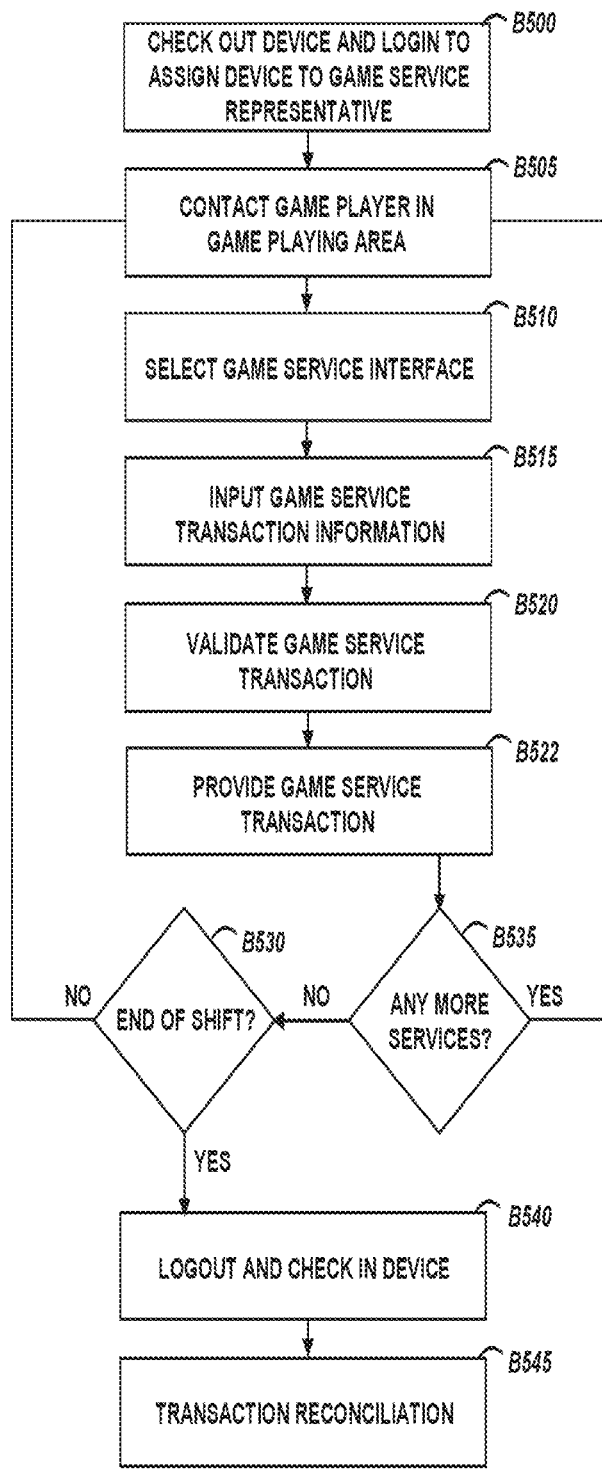
FIG. 12 is a flow diagram of a method of use of the portable gaming device by a gaming service operator, according to some embodiments.

FIG. 12 is a flow chart depicting a method for providing a game service using a hand-held device. In step B500, a game service representative receives the PGD B24 and logs in to the device to assign the device. The check out process and assign process are for security and auditing purposes. In a step B505, the game service representative contacts a game player in the game playing area requesting a game service of some type. In a step B510, the game service representative selects an appropriate interface on the PGD B24 using menus on the display screen B102 of the PGD that allow the game service representative to provide a requested game service. In a step B515, the game service representative inputs game service transaction information required to perform a game service transaction. For example, to validate an award ticket, the game service representative may read information from the ticket using a ticket reader. As another example, to provide a food service including dinner reservation, the game service representative may enter a game player's name to make the reservation.

In a step B520, the transaction information obtained in step B515 is validated as required. For example, when a player attempts to cash out an award ticket, the information from the award is validated to ensure the ticket is both genuine (e.g., the ticket may be counterfeit) and has not already been validated. The validation process requires a number of transfers of information packets between the PGD B24 and the transaction server. The details of the validation process for an award ticket validation are described with reference to FIG. 13. When the transaction information is valid, in a step B522, a game service transaction is provided. For example, a room reservation may be made for a player requesting an accommodation service. A confirmation of the game service transaction may be sent to the transaction server for transaction reconciliation in a step B545. In one or more embodiments, the method may include the step of generating a receipt regarding the game service transaction.

In a step B535, after providing the service, a game player may request another game service. When a game player requests an additional game service, the game service representative returns to step B510 and selects an appropriate interface for the game service. When a game player does not request an additional service and it is not the end of a shift, in a step B530, the game service representative returns to step B505 and contacts a new game player. In a step B540, when a shift has ended, the game service representative logs out of the PGD B24 and checks the device at a secure location so that the PGD may be assigned to a different game service representative. In step B545, before the PGD B24 is assigned to a different game service representative, a transaction history reconciliation is performed to ensure that the transaction history stored on the PGD is consistent with the transactions previously confirmed with a transaction server during the game service representative's shift. The transaction history on the PGD B24 may be stored on a removable memory storage device on the PGD. Thus, the memory may be removed from the device for transaction reconciliation and replaced with a new memory. Thus, the device with the new memory may be assigned to a new game service representative while the transaction history from the previous game service representative assigned to the device is reconciled.

Figure 13:
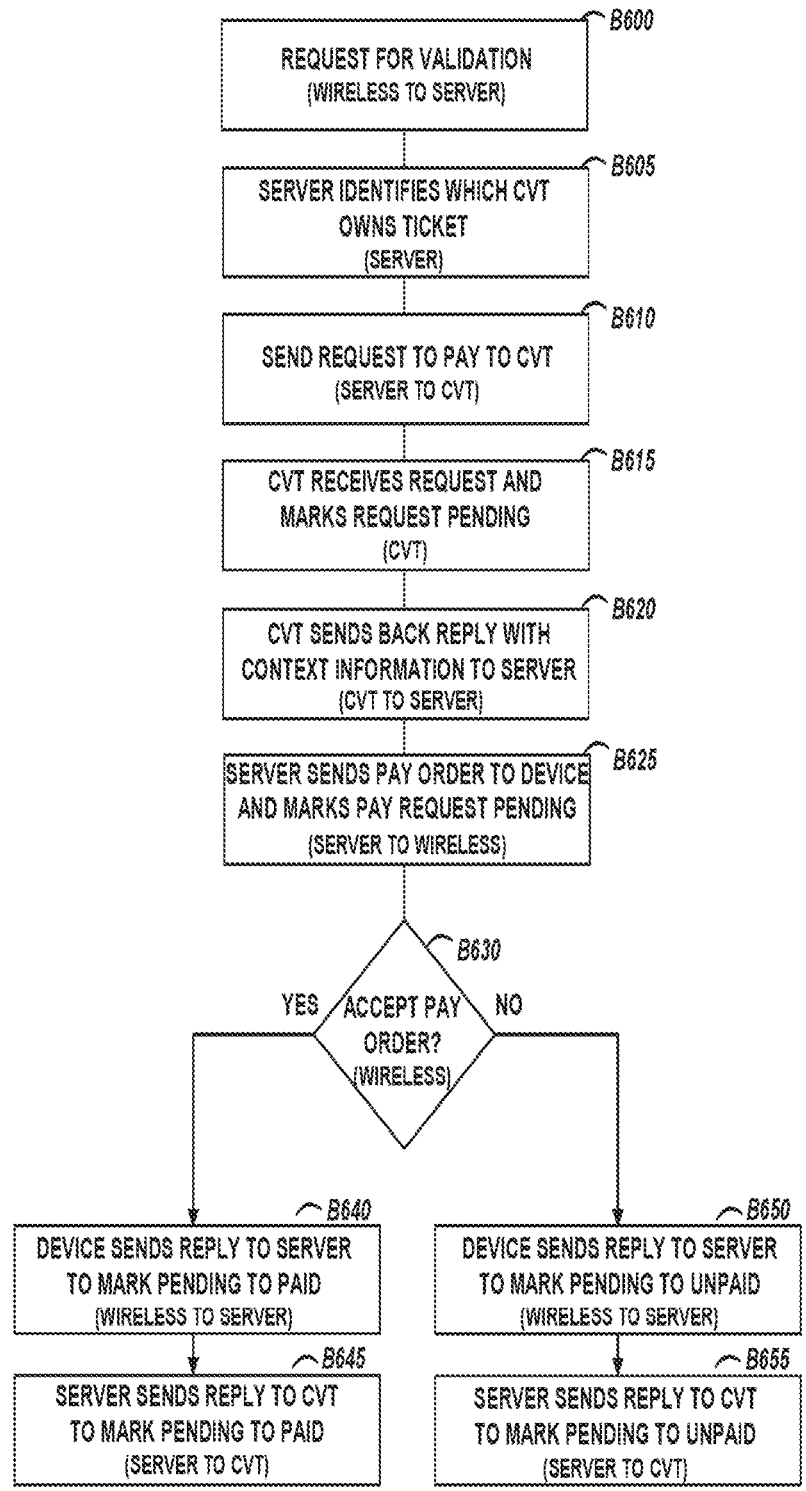
FIG. 13 is a flow diagram of a method of use of the portable gaming device according to some embodiments.

FIG. 13 is a flow chart depicting a method for validating information for providing a personal game service. In the embodiment shown in the figure, a ticket is validated in a manner consistent with an EZ pay ticket system. The EZ pay ticket is usually used for award tickets. However, the system may be adapted to provide tickets for other services include food services, prize services or accommodation services. In a step B600, a request for game service transaction information read from a ticket is sent via a wire-less communication interface on the PGD B24 to the appropriate transaction server as described with reference to FIG. 8. In a step B605, the server identifies which clerk validation ticket (CVT) B34,B36 owns the ticket. When a CVT owns a ticket, the CVT has stored information regarding the status of a particular ticket issued from a gaming machine connected to the CVT B34, B36. In a step B610, the server sends a request to pay the ticket to the CVT identified as the owner of the ticket. Typically, the pay request indicated a service on the ticket has been requested. For a cash ticket, a pay request means a request to cash out the ticket has been made. For a free meal, a pay request means a request to obtain the meal has been made. In a step B615, the CVT receives the pay request for the ticket and marks the ticket pending. While the ticket is pending, any attempts to validate a ticket with similar information is blocked by the CVT.

In a step B620, the CVT B34, B36 sends back a reply with context information to the server. As an example, the context information may be the time and place when the ticket was issued. The information from the CVT to the server may be sent as one or more data packets according to a communication standard shared by the CVT and server. In a step B625, after receiving the validation reply from the CVT, the server marks the pay request pending and sends a pay order to the PGD B24. While the pay request is pending, the server will not allow another ticket with the same information as the ticket with the pay request pending to be validated.

In a step B630, the game service representative may choose to accept or reject the pay order form the server. When the game service representative accepts the pay order from the server, in a step B640, the PGD B24 sends a reply to the transaction server confirming that the transaction has been performed. The transaction server marks the request paid which prevents another ticket with identical information from being validated. In a step B645, the server sends a confirmation to the CVT which allows the CVT to mark the request from pending to paid. When the game service representative rejects the pay order from the server, in a step B650, the PGD B24 sends a reply to the server to mark the pay request from pending to unpaid. When the ticket is marked unpaid, it may be validated by another PGD B24 or other validation device. In a step B655, the server sends the reply to the CVT to mark the pay request from pending to unpaid which allows the ticket to be validated.

In one or more embodiments of the invention, a ticket may be used to provide credit/value for establishing entitlement to a service or a good, such as the right to play a game or obtain food. The PGD B24 may include a card reader B140. In such an arrangement, a user of the PGD B24 may use a credit card or other magnetic stripe type card for providing credit/value. In various embodiments, the PGD B24 may include one or more other types of devices for obtaining/receiving information, such as a smart card reader. In such arrangements, the PGD B24 device may read information from the credit card, smart card, or other device. These cards may comprise the well-known credit or debit cards. This information may be used to provide the credit/value. In the example of a credit card, the user's account information may be read from the card and transmitted from the PGD B24 to the controller B42. Credit card/credit validation information may be associated with a credit card server (not shown). This credit card server may be associated with a bank or other entity remote from the casino or place of use of the PGD B24 and the controller B42. A communication link may be provided between the controller B42 and remote server for sending credit card information there over.

In some embodiments, when a player utilizes a smart card or credit card the amount of associated credit or value may be transmitted to the EZ Pay server B26, and then the credited amount may be treated in exactly the same manner as if the credit/value had been provided by a ticket. When a player wishes to cash out, the EZ Pay server B26 has a record of the original amount credited and the amounts of any awards, losses, or payments, and may then issue the player a ticket representing the user's total credit.

In accordance with the invention, a gaming system is provided which includes one or more portable gaming devices. The portable gaming devices permit a player to play one or more games at a variety of locations, such as a hotel room, restaurant, or other location. These locations may be remote from traditional gaming areas where free-standing, generally stationary gaming machines are located.

In one or more embodiments, a player may use the portable gaming device to not only play games, but obtain other products and services. In addition, in one or more embodiments, the portable gaming device may be used by game service representatives to perform a variety of functions and provide a variety of services to a player.

It should be understood that the foregoing descriptions encompass but some of the implementation technologies that may be used, according to various embodiments. Other technologies may be used and are contemplated, according to various embodiments. Various embodiments may be performed using any suitable technology, either a technology currently existing or a technology which has yet to be developed.

Wireless Interactive System

According to various embodiments, a wireless interactive gaming system includes one or more wireless gaming devices, a receiver, and a central processor. The wireless interactive gaming system may also include a terminal which is in communication with the central processor.

In a gaming environment that employs a wireless interactive gaming system, a player receives a wireless gaming device from a game official who represents a gaming establishment or the "house". The wireless gaming device is capable of receiving wager information as commands entered by the player and transmitting the received wager information along with identification information to the receiver by wireless transmission.

The wireless interactive gaming system may support a number of wireless gaming devices within one gaming establishment. The range for the wireless transmission from a wireless gaming device may be up to 100 feet.

According to various embodiments, a player inputs information into a wireless gaming device, e.g., by pressing push buttons or keys on the device. The wireless gaming device may include any number, e.g., from 5 to 20, of buttons in a keypad-type arrangement. Buttons may be marked with the digits 0 through 9 and may also include a "$" (dollar sign) key and an "enter" key, so that the player may easily input wager information. In various embodiments, the wireless gaming device includes at least eight player selection buttons (e.g., digits) and at least five special function buttons, (e.g., to request the player's balance). In various embodiments, the player can input some or all of the wager information into the wireless gaming device by swiping a smart card, which contains a microprocessor chip or a magnetic stripe with encoded information, through a smart card reader on the wireless gaming device.

In various embodiments, the wireless gaming device may include an identifier. The identifier may be, e.g., a series of alphanumeric characters, a bar code, or a magnetic stripe affixed to the device. In various embodiments, the identifier may be a digital code stored in a secure memory, e.g., an electronically erasable programmable read only memory (EEPROM). The identifier may thus be readable directly by the game official if it is a series of alphanumeric characters, or it may be read automatically by a bar code reader or a magnetic stripe reader. In various embodiments, the identifier may be programmed in EEPROM or read from EEPROM through an RS-232 port, which may be directly connected to encoder and decoder circuitry in a terminal.

A wireless gaming device may store an encryption key. The encryption key may be used to encrypt information that is transmitted to the receiver from the device. Encryption of the information transmitted to the receiver may limit tampering with the wireless gaming device and may prevent unauthorized or counterfeit devices from being used with the system.

In various embodiments, the encryption key may be stored in the EEPROM. The EEPROM may have the advantage of being a memory device which is difficult to access if the appropriate encoding circuitry is not available. Thus, it is contemplated that the encoding circuitry that downloads the encryption key into the device may be securely held by the game official.

Alternately, the encryption key stored in the EEPROM may be updated and changed for each player who receives a wireless gaming device by directly connecting the device to encoding and decoding circuitry in the terminal through a port at the time the wireless gaming device is delivered to the player. Moreover, other digital information related to the game being played may be downloaded from the terminal to the EEPROM through a direct connection with the wireless gaming device.

In various embodiments, a microprocessor controls the operation of a wireless gaming device. The microprocessor receives digital wager information entered by the player using buttons or keys of the wireless gaming device. The microprocessor stores an identification code associated with the wireless gaming device that is a digital equivalent of the identifier of the wireless gaming device. The microprocessor also executes software applications for encrypting the identification code and the player's wager information for transmission to the receiver. The software contains an algorithm that encrypts a data packet including the identification code and wager information using the encryption key.

In various embodiments, a wireless gaming device has a unique address, i.e., identification code, for communications with the receiver and stores a player identification that is programmed into the device by the central processor. The wireless gaming device may include a wager amount register, which is maintained and updated using the keys on the device. The value stored in the wager amount register may be included in transmissions from the device to the central processor. The value of the wager amount register may default to a predetermined value, e.g., $1, when the device is initialized, and can be further adjusted by the player. The wireless gaming device may also include an account balance register, which is maintained in the device and is updated by the central processor periodically. The value of the account balance register should default to $0 when the device is initialized.

The wireless gaming device may include player function keys. The player function keys may be used to accomplish the following functions:
 1. Transmit a message to the receiver;
 2. Request account balance information;
 3. Adjust the state of the device;
 4. Affect the data to be sent in the next transmitted message;

5. Increment the wager amount register by a predetermined amount, e.g., $10, $5 or $1;
6. Reset the wager amount register to the default value, e.g., $1.

The firmware of the wireless gaming device may only allow for one press of buttons or keys every 100 ms. In various embodiments, key presses are not queued; thus, when a key press message is queued to be sent, no other player input is accepted until the queued message has been sent.

The wireless gaming device may include a transmitter. The transmitter may receive encrypted digital information from the microprocessor and convert it to a signal for wireless transmission to the receiver. The transmitter transmits signals wirelessly, e.g., using radio frequency signals or infrared signals. Communications between the receiver and the wireless gaming device may be asynchronous at 2400 bits per second.

The wireless gaming device may include an identifying circuit that drives the transmitter to periodically send an identification signal to the receiver. The use of the identifying circuit permits the receiver and the central processor to be assured that the wireless gaming device is still active, functioning, and present in the gaming establishment. Thus, if the wireless gaming device were removed from the gaming establishment, the receiver and central processor would no longer receive and detect the periodic identification signal sent by the identifying circuit and the transmitter, and the game official may be alerted that the wireless gaming device has been removed from the gaming establishment.

The wireless gaming device may contain a real-time clock that permits the microprocessor to monitor the current time and date. The clock may consist of a timing circuit. The microprocessor can use the time and date information obtained from clock to perform calculations and other functions based on the current time and date.

The wireless gaming device may also include a tag, such as an electronic or magnetic component, which activates an alarm when passed through a sensing apparatus located at the entrance and/or exit of the gaming establishment. Activation of the alarm by passing the wireless gaming device with the tag through the sensing apparatus notifies the game official of an attempted removal of the wireless gaming device from the gaming establishment.

The wireless gaming device may be powered by a battery source contained within the device. A portable power source such as battery source permits extended cordless operation of the wireless gaming device throughout a gaming environment. The battery source may be part of a removable, rechargeable battery pack that allows the device to be recharged when it is not in use.

In some embodiments, the wireless gaming device displays information such as game information on a device display, such as a liquid crystal display (LCD) with a back-light. The LCD can be used to display the values stored in the wager amount register and in the account balance register. The wireless gaming device may include a display receiver which receives digital information transmitted from the receiver or from the central processor.

The device may also include a bicolor light emitting diode (LED). The bicolor LED is capable of displaying at least two colors, e.g., red and green. The green light may flash each time the wireless gaming device sends a transmission to the receiver, for a period of time to ensure that it is visible to the player. The red light may illuminate when a key is pressed on the wireless gaming device, and remain lit until the transmission is received by the receiver; no additional key entry will be enabled when the red light is lit. The wireless gaming device may also include additional light emitting diodes, for example to indicate when the account balance register is being updated and the balance information is being displayed on the LCD.

The receiver is capable of receiving signals transmitted from the transmitter in the wireless gaming device. The receiver contains a decoder, which converts the received signals, e.g., into digital information. This digital information contains at least the identification code of the wireless gaming device and the player's wager information. The receiver sends the digital information obtained by the decoder to the central processor. Communications between the central processor and the receiver may be by an RS-232 electrical interface data serial communications link, with communications being asynchronous at either 9600 or 19,200 bytes per second, in various embodiments.

The receiver may receive signals from many wireless devices either simultaneously or in rapid succession, e.g., using multiplexing techniques, so that many players can place wagers using their wireless gaming devices during a short time interval. The receiver differentiates signals received from the various devices by the identification codes which are present in the signals received by the receiver.

The central processor receives the identification code of a wireless gaming device and the player's wager information from the receiver. The central processor also decrypts this information using the encryption key. The central processor is capable of receiving data from multiple wireless gaming devices in an apparently simultaneous manner.

In various embodiments, an account for the player is stored in a database of the central processor. The database stores the monetary value of the balance of the account associated with the identifier of the wireless gaming device.

The central processor manages the player's account in the database based on signals received from the player's wireless gaming device as the player places wagers and when prizes are awarded during play of the game. The central processor subtracts money from the player's account balance when the player places a wager. The player's account balance may be automatically increased by the central processor when the player wins a game on which he has placed a wager.

The central processor also stores and is capable of executing software applications containing algorithms to calculate players' account balances, wagers, and winnings. The central processor should be able to execute all of the algorithms which define the actions performed on the players' accounts during the progress of the game, as wagers are entered, as winnings paid out, and when funds are added to the players' accounts.

Algorithms in the software in the central processor may also calculate odds and payouts for certain games, such as lottery-type games, during play of the game. The odds and payouts at a particular point in time may depend on the characteristics of the game being conducted by the central processor, and may change as the game progresses. These algorithms may be executed by the central processor to provide exact calculations of the odds of specific game events occurring and the associated prizes for a player's correctly predicting the occurrence of one of those events. The algorithms may be executed continuously, so that real-time odds and payout can be calculated as the game progresses.

The central processor may perform various actions on players' accounts, resulting in various impacts on the accounts. For example, if the player wins a game, his account is credited for the payout based on his wager. If the player places a wager using the wireless gaming device, his account is debited by the amount of the wager. If the game official receives additional funds from the player, the balance of the player's account is credited by the amount of the funds. If the game official closes the player's account and disburses funds to him, the balance of the player's account is debited by the amount disbursed.

The central processor may be located in the gaming establishment that houses the receiver. In various embodiments, the central processor may be located remotely from the receiver, communicating with the receiver via electronic digital telephone communication or wireless transmission, such as a serial communication link. Additionally, the central processor may perform a multitude of functions for various receivers in a variety of gaming environments.

In some embodiments, communication among the central processor, the receiver, and the wireless gaming device involves a polling scheme. Polling enables many wireless gaming devices to communicate with a receiver without interference between them. Such a polling scheme may include the transmission of digital signals in the form of strings of hexadecimal characters. Preferably, all communications between the central processor, the receiver and the wireless gaming device are encrypted.

In such a polling scheme, hexadecimal characters may be reserved for specific control protocols. For example, an attention character is a header character used to begin all transmissions from the central processor to the receiver, and serves to delineate messages and synchronize the receipt of messages in the receiver. The same function is implied when the attention character follows in response to a message transmission. An acknowledgement character is another header character which provides acknowledgement to the transmitting device that the previous message's data has been received and verified. The acknowledgement character can also function as an attention character to begin a subsequent message. An end of message character is used to indicate the end of a transmission. Also, a complement next byte character allows for use of reserved protocol characters within a normal transmission message by avoiding a false control signal when a message data byte matches one of the control characters. When a message byte that needs to be sent matches one of the protocol control characters, the complement next byte character is sent, followed by the one's complement of the matching message byte.

Verification of received data may be accomplished using a single byte checksum of the message information. This checksum may be the one's complement of the sum of the original message data, not including the header character. If the checksum results in a value equal to one of the protocol control characters, it will be treated in accordance with the function of the complement next byte character.

In the polling scheme described above, there are three different modes of communication over the link between the central processor and the receiver. First, the central processor may send messages intended for the receiver. Second, the central processor may send messages intended for the wireless gaming device. Third, the wireless gaming device may send messages intended for the central processor. In various embodiments, messages sent by the central processor may be in the form of a character string formatted with a header character, followed by the identification code of the intended device, the command or message, an end of message character, and a checksum character. Messages received by the receiver, or the wireless gaming device may be acknowledged by transmission of an acknowledgement character, but the central processor need not acknowledge messages sent from the wireless gaming devices. Messages sent by the central processor to be received by the wireless gaming device may be broadcast to all of the wireless gaming devices. A device address may be reserved as a broadcast address for all of the wireless gaming devices, and all devices will receive messages sent to this address; in this case, no acknowledgement need be returned from any of the wireless gaming devices.

Each command or message may begin with a command code to signal how the information contained in the message is to be used. Command codes for messages sent by the central processor to the receiver and the wireless gaming device include the following:
  1. Send a device address list to the receiver;
  2. Send account balance information to the addressed device;
  3. Send command to disable the addressed device;
  4. Send command to enable the addressed device.

In various embodiments, messages sent between the receiver and the wireless gaming device may be in the form of a character string formatted with a header character, followed by the identification code of the intended device, the current wager amount, the request, command or data, an end of message character, and a checksum character. Command codes for requests, commands and data sent between the receiver and the wireless gaming device include the following:
  1. Read user identification;
  2. Read device address;
  3. Read balance register;
  4. Read wager amount register;
  5. Provide device status;
  6. Write user identification;
  7. Write device address;
  8. Write balance register;
  9. Write wager amount;
  10. Perform self test.

These command codes may be used to program the device addresses and user identification information into the wireless gaming devices, as well as to initialize the device to the default state, i.e., the player's account balance of $0. The account balance register and the user identification may each comprise two characters, the least significant byte, and the most significant byte, allowing for the use a greater range of numbers for these values.

Various embodiments include methods by which the central processor communicates with a wireless gaming device. The central processor transmits a string of hexadecimal characters, including, e.g., a header character, followed by the device's identification code, followed by a request, command or data, followed by an end of message character, followed by a checksum character. After the central processor transmits the character string, the wireless gaming device receives the string, recognizes its identification code, and executes any instructions in the string. When the central processor sends an instruction to all wireless gaming devices simultaneously, all currently active devices receive and execute the instruction. The wireless gaming device does not send an acknowledgement message to the central processor, although the receiver may receive a transmission from the wireless gaming device that the instruction was received properly. The central processor also communicates with the receiver in a similar manner, except that the receiver may send an acknowledgement message to the central processor which includes the acknowledgement control protocol character.

Similarly, the wireless gaming device communicates with the receiver and the central processor using, e.g., hexadecimal character strings. The receiver regularly and periodically polls the active wireless gaming device for information requests or wagering requests. If the player has entered a request into the wireless gaming device since the last time the wireless gaming device was polled, then the player's request will be transmitted to the receiver.

Various embodiments include methods by which the wireless gaming device receives and relays player requests to the central processor. First, the player enters a request into the wireless gaming device using buttons or keys. The player then presses a button labeled, e.g., "enter" or "send," instructing the wireless gaming device to send the request the next time the receiver polls the wireless gaming device. When this button has been pressed, the red light of the bicolor LED is illuminated, thereby informing the player that the request is waiting to be sent. The request is converted into a hexadecimal character string, including, e.g., a header character, an identification code (or, alternatively, a separate identification string reserved for a specific player), the current wager amount, the player's request (e.g., to change the wager amount or to send a balance update), an end of message character, and a checksum character. The next time the receiver polls the device, the transmitter of the device transmits the character string to the receiver. When the wireless gaming device is polled by the receiver, the green light of bicolor LED flashes, informing the player that the request has been transmitted. The receiver receives the request string, and transmits the string to the central processor. The central processor then acts on the player's request.

Using the terminal, the game official may process wagering transactions and distribute wireless gaming devices. In various embodiments, the terminal may include a bar code reader and/or a magnetic stripe reader for rapid entry of the identifier of a wireless gaming device prior to delivering the wireless gaming device to the player. Reading devices provide information in the form of digital data to the terminal. The terminal includes a keyboard by which the game official can manually enter data to be sent to the central processor. Using either reading device, the keyboard, or a combination of these, the game official communicates with the central processor to establish a player's account, increase the balance of the account when the player tenders funds to the game official, and decrease the balance of the account when the player seeks to collect the cash value of his account balance.

The player establishes a balance of the account associated with his wireless gaming device, identified by an identifier, when he receives the wireless gaming device from the game official. The player may increase the monetary value of the balance of the account by paying additional funds, in the form of cash or credit, to the game official, who accesses the account stored in the central processor through the terminal to increase the balance of the account.

The wireless gaming device is returned to the game official after the player has played one or more games. The readers may be used to read the identifier for closing out the player's account stored in the database of the central processor. The terminal includes a terminal display which notifies the game official of the balance of the player's account, so that the player may be paid the cash value of the remaining balance of his account.

In some embodiments, an account status display device is located in the gaming establishment to display players' account information. In various embodiments, the display device may be, e.g., a liquid crystal display or a cathode ray tube display. The display device is controlled by the central processor, which sends information to the display device for display to the players.

A player may look at the display device to confirm that wagers transmitted from the wireless gaming device were received by the receiver and sent to the central processor, to determine the monetary balance of the player's account, and to verify that the player's winnings have been credited to his account. The display device displays key information necessary for a player to participate in a game. The information displayed for each player may include the account number, the player's account balance, the player's last wager, and the player's last prize award or win.

The display device is divided into specific areas, e.g., a display area, each area showing the account information for one player. The size of the display area may be determined by the size of the display device and the number of players who possess wireless display devices. It is contemplated that only active accounts will be displayed on the display device. If additional display devices are required to display the information concerning a large number of accounts, the central processor may be configured to drive multiple similar display devices.

The display device may also be used to display the odds and payouts for game wagers. Alternately, a separate display device driven by the central processor may be used to display the odds and payout information. Further, the odds and payouts may be displayed on the device display 21.

Procedures for using the wireless interactive gaming system, according to some embodiments, are now described. In some embodiments, a player tenders money in the form of cash or credit, e.g., $100, to a game official in the gaming establishment to establish an account. The game official chooses a wireless gaming device and uses, e.g., the bar code reader on the terminal to enter the identifier of the wireless gaming device into the terminal. The game official also inputs the amount of money tendered, i.e., $100, into the terminal via keyboard. The game official hands the wireless gaming device to the player and tells the player that his account is, e.g., Account No. 12. Alternately, the player may identify his account number directly from the identifier on the wireless gaming device. The information entered by the game official into the terminal is sent to the central processor, which establishes an account record for the player in the database.

For this example, the central processor may be conducting a racing game in which players choose a winning racing element on which to place a wager for the next racing game to be displayed in the gaming establishment. To place a wager, the player presses buttons on the wireless gaming device.

In some embodiments, the player first presses the button that corresponds to the number assigned to the racing element that he chooses, e.g., "3", and then the wager amount, e.g., "$" and "5", for a $5 wager. The player then presses the "enter" key to transmit his wager to the central processor.

In an alternate embodiment, the game may be simplified so that all wagers are placed for a fixed amount, e.g., $1, by pressing a single button on the wireless gaming device. By pressing the button that corresponds to the number assigned to the chosen racing element, e.g., "3", the player places a $1 bet on racing element number 3. The player can then place a larger wager on racing element number 3, by pressing the "3" button the number of times corresponding to the number of $1 bets he desires to make, e.g., by pressing "3" five times to wager $5 on racing element number 3.

Each time the player enters a wager, the wireless gaming device forms a data packet containing the player's wager information and the identification code of the wireless gaming device. The data packet is encrypted and transmitted by the transmitter via wireless communication.

The decoder in the receiver receives the encrypted data packet transmitted by the transmitter. The encrypted data packet is sent to the central processor, where it is decrypted. The central processor uses the information it has obtained to update the player's account in the database by subtracting the wagered amount from the player's account balance and registers the player's wager on the game.

After the game has been played, the central processor awards prizes to winning players based on the wagers they have made, and the odds associated with the winning outcome of the game. If the player in possession of the wireless gaming device is a winner, the central computer updates the player's account in the database by adding the monetary amount of the prize to the player's account balance. Otherwise, the player's account remains unchanged.

When the player has finished playing games in the gaming establishment, he returns the wireless gaming device to the game official. The game official again inputs the identifier of the wireless gaming device into the terminal, e.g., by using the bar code reader of the terminal. The terminal accesses the player's account information stored in the database of the central processor to obtain the player's remaining account balance. The terminal display displays the player's remaining account balance to the game official, who then tenders the monetary value of that amount to the player. The account is closed, and the transaction is recorded in the central processor.

It should be understood that the foregoing descriptions encompass but some of the implementation technologies that may be used, according to various embodiments. Other technologies may be used and are contemplated, according to various embodiments. Various embodiments may be performed using any suitable technology, either a technology currently existing or a technology which has yet to be developed.

Hand-Held Wireless Game Player

Various embodiments include a hand-held wireless game player for playing a game of chance. The hand-held wireless game player may be generally characterized as including: 1) a wire-less communication interface; 2) a display screen; 3) one or more input mechanisms; and 4) a microprocessor configured i) to present the game of chance on the display screen using operating instructions received via the wireless communication interface from a master gaming controller located on a gaming machine and ii) to send information from input signals generated from the one or more input mechanisms to the master gaming controller via the wireless communication interface. The wireless game player may be played in a plurality of venue locations physically separate from the location of the gaming machine where the plurality of venue locations are selected from the group consisting of a keno parlor, a bingo parlor, a restaurant, a sports book, a bar, a hotel, a pool area, and a casino floor area. The game of chance played on the wireless game player may be selected from the group consisting of slot games, poker, pachinko, multiple hand poker games, pai-gow poker, black jack, keno, bingo, roulette, craps, and a card game. Other games are also contemplated, in various embodiments.

In various embodiments, the wireless communication interface may use a wireless communication protocol selected from the group consisting of IEEE 802.11a, IEEE 802.11b, IEEE 802.11x, hyperlan/2, Bluetooth, and HomeRF. The wireless game player may also comprise a wire network interface for connecting the wireless game player to a wire network access point. In addition, the wireless game player may also comprise a peripheral interface for connecting to a peripheral gaming device where the peripheral interface is a serial interface, a parallel interface, a USB interface, a FireWire interface, an IEEE 1394 interface. The peripheral gaming device may be a printer, a card reader, a hard drive, and a CD-DVD drive.

In various embodiments, the one or more inputs mechanisms on the wireless game player may be selected from the group consisting of a touch screen, an input switch, an input button, and biometric input device where the biometric input device may be a finger print reader. The wireless game player may also include a detachable memory interface designed to receive a detachable memory where the detachable memory unit stores graphical programs for one or more games of chance played on the wireless game player. The wireless game player may also comprise one or more of the following: 1) an audio output interface for receiving a head phone jack, 2) an antenna, 3) a sound projection device, 4) a battery, 5) a power interface for supplying power to the wireless game player from an external power source and for charging the battery from the external power source, 6) a memory unit where the memory unit may store graphical programs for one or more games of chance played on the wireless game player, 7) an electronic key interface designed to receive an electronic key, and 8) a video graphics card for rendering images on the display screen where the video graphics card may be used to render 2-D graphics and 3-D graphics.

It should be understood that the foregoing descriptions encompass but some of the implementation technologies that may be used, according to various embodiments. Other technologies may be used and are contemplated, according to various embodiments. Various embodiments may be performed using any suitable technology, either a technology currently existing or a technology which has yet to be developed.

The invention claimed is:

1. A method of managing a gaming system having light sources at known positions, comprising:
   emitting, by the light sources, light in a direction of a first sensor affixed to a limb of one or more of a plurality of players, wherein the light sources identify movements of the first sensor relative to the light sources;
   generating first signals corresponding to multi-dimensional movements of the first sensor which represent a plurality of gaming commands;
   receiving and transforming the first signals to control, and provide input to, a game of chance executing on a gaming device; and
   providing feedback to the first sensor to inform at least one of the plurality of players regarding an outcome of the game of chance.

2. The method of claim 1, wherein the gaming device receives the first signals from the one or more of the plurality of players, the first signals identifying the one or more of the plurality of players and their use of the gaming device, wherein the gaming device receives the first signals, and requests identity of the one or more of the plurality of players.

3. The method of claim 1, further comprising the first sensor detecting at least one of pulse, temperature, skin conductivity, skin moisture level, skin electric field, degree or muscle tension, and other biometric signal of the one or more of the plurality of players.

4. The method of claim 1, further comprising communicating identity of the one or more of the plurality of players between the first sensor and the gaming device to initiate a gaming session.

5. The method of claim 4, further comprising requesting the one or more of the plurality of players to re-identify and/or confirm identity.

6. The method of claim 1, wherein the first sensor includes a plurality of modes of operation.

7. An apparatus comprising:
a motion sensor;
an electromagnetic transmitter/receiver;
a haptics transducer for managing a gaming system having light sources at known positions; and
at least one processor configured to control:
emitting, by the light sources, light in a direction of a first sensor affixed to a limb of one or more of a plurality of players, wherein the light sources identify movements of the first sensor relative to the light sources;
generating first signals corresponding to multi-dimensional movements of the first sensor which represent a plurality of gaming commands;
receiving and transforming the first signals to control, and provide input to, a game of chance executing on a gaming device; and
providing feedback to the first sensor to inform at least one of the plurality of players regarding an outcome of the game of chance.

8. The apparatus of claim 7, wherein the gaming device receives the first signals from the one or more of the plurality of players, the first signals identifying the one or more of the plurality of players and their use of the gaming device, wherein the gaming device receives the first signals, and requests identity of the one or more of the plurality of players.

9. The apparatus of claim 7, wherein the at least one processor is further configured to enable the first sensor to detect at least one of pulse, temperature, skin conductivity, skin moisture level, skin electric field, degree or muscle tension, and other biometric signal of the one or more of the plurality of players.

10. The apparatus of claim 7, wherein the at least one processor is further configured to communicate identity of the one or more of the plurality of players between the first sensor and the gaming device to initiate a gaming session.

11. The apparatus of claim 10, wherein the at least one processor is further configured to request the one or more of the plurality of players to re-identify and/or confirm identity.

12. The apparatus of claim 7, wherein the first sensor includes a plurality of modes of operation.

* * * * *